United States Patent
Van Os et al.

(10) Patent No.: US 10,630,939 B2
(45) Date of Patent: Apr. 21, 2020

(54) MULTI-PARTICIPANT LIVE COMMUNICATION USER INTERFACE

(71) Applicant: Apple Inc., Cupertino, CA (US)

(72) Inventors: Marcel Van Os, San Francisco, CA (US); Pablo F. Caro, San Francisco, CA (US); Jae Woo Chang, San Jose, CA (US); Allison Dryer, San Francisco, CA (US); Alan C. Dye, San Francisco, CA (US); Robert Garcia, San Francisco, CA (US); Stephen O. Lemay, Palo Alto, CA (US); Hoan Pham, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/383,403

(22) Filed: Apr. 12, 2019

(65) Prior Publication Data

US 2019/0342519 A1 Nov. 7, 2019

Related U.S. Application Data

(63) Continuation of application No. 16/144,572, filed on Sep. 27, 2018, now Pat. No. 10,284,812.
(Continued)

(51) Int. Cl.
*H04N 7/14* (2006.01)
*H04N 7/15* (2006.01)
(Continued)

(52) U.S. Cl.
CPC .............. *H04N 7/15* (2013.01); *G06F 9/542* (2013.01); *H04L 51/04* (2013.01); *H04L 51/043* (2013.01);
(Continued)

(58) Field of Classification Search
CPC ............ H04N 7/14; H04N 7/15; H04N 7/151; H04W 4/12
(Continued)

(56) References Cited

U.S. PATENT DOCUMENTS 5,617,526 A 4/1997 Oran et al.
6,728,784 B1 4/2004 Mattaway
(Continued)

FOREIGN PATENT DOCUMENTS

EP 2056568 A1 5/2009
EP 2237536 A1 10/2010
(Continued)

OTHER PUBLICATIONS

International Search Report and Written Opinion received for PCT Patent Application No. PCT/US2018/048151, dated Jan. 10, 2019, 23 pages.
(Continued)

*Primary Examiner* — Melur Ramakrishnaiah
(74) *Attorney, Agent, or Firm* — Dentons US LLP

(57) ABSTRACT

An electronic device includes a display, one or more processors, and memory storing one or more programs configured to be executed by the one or more processors. The device can display a messaging user interface of a messaging application, the messaging user interface including: a message region including a plurality of messages between participants in a message conversation that includes three or more participants, and an affordance separate from the message region for starting a live video communication session in a live video communication application. The device can detect an input corresponding to selection of the affordance. In response to, detecting the input corresponding to selection of the affordance, the device can initiate a process for starting the live video communication session in
(Continued)

the live video communication application, the live video communication session including the participants of the message conversation.

30 Claims, 178 Drawing Sheets

Related U.S. Application Data

(60) Provisional application No. 62/679,925, filed on Jun. 3, 2018, provisional application No. 62/668,229, filed on May 7, 2018.

(51) Int. Cl.
*G06F 9/54* (2006.01)
*H04M 1/725* (2006.01)
*H04L 12/58* (2006.01)
*H04N 5/262* (2006.01)
*H04N 5/44* (2011.01)
*H04N 5/445* (2011.01)
*G06T 7/20* (2017.01)

(52) U.S. Cl.
CPC ...... *H04L 51/046* (2013.01); *H04M 1/72555* (2013.01); *H04N 5/2628* (2013.01); *H04N 5/4403* (2013.01); *H04N 5/44591* (2013.01); *H04N 7/141* (2013.01); *H04N 7/144* (2013.01); *H04N 7/147* (2013.01); *H04N 7/152* (2013.01); *G06T 7/20* (2013.01); *G06T 2207/10016* (2013.01); *G06T 2207/30196* (2013.01); *H04L 51/24* (2013.01); *H04N 2005/443* (2013.01); *H04N 2007/145* (2013.01)

(58) Field of Classification Search
USPC .............................. 348/14.01–14.18; 715/753
See application file for complete search history.

(56) References Cited

U.S. PATENT DOCUMENTS

| | | |
|---|---|---|
| 6,731,308 B1 | 5/2004 | Tang et al. |
| 7,185,054 B1 | 2/2007 | Ludwig et al. |
| 9,635,314 B2 | 4/2017 | Barkley et al. |
| 9,800,951 B1 | 10/2017 | Carlson et al. |
| 9,819,877 B1 | 11/2017 | Faulkner et al. |
| 10,284,812 B1 | 5/2019 | Van Os et al. |
| 10,362,272 B1 | 7/2019 | Van Os et al. |
| 10,389,977 B1 | 8/2019 | Van Os et al. |
| 2002/0101446 A1 | 8/2002 | Tang et al. |
| 2005/0099492 A1 | 5/2005 | Orr |
| 2005/0124365 A1 | 6/2005 | Balasuriya et al. |
| 2006/0098634 A1 | 5/2006 | Umemoto et al. |
| 2008/0122796 A1 | 5/2008 | Jobs et al. |
| 2008/0313278 A1 | 12/2008 | Hochberg |
| 2009/0256780 A1 | 10/2009 | Small et al. |
| 2010/0039498 A1 | 2/2010 | Liu et al. |
| 2010/0085416 A1 | 4/2010 | Hegde et al. |
| 2010/0169435 A1 | 7/2010 | O'sullivan et al. |
| 2011/0161836 A1 | 6/2011 | Mu et al. |
| 2011/0252146 A1 | 10/2011 | Santamaria et al. |
| 2012/0002001 A1 | 1/2012 | Prentice |
| 2012/0019610 A1 | 1/2012 | Hornyak et al. |
| 2012/0092436 A1 | 4/2012 | Pahud et al. |
| 2012/0114108 A1* | 5/2012 | Katis ............ H04W 4/12 379/88.13 |
| 2012/0304079 A1 | 11/2012 | Rideout et al. |
| 2013/0169742 A1 | 7/2013 | Wu et al. |
| 2013/0225140 A1 | 8/2013 | Greisson |
| 2014/0215404 A1 | 7/2014 | Kong et al. |
| 2014/0218461 A1 | 8/2014 | DeLand |
| 2014/0331149 A1 | 11/2014 | Labey |
| 2014/0375747 A1 | 12/2014 | Martinez et al. |
| 2015/0256796 A1 | 9/2015 | Ma |
| 2015/0304366 A1 | 10/2015 | Bader-Natal et al. |
| 2016/0014059 A1 | 1/2016 | Rathod |
| 2016/0099987 A1 | 4/2016 | Shamma |
| 2016/0212374 A1 | 7/2016 | Usbergo et al. |
| 2016/0306504 A1 | 10/2016 | Brunsch et al. |
| 2017/0031557 A1 | 2/2017 | Xiangli et al. |
| 2017/0048817 A1* | 2/2017 | Yang ............ H04L 51/18 |
| 2017/0324784 A1 | 11/2017 | Taine et al. |
| 2017/0373868 A1* | 12/2017 | Deets, Jr. ........... H04N 7/147 |
| 2018/0070144 A1 | 3/2018 | Tang et al. |
| 2018/0123986 A1 | 5/2018 | Faulkner et al. |
| 2018/0124359 A1 | 5/2018 | Faulkner |
| 2018/0295079 A1* | 10/2018 | Longo ............ H04L 51/066 |
| 2019/0102049 A1 | 4/2019 | Anzures et al. |
| 2019/0124021 A1* | 4/2019 | DeMattei ........... H04L 51/04 |
| 2019/0339825 A1 | 11/2019 | Anzures et al. |

FOREIGN PATENT DOCUMENTS

| | | |
|---|---|---|
| EP | 2761582 B1 | 3/2017 |
| JP | 2007-150921 A | 6/2007 |
| JP | 2015-11507 A | 1/2015 |
| JP | 2015-170234 A | 9/2015 |
| JP | 2016-1446 A | 1/2016 |
| JP | 2016-174282 A | 9/2016 |
| JP | 2017-228843 A | 12/2017 |
| JP | 2018-056719 A | 4/2018 |
| WO | 2016/168154 A1 | 10/2016 |

OTHER PUBLICATIONS

Invitation to Pay Additional Fees received for PCT Patent Application No. PCT/US2018/048151, dated Nov. 6, 2018, 18 pages.
Non Final Office Action received for U.S Appl. No. 16/035,422, dated Nov. 30, 2018, 13 pages.
Notice of Allowance received for U.S Appl. No. 16/035,422, dated Apr. 10, 2019, 6 pages.
Notice of Allowance received for U.S. Appl. No. 16/109,552, dated Mar. 13, 2019, 25 pages.
Notice of Allowance received for U.S. Appl. No. 16/109,552, dated May 13, 2019, 2 pages.
Office Action received for Danish Patent Application No. PA201870364, dated Jun. 11, 2019, 11 pages.
Corrected Notice of Allowance received for U.S. Appl. No. 16/109,552, dated Jun. 13, 2019, 2 pages.
Notice of Allowance received for U.S. Appl. No. 16/147,432, dated May 20, 2019, 6 pages.
Corrected Notice of Allowance received for U.S. Appl. No. 16/144,572, dated Mar. 21, 2019, 3 pages.
Corrected Notice of Allowance received for U.S. Appl. No. 16/147,432, dated Jan. 18, 2019, 3 pages.
Corrected Search Report and Opinion received for Danish Patent Application No. PA201870364, dated Sep. 5, 2018, 13 pages.
Non-Final Office Action received for U.S. Appl. No. 16/109,552, dated Oct. 17, 2018, 16 pages.
Non-Final Office Action received for U.S. Appl. No. 16/144,572, dated Nov. 30, 2018, 8 pages.
Notice of Allowance received for U.S. Appl. No. 16/144,572, dated Feb. 28, 2019, 7 pages.
Notice of Allowance received for U.S. Appl. No. 16/147,432, dated Dec. 18, 2018, 13 pages.
Office Action received for Danish Patent Application No. PA201870362, dated Dec. 18, 2018, 2 pages.
Office Action received for Danish Patent Application No. PA201870363, dated Mar. 26, 2019, 3 pages.
Office Action received for Danish Patent Application No. PA201870364, dated Jan. 28, 2019, 8 pages.
Search Report and Opinion received for Danish Patent Application No. PA201870362, dated Sep. 7, 2018, 9 pages.
Search Report and Opinion received for Danish Patent Application No. PA201870363, dated Sep. 11, 2018, 12 pages.

(56) References Cited

OTHER PUBLICATIONS

Search Report and Search Opinion received for Danish Patent Application No. PA201870364, dated Sep. 4, 2018, 12 pages.
Corrected Notice of Allowance received for U.S. Appl. No. 16/147,432, dated Jul. 16, 2019, 3 pages.
Office Action received for Australian Patent Application No. 2019100499, dated Jun. 28, 2019, 4 pages.
Certificate of Examination received for Australian Patent Application No. 2019100499, dated Aug. 15, 2019, 2 pages.
Invitation to Pay Additional Fees received for PCT Patent Application No. PCT/US2019/031202, dated Aug. 8, 2019, 12 pages.
Office Action received for Danish Patent Application No. PA201870362, dated Aug. 22, 2019, 4 pages.
International Search Report and Written Opinion received for PCT Patent Application No. PCT/US2019/031202, dated Oct. 4, 2019, 19 pages.
Notice of Allowance received for Japanese Patent Application No. 2018-183504, dated Sep. 27, 2019, 4 pages. (1 pages of English Translation and 3 pages of Official Copy).
Notice of Allowance received for U.S. Appl. No. 16/511,578, dated Nov. 18, 2019, 12 pages.
Office Action received for Australian Patent Application No. 2019101062, dated Dec. 5, 2019, 3 pages.

* cited by examiner

MULTI-PARTICIPANT LIVE COMMUNICATION USER INTERFACE

CROSS-REFERENCE TO RELATED APPLICATIONS

This application is a continuation of U.S. patent application Ser. No. 16/144,572, titled "MULTI-PARTICIPANT LIVE COMMUNICATION USER INTERFACE," filed on Sep. 27, 2018, which claims priority to U.S. Provisional Patent Application Ser. No. 62/679,925, titled "MULTI-PARTICIPANT LIVE COMMUNICATION USER INTERFACE," filed on Jun. 3, 2018; and U.S. Provisional Patent Application Ser. No. 62/668,229, titled "MULTI-PARTICIPANT LIVE COMMUNICATION USER INTERFACE," filed on May 7, 2018, the contents of which are hereby incorporated by reference in their entireties.

FIELD

The present disclosure relates generally to computer user interfaces, and more specifically to techniques for live communication involving multiple participants.

BACKGROUND

Users are increasingly using electronic devices to virtually communicate with others for personal and business reasons. Most electronic devices are capable of providing live communication between users and multiple participants. As an example, some electronic devices provide interactive interfaces to display and control the live communication.

BRIEF SUMMARY

Some techniques for live communication involving multiple participants using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for live communication involving multiple participants. Such methods and interfaces optionally complement or replace other methods for live communication involving multiple participants. Such methods and interfaces reduce the cognitive burden on a user and produce a more efficient human-machine interface. For battery-operated computing devices, such methods and interfaces conserve power and increase the time between battery charges.

In some embodiments, a method is performed at an electronic device with a display. The method may include: displaying a messaging user interface of a messaging application, the messaging user interface including a message region that includes a plurality of messages in a message conversation between three or more participants; receiving first data indicating that a live communication session that is available to the three or more participants is active; in response to receiving the first data indicating that the live communication session between the three or more participants is active, displaying a notification indicating that the live communication session is active; while displaying the notification indicating that the live communication session is active, receiving second data indicating that the live communication session between the three or more participants is no longer active; and in response to receiving the second data indicating that the live communication session between the three or more participants is no longer active, ceasing to display the notification or updating the notification to indicate that the live communication session is no longer active.

In some embodiments, a non-transitory computer-readable storage medium stores one or more programs configured to be executed by one or more processors of an electronic device with a display. The one or more programs include instructions for: displaying a messaging user interface of a messaging application, the messaging user interface including a message region that includes a plurality of messages in a message conversation between three or more participants; receiving first data indicating that a live communication session that is available to the three or more participants is active; in response to receiving the first data indicating that the live communication session between the three or more participants is active, displaying a notification indicating that the live communication session is active; while displaying the notification indicating that the live communication session is active, receiving second data indicating that the live communication session between the three or more participants is no longer active; and in response to receiving the second data indicating that the live communication session between the three or more participants is no longer active, ceasing to display the notification or updating the notification to indicate that the live communication session is no longer active.

In some embodiments, a transitory computer-readable storage medium stores one or more programs configured to be executed by one or more processors of an electronic device with a display. The one or more programs include instructions for: displaying a messaging user interface of a messaging application, the messaging user interface including a message region that includes a plurality of messages in a message conversation between three or more participants; receiving first data indicating that a live communication session that is available to the three or more participants is active. In response to receiving the first data indicating that the live communication session between the three or more participants is active, displaying a notification indicating that the live communication session is active; while displaying the notification indicating that the live communication session is active, receiving second data indicating that the live communication session between the three or more participants is no longer active; and in response to receiving the second data indicating that the live communication session between the three or more participants is no longer active, ceasing to display the notification or updating the notification to indicate that the live communication session is no longer active.

In some embodiments, an electronic device includes a display, one or more processors, and memory. The memory stores one or more programs configured to be executed by the one or more processors. The one or more programs including instructions for: displaying a messaging user interface of a messaging application, the messaging user interface including a message region that includes a plurality of messages in a message conversation between three or more participants; receiving first data indicating that a live communication session that is available to the three or more participants is active. In response to receiving the first data indicating that the live communication session between the three or more participants is active, displaying a notification indicating that the live communication session is active;

while displaying the notification indicating that the live communication session is active, receiving second data indicating that the live communication session between the three or more participants is no longer active; and in response to receiving the second data indicating that the live communication session between the three or more participants is no longer active, ceasing to display the notification or updating the notification to indicate that the live communication session is no longer active.

In some embodiments, an electronic device includes: a display; means for displaying a messaging user interface of a messaging application, the messaging user interface including a message region that includes a plurality of messages in a message conversation between three or more participants; means for receiving first data indicating that a live communication session that is available to the three or more participants is active; means responsive to receiving the first data indicating that the live communication session between the three or more participants is active, displaying a notification indicating that the live communication session is active; means for, while displaying the notification indicating that the live communication session is active, receiving second data indicating that the live communication session between the three or more participants is no longer active; and means for responsive to receiving the second data indicating that the live communication session between the three or more participants is no longer active, ceasing to display the notification or updating the notification to indicate that the live communication session is no longer active.

In some embodiments, a method is performed at an electronic device with a display. The method may include: receiving a request to display a user interface for a live communication session between two or more participants; and in response to receiving the request to display the user interface for the live communication session between two or more participants, displaying a live communication user interface including concurrently displaying a plurality of representations of participants in the live communication session, where displaying the plurality of representations of participants in the live communication session includes: in accordance with a determination that the number of participants in the live communication session includes more than a threshold number of participants, concurrently displaying representations of a first plurality of the participants other than a user of the electronic device at one or more sizes greater than a respective threshold size while displaying representations of a second plurality of the participants in an overflow region, where the second plurality of participants includes one or more participants not included in the first plurality of participants and the representations of the one or more other participants displayed in the overflow region are displayed at a size smaller than the respective threshold size; and in accordance with a determination that the number of participants in the live communication session includes less than or equal to the threshold number of participants, displaying representations of the participants other than the user of the electronic device at one or more sizes greater than a respective threshold size without displaying representations of participants other than the user of the electronic device at one or more sizes smaller than or equal to the respective threshold size.

In some embodiments, a non-transitory computer-readable storage medium stores one or more programs configured to be executed by one or more processors of an electronic device with a display. The one or more programs include instructions for: receiving a request to display a user interface for a live communication session between two or more participants; and in response to receiving the request to display the user interface for the live communication session between two or more participants, displaying a live communication user interface including concurrently displaying a plurality of representations of participants in the live communication session, where displaying the plurality of representations of participants in the live communication session includes: in accordance with a determination that the number of participants in the live communication session includes more than a threshold number of participants, concurrently displaying representations of a first plurality of the participants other than a user of the electronic device at one or more sizes greater than a respective threshold size while displaying representations of a second plurality of the participants in an overflow region, where the second plurality of participants includes one or more participants not included in the first plurality of participants and the representations of the one or more other participants displayed in the overflow region are displayed at a size smaller than the respective threshold size; and in accordance with a determination that the number of participants in the live communication session includes less than or equal to the threshold number of participants, displaying representations of the participants other than the user of the electronic device at one or more sizes greater than a respective threshold size without displaying representations of participants other than the user of the electronic device at one or more sizes smaller than or equal to the respective threshold size.

In some embodiments, a transitory computer-readable storage medium stores one or more programs configured to be executed by one or more processors of an electronic device with a display. The one or more programs include instructions for: receiving a request to display a user interface for a live communication session between two or more participants; and in response to receiving the request to display the user interface for the live communication session between two or more participants, displaying a live communication user interface including concurrently displaying a plurality of representations of participants in the live communication session, where displaying the plurality of representations of participants in the live communication session includes: in accordance with a determination that the number of participants in the live communication session includes more than a threshold number of participants, concurrently displaying representations of a first plurality of the participants other than a user of the electronic device at one or more sizes greater than a respective threshold size while displaying representations of a second plurality of the participants in an overflow region, where the second plurality of participants includes one or more participants not included in the first plurality of participants and the representations of the one or more other participants displayed in the overflow region are displayed at a size smaller than the respective threshold size; and in accordance with a determination that the number of participants in the live communication session includes less than or equal to the threshold number of participants, displaying representations of the participants other than the user of the electronic device at one or more sizes greater than a respective threshold size without displaying representations of participants other than the user of the electronic device at one or more sizes smaller than or equal to the respective threshold size.

In some embodiments, an electronic device includes a display, one or more processors, and memory. The memory stores one or more programs configured to be executed by the one or more processors. The one or more programs including instructions for: receiving a request to display a user interface for a live communication session between two or more participants; and in response to receiving the request to display the user interface for the live communication session between two or more participants, displaying a live communication user interface including concurrently displaying a plurality of representations of participants in the live communication session, where displaying the plurality of representations of participants in the live communication session includes: in accordance with a determination that the number of participants in the live communication session includes more than a threshold number of participants, concurrently displaying representations of a first plurality of the participants other than a user of the electronic device at one or more sizes greater than a respective threshold size while displaying representations of a second plurality of the participants in an overflow region, where the second plurality of participants includes one or more participants not included in the first plurality of participants and the representations of the one or more other participants displayed in the overflow region are displayed at a size smaller than the respective threshold size; and in accordance with a determination that the number of participants in the live communication session includes less than or equal to the threshold number of participants, displaying representations of the participants other than the user of the electronic device at one or more sizes greater than a respective threshold size without displaying representations of participants other than the user of the electronic device at one or more sizes smaller than or equal to the respective threshold size.

In some embodiments, an electronic device includes: a display; means for receiving a request to display a user interface for a live communication session between two or more participants; and means responsive to receiving the request to display the user interface for the live communication session between two or more participants, for displaying a live communication user interface including concurrently displaying a plurality of representations of participants in the live communication session, where displaying the plurality of representations of participants in the live communication session includes: means, in accordance with a determination that the number of participants in the live communication session includes more than a threshold number of participants, for concurrently displaying representations of a first plurality of the participants other than a user of the electronic device at one or more sizes greater than a respective threshold size while displaying representations of a second plurality of the participants in an overflow region, where the second plurality of participants includes one or more participants not included in the first plurality of participants and the representations of the one or more other participants displayed in the overflow region are displayed at a size smaller than the respective threshold size; and means, in accordance with a determination that the number of participants in the live communication session includes less than or equal to the threshold number of participants, for displaying representations of the participants other than the user of the electronic device at one or more sizes greater than a respective threshold size without displaying representations of participants other than the user of the electronic device at one or more sizes smaller than or equal to the respective threshold size.

In some embodiments, a method is performed at an electronic device with a display. The method may include: displaying a live video communication user interface that includes concurrently displaying a representation of a first participant in a live video communication session, a representation of a second participant in the live video communication session, and a representation of a third participant in the live video communication session; while displaying the live video communication user interface, receiving data indicating that an activity level of the second participant in the live video communication session has increased above the activity level of the first participant in the live video communication session; and in response to receiving the data indicating that the activity level of the second participant in the live video communication session has increased above the activity level of the first participant in the live video communication session: changing a size and/or position of the representation of the first participant in the live video communication user interface; changing a size and/or position of the representation of the second participant in the live video communication user interface; and changing a size and/or position of the representation of the third participant in the live video communication user interface.

In some embodiments, a non-transitory computer-readable storage medium stores one or more programs configured to be executed by one or more processors of an electronic device with a display. The one or more programs include instructions for: displaying a live video communication user interface that includes concurrently displaying a representation of a first participant in a live video communication session, a representation of a second participant in the live video communication session, and a representation of a third participant in the live video communication session; while displaying the live video communication user interface, receiving data indicating that an activity level of the second participant in the live video communication session has increased above the activity level of the first participant in the live video communication session; and in response to receiving the data indicating that the activity level of the second participant in the live video communication session has increased above the activity level of the first participant in the live video communication session: changing a size and/or position of the representation of the first participant in the live video communication user interface; changing a size and/or position of the representation of the second participant in the live video communication user interface; and changing a size and/or position of the representation of the third participant in the live video communication user interface.

In some embodiments, a transitory computer-readable storage medium stores one or more programs configured to be executed by one or more processors of an electronic device with a display. The one or more programs include instructions for: displaying a live video communication user interface that includes concurrently displaying a representation of a first participant in a live video communication session, a representation of a second participant in the live video communication session, and a representation of a third participant in the live video communication session; while displaying the live video communication user interface, receiving data indicating that an activity level of the second participant in the live video communication session has increased above the activity level of the first participant in the live video communication session; and in response to receiving the data indicating that the activity level of the second participant in the live video communication session has increased above the activity level of the first participant in the live video communication session: changing a size and/or position of the representation of the first participant in the live video communication user interface; changing a size and/or position of the representation of the second participant in the live video communication user interface;

and changing a size and/or position of the representation of the third participant in the live video communication user interface.

In some embodiments, an electronic device includes a display, one or more processors, and memory. The memory stores one or more programs configured to be executed by the one or more processors. The one or more programs including instructions for: displaying a live video communication user interface that includes concurrently displaying a representation of a first participant in a live video communication session, a representation of a second participant in the live video communication session, and a representation of a third participant in the live video communication session; while displaying the live video communication user interface, receiving data indicating that an activity level of the second participant in the live video communication session has increased above the activity level of the first participant in the live video communication session; and in response to receiving the data indicating that the activity level of the second participant in the live video communication session has increased above the activity level of the first participant in the live video communication session: changing a size and/or position of the representation of the first participant in the live video communication user interface; changing a size and/or position of the representation of the second participant in the live video communication user interface; and changing a size and/or position of the representation of the third participant in the live video communication user interface.

In some embodiments, an electronic device includes: a display; means for displaying a live video communication user interface that includes concurrently displaying a representation of a first participant in a live video communication session, a representation of a second participant in the live video communication session, and a representation of a third participant in the live video communication session; means for, while displaying the live video communication user interface, receiving data indicating that an activity level of the second participant in the live video communication session has increased above the activity level of the first participant in the live video communication session; and means responsive to receiving the data indicating that the activity level of the second participant in the live video communication session has increased above the activity level of the first participant in the live video communication session for: changing a size and/or position of the representation of the first participant in the live video communication user interface; changing a size and/or position of the representation of the second participant in the live video communication user interface; and changing a size and/or position of the representation of the third participant in the live video communication user interface.

In some embodiments, a method is performed at an electronic device with a display. The method may include: displaying a messaging user interface of a messaging application, the messaging user interface including: a message region including a plurality of messages between participants in a message conversation that includes three or more participants; and an affordance separate from the message region for starting a live video communication session in a live video communication application; detecting an input corresponding to selection of the affordance; and in response to detecting the input corresponding to selection of the affordance, initiating a process for starting the live video communication session in the live video communication application, the live video communication session including the participants of the message conversation.

In some embodiments, a non-transitory computer-readable storage medium stores one or more programs configured to be executed by one or more processors of an electronic device with a display. The one or more programs include instructions for: displaying a messaging user interface of a messaging application, the messaging user interface including: a message region including a plurality of messages between participants in a message conversation that includes three or more participants; and an affordance separate from the message region for starting a live video communication session in a live video communication application; detecting an input corresponding to selection of the affordance; and in response to detecting the input corresponding to selection of the affordance, initiating a process for starting the live video communication session in the live video communication application, the live video communication session including the participants of the message conversation.

In some embodiments, a transitory computer-readable storage medium stores one or more programs configured to be executed by one or more processors of an electronic device with a display. The one or more programs include instructions for: displaying a messaging user interface of a messaging application, the messaging user interface including: a message region including a plurality of messages between participants in a message conversation that includes three or more participants; and an affordance separate from the message region for starting a live video communication session in a live video communication application; detecting an input corresponding to selection of the affordance; and in response to detecting the input corresponding to selection of the affordance, initiating a process for starting the live video communication session in the live video communication application, the live video communication session including the participants of the message conversation.

In some embodiments, an electronic device includes a display, one or more processors, and memory. The memory stores one or more programs configured to be executed by the one or more processors. The one or more programs including instructions for: displaying a messaging user interface of a messaging application, the messaging user interface including: a message region including a plurality of messages between participants in a message conversation that includes three or more participants; and an affordance separate from the message region for starting a live video communication session in a live video communication application; detecting an input corresponding to selection of the affordance; and in response to detecting the input corresponding to selection of the affordance, initiating a process for starting the live video communication session in the live video communication application, the live video communication session including the participants of the message conversation.

In some embodiments, an electronic device includes: a display; means for displaying a messaging user interface of a messaging application, the messaging user interface including: a message region including a plurality of messages between participants in a message conversation that includes three or more participants; and an affordance separate from the message region for starting a live video communication session in a live video communication application; mean for detecting an input corresponding to selection of the affordance; and means responsive to detecting the input corresponding to selection of the affordance, for initiating a process for starting the live video communication session in the live video communication application, the live video communication session including the participants of the message conversation.

In some embodiments, a method is performed at an electronic device with a display. The method may include: displaying a live video communication user interface of a live video communication application, the live video communication user interface including: a plurality of participant affordances corresponding to respective one or more participants, the plurality of participant affordances including a first participant affordance corresponding to a group of three or more participants; and a new session affordance for starting a new live video communication session; detecting an input that corresponds to a request to initiate a process of starting a new live video communication session; and in response to detecting the input: in accordance with the input corresponding to selection of the first participant affordance, initiating a process of starting new live video communication session that includes the group of three or more participants; and in accordance with the input corresponding to selection of the new session affordance, initiating a process for selecting two or more participants and starting a new live video communication session that includes a participant associated with the device and the two or more selected participants.

In some embodiments, a non-transitory computer-readable storage medium stores one or more programs configured to be executed by one or more processors of an electronic device with a display. The one or more programs include instructions for: displaying a live video communication user interface of a live video communication application, the live video communication user interface including: a plurality of participant affordances corresponding to respective one or more participants, the plurality of participant affordances including a first participant affordance corresponding to a group of three or more participants; and a new session affordance for starting a new live video communication session; detecting an input that corresponds to a request to initiate a process of starting a new live video communication session; and in response to detecting the input: in accordance with the input corresponding to selection of the first participant affordance, initiating a process of starting new live video communication session that includes the group of three or more participants; and in accordance with the input corresponding to selection of the new session affordance, initiating a process for selecting two or more participants and starting a new live video communication session that includes a participant associated with the device and the two or more selected participants.

In some embodiments, a transitory computer-readable storage medium stores one or more programs configured to be executed by one or more processors of an electronic device with a display. The one or more programs include instructions for: displaying a live video communication user interface of a live video communication application, the live video communication user interface including: a plurality of participant affordances corresponding to respective one or more participants, the plurality of participant affordances including a first participant affordance corresponding to a group of three or more participants; and a new session affordance for starting a new live video communication session; detecting an input that corresponds to a request to initiate a process of starting a new live video communication session; and in response to detecting the input: in accordance with the input corresponding to selection of the first participant affordance, initiating a process of starting new live video communication session that includes the group of three or more participants; and in accordance with the input corresponding to selection of the new session affordance, initiating a process for selecting two or more participants and starting a new live video communication session that includes a participant associated with the device and the two or more selected participants.

In some embodiments, an electronic device includes a display, one or more processors, and memory. The memory stores one or more programs configured to be executed by the one or more processors. The one or more programs including instructions for: displaying a live video communication user interface of a live video communication application, the live video communication user interface including: a plurality of participant affordances corresponding to respective one or more participants, the plurality of participant affordances including a first participant affordance corresponding to a group of three or more participants; and a new session affordance for starting a new live video communication session; detecting an input that corresponds to a request to initiate a process of starting a new live video communication session; and in response to detecting the input: in accordance with the input corresponding to selection of the first participant affordance, initiating a process of starting new live video communication session that includes the group of three or more participants; and in accordance with the input corresponding to selection of the new session affordance, initiating a process for selecting two or more participants and starting a new live video communication session that includes a participant associated with the device and the two or more selected participants.

In some embodiments, an electronic device includes: a display; means for displaying a live video communication user interface of a live video communication application, the live video communication user interface including: a plurality of participant affordances corresponding to respective one or more participants, the plurality of participant affordances including a first participant affordance corresponding to a group of three or more participants; and a new session affordance for starting a new live video communication session; means for detecting an input that corresponds to a request to initiate a process of starting a new live video communication session; and means responsive to detecting the input for: in accordance with the input corresponding to selection of the first participant affordance, initiating a process of starting new live video communication session that includes the group of three or more participants; and in accordance with the input corresponding to selection of the new session affordance, initiating a process for selecting two or more participants and starting a new live video communication session that includes a participant associated with the device and the two or more selected participants.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for live communication involving multiple participants, thereby increasing the effectiveness, efficiency, and user satisfaction with such devices. Such methods and interfaces may complement or replace other methods for live communication involving multiple participants.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for live communication involving multiple participants. Such techniques can reduce the cognitive burden on a user who participates in live communication involving multiple participants, thereby enhancing productivity. Further, such techniques can reduce processor and battery power otherwise wasted on redundant user inputs.

Below, FIGS. 1A-1B, 2, 3, 4A-4B, and 5A-5H provide a description of exemplary devices for performing the techniques for a live communication session between multiple participants. FIGS. 6A-6AF illustrate exemplary user interfaces for managing event notifications. FIGS. 7A-7F are a flow diagram illustrating methods of a live communication session between multiple participants in accordance with some embodiments. The user interfaces in FIGS. 6A-6AF are used to illustrate the processes described below, including the processes in FIGS. 7A-7F.

Figure 8A:
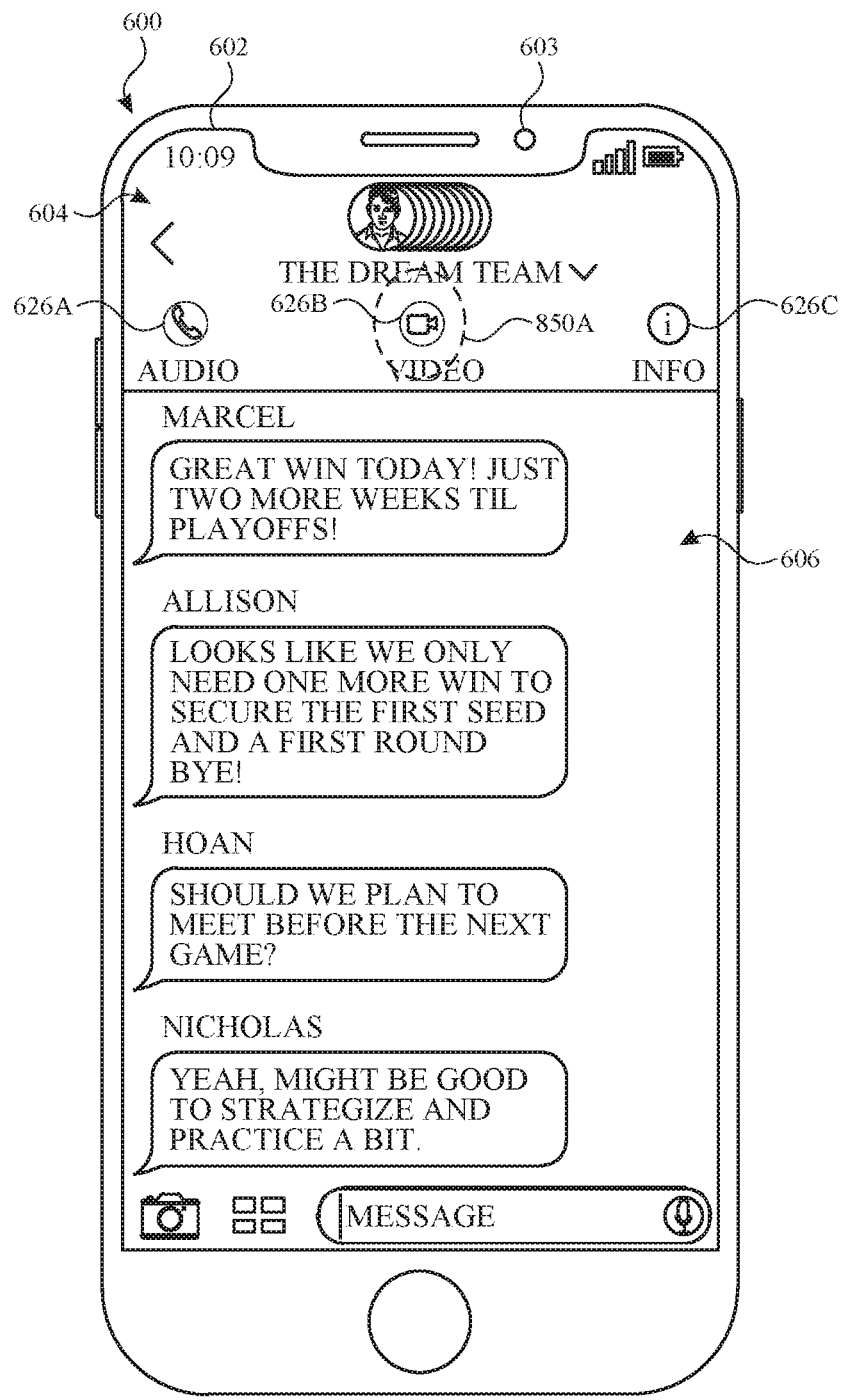
FIGS. 8A-8BK illustrate exemplary user interfaces in accordance with some embodiments.
Figure 8B:
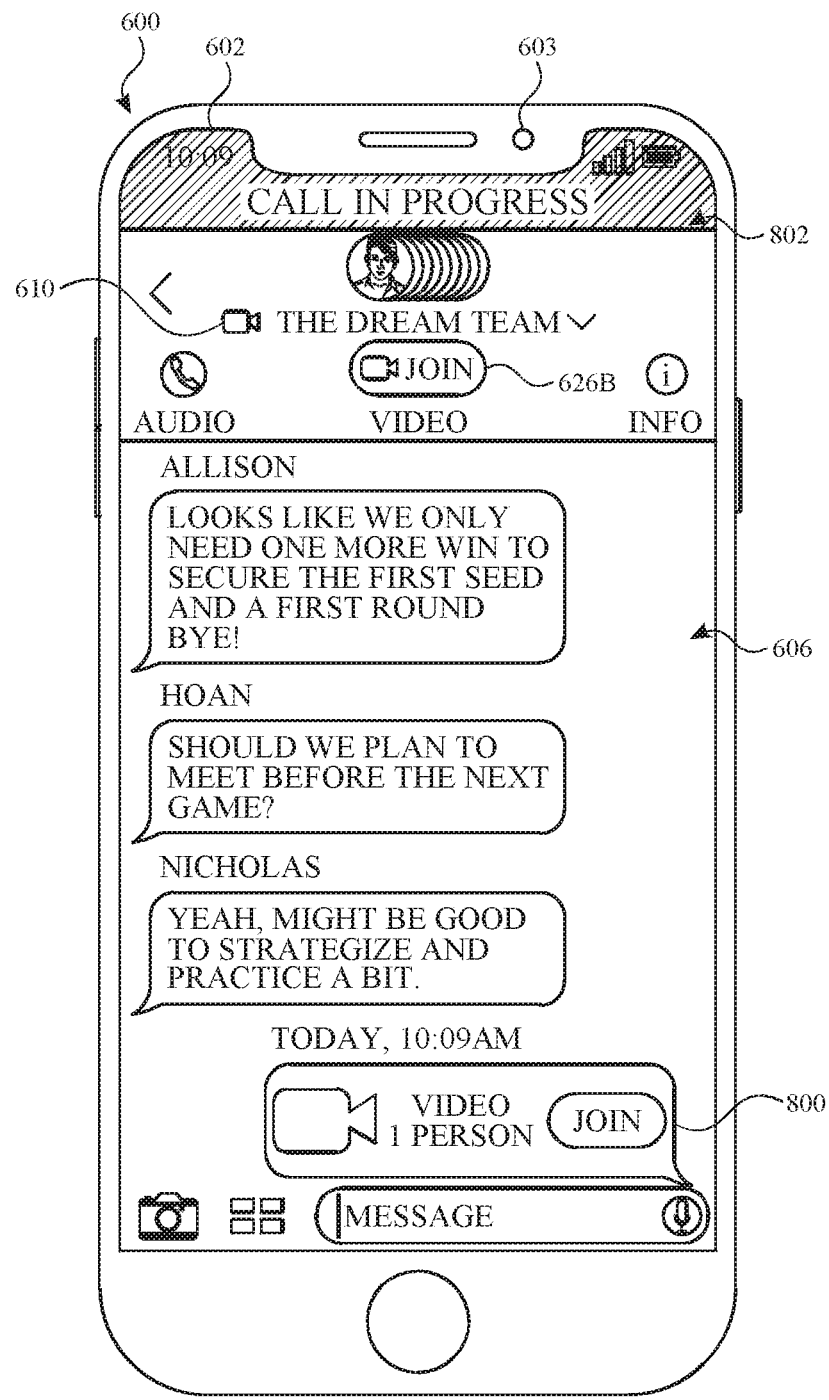

FIGS. 8A-8BK illustrate exemplary user interfaces for a live communication session between multiple participants. FIGS. 9A-9K are a flow diagram illustrating methods of performing a live communication session between multiple participants in accordance with some embodiments. The user interfaces in FIGS. 8A-8BK are used to illustrate the processes described below, including the processes in FIGS. 9A-9K.

Figure 10A:
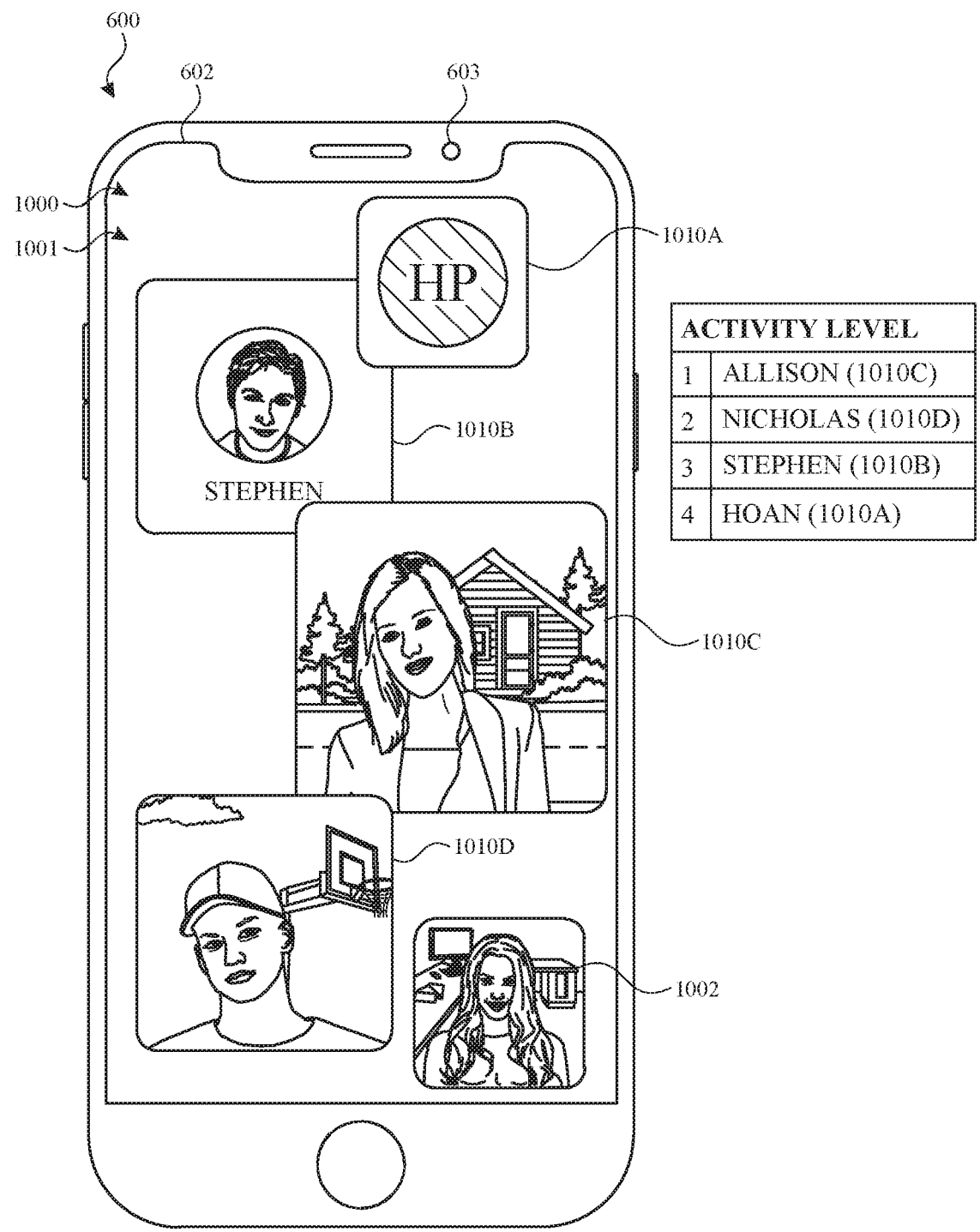
FIGS. 10A-10S illustrate exemplary user interfaces in accordance with some embodiments.
Figure 10B:
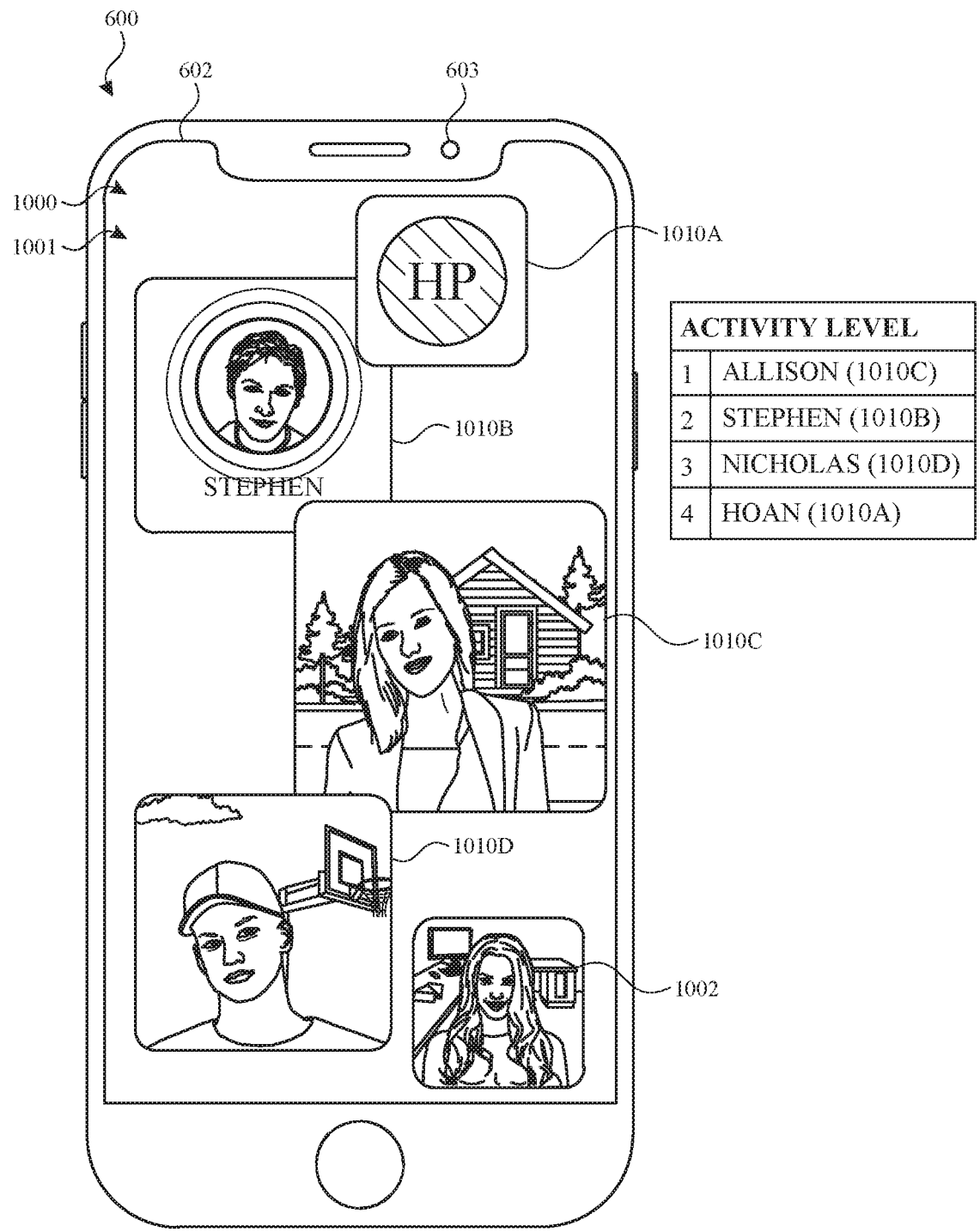
Figure 10C:
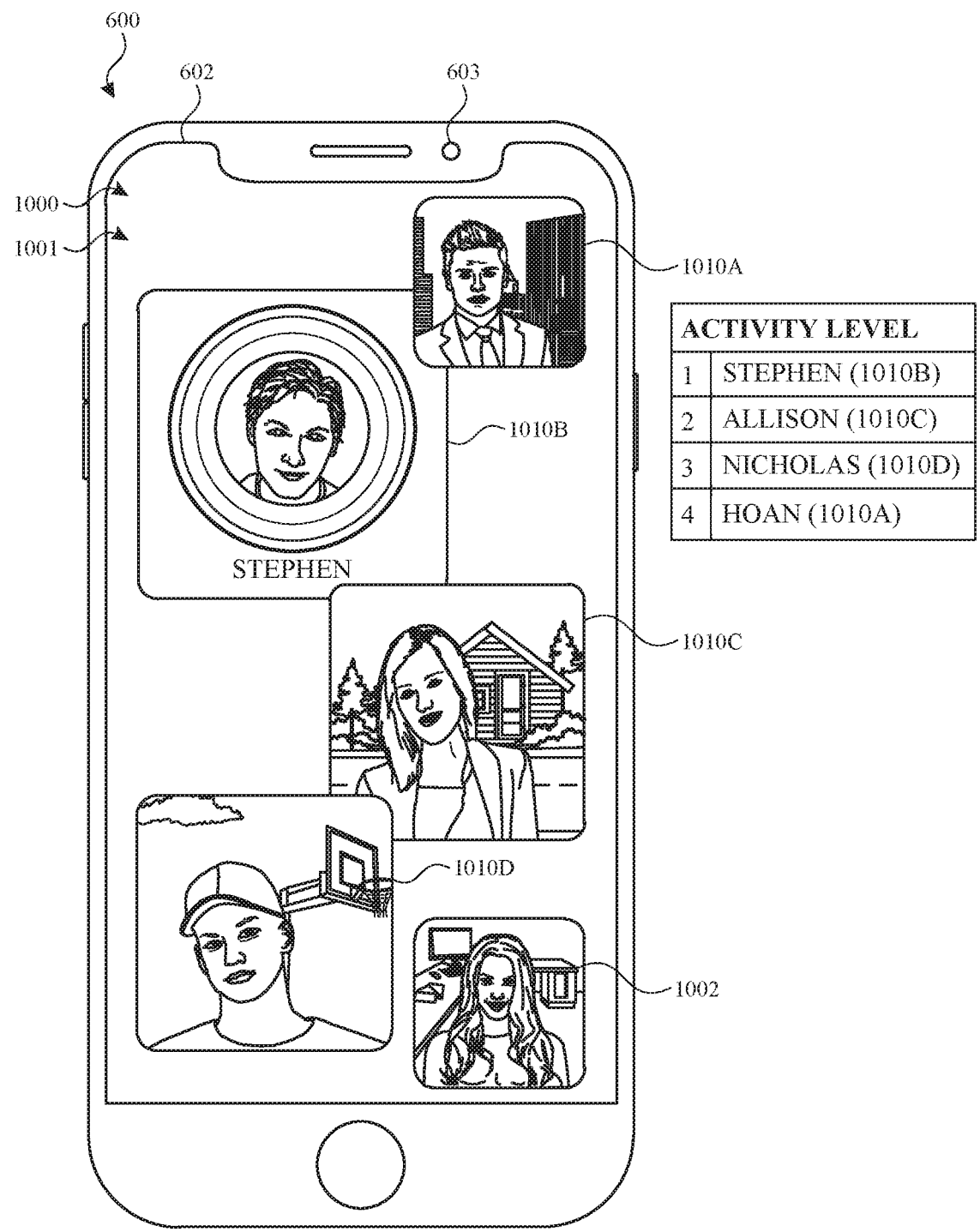
Figure 10D:
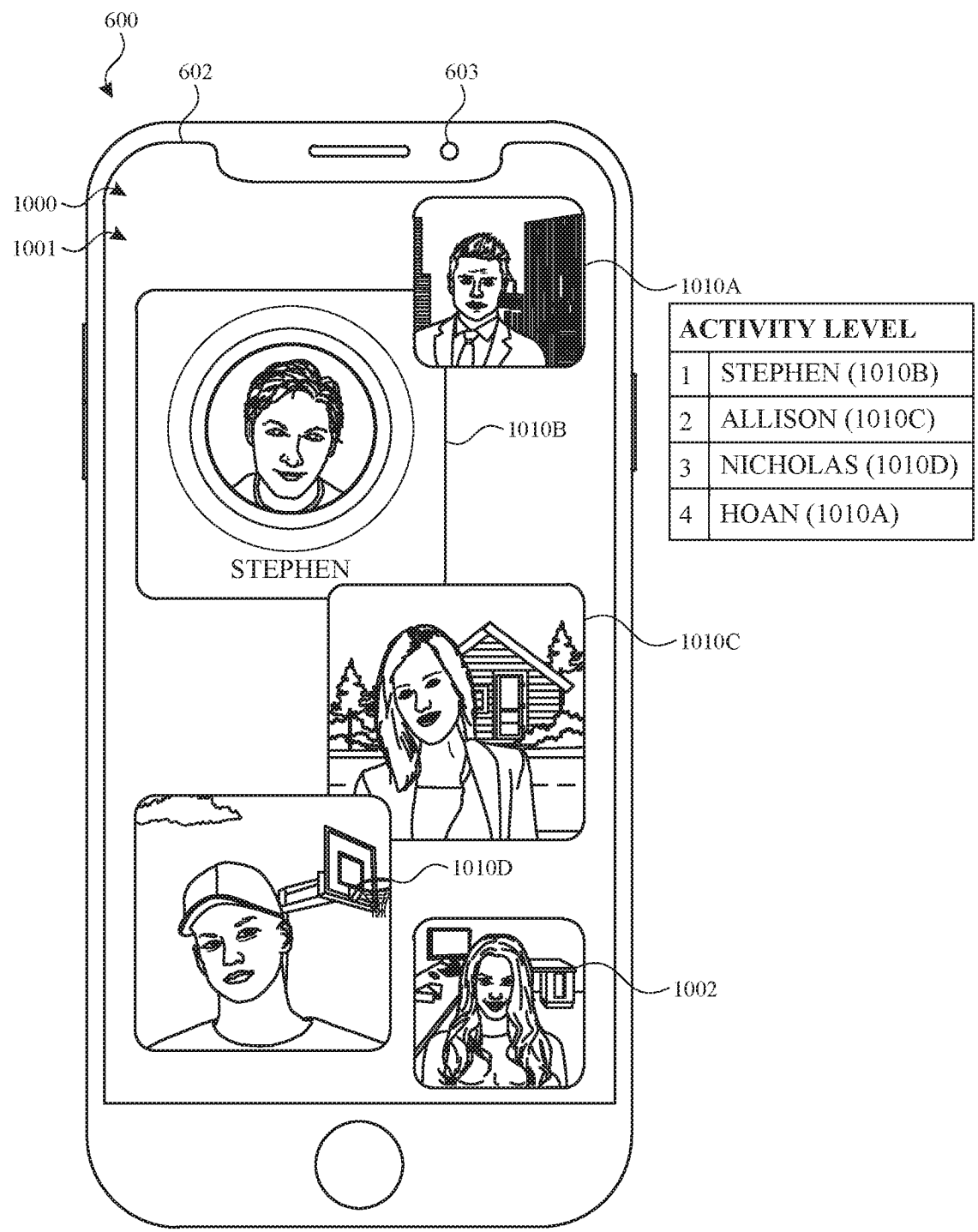
Figure 10E:
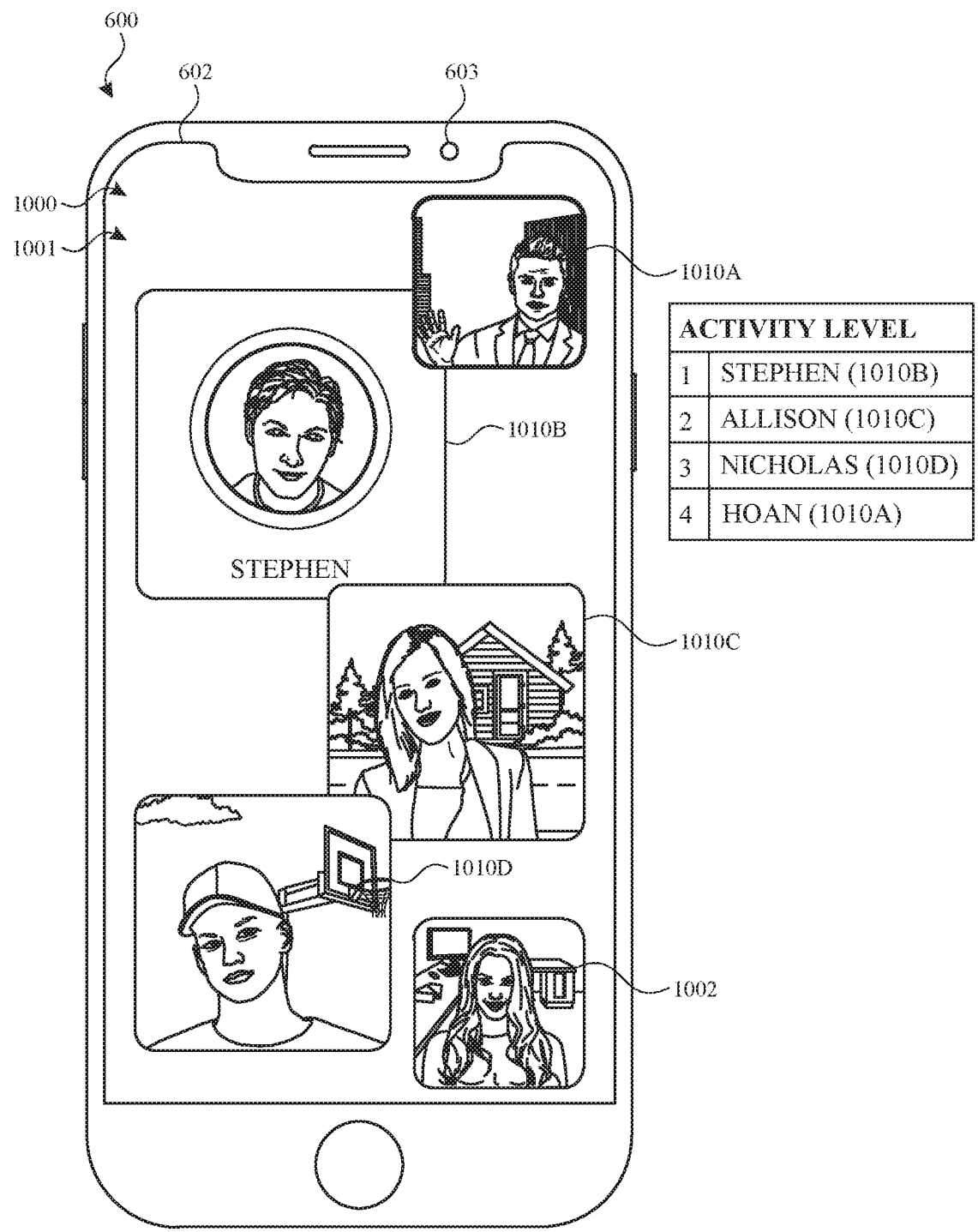
Figure 10F:
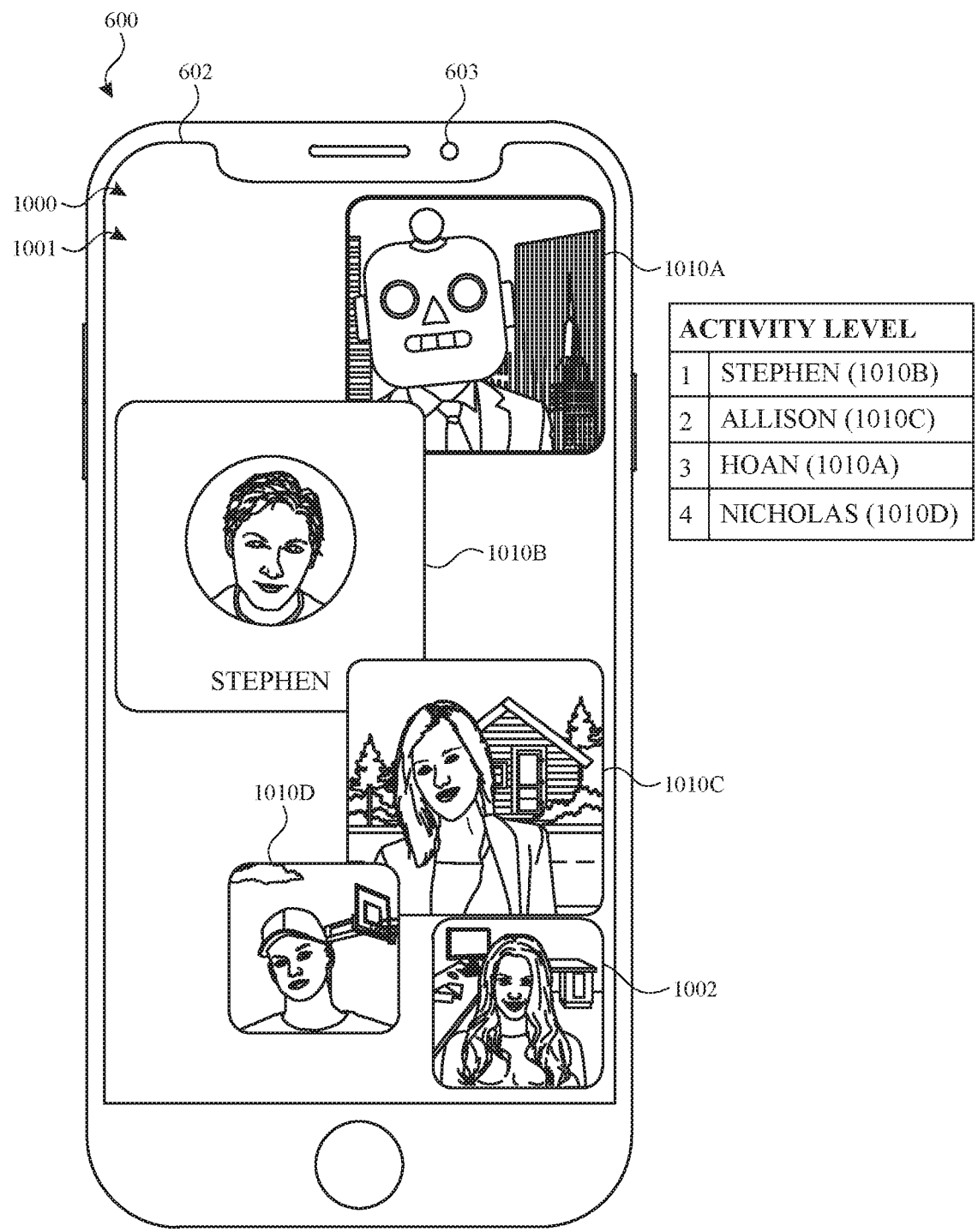
Figure 10G:
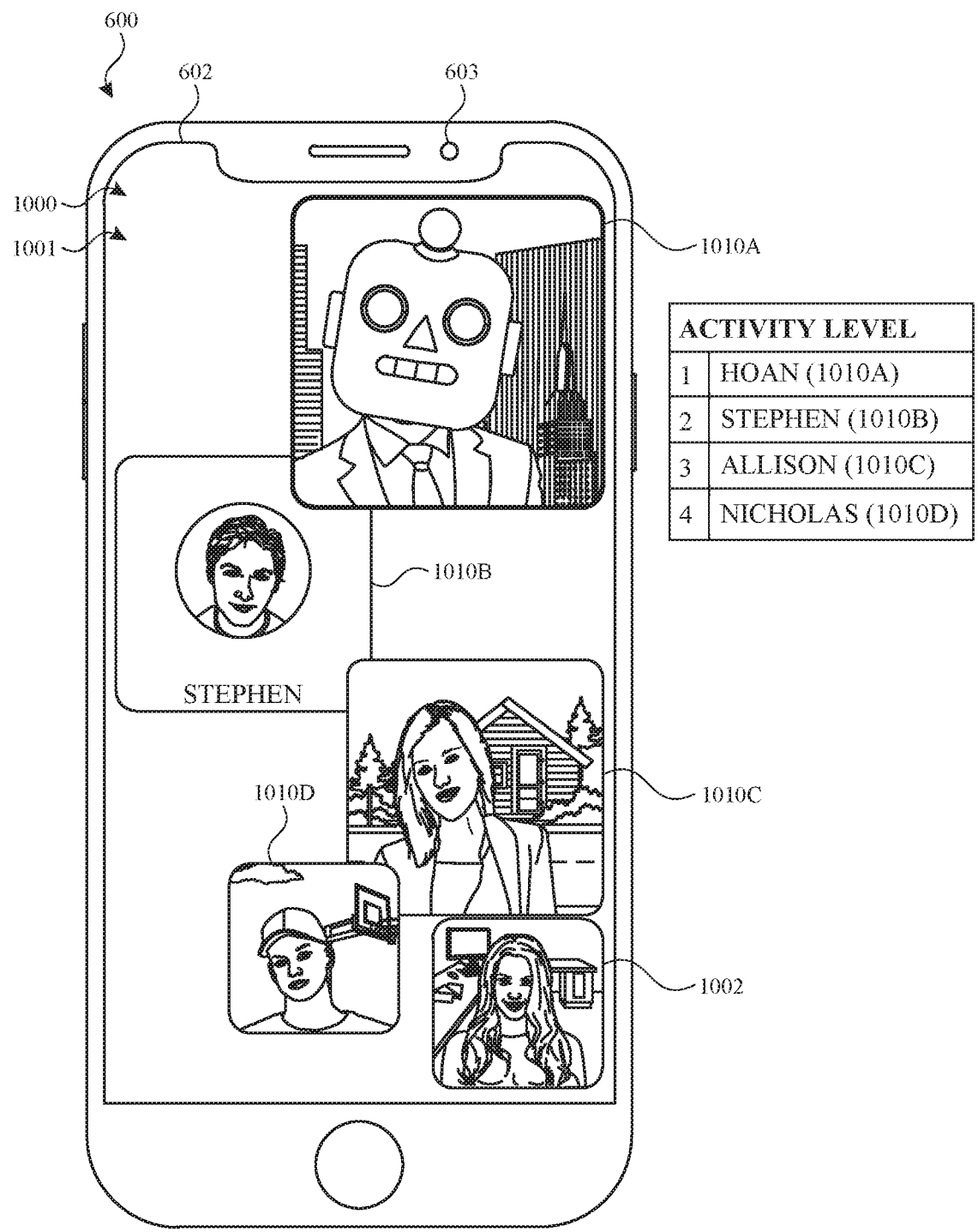
Figure 10H:
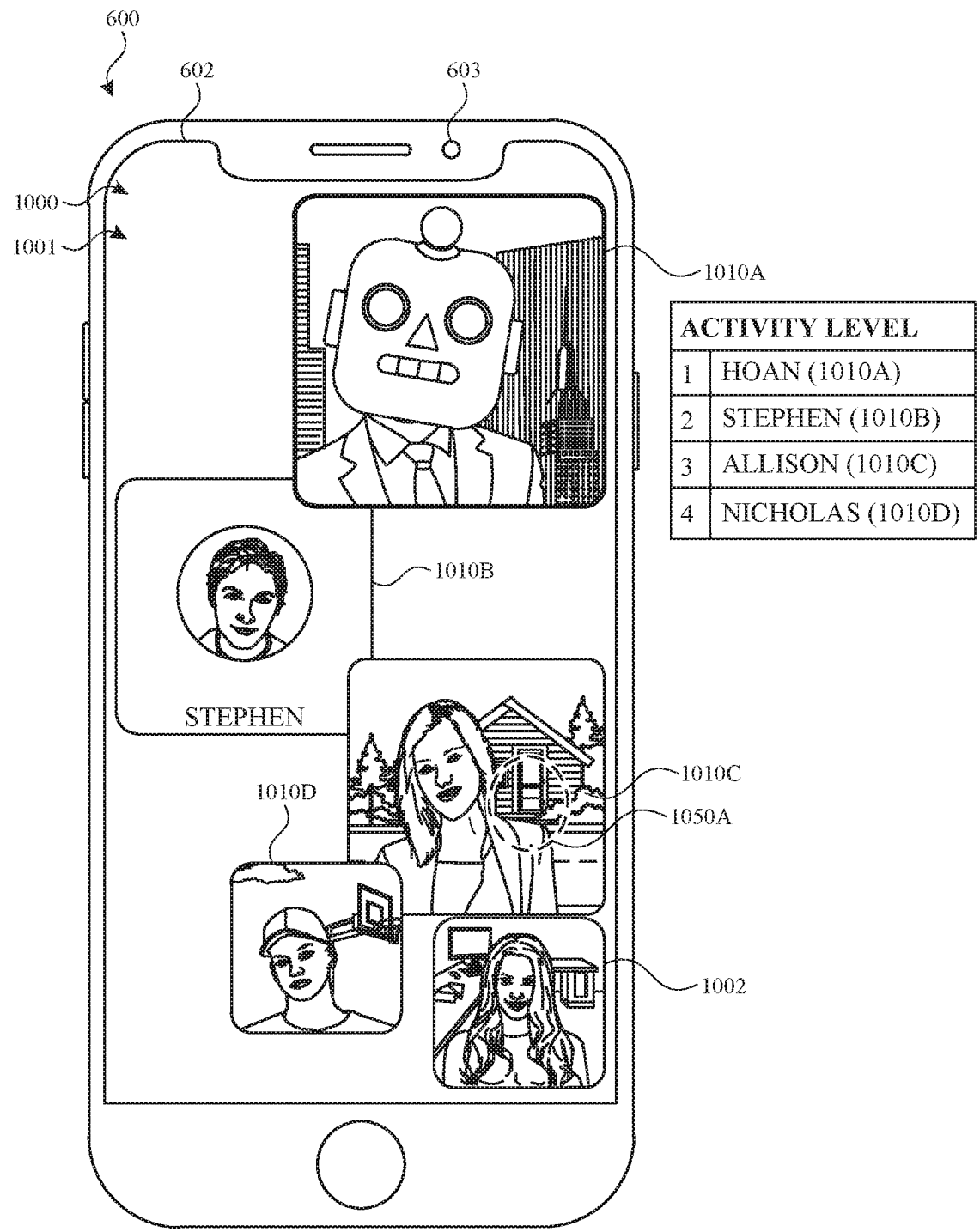
Figure 10I:
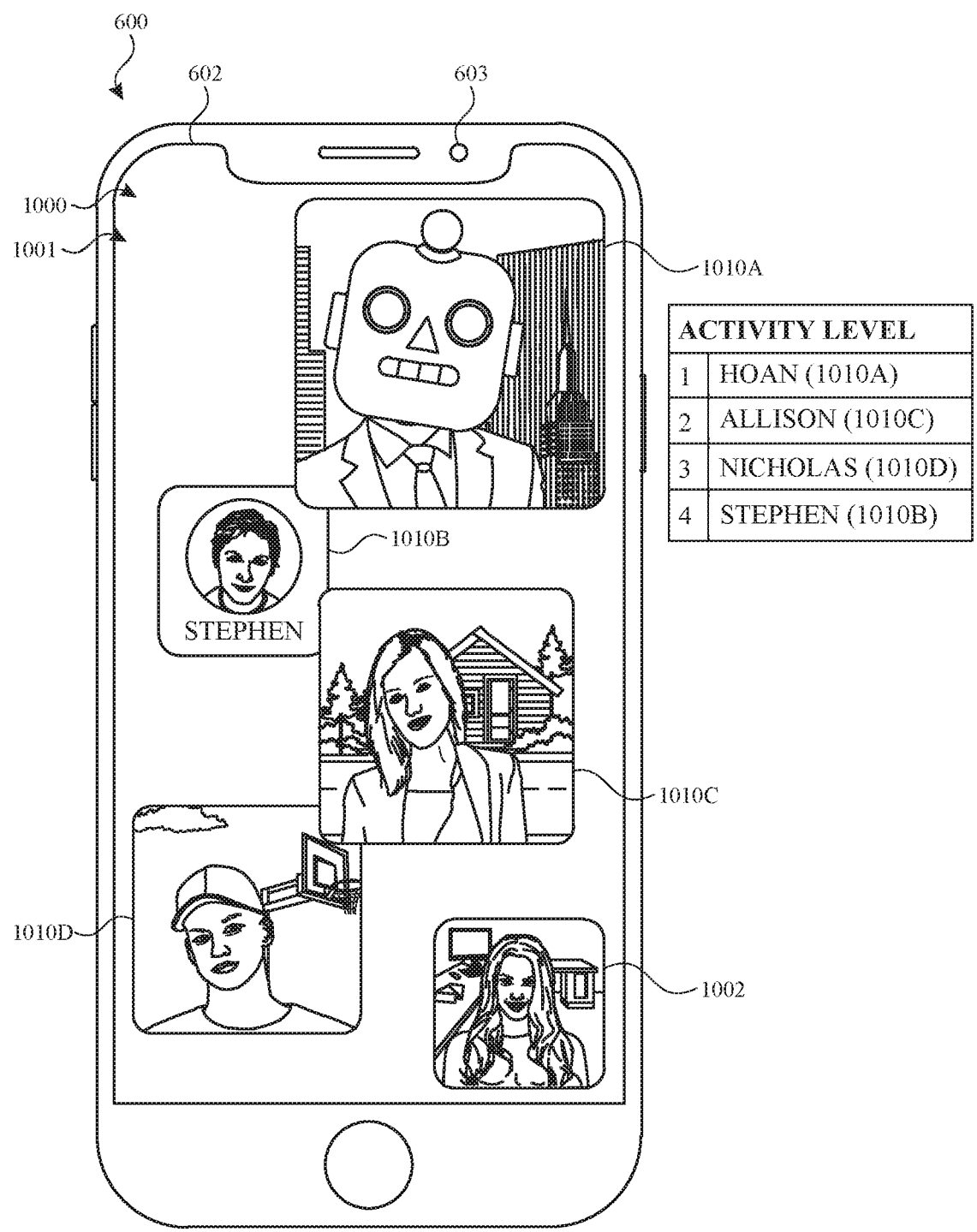
Figure 10J:
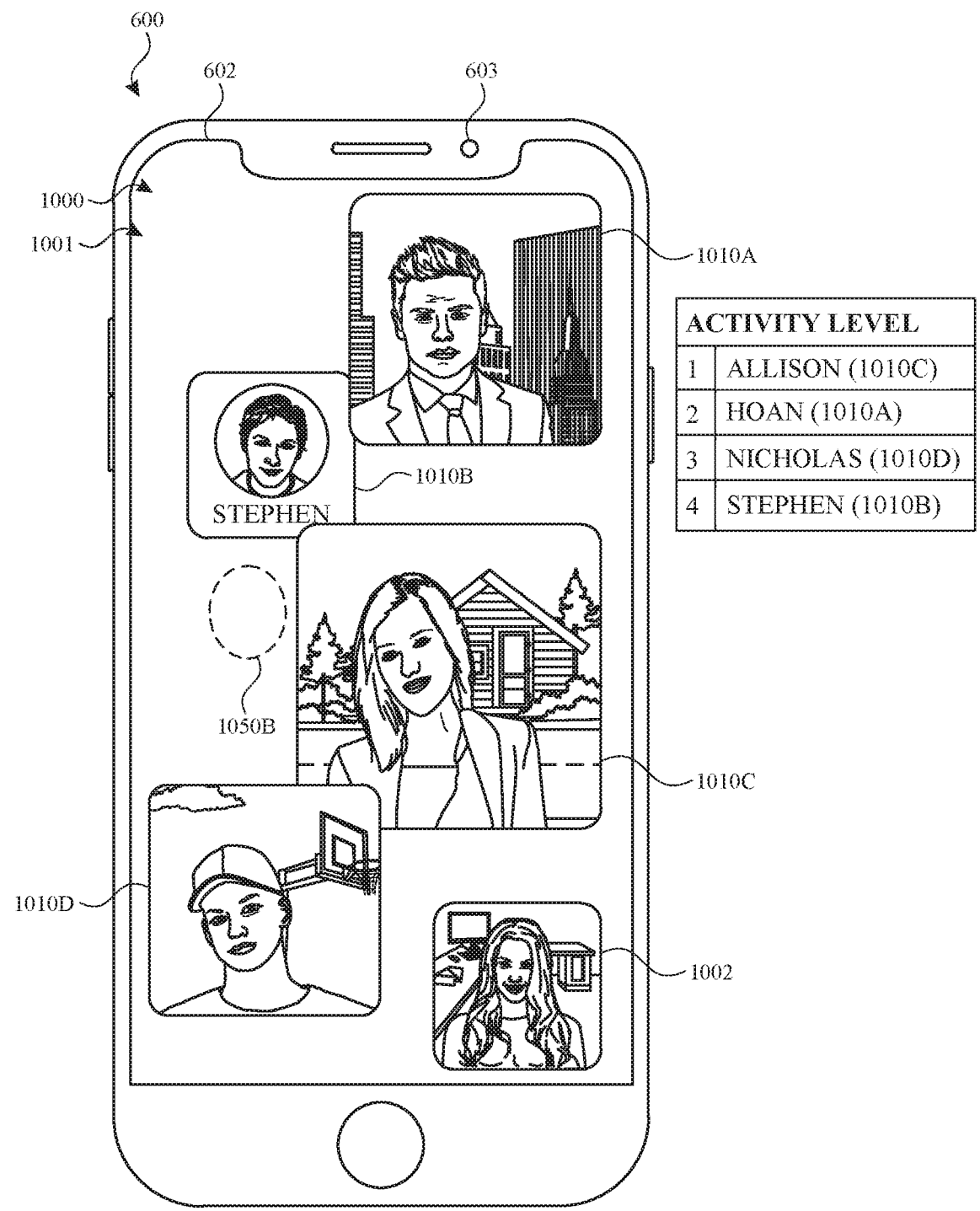
Figure 10K:
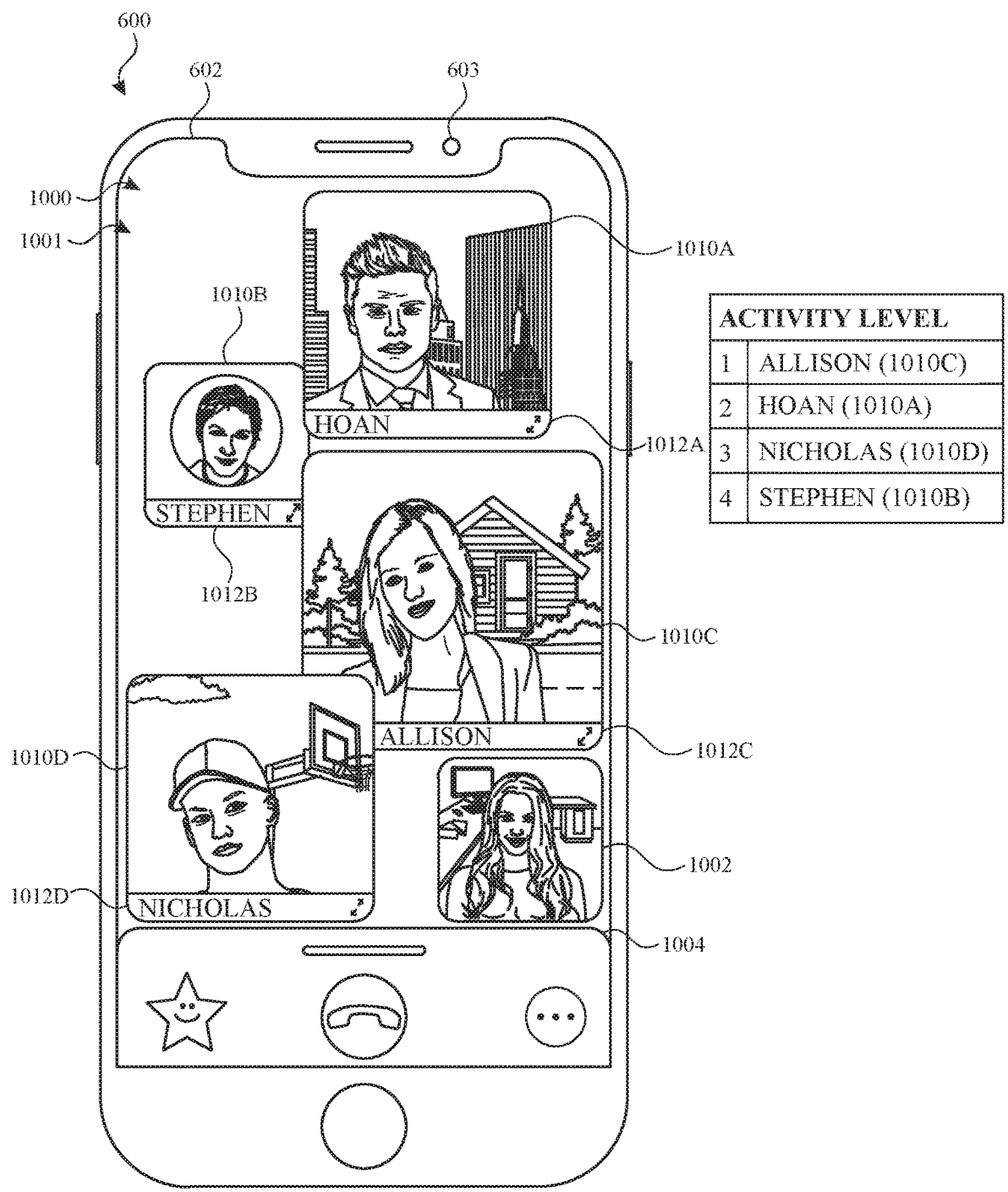
Figure 10L:
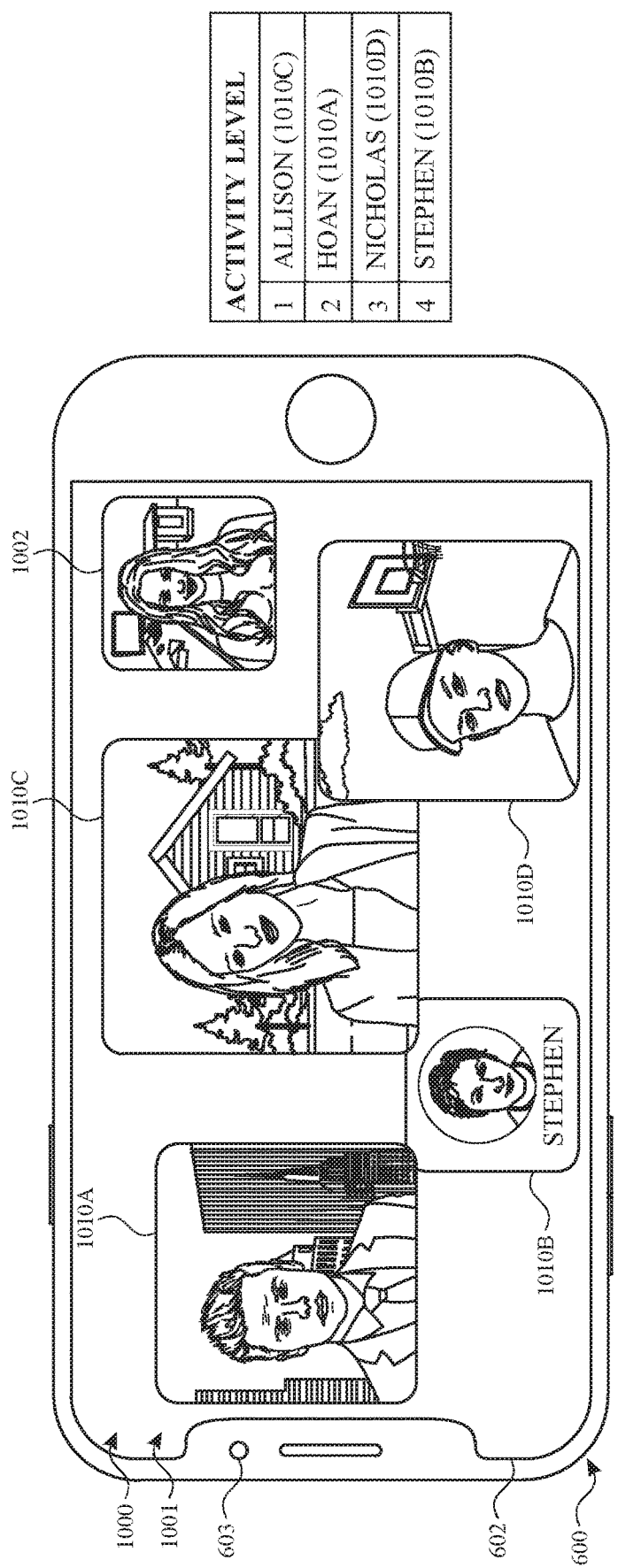
Figure 10M:
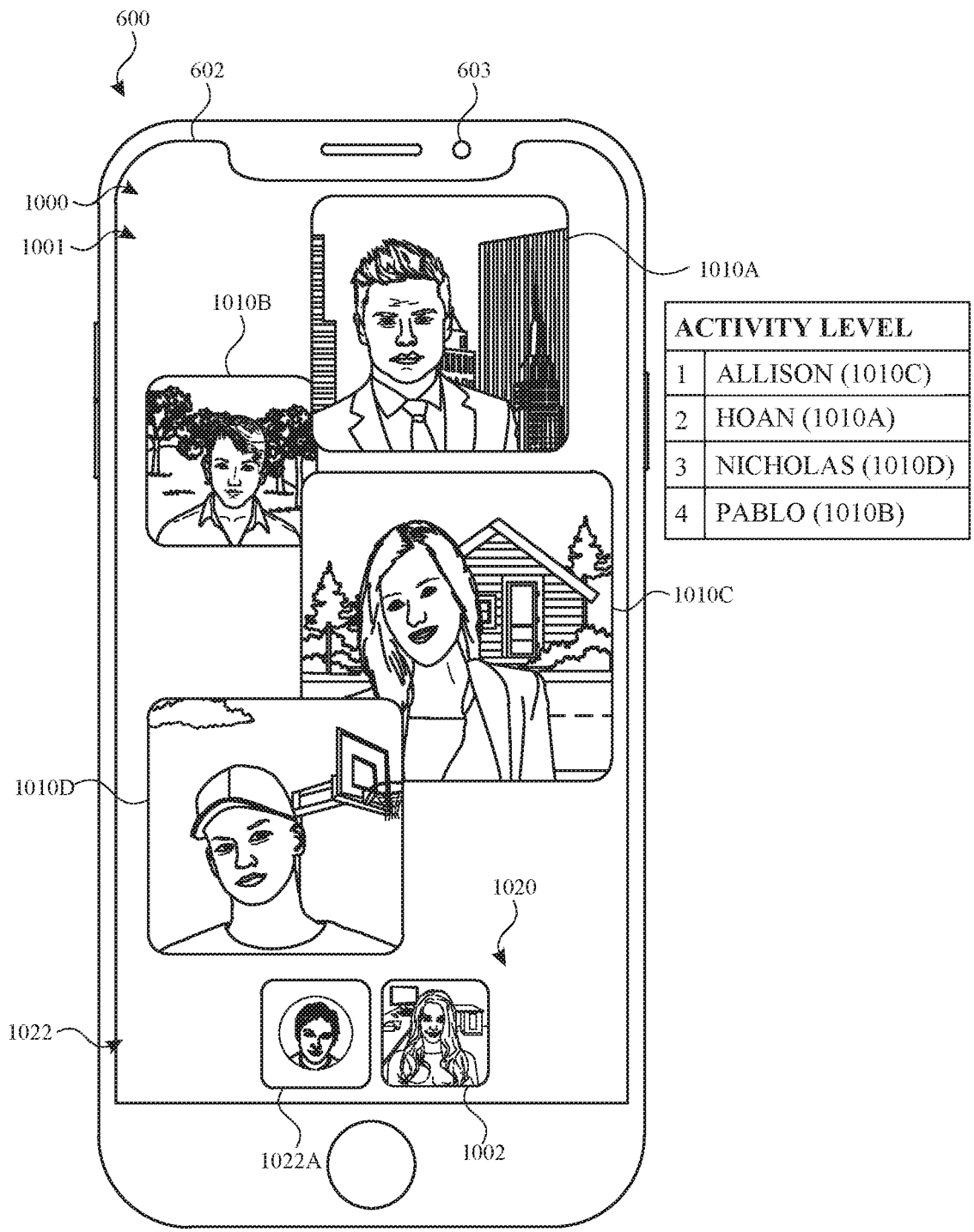
Figure 10N:
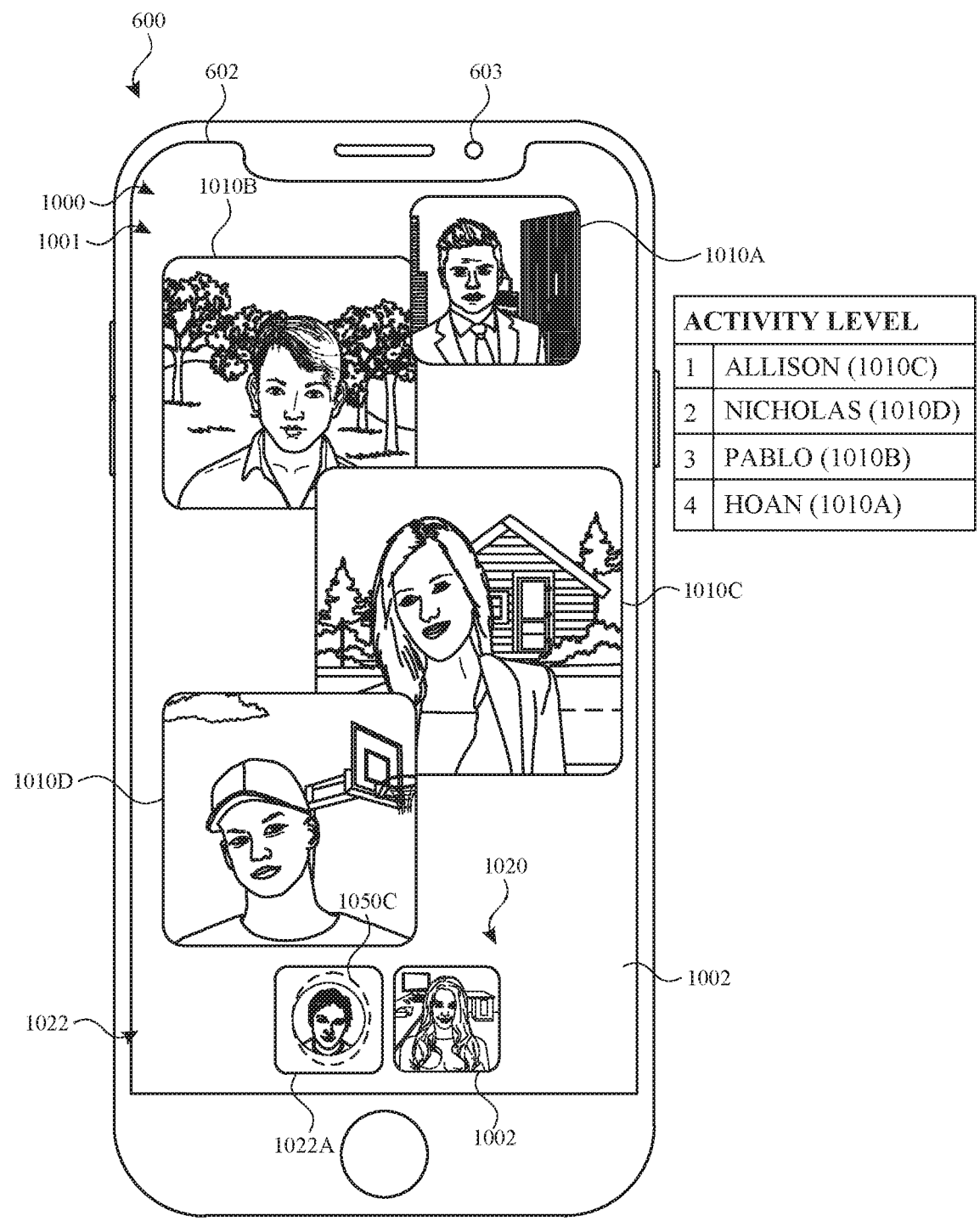
Figure 10O:
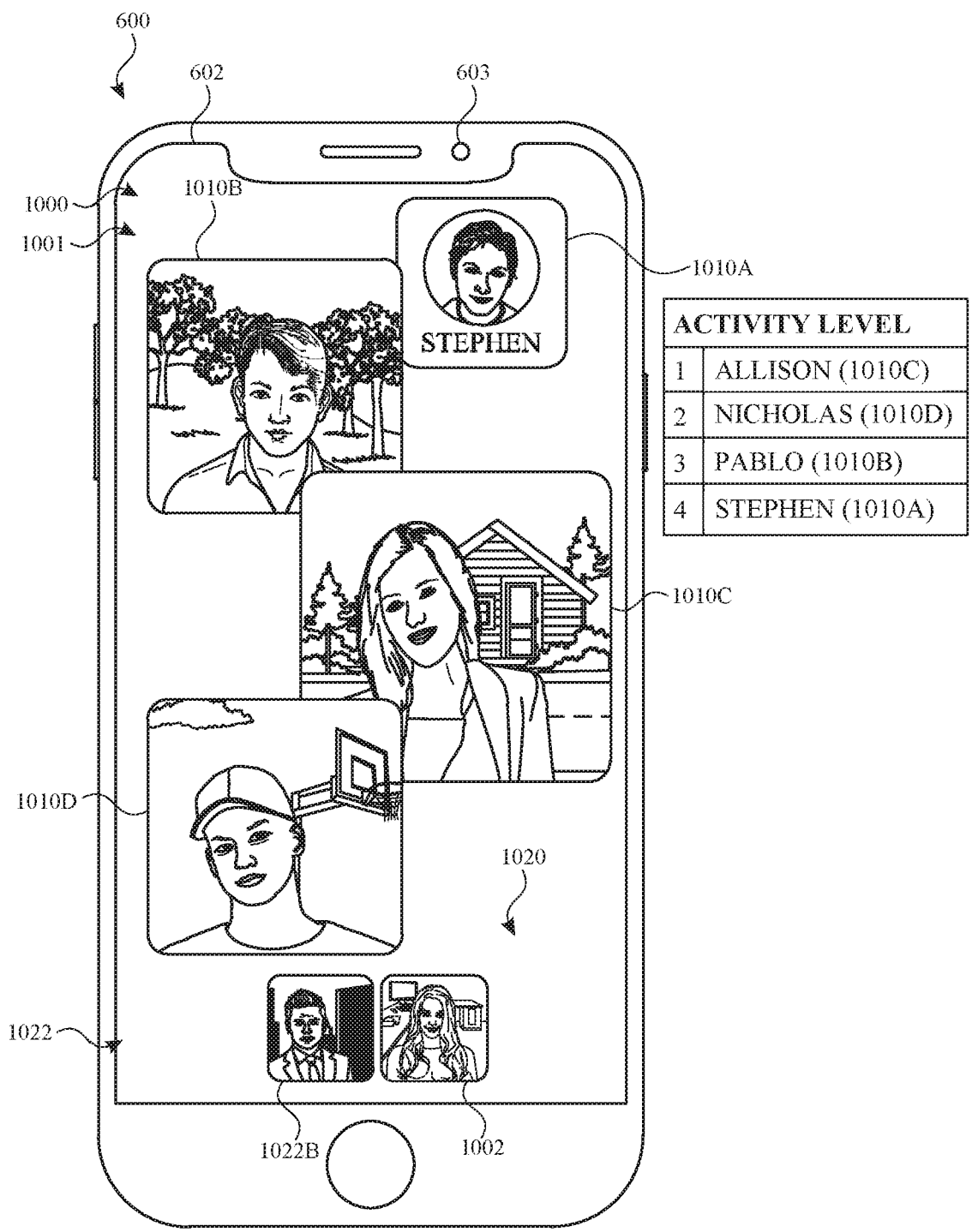
Figure 10P:
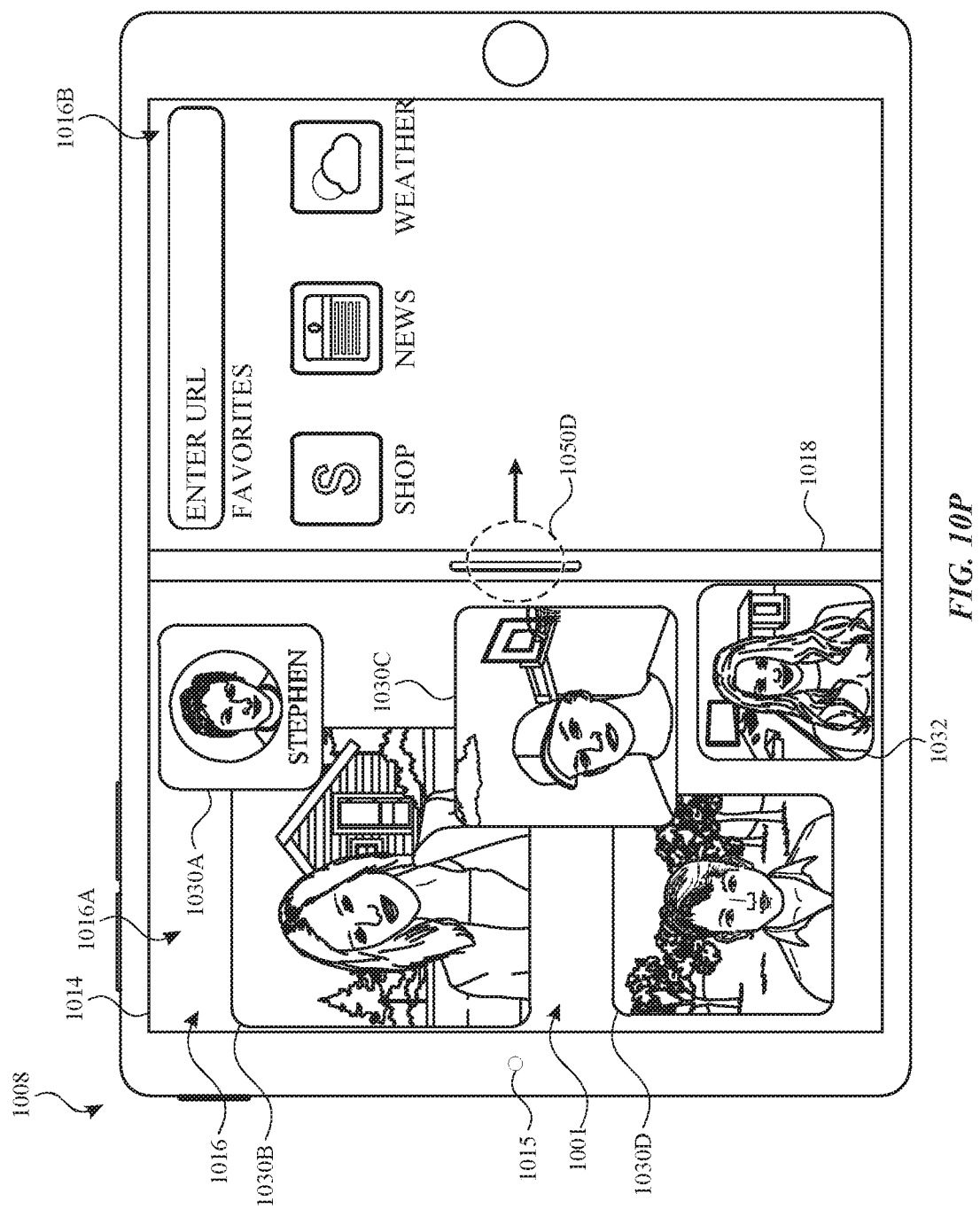
Figure 10Q:
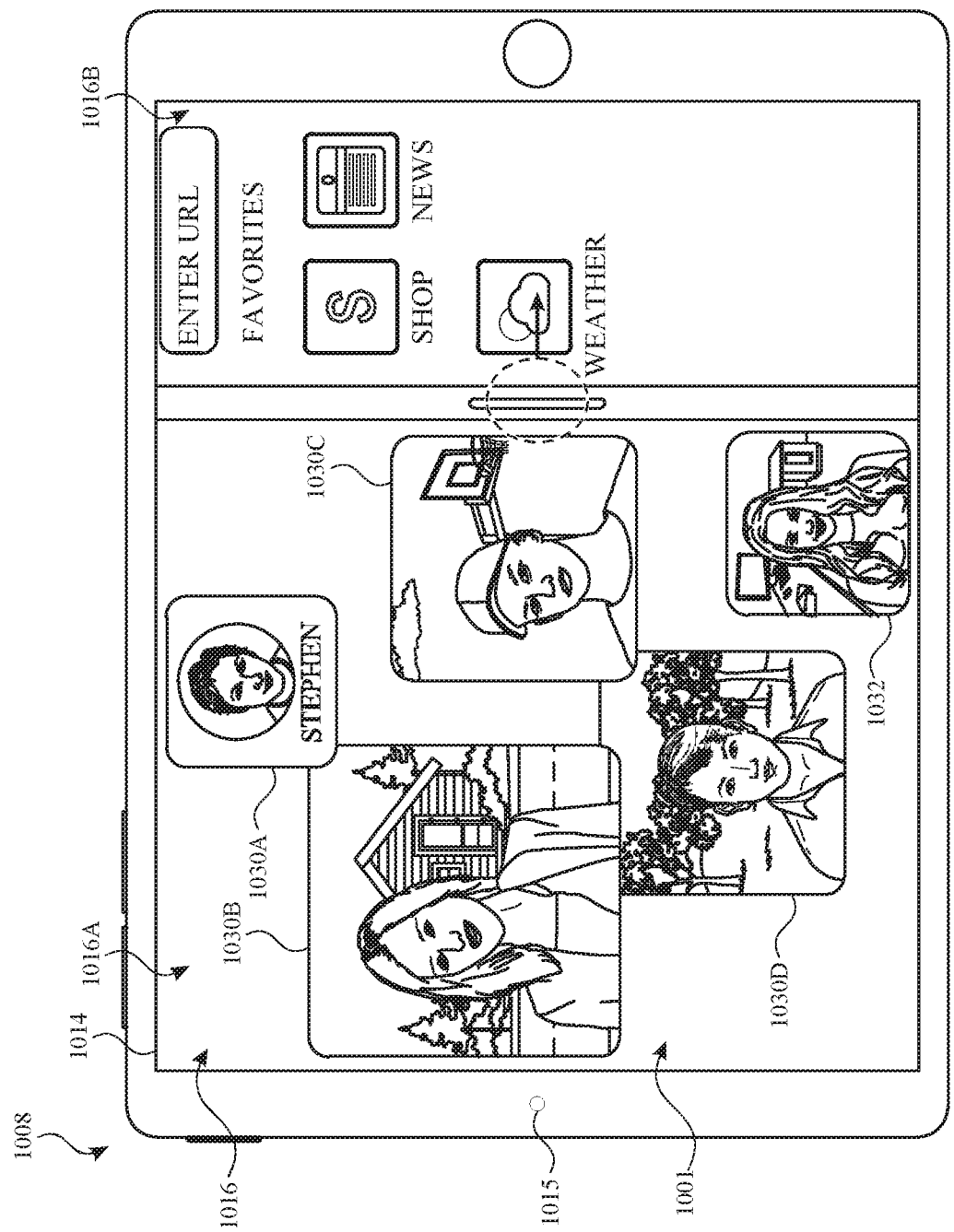
Figure 10R:
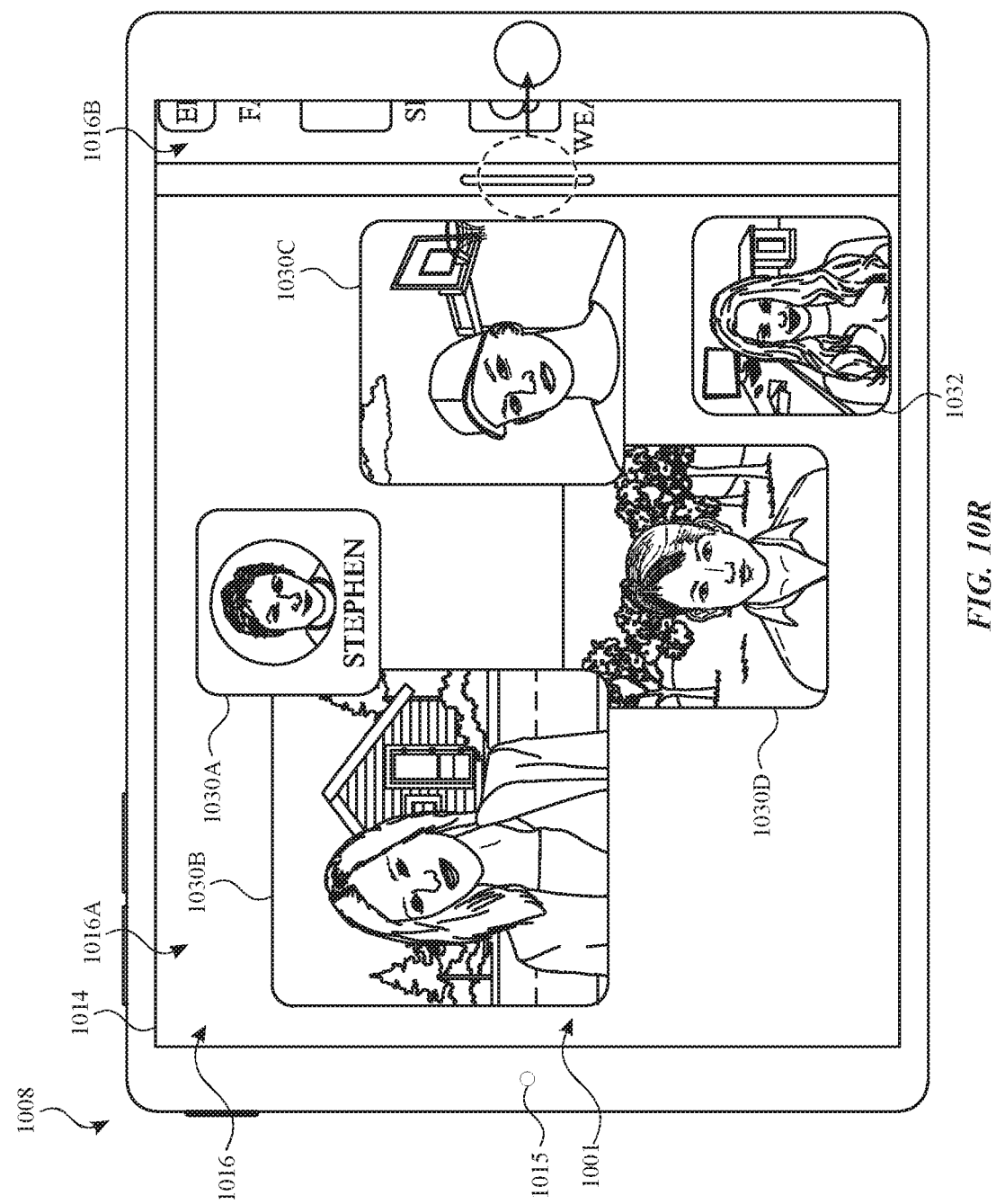
Figure 10S:
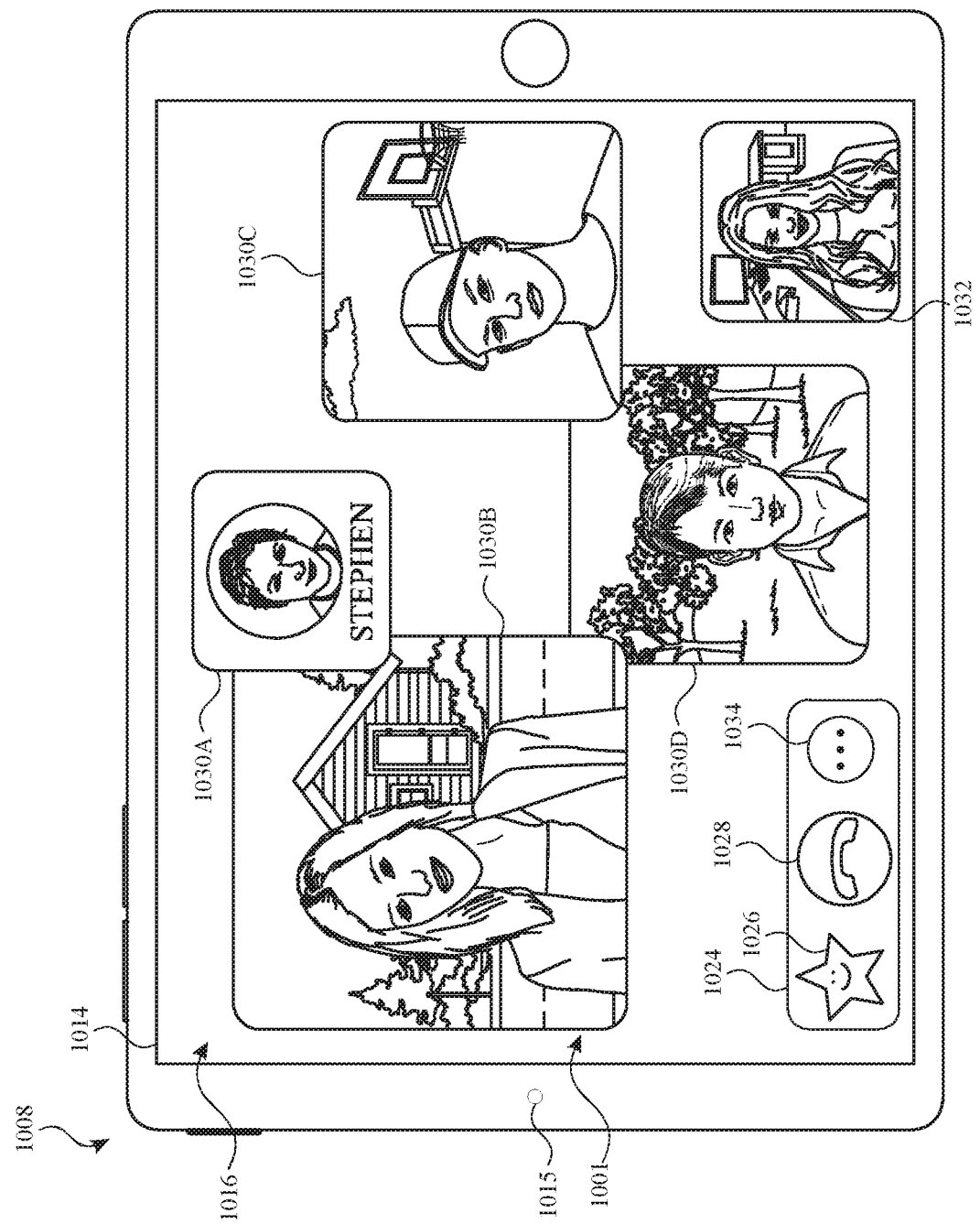
Figure 11A:
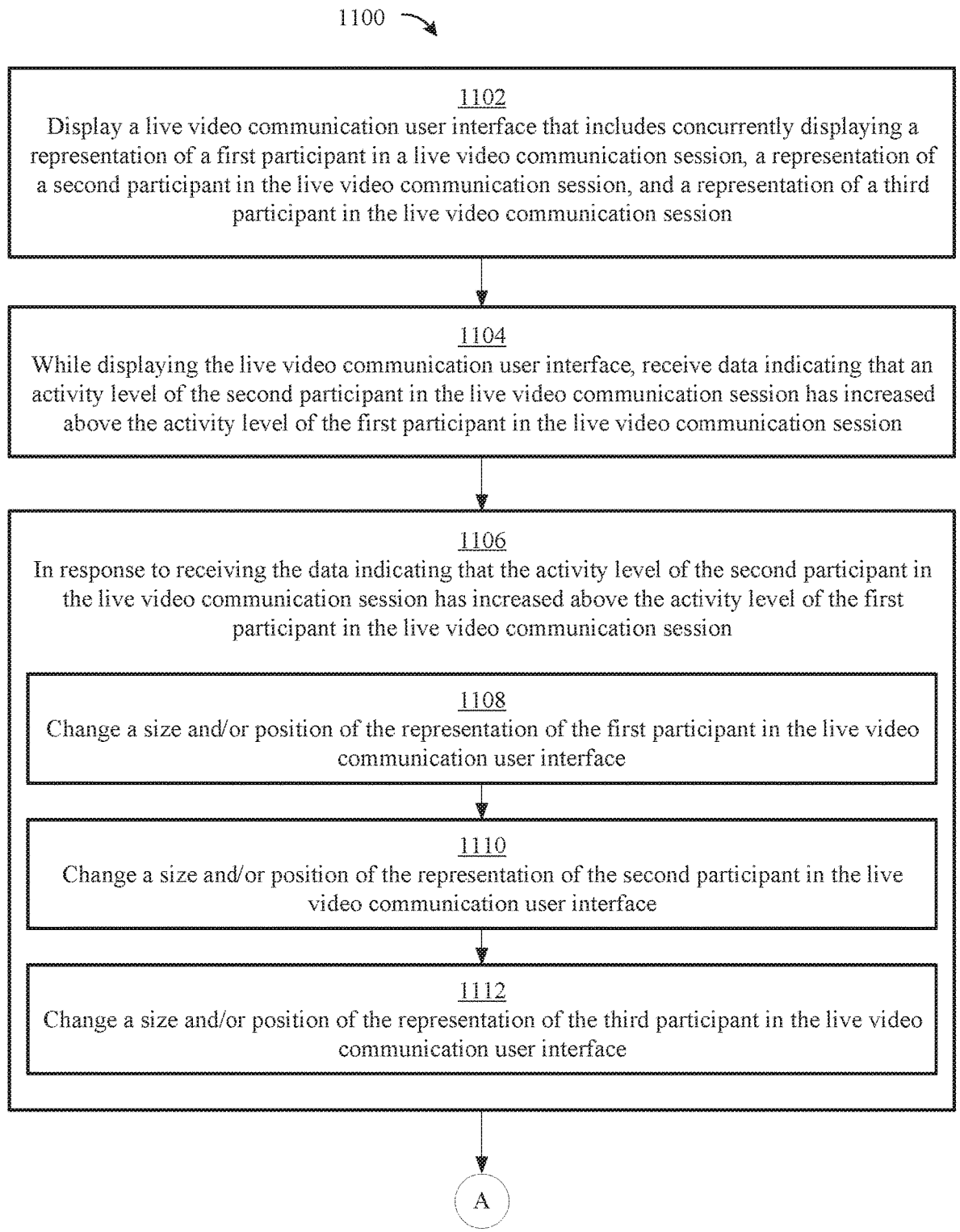
FIGS. 11A-11F illustrate an exemplary method in accordance with some embodiments.
Figure 11B:
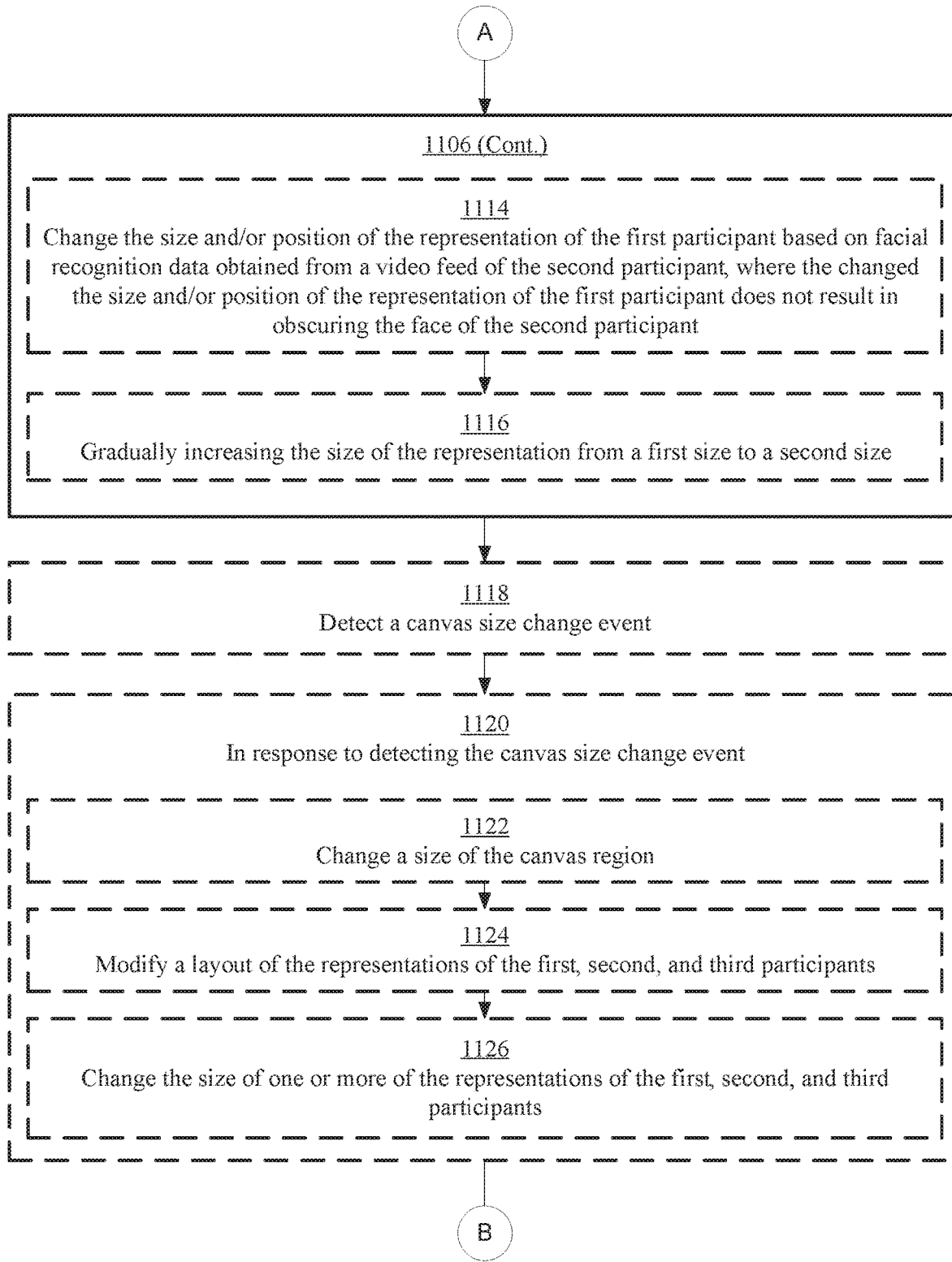
Figure 11C:
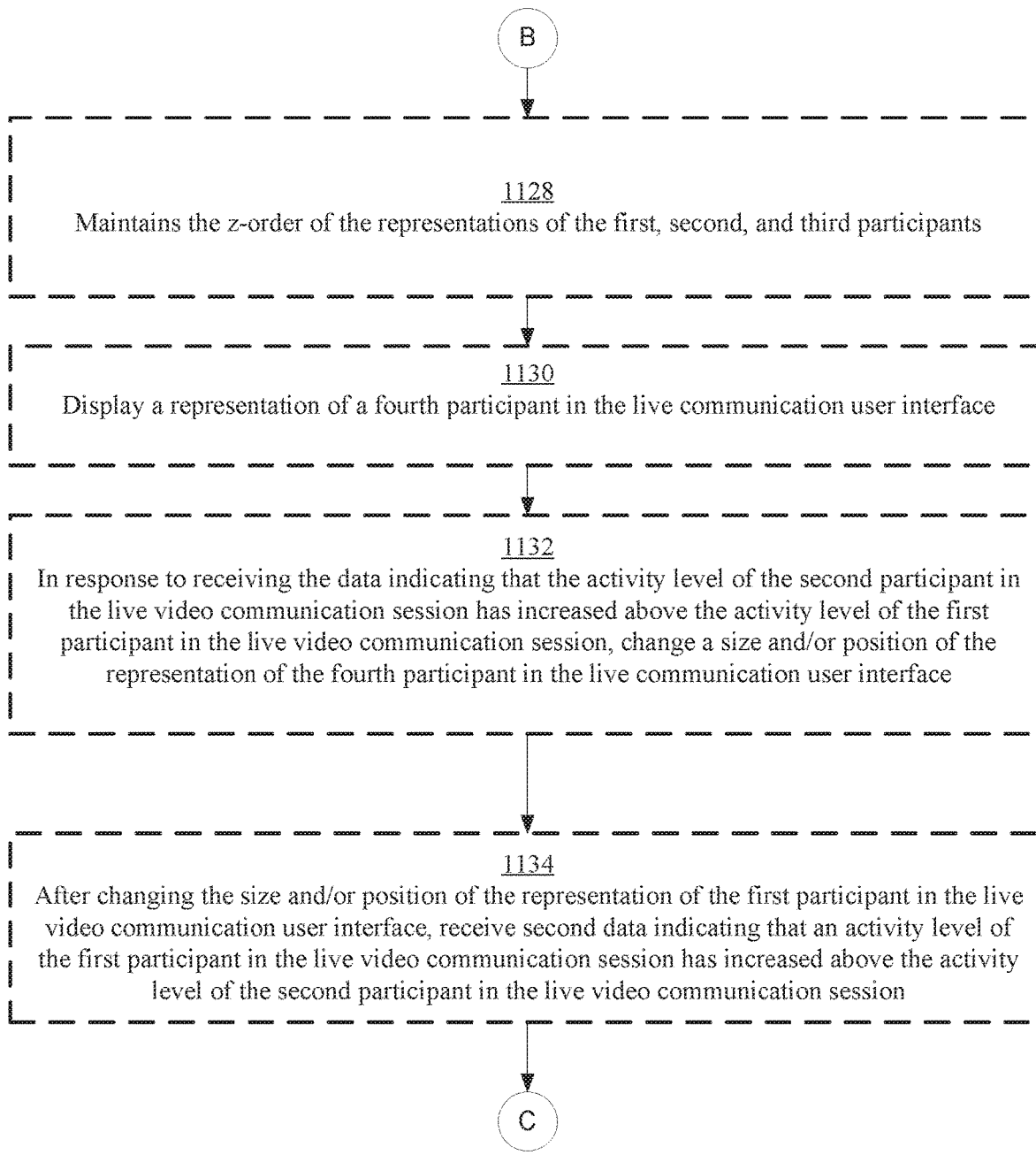
Figure 11D:
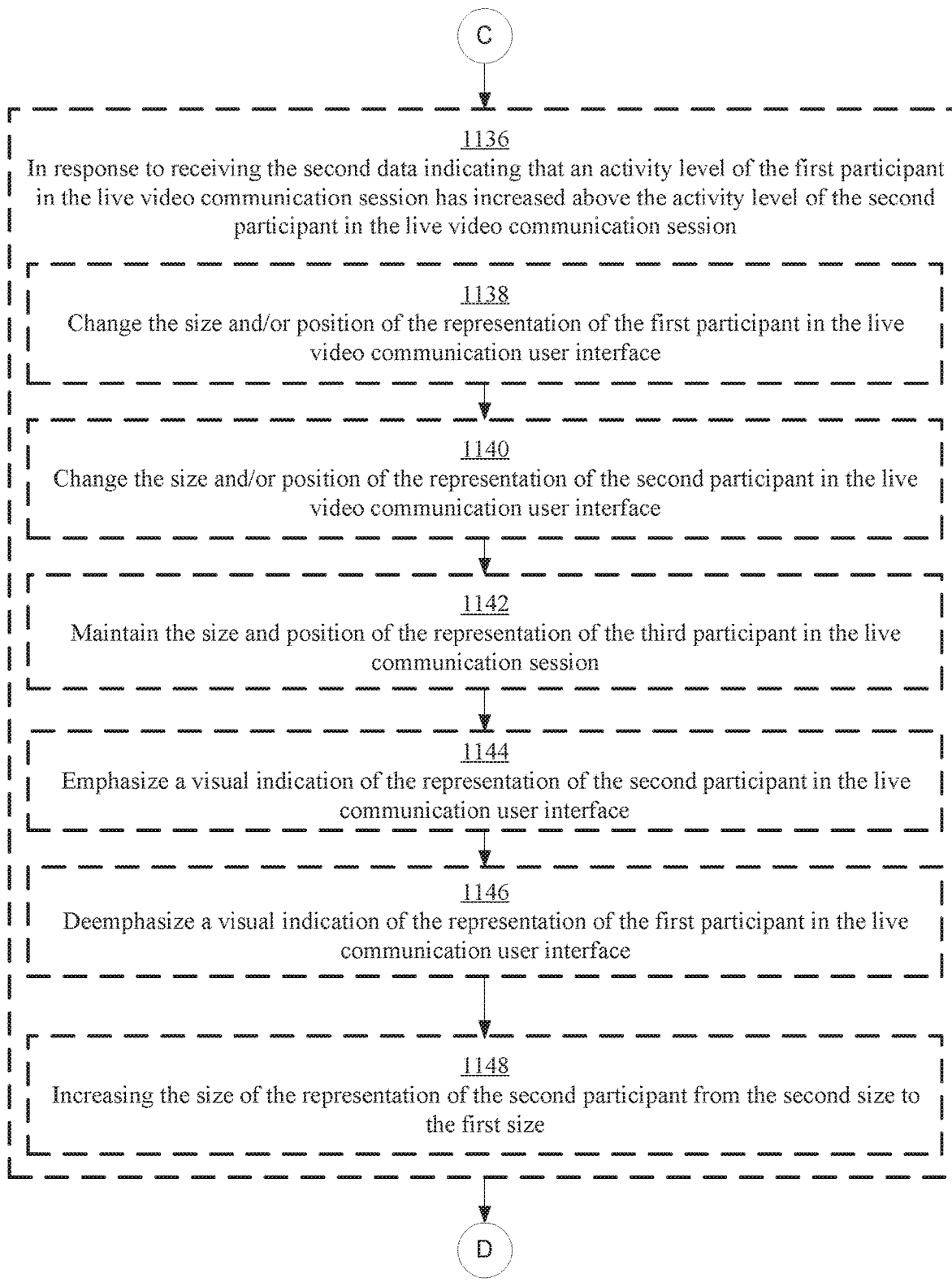
Figure 11E:
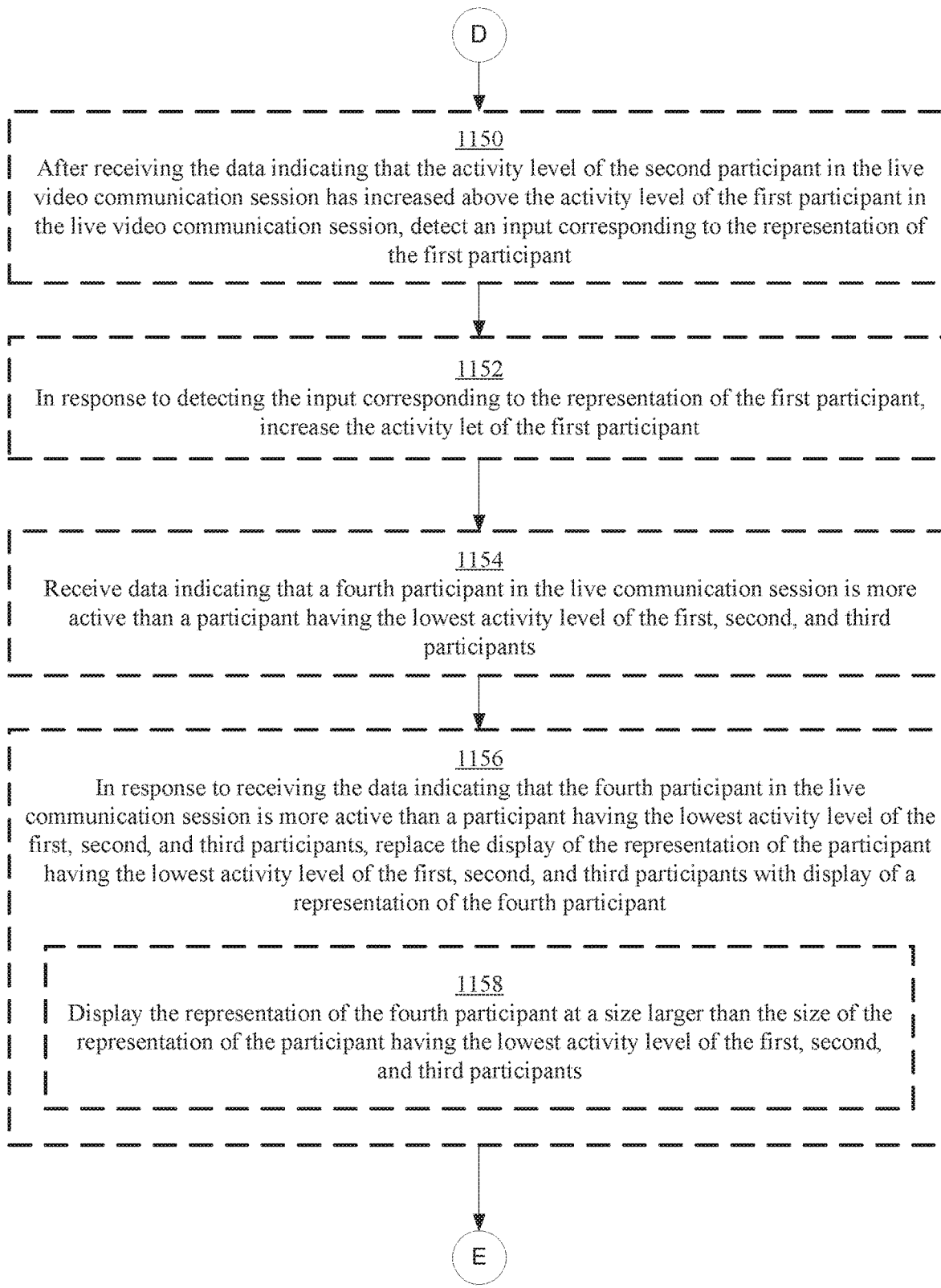
Figure 11F:
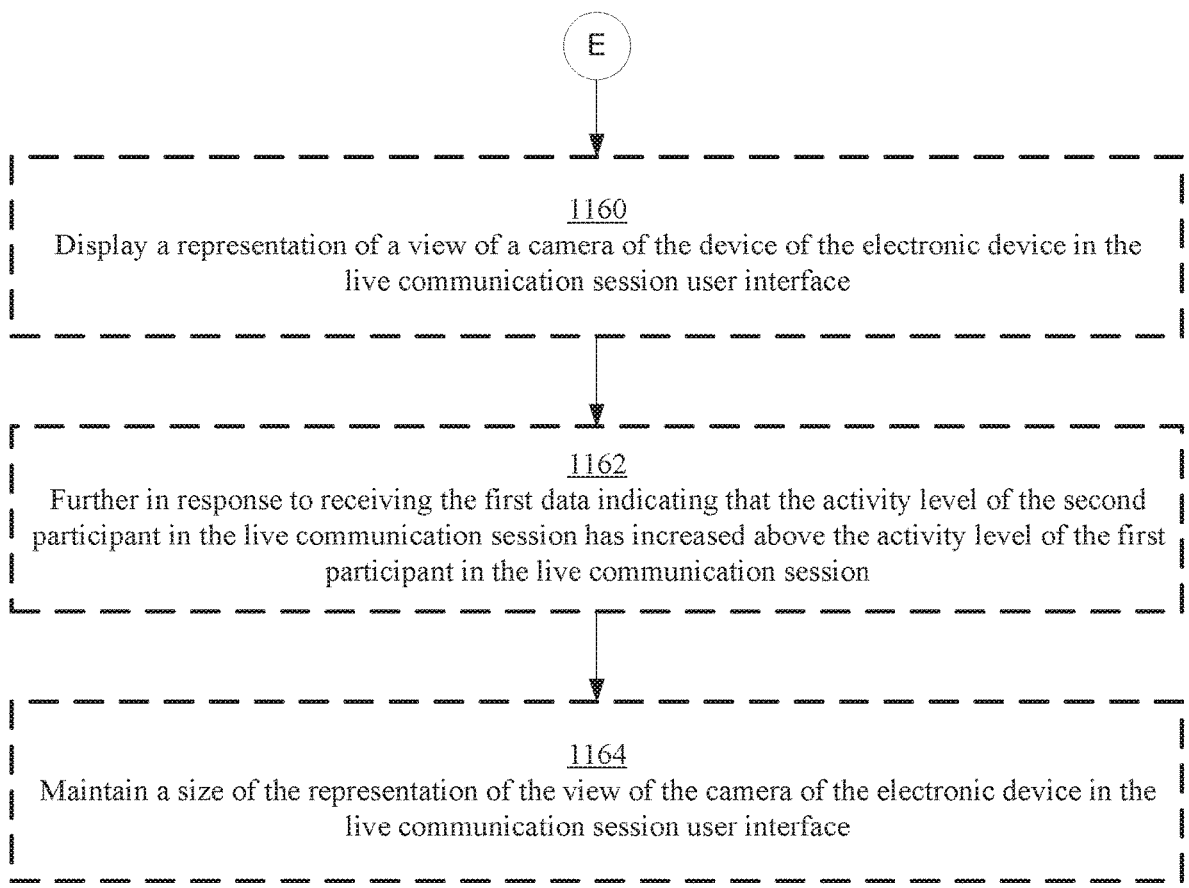

FIGS. 10A-10S illustrate exemplary user interfaces for a live communication session between multiple participants. FIGS. 11A-11F are a flow diagram illustrating methods of performing a live communication session between multiple participants in accordance with some embodiments. The user interfaces in FIGS. 10A-10S are used to illustrate the processes described below, including the processes in FIGS. 11A-11F.

Figure 12A:
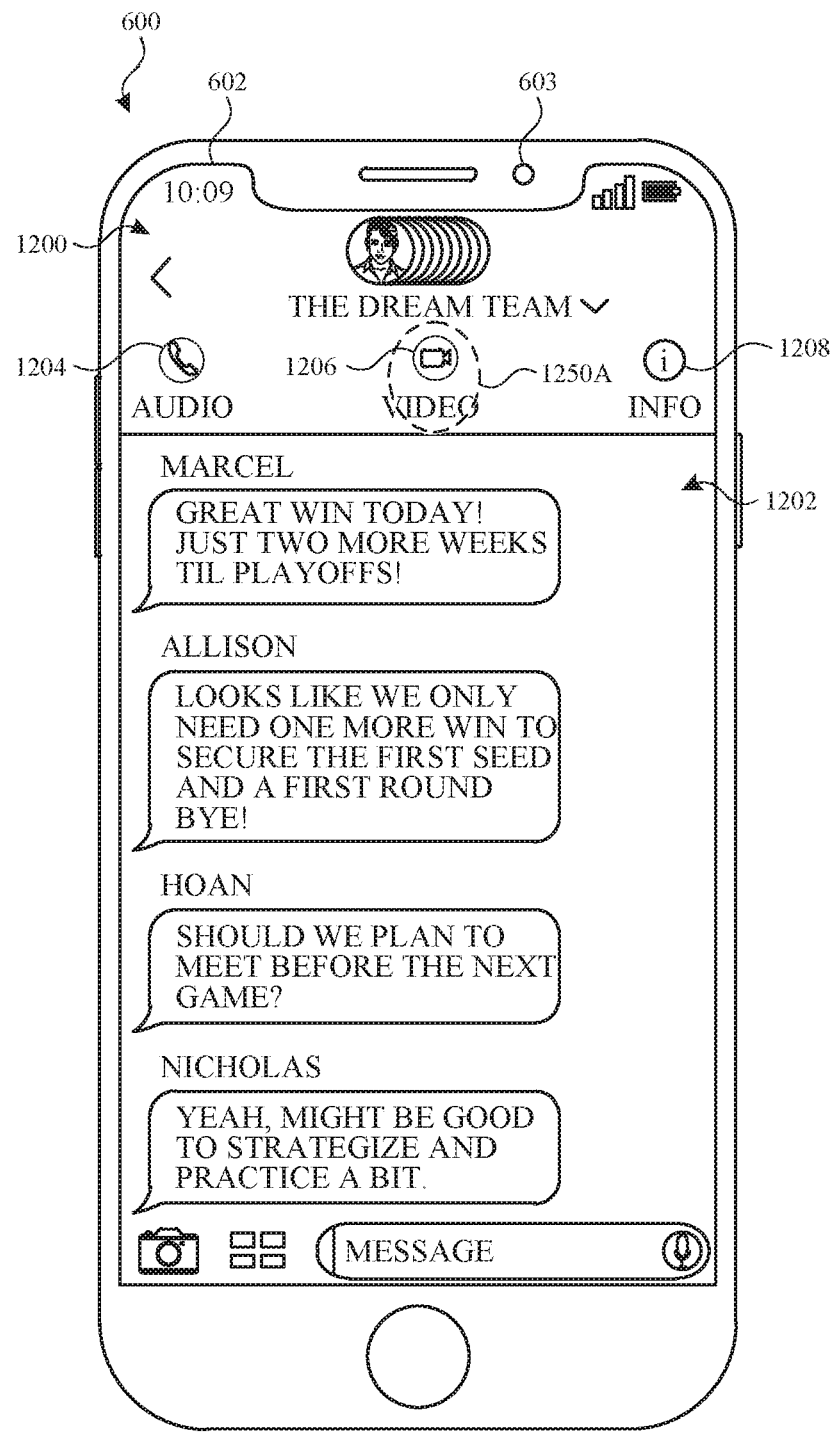
FIGS. 12A-12N illustrate exemplary user interfaces in accordance with some embodiments.
Figure 12B:
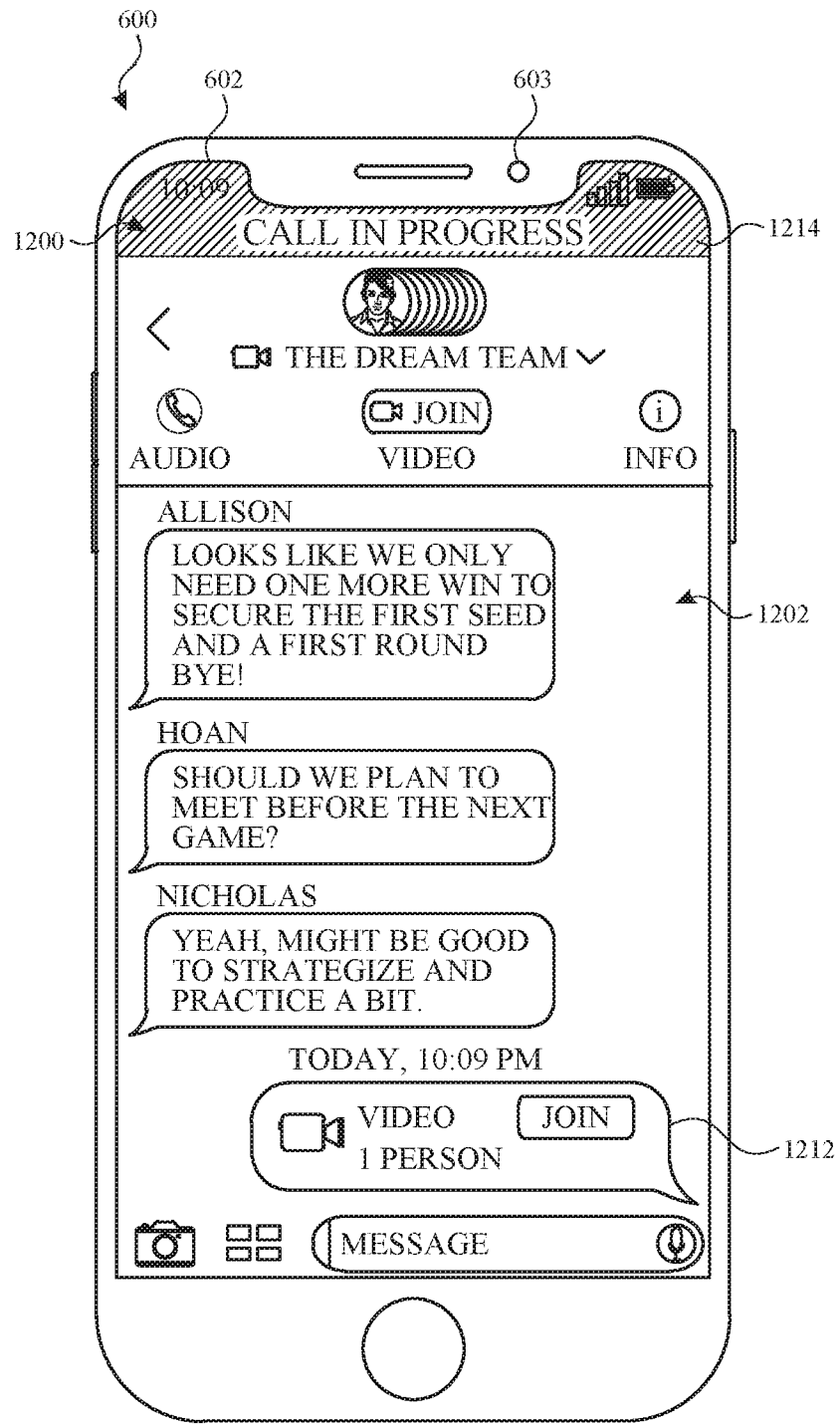
Figure 12C:
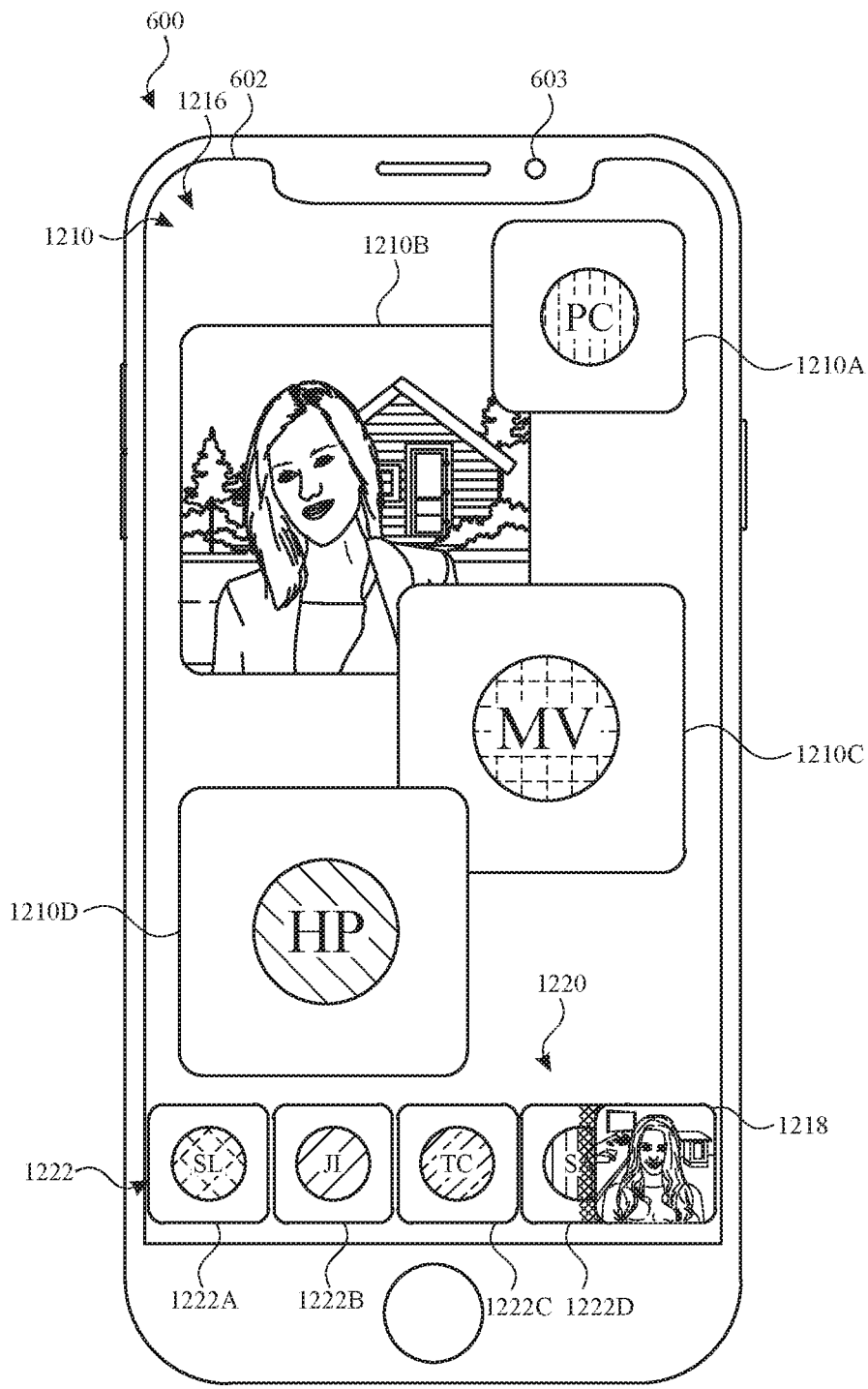
Figure 12D:
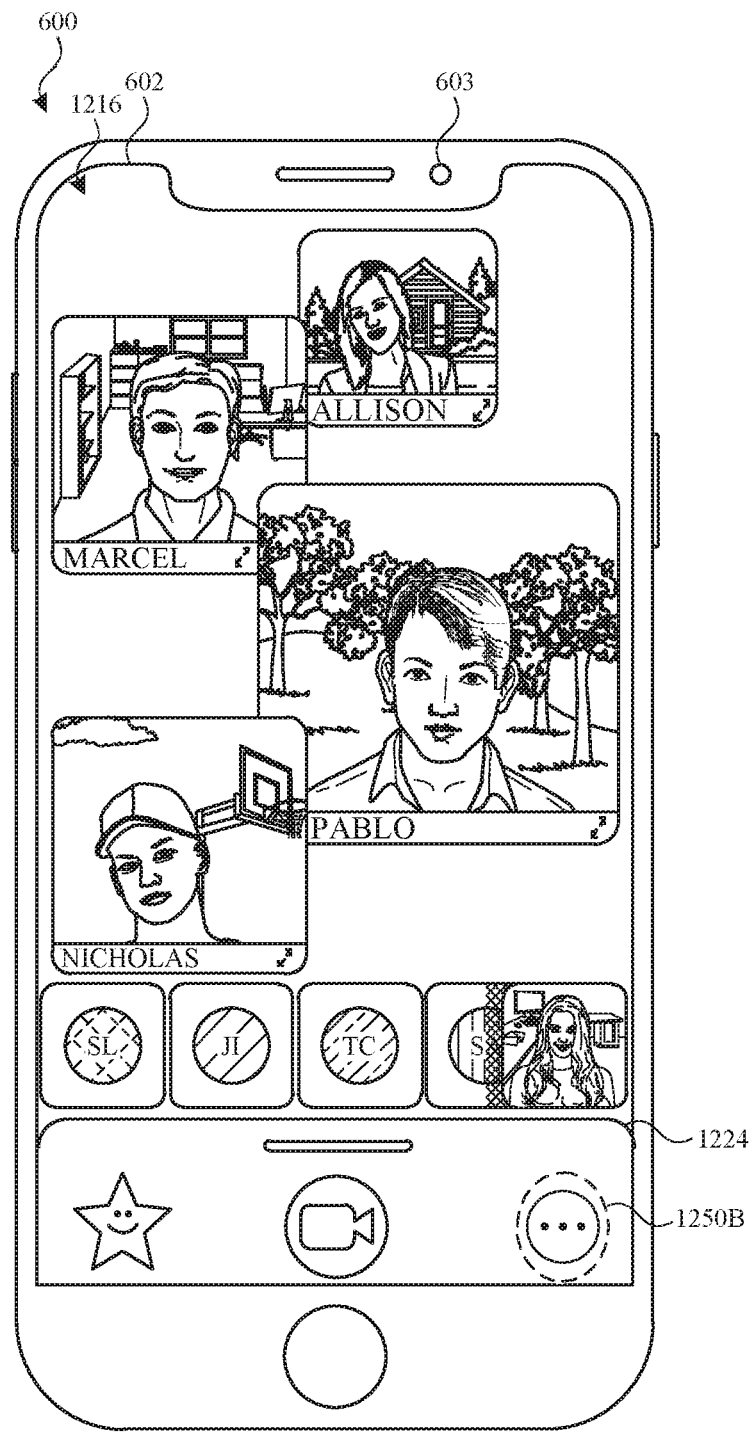
Figure 12E:
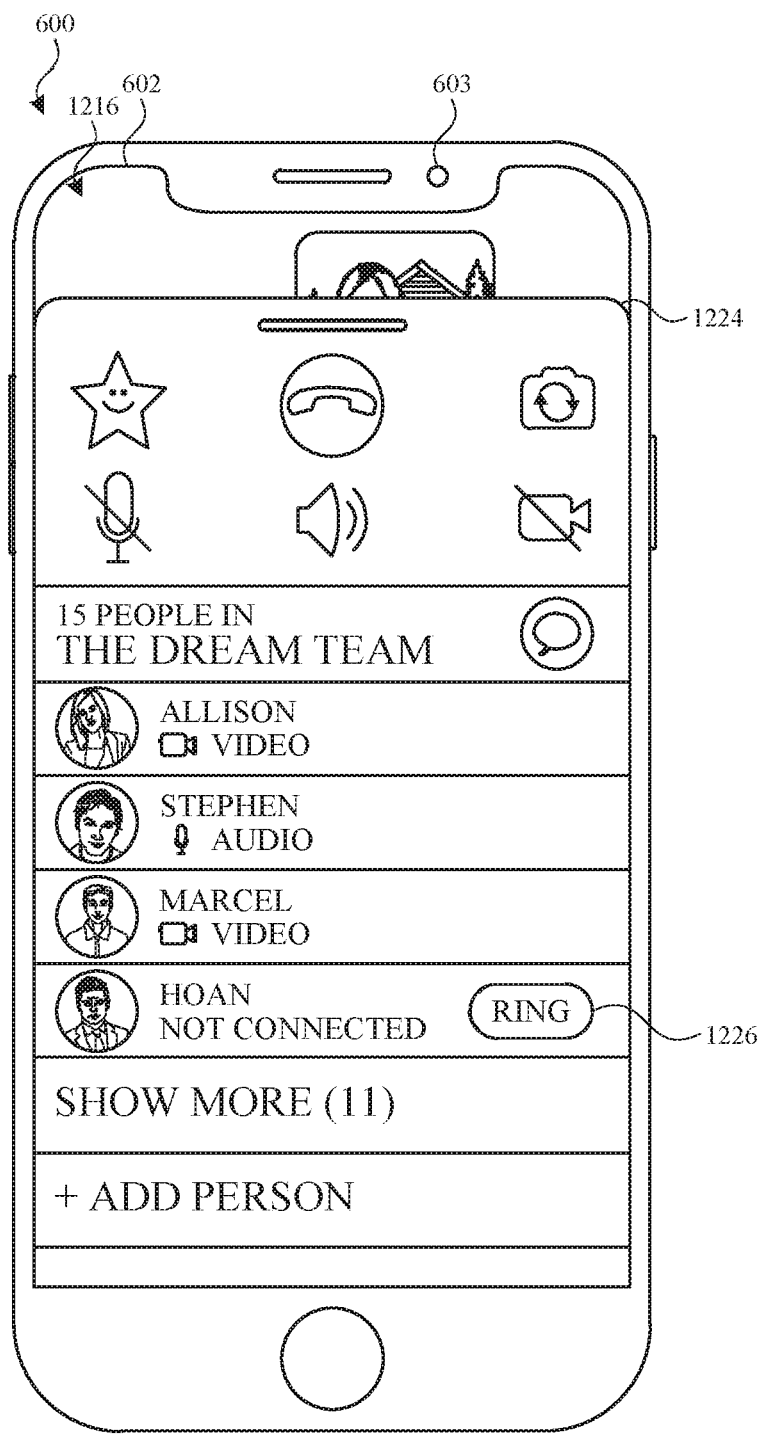
Figure 12F:
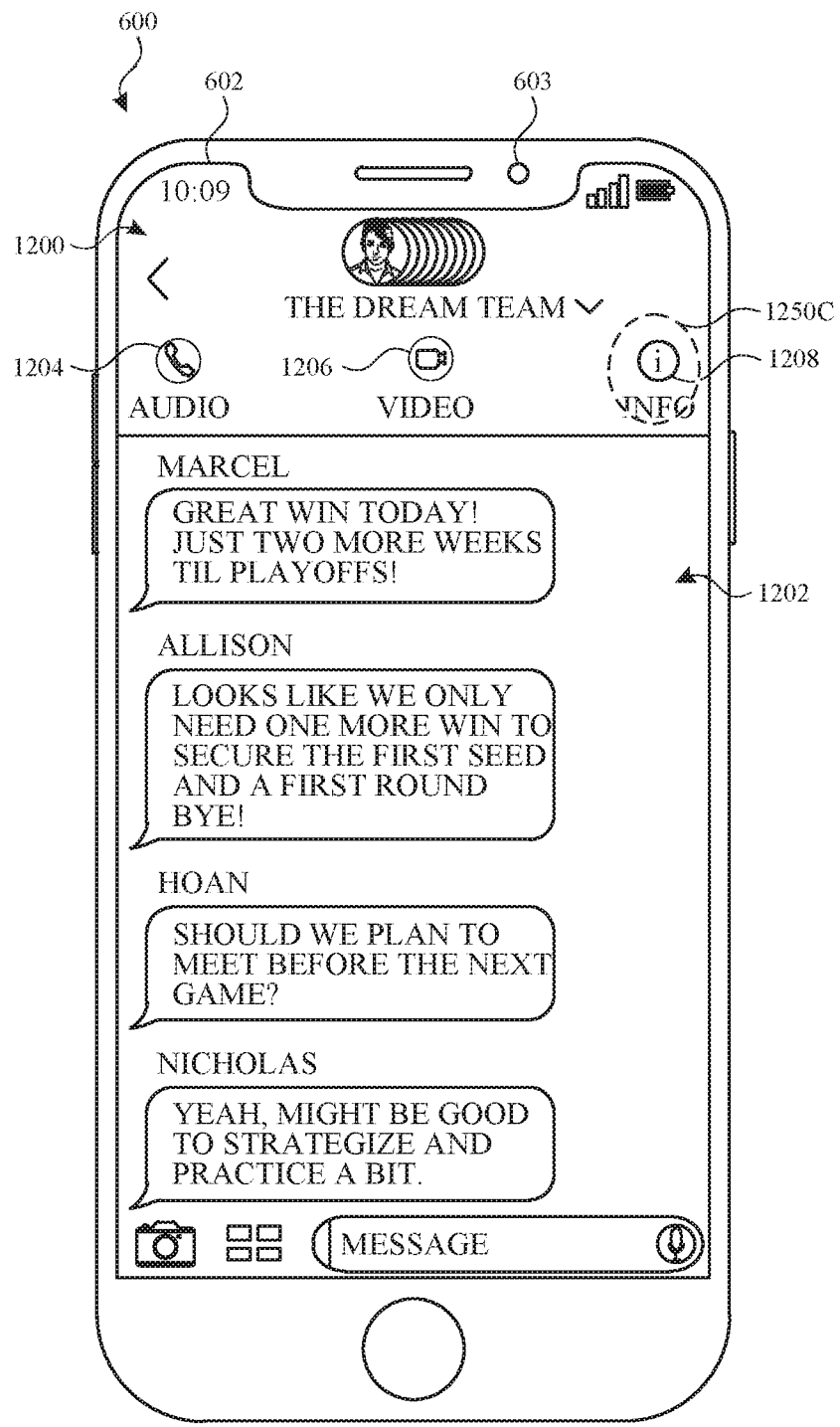
Figure 12G:
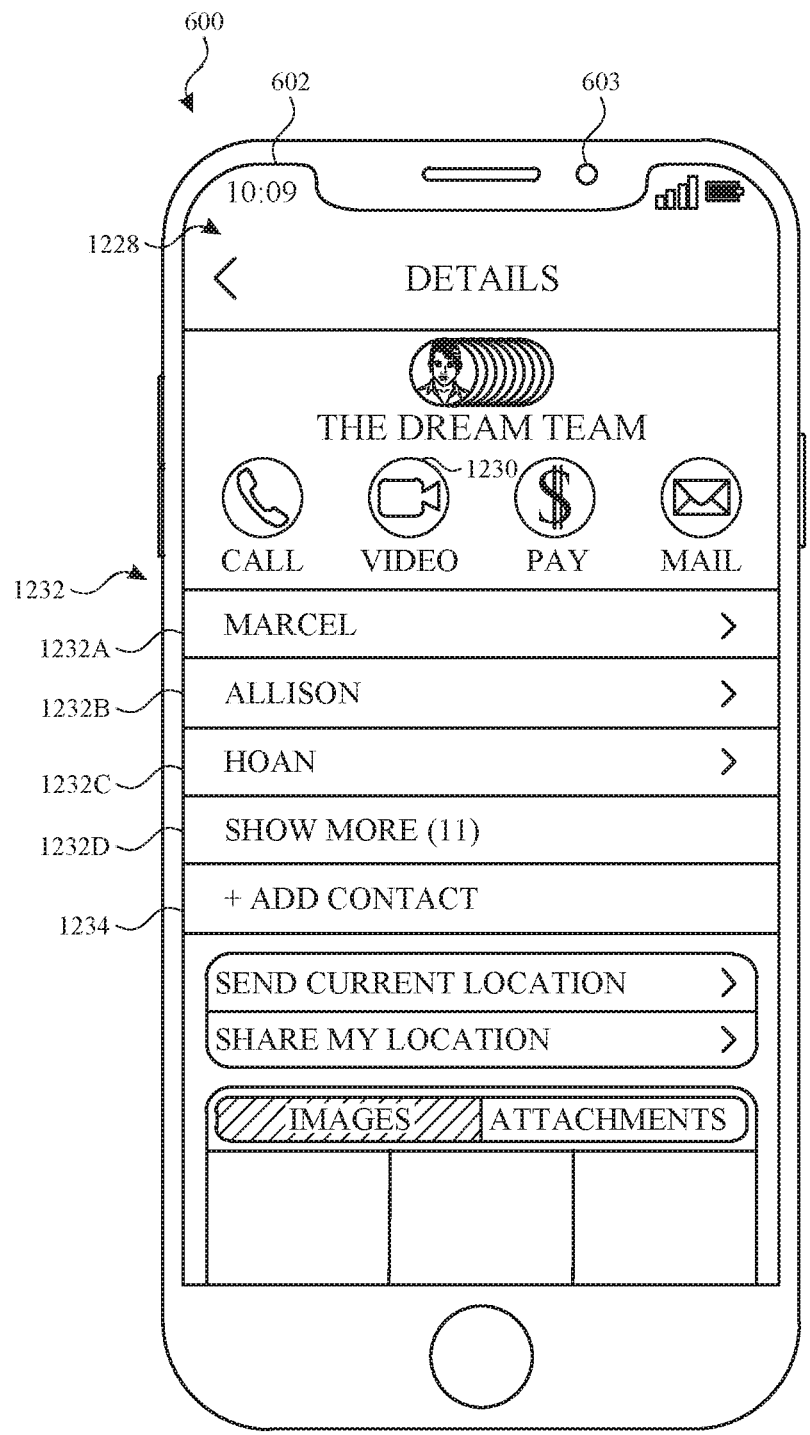
Figure 12H:
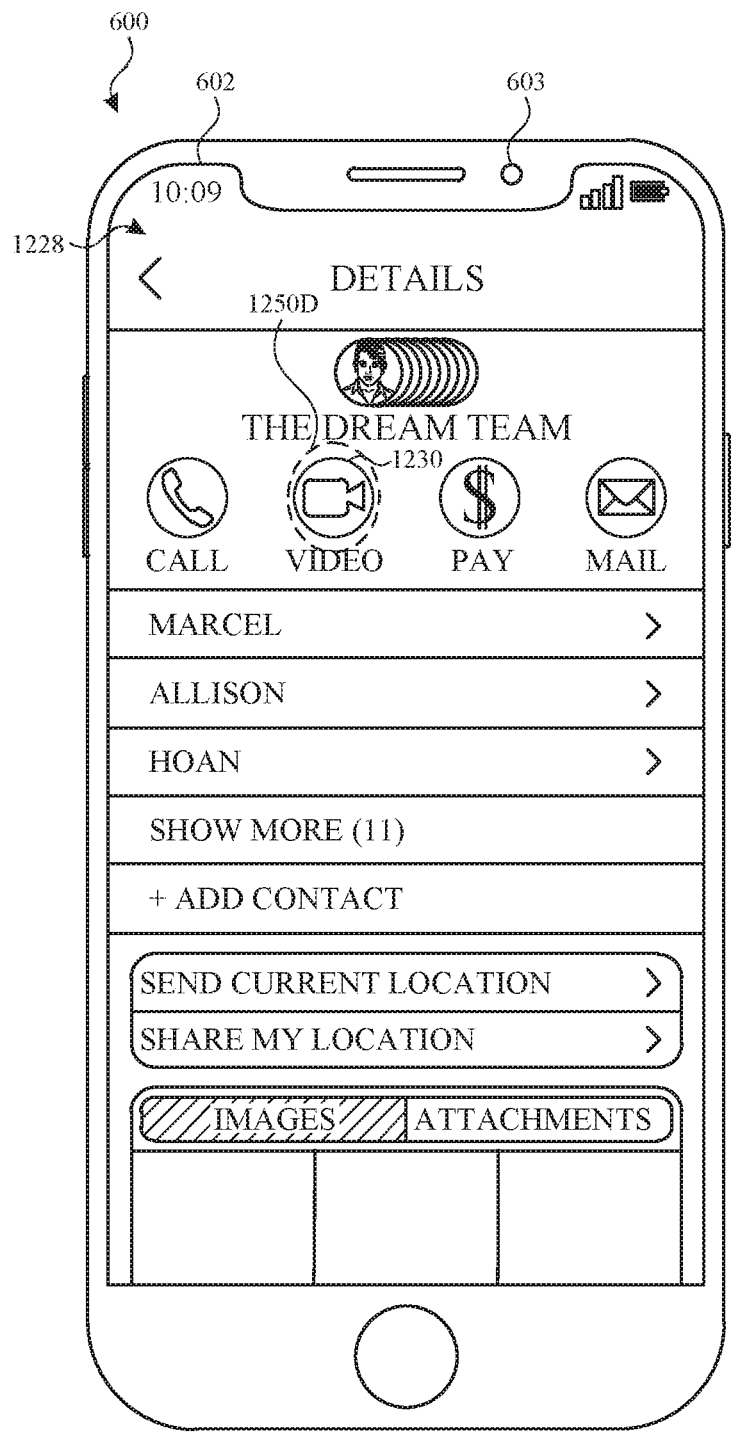
Figure 12I:
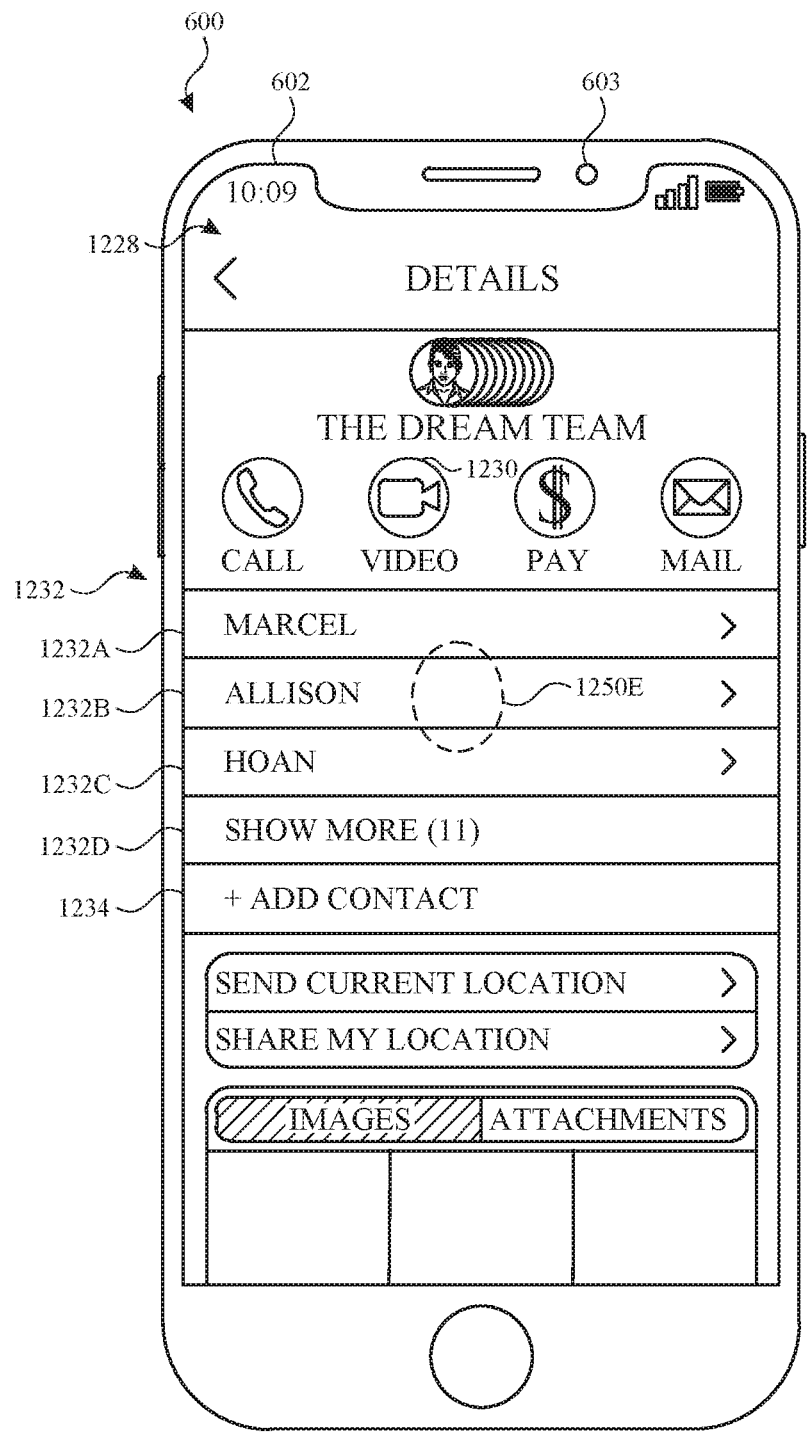
Figure 12J:
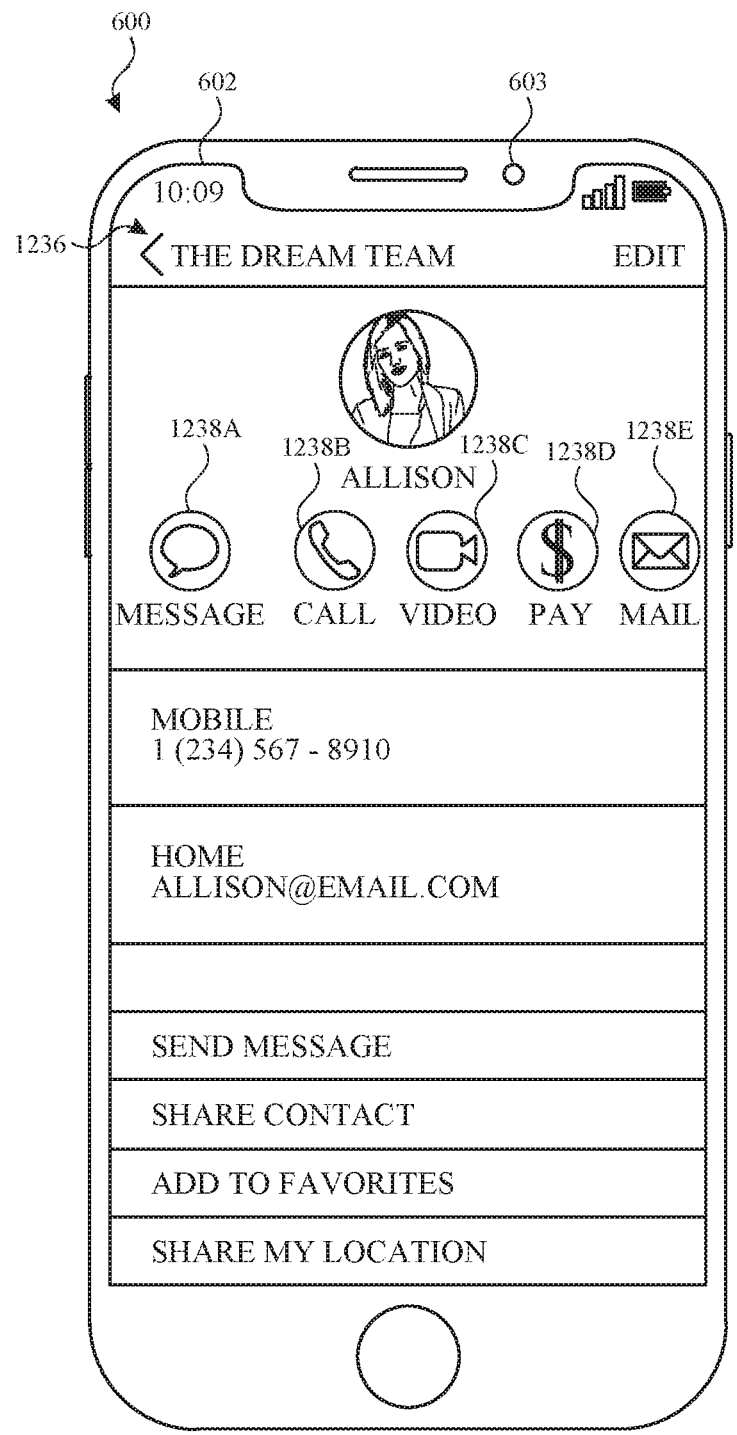
Figure 12K:
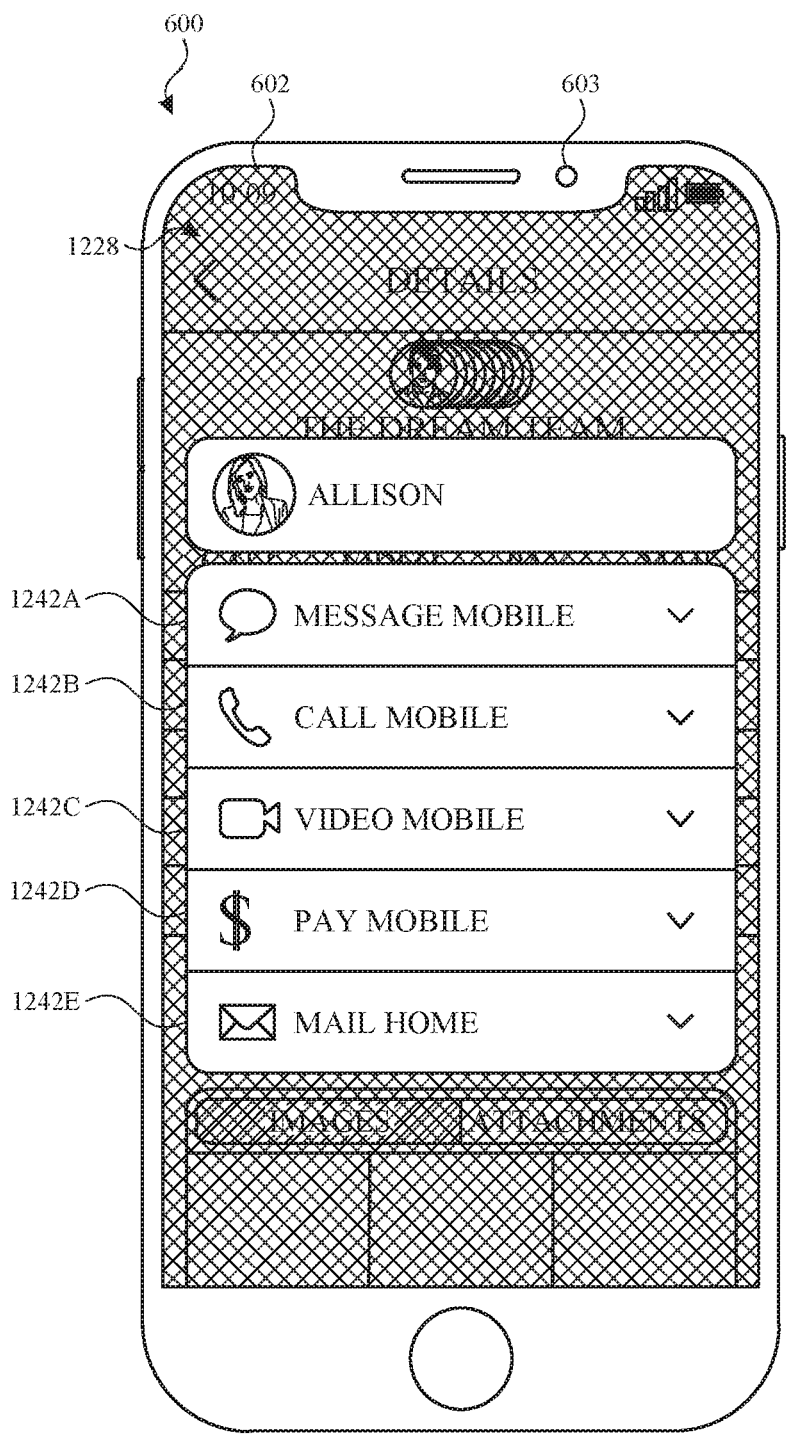
Figure 12L:
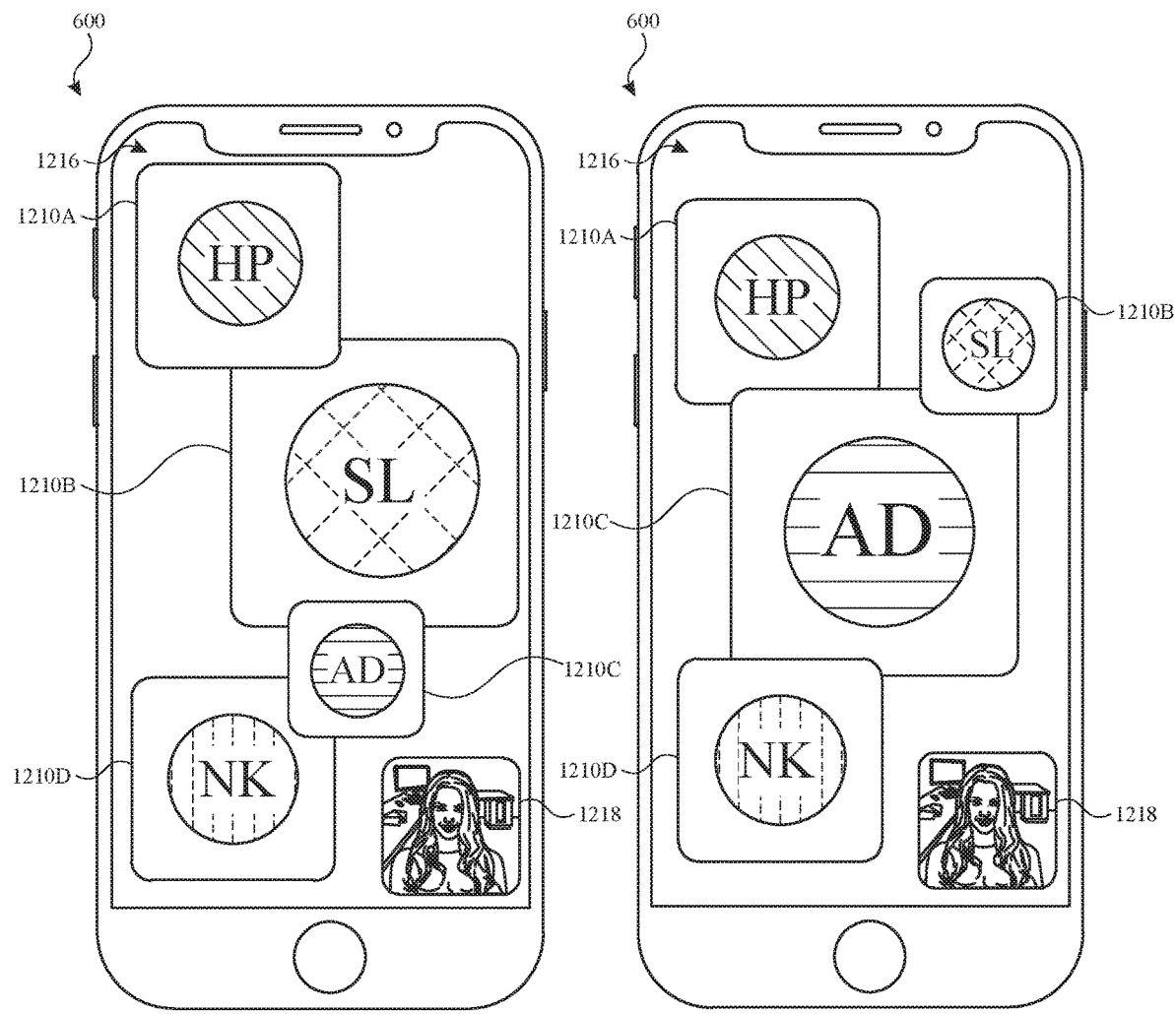
Figure 12M:
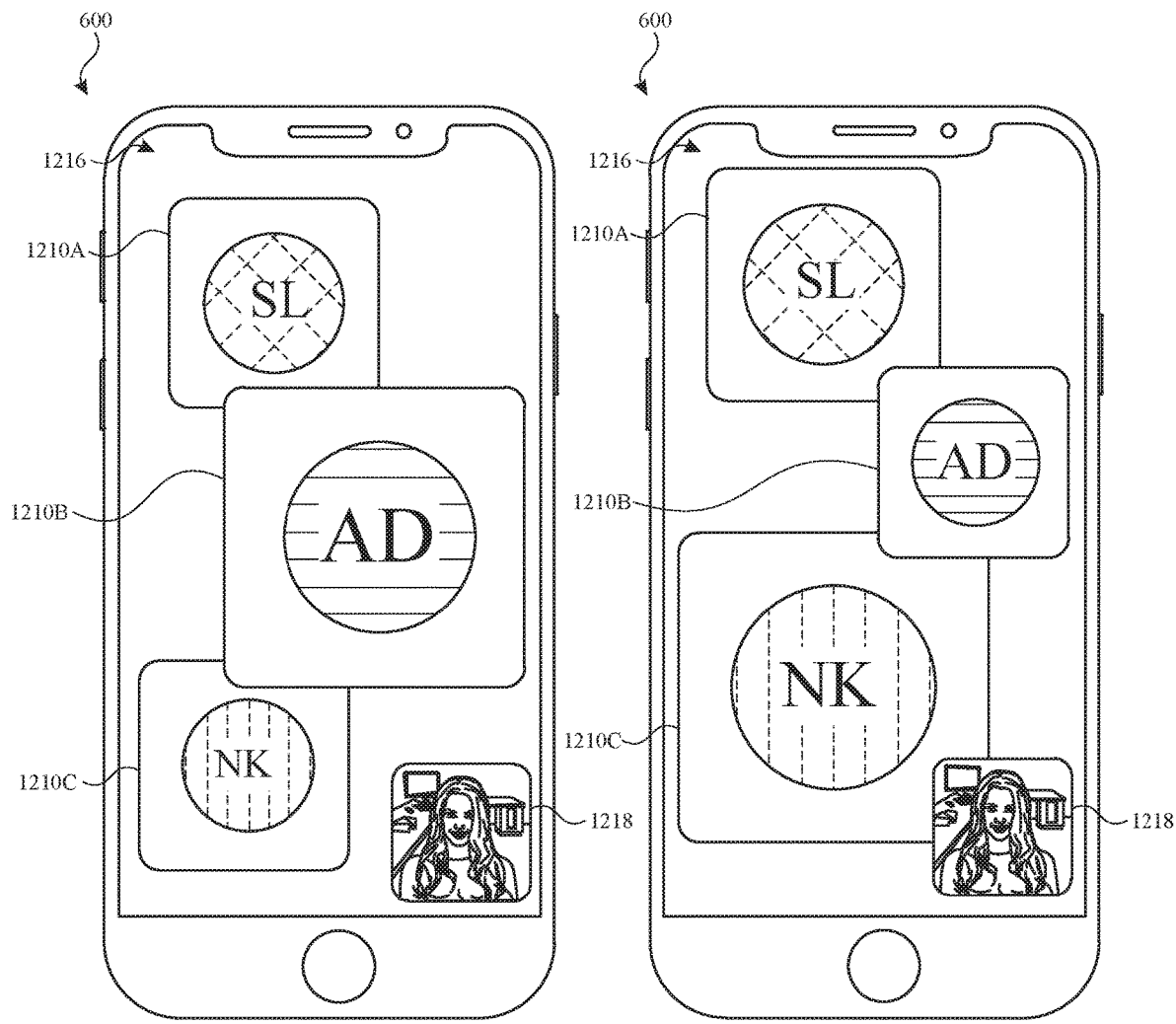
Figure 12N:
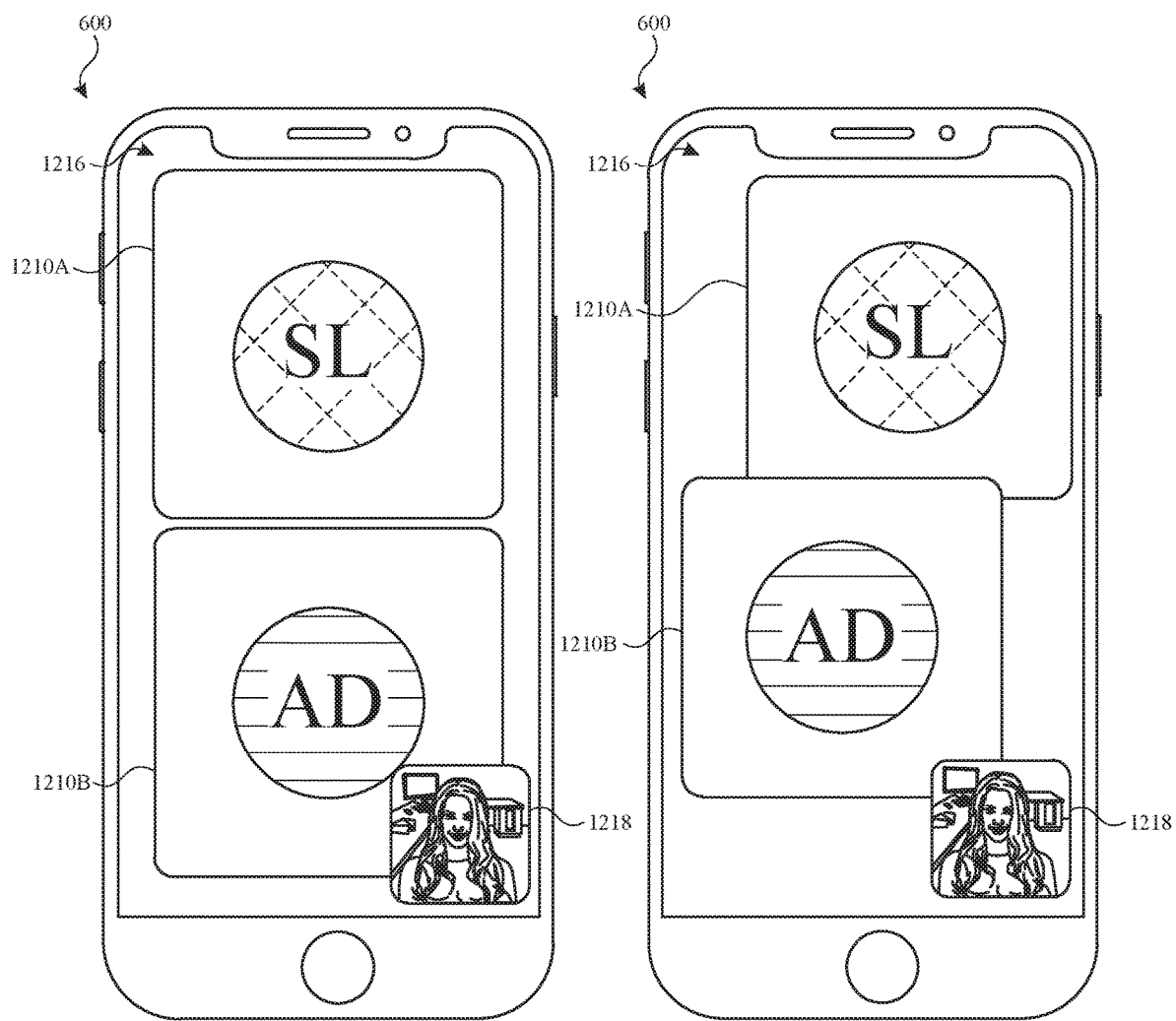
Figure 13A:
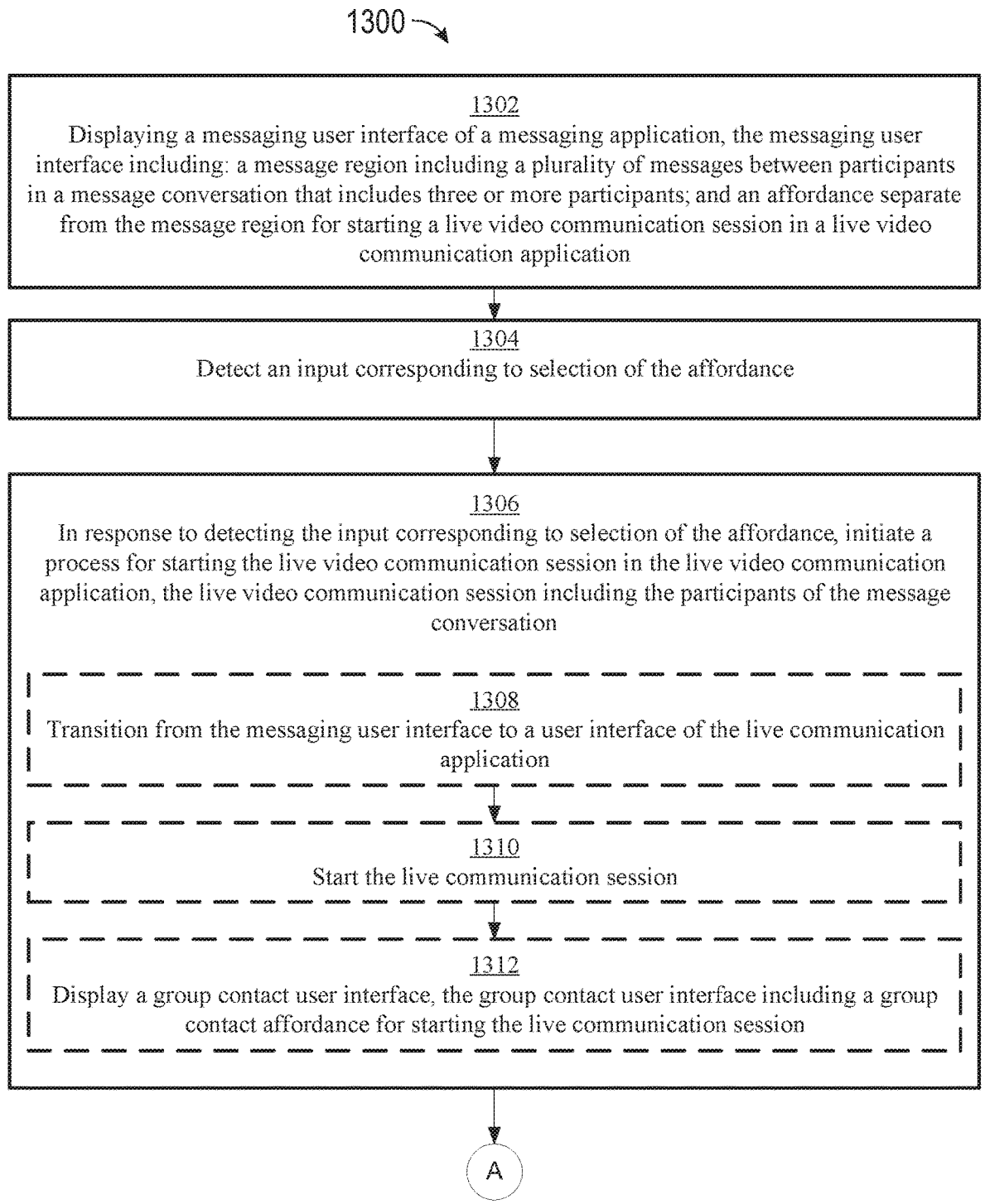
FIGS. 13A-13D illustrate an exemplary method in accordance with some embodiments.
Figure 13B:
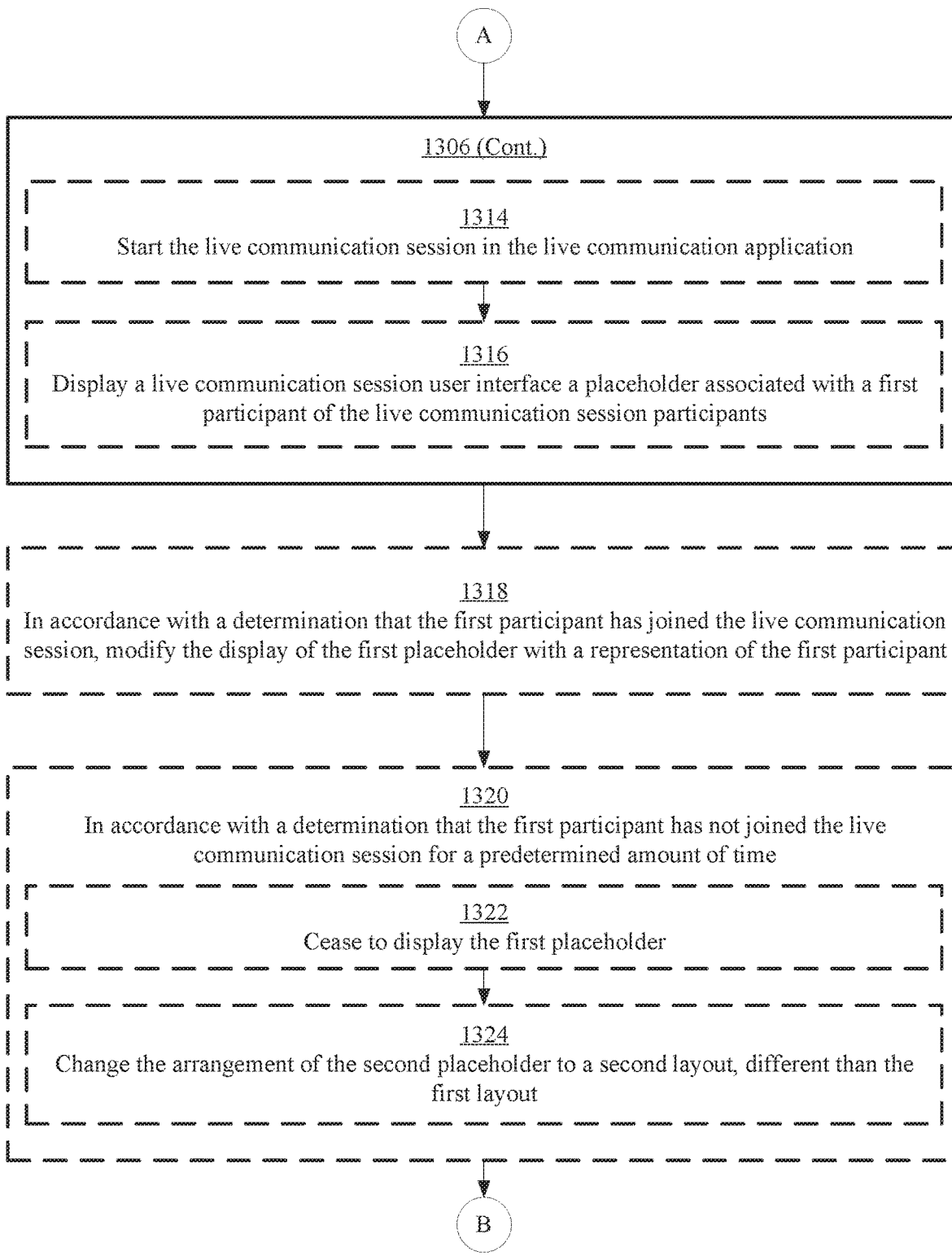
Figure 13C:
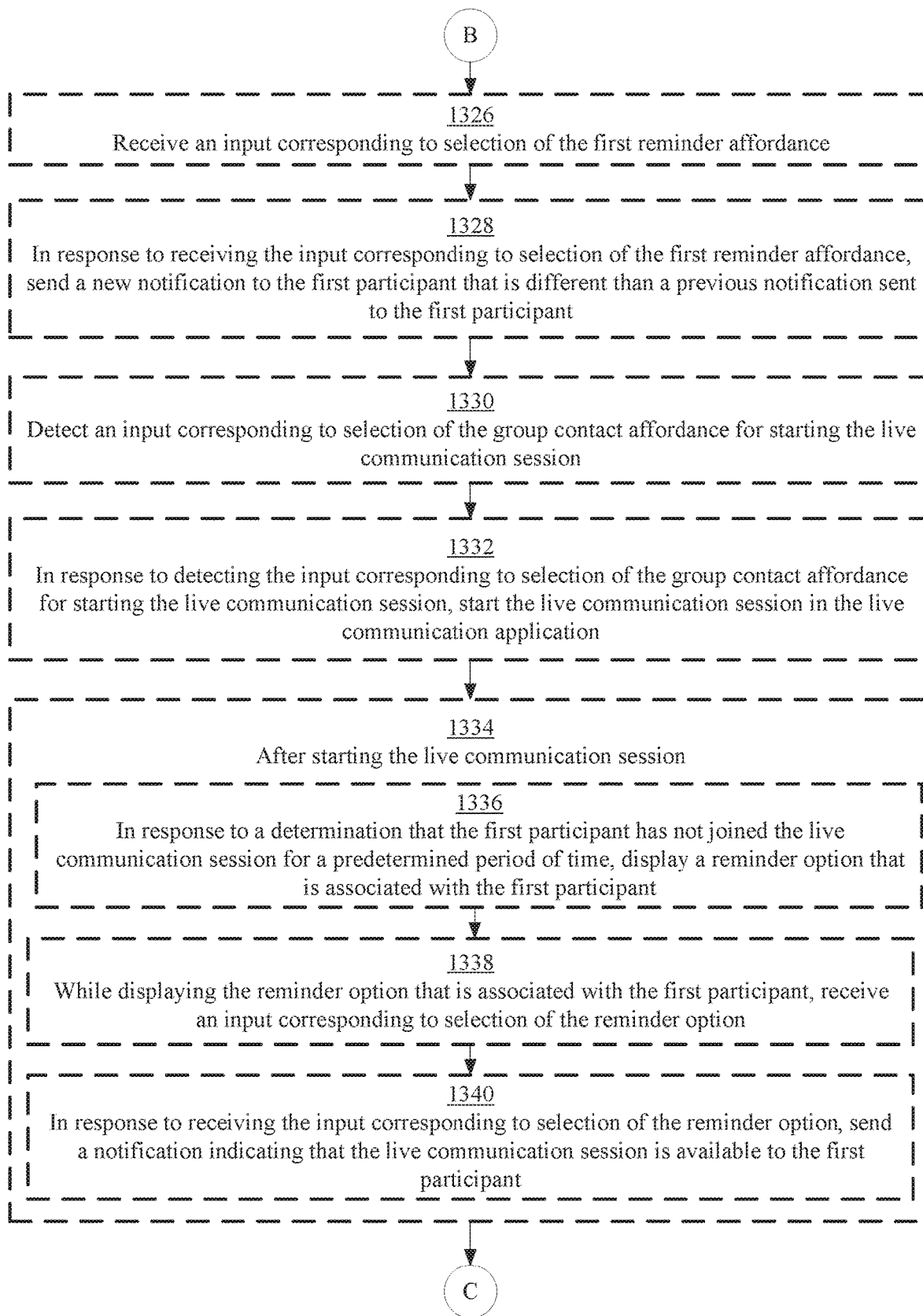
Figure 13D:
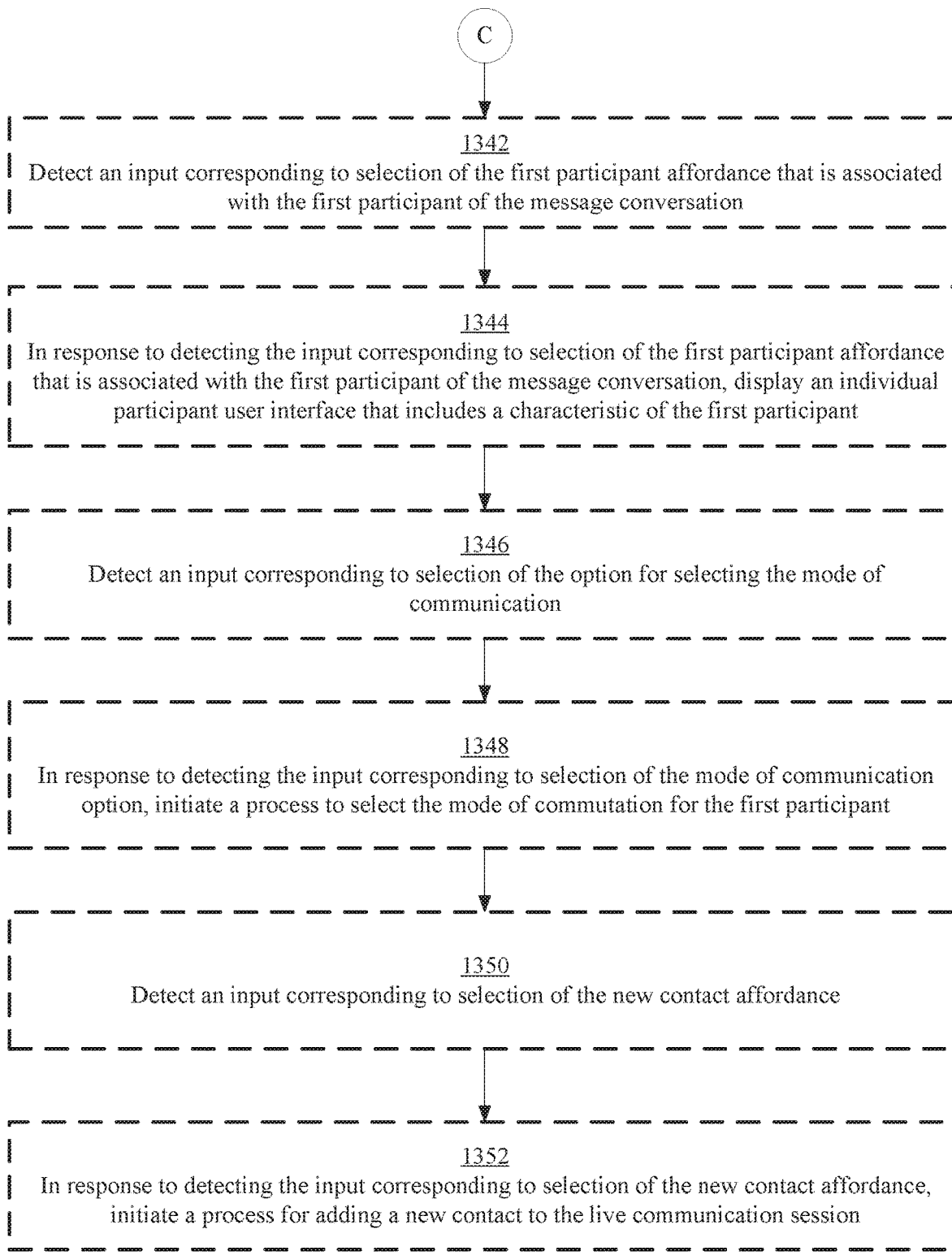

FIGS. 12A-12N illustrate exemplary user interfaces for a live communication session between multiple participants. FIGS. 13A-13D are a flow diagram illustrating methods of performing a live communication session between multiple participants in accordance with some embodiments. The user interfaces in FIGS. 12A-12N are used to illustrate the processes described below, including the processes in FIGS. 13A-13D.

FIGS. 14A-14I illustrate exemplary user interfaces for a live communication session between multiple participants. FIGS. 15A-15C are a flow diagram illustrating methods of performing a live communication session between multiple participants in accordance with some embodiments. The user interfaces in FIGS. 14A-14I are used to illustrate the processes described below, including the processes in FIGS. 15A-15C.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
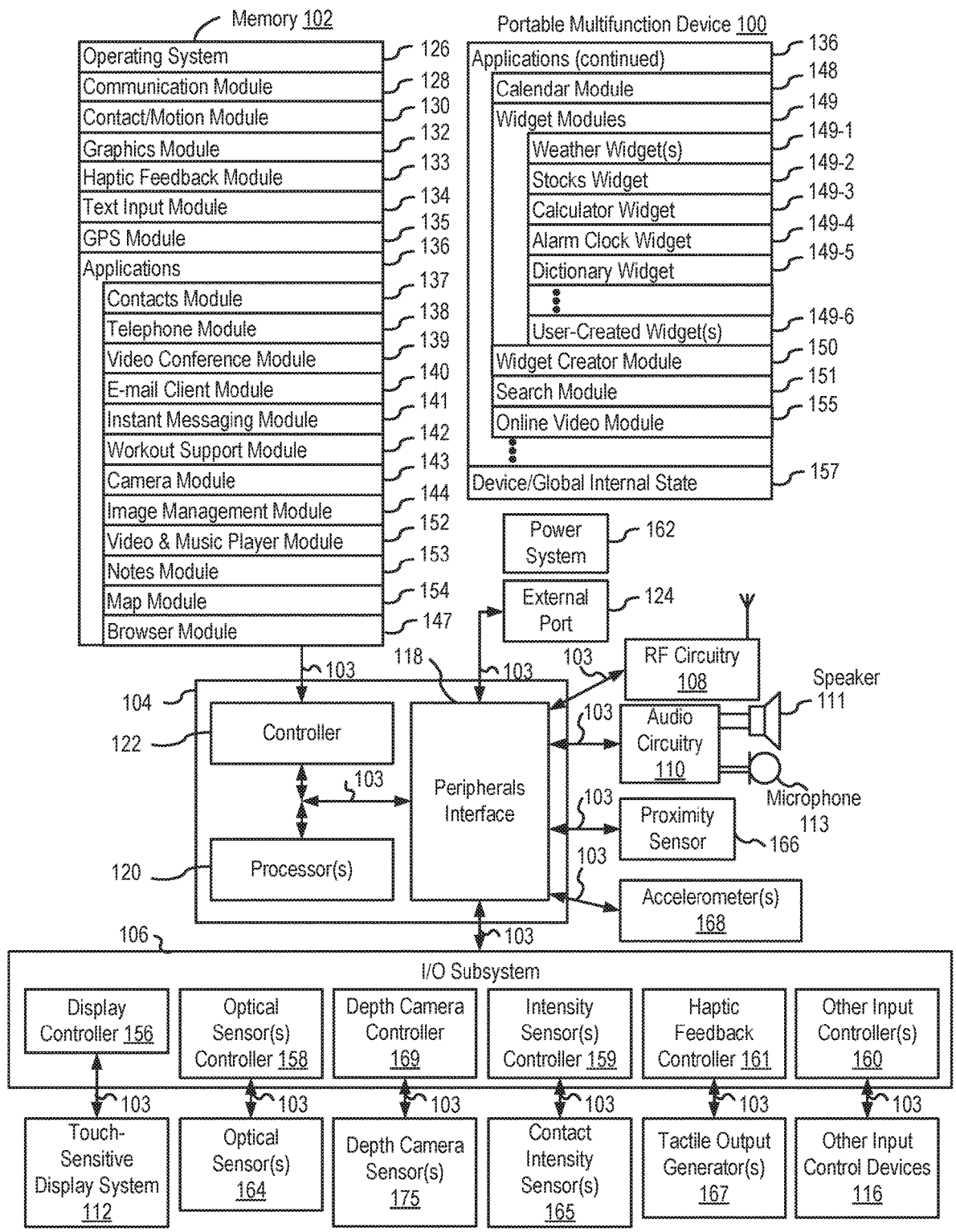
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as a "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
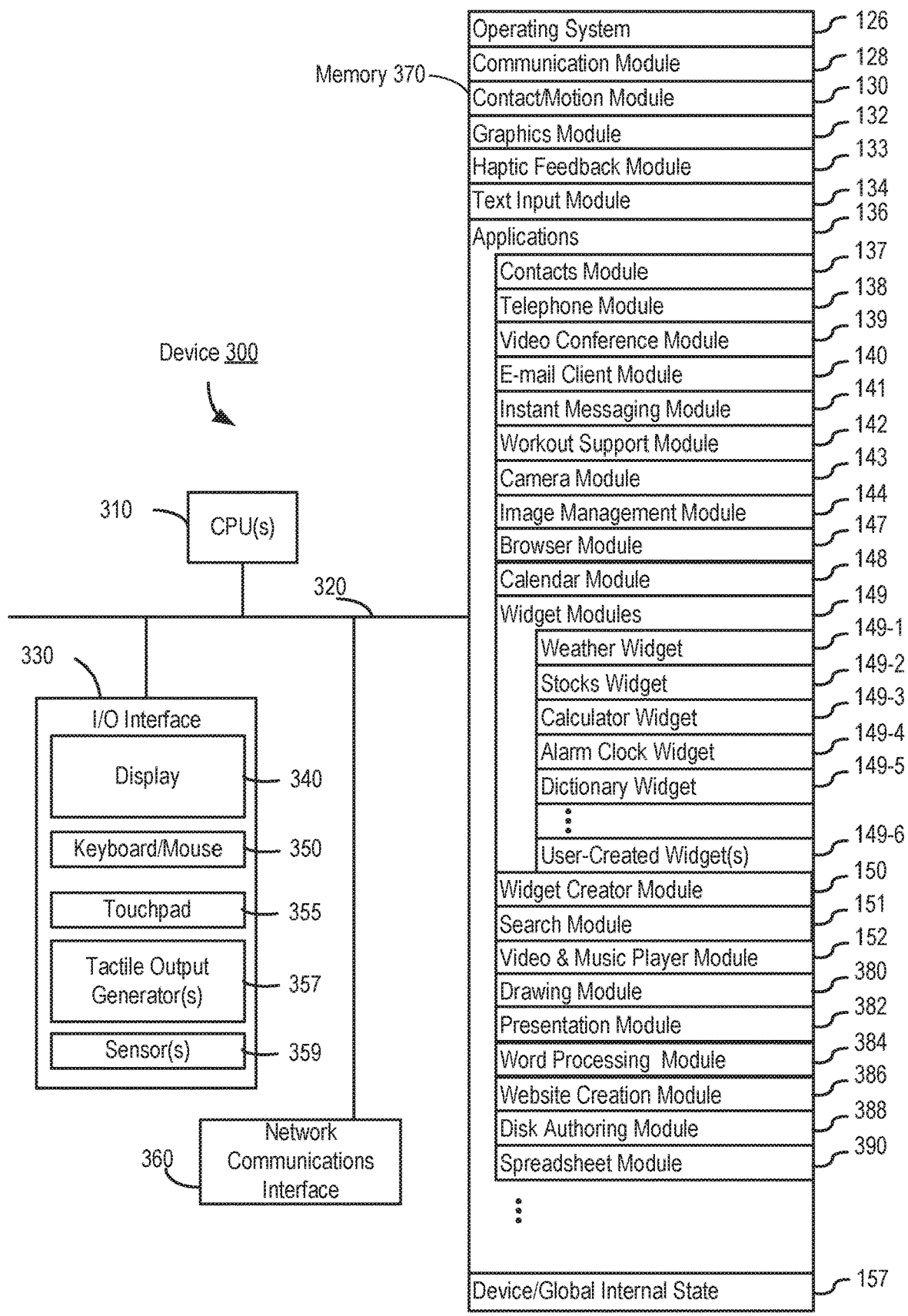
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

Widget creator module 150 for making user-created widgets 149-6;

Search module 151;

Video and music player module 152, which merges video player module and music player module;

Notes module 153;

Map module 154; and/or

Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
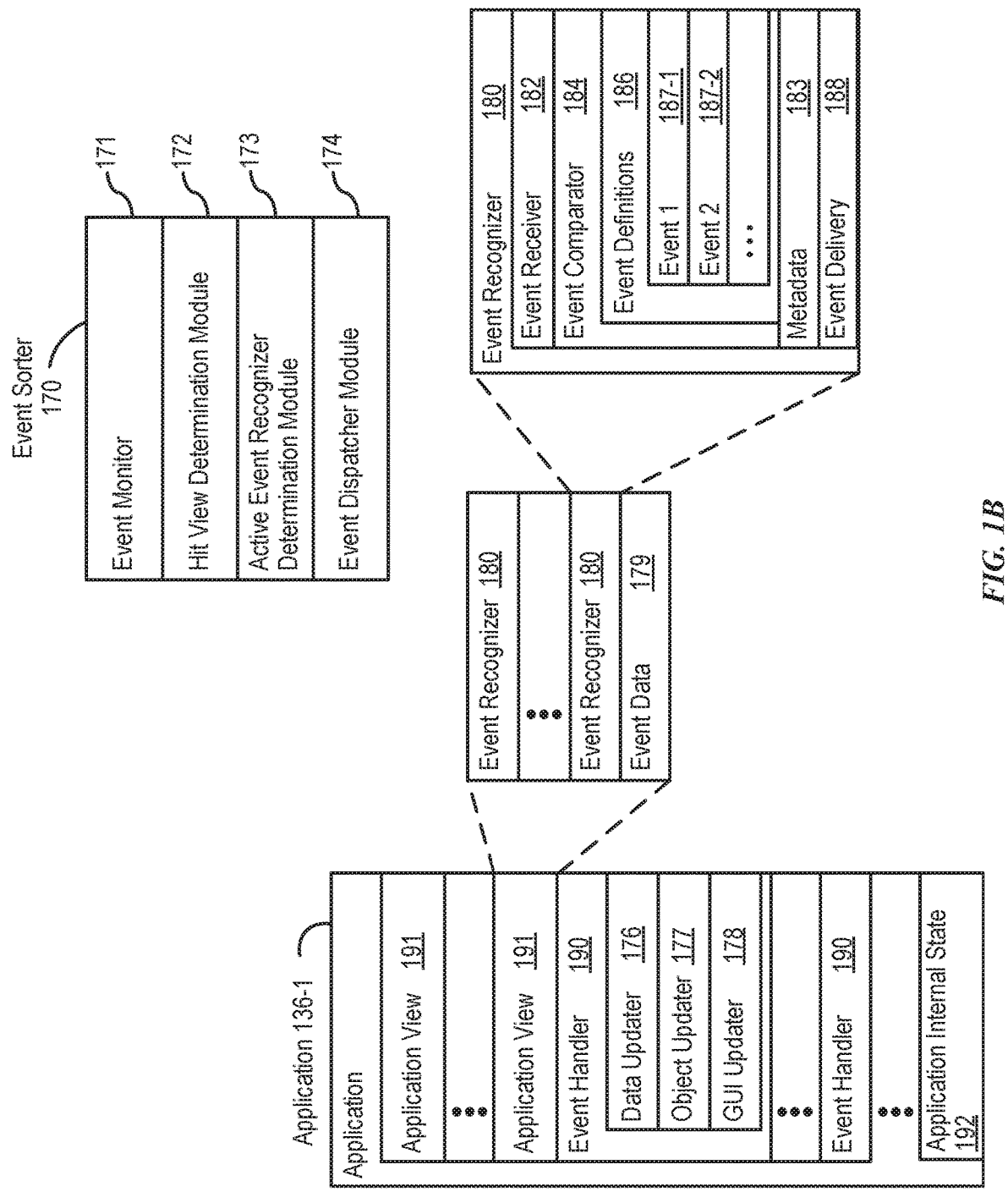
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
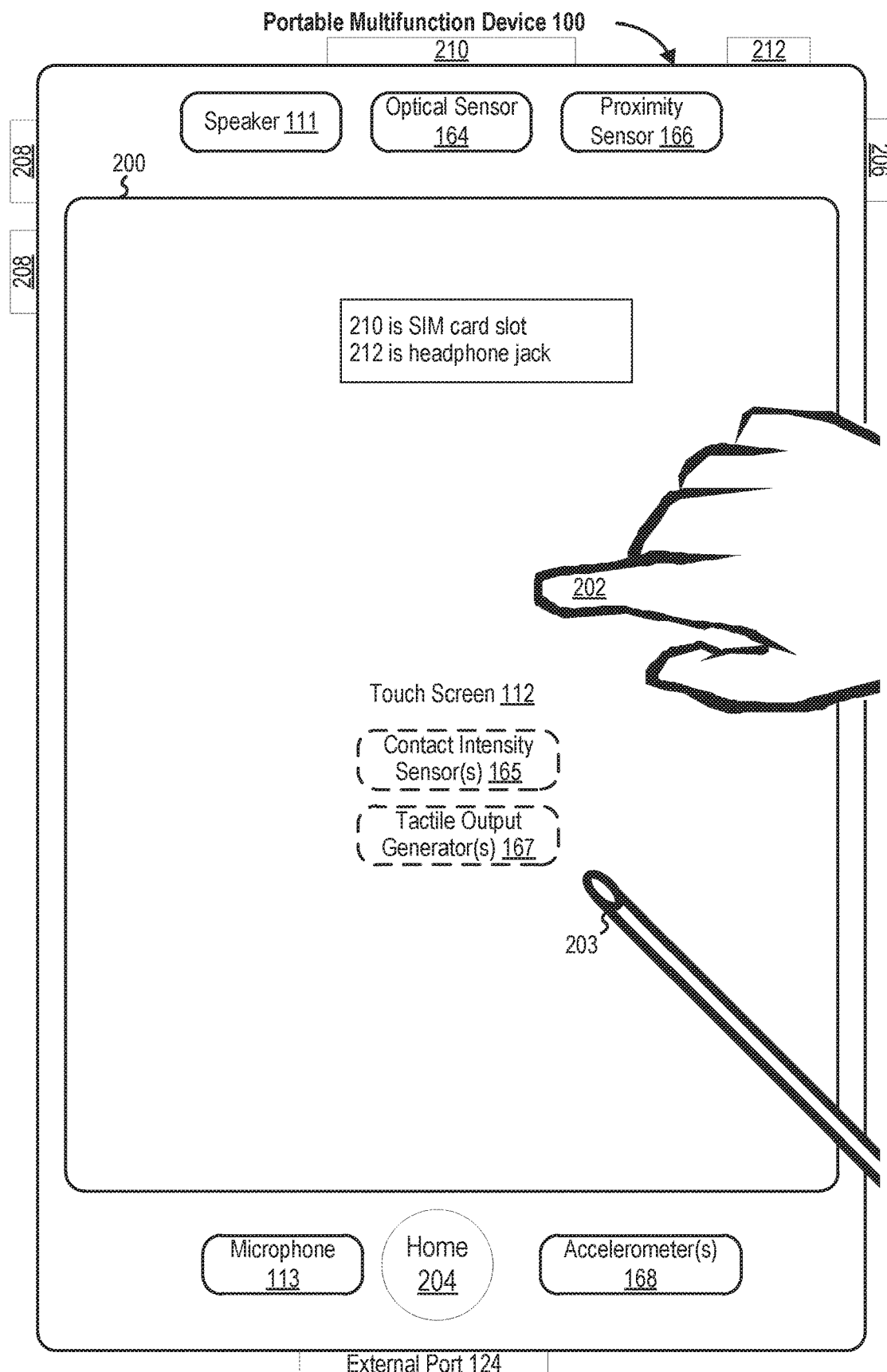
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
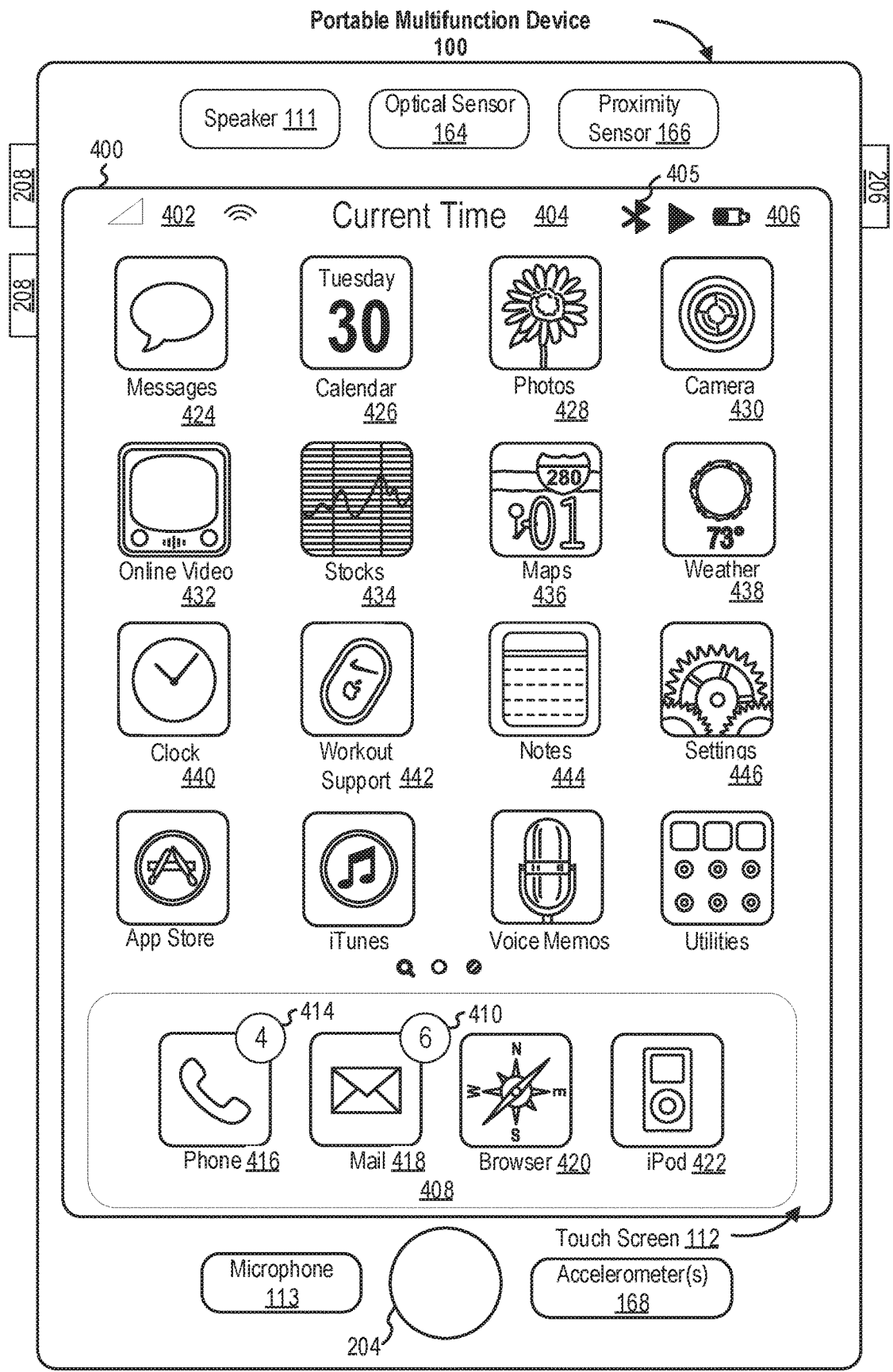
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
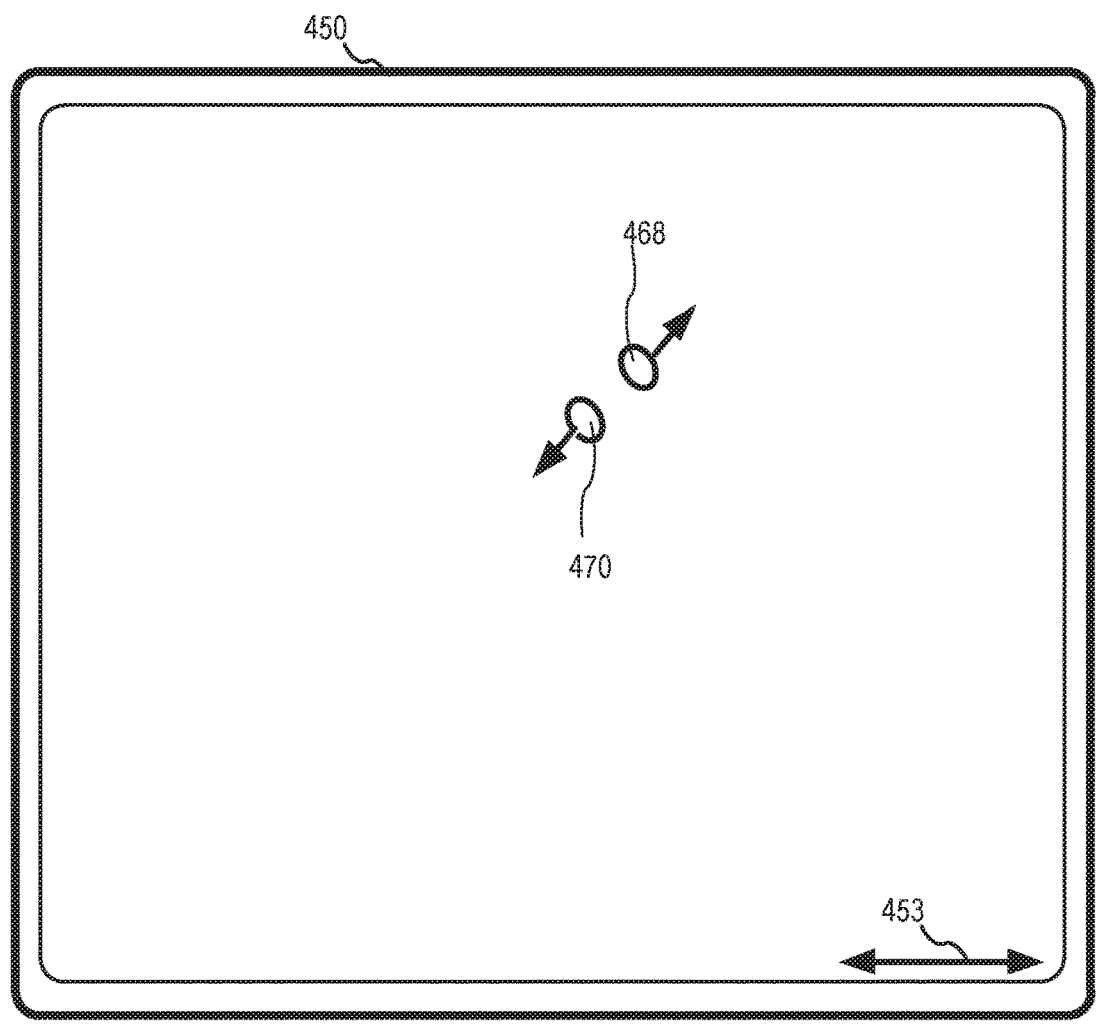
FIG. 4B illustrates an exemplary user interface for a multifunction device with a touch-sensitive surface that is separate from the display in accordance with some embodiments.
Figure 4B:
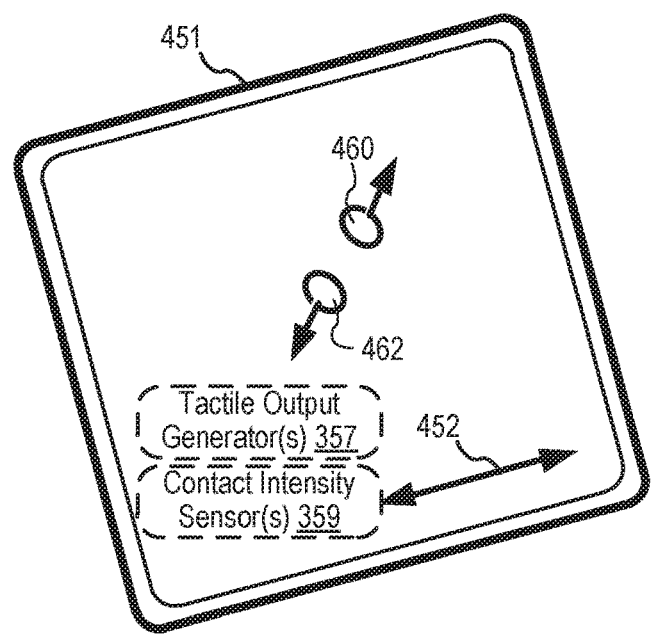

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
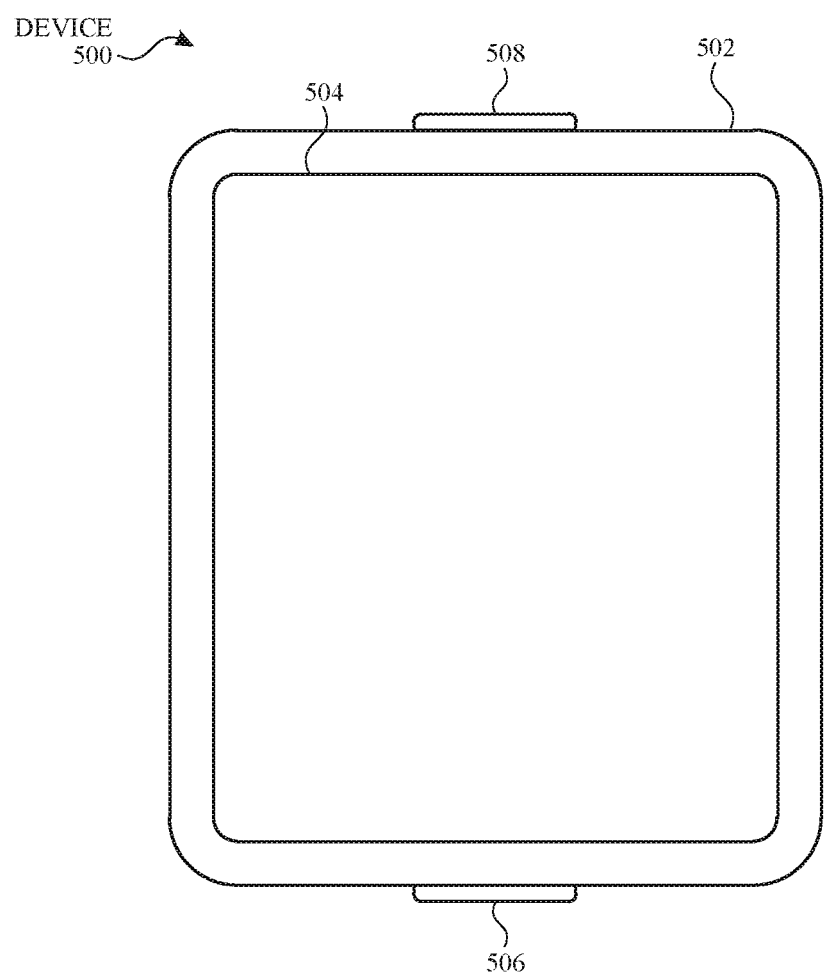
FIG. 5A illustrates a personal electronic device in accordance with some embodiments.
Figure 6A:
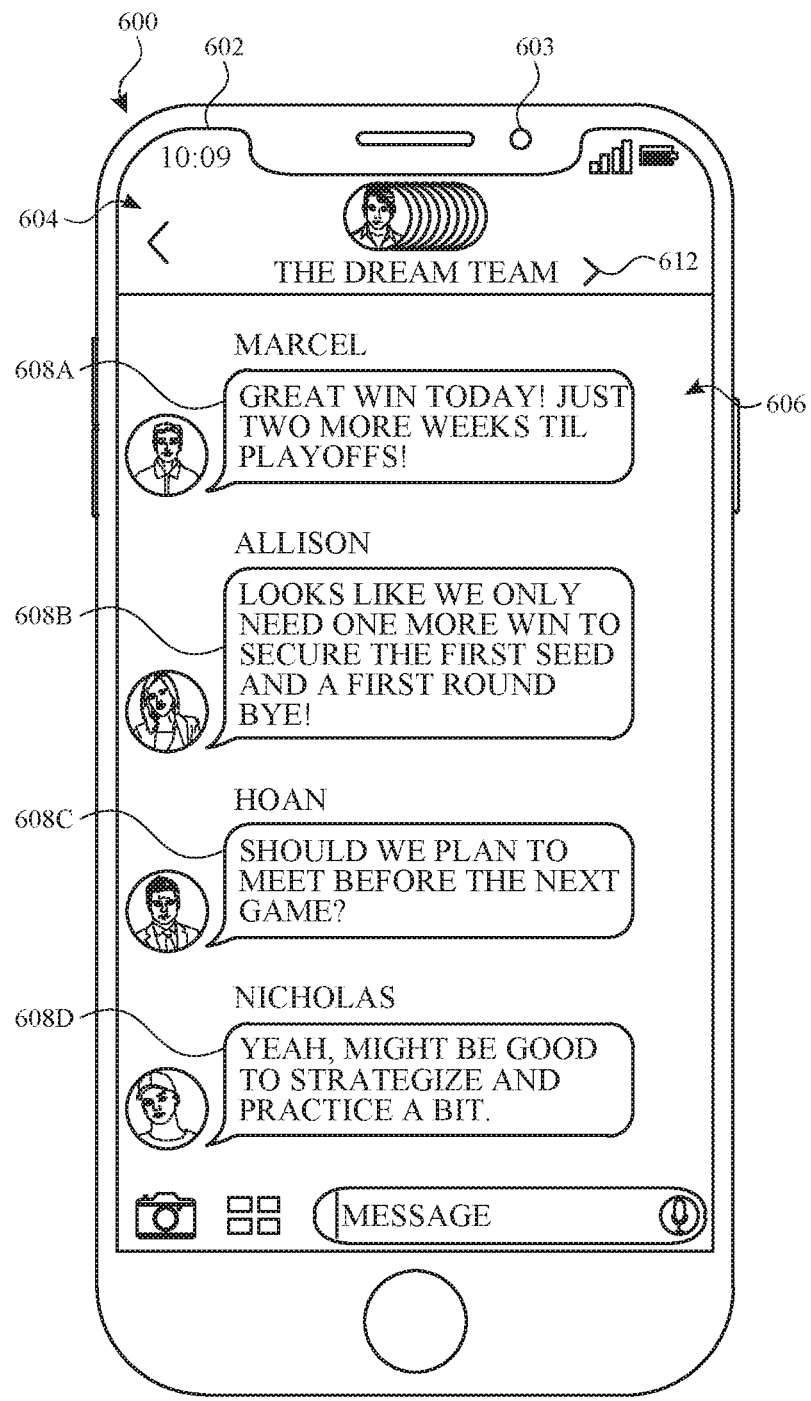
FIGS. 6A-6AF illustrate exemplary user interfaces in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
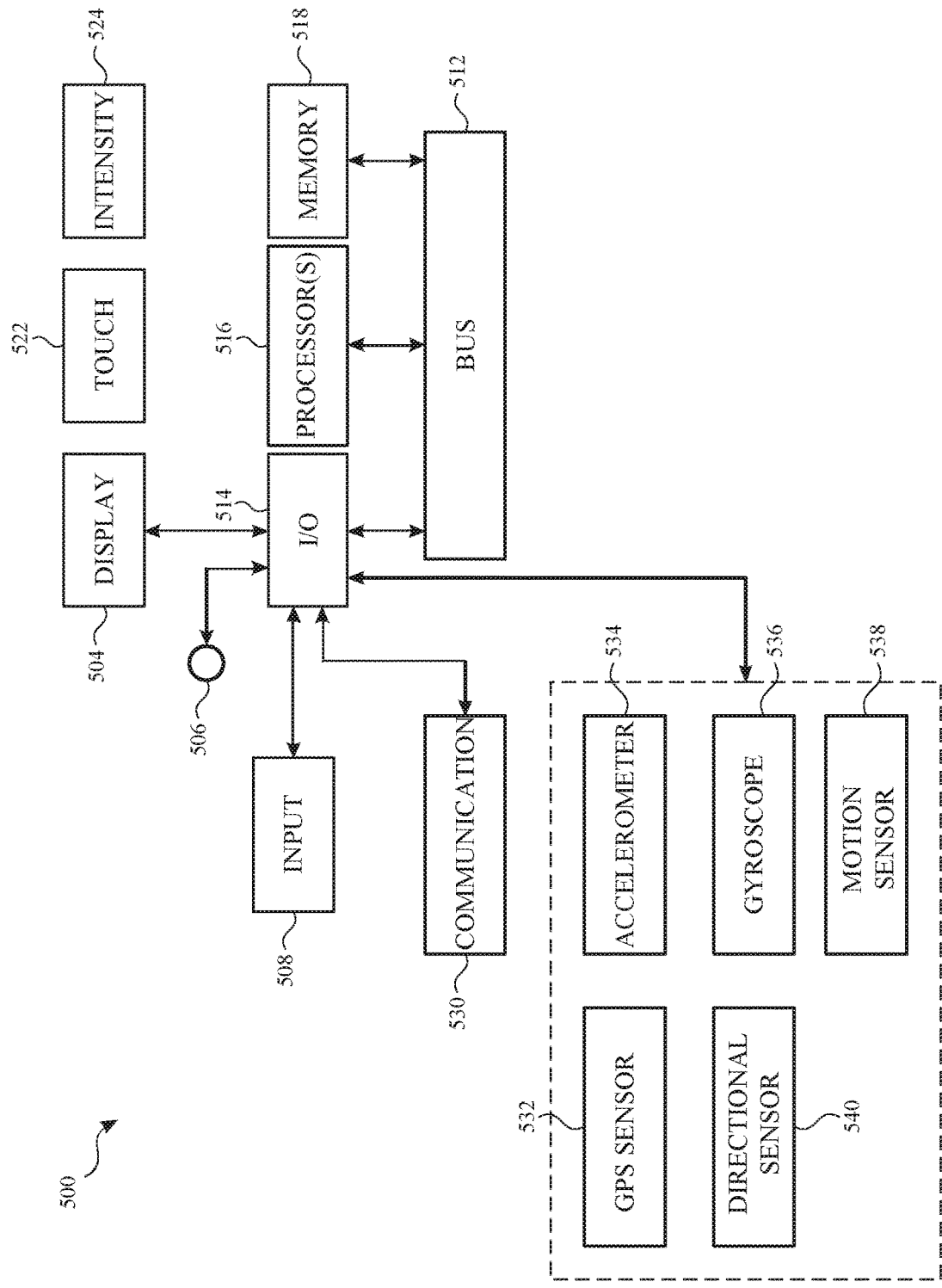
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, 1100, 1300, and 1500 (FIGS. 7A-7F, 9A-9K, 11A-11F, 13A-13D, and 15A-15C). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
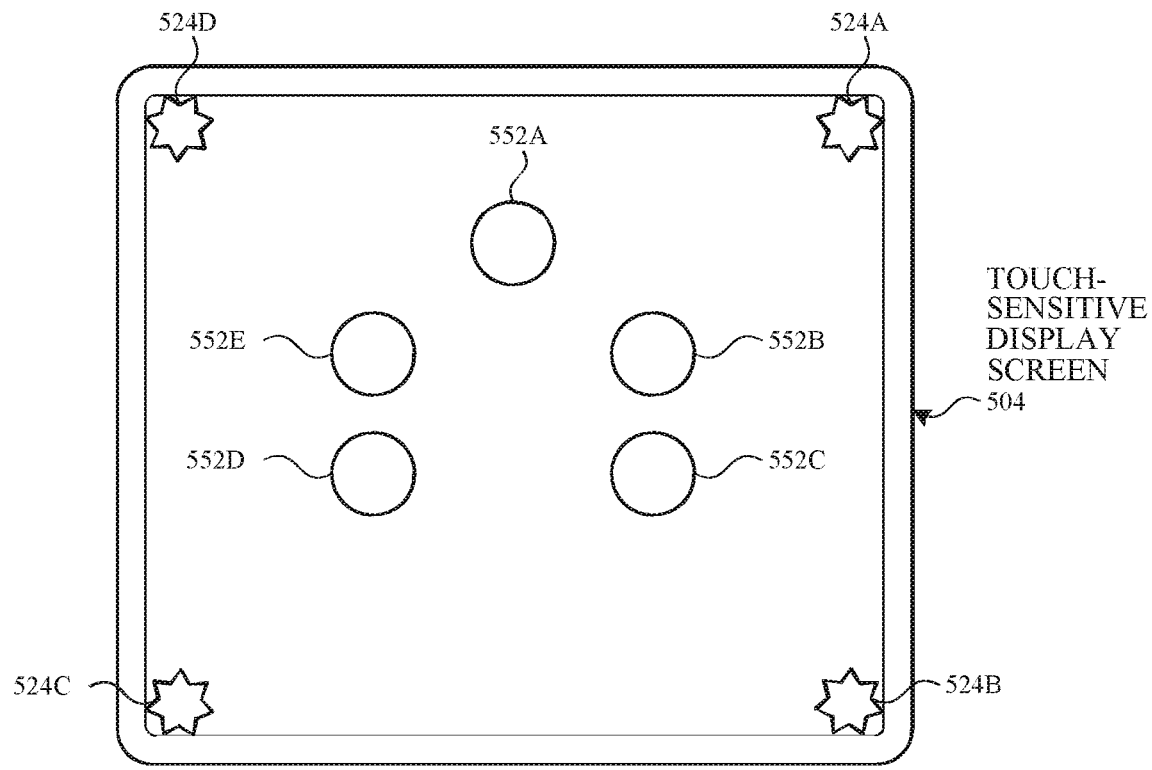
FIGS. 5C-5D illustrate exemplary components of a personal electronic device having a touch-sensitive display and intensity sensors in accordance with some embodiments.
Figure 5C:
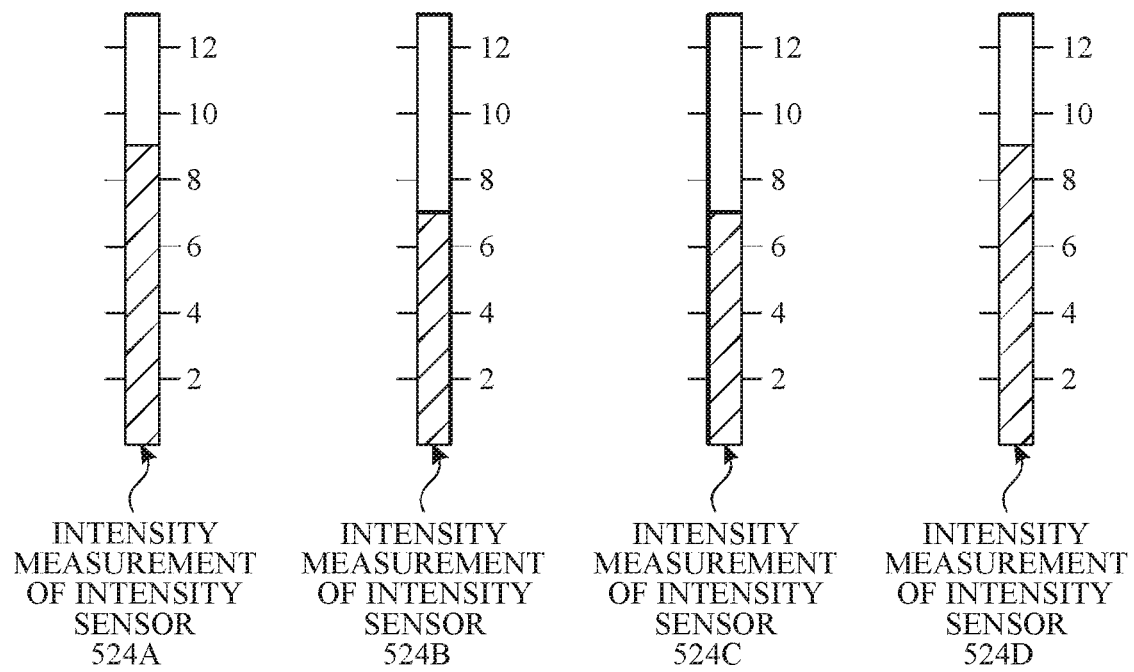
Figure 5D:
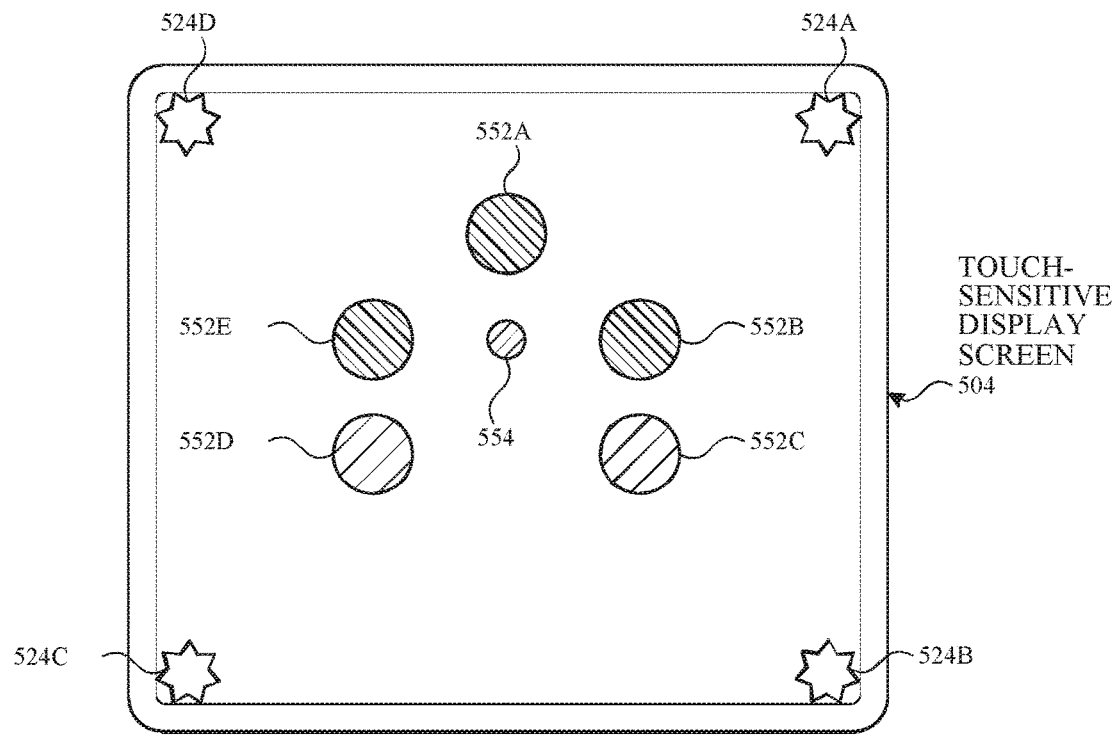
Figure 5D:
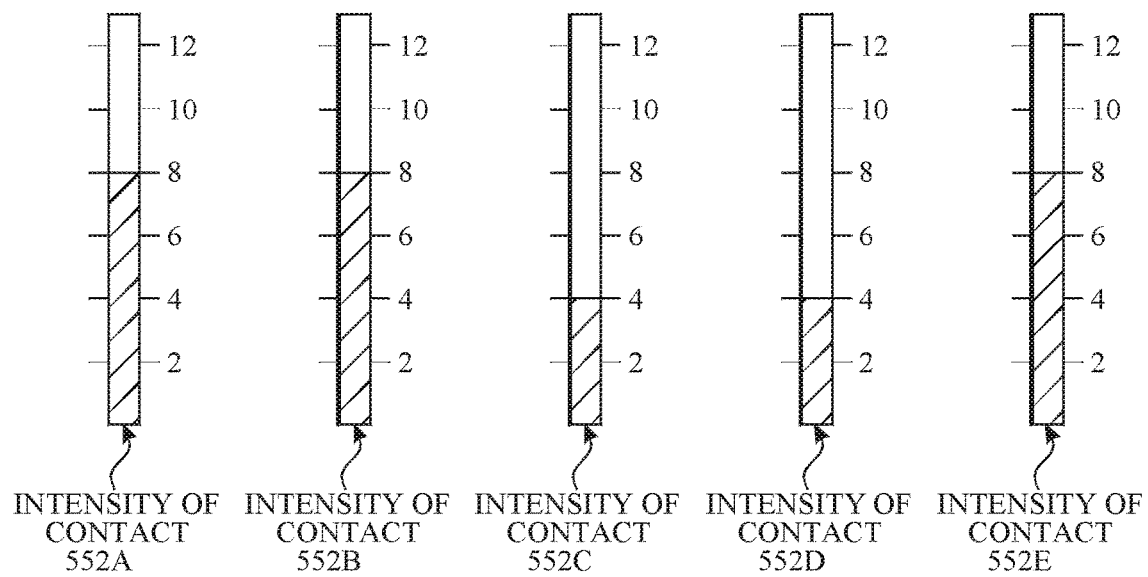

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A\cdot(Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
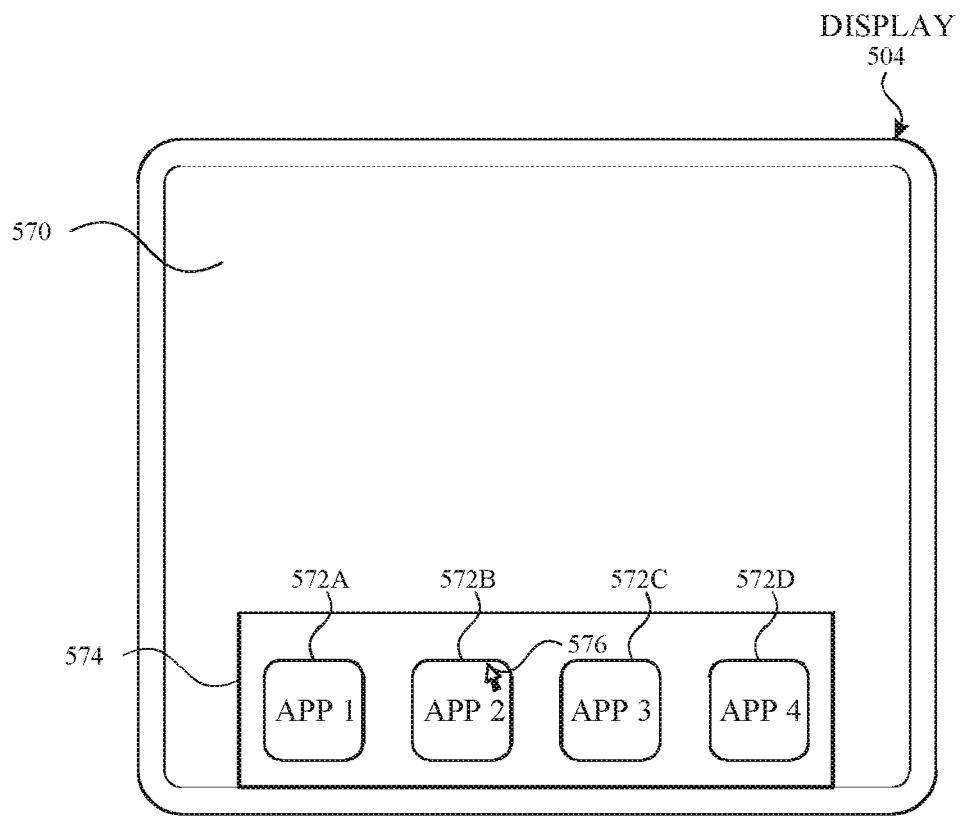
FIGS. 5E-5H illustrate exemplary components and user interfaces of a personal electronic device in accordance with some embodiments.
Figure 5E:
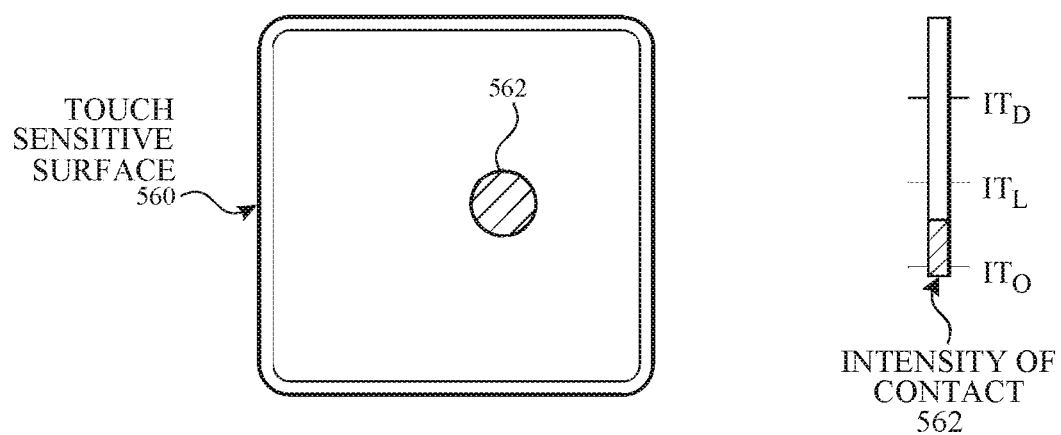
Figure 5F:
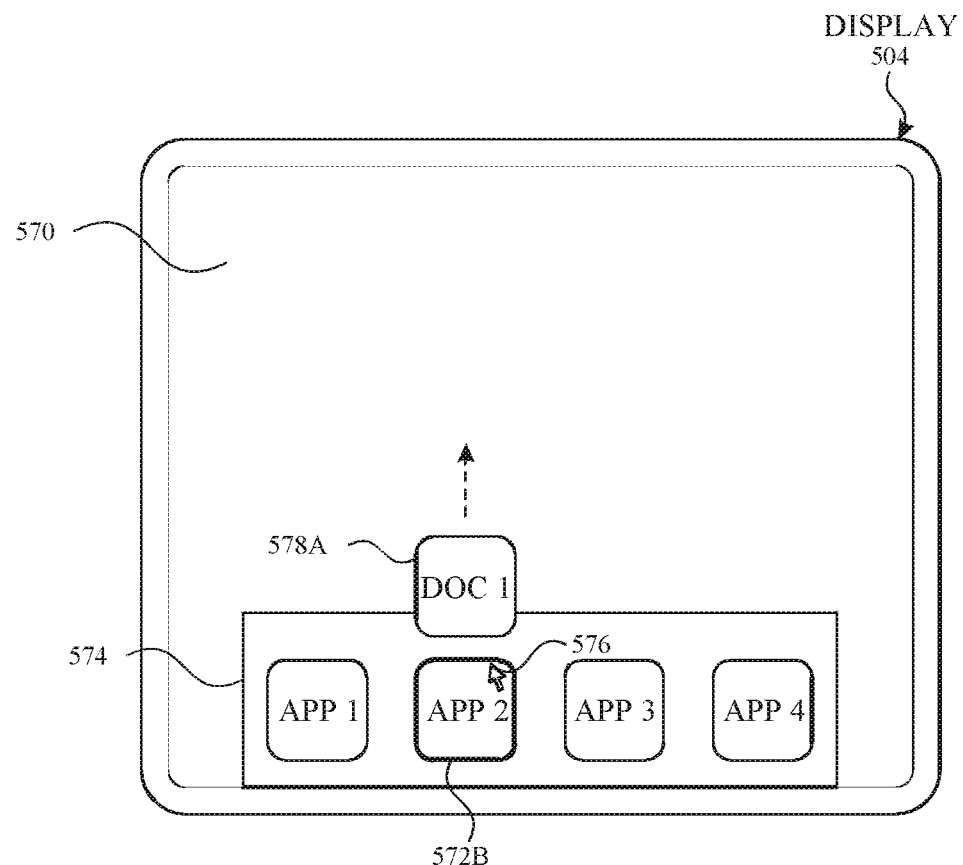
Figure 5F:
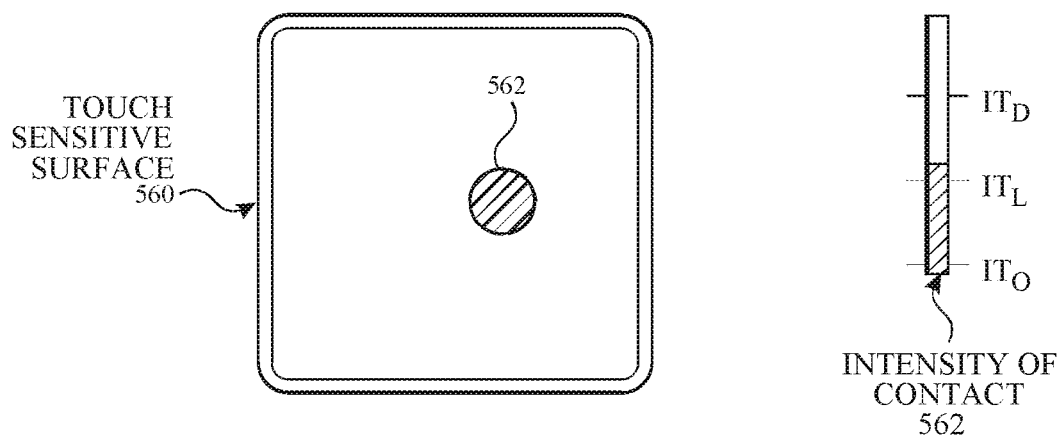
Figure 5G:
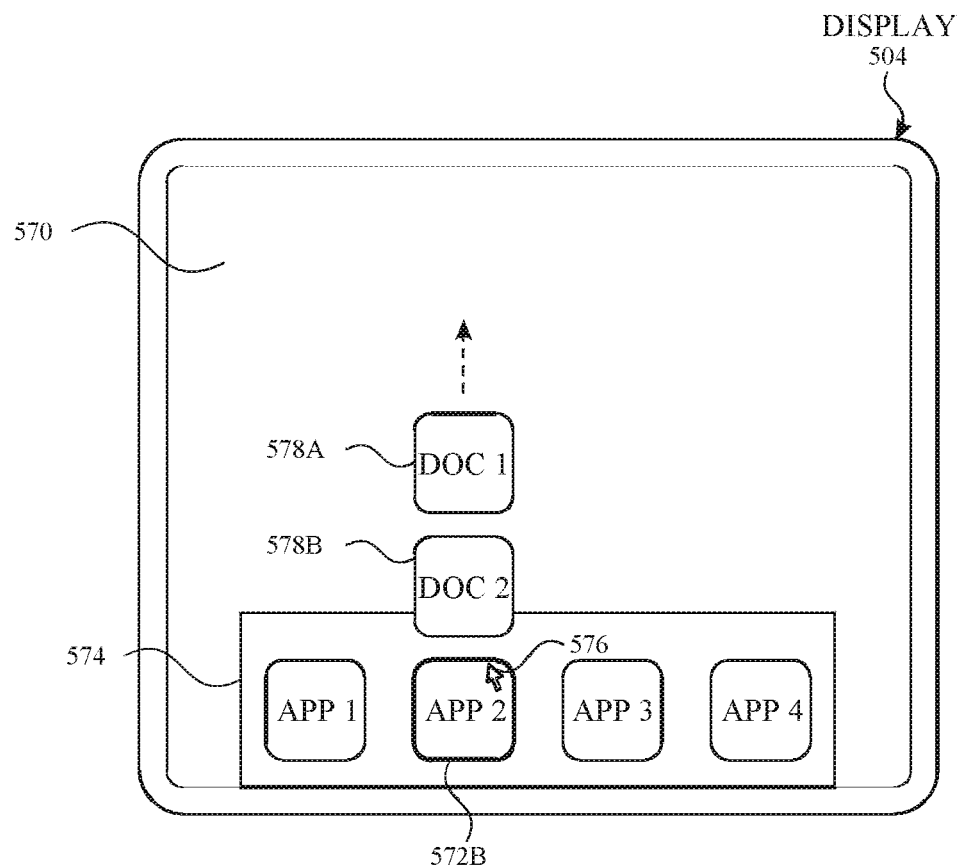
Figure 5G:
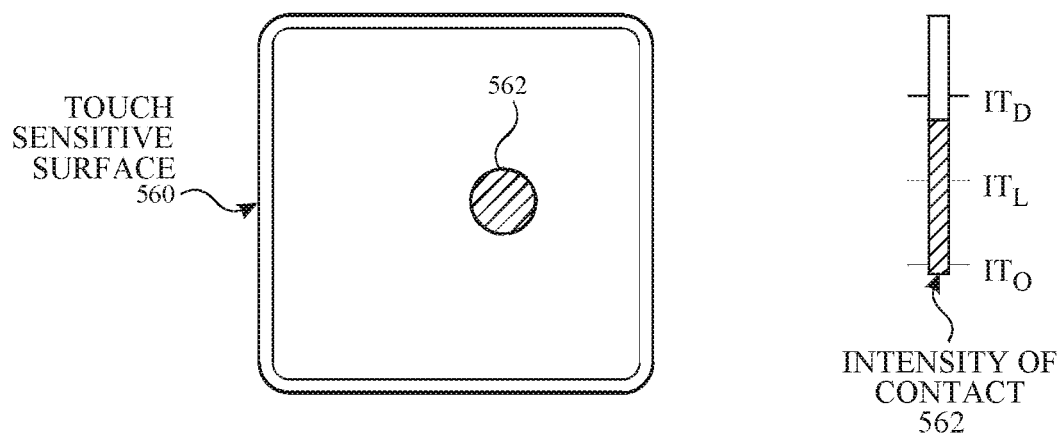
Figure 5H:
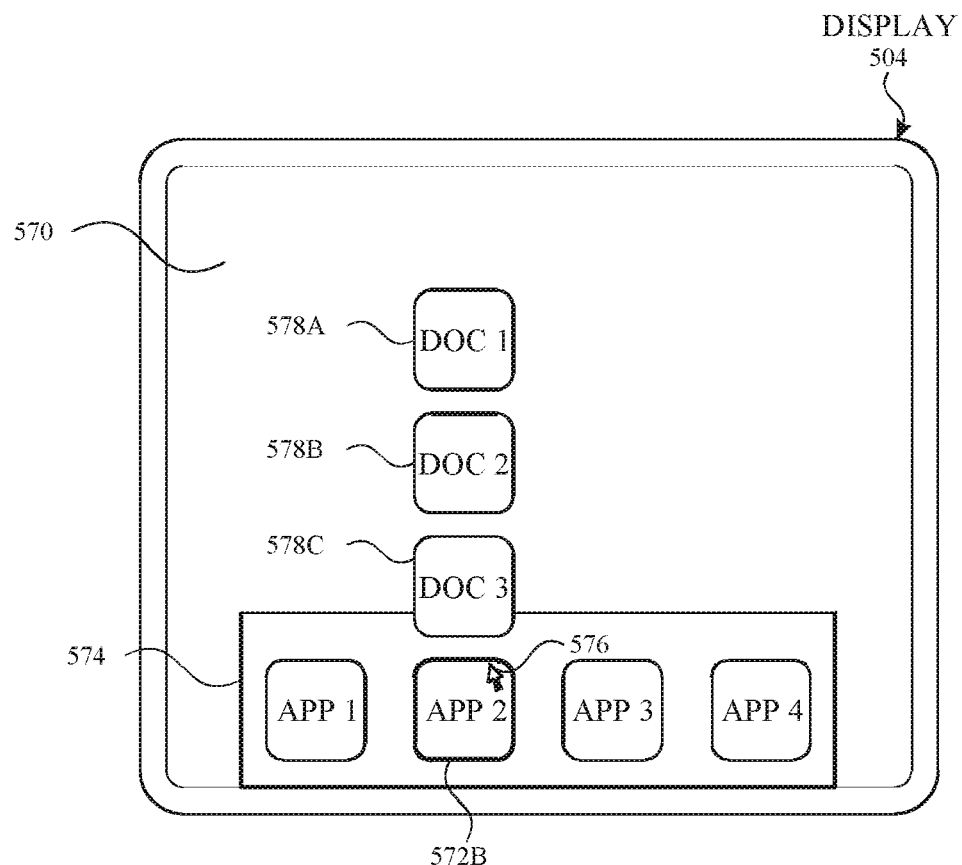
Figure 5H:
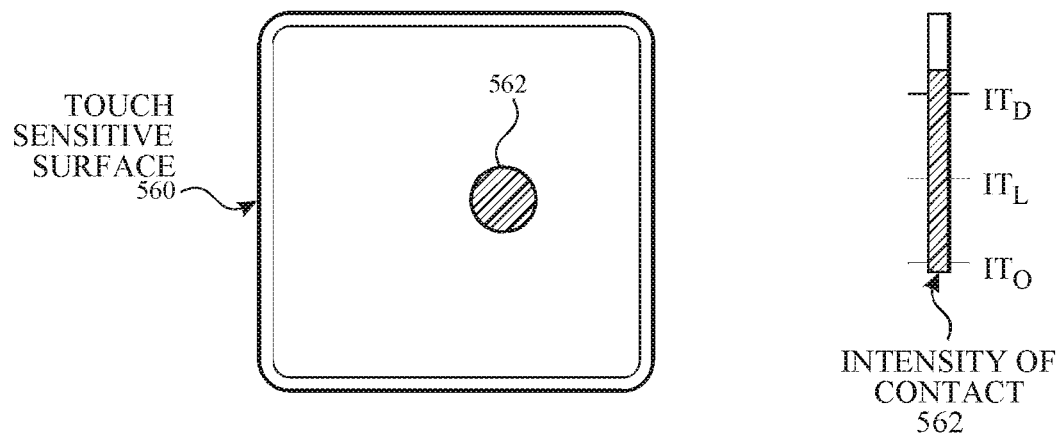

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6A-6AF illustrate exemplary user interfaces for initiating and participating in a live communication session (e.g., from a messaging application), in accordance with some embodiments. The user interfaces in these figures are used to illustrate the processes described below, including the processes in FIG. 7A-7F.

FIG. 6A illustrates device 600 with touch-sensitive display 602. In some embodiments, device 600 includes one or more features of devices 100, 300, and 500. In some embodiments, device 600 also includes camera 603, which, at a minimum, includes an image sensor that is capable of capturing data representing a portion of the light spectrum (e.g., visible light, infrared light, or ultraviolet light). In some embodiments, camera 603 includes multiple image sensors and/or other types of sensors. In addition to capturing data representing sensed light, in some embodiments, camera 603 is capable of capturing other types of data, such as depth data. For example, in some embodiments, camera 603 also captures depth data using techniques based on speckle, time-of-flight, parallax, or focus. Image data that device 600 captures using camera 603 includes data corresponding to a portion of the light spectrum for a scene within the field of view of the camera. Additionally, in some embodiments, the captured image data also includes depth data for the light data. In some other embodiments, the captured image data contains data sufficient to determine or generate depth data for the data for the portion of the light spectrum.

In some examples, electronic device 600 includes a depth camera (e.g., as part of camera 603), such as an infrared camera, a thermographic camera, or a combination thereof. In some examples, the device further includes a light-emitting device (e.g., light projector), such an IR flood light, a structured light projector, or a combination thereof. The light-emitting device is, optionally, used to illuminate the subject during capture of the image by a visible light camera and a depth camera (e.g., an IR camera) and the information from the depth camera and the visible light camera are used to determine a depth map of different portions of subject captured by the visible light camera. In some embodiments, a depth map (e.g., depth map image) contains information (e.g., values) that relates to the distance of objects in a scene from a viewpoint (e.g., a camera). In one embodiment of a depth map, each depth pixel defines the position in the viewpoint's Z-axis where its corresponding two-dimensional pixel is located. In some examples, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., camera) in the "three dimensional" scene. In other examples, a depth map represents the distance between an object in a scene and the plane of the viewpoint.) In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction. In some embodiments, the lighting effects described herein are displayed using disparity information from two cameras (e.g., two visual light cameras) for rear facing images and using depth information from a depth camera combined with image data from a visual light camera for front facing images (e.g., selfie images). In some embodiments, the same user interface is used when the two visual light cameras are used to determine the depth information and when the depth camera is used to determine the depth information, providing the user with a consistent experience, even when using dramatically different technologies to determine the information that is used when generating the lighting effects. In some embodiments, while displaying the camera user interface with one of the lighting effects applied, the device detects selection of a camera switching affordance and switches from the front facing cameras (e.g., a depth camera and a visible light camera) to the rear facing cameras (e.g., two visible light cameras that are spaced apart from each other) (or vice versa) while maintaining display of the user interface controls for applying the lighting effect and replacing display of the field of view of the front facing cameras to the field of view of the rear facing cameras (or vice versa).

As illustrated in FIG. 6A, device 600 displays messaging user interface 604 of a messaging application. Messaging user interface 604 includes message region 606 that includes messages 608A-608D in a message conversation between a group of participants including three or more participants ("The Dream Team").

While displaying messaging user interface 604, device 600 receives data indicating that a live communication session is active (e.g., an invitation to join a live communication session), where the live communication session is available to the participants in the group The Dream Team. In some embodiments, the live communication session is an audio communication session or an audio/video communication session.

Figure 6B:
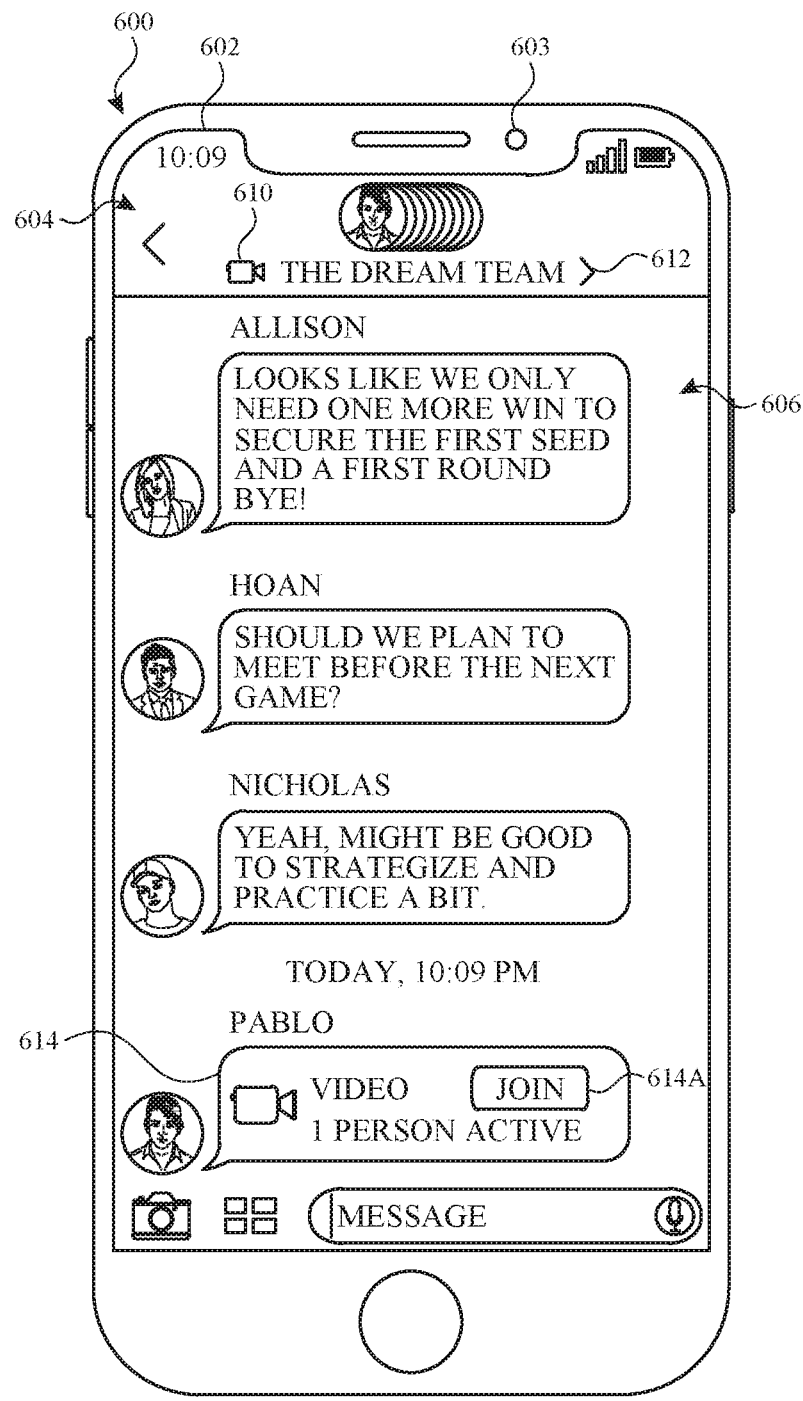

In response to receiving the data indicating that the live communication session is active, device 600 displays a notification indicating that the live communication session is active. As illustrated in FIG. 6B, the notification includes notification 614 as a message from participant Pablo in message region 606, indicating that Pablo initiated the live communication session. Notification 614 indicates the type of live communication session with text "VIDEO" and a video camera icon. Notification 614 also indicates the number of participants currently active in the live communication session ("1 PERSON ACTIVE"). In some embodiments, notification 614 indicates the name of one or more of the participants that are currently active in the live communication session. Notification 614 also includes live communication join affordance 614A, which when selected, causes device 600 to initiate a process for joining the live communication session represented by notification 614. Techniques for joining the live communication session are described in greater detail below.

Optionally, in response to receiving the data indicating that the live communication session is active, device 600 generates an audio output indicating that the live communication session is active. In some embodiments, the audio output is different than an audio output associated with a messaging application (e.g., a notification of a received message) and an audio output associated with a phone application (e.g., a ring for an incoming call). In some embodiments, the audio output is a hybrid of audio associated with a message notification and audio associated with an incoming call notification. In some embodiments, the audio output shares audio characteristics (e.g., common tones, notes, cadence) with both the audio outputs for the phone call and message notifications.

Also in response to receiving the data indicating that the live communication session is active, device 600 displays live communication affordance 610. In some embodiments, live communication affordance 610 is displayed before the live communication session is initiated (e.g., in a greyed out state) and is visually emphasized (e.g., highlighted) or modified (e.g., to a non-greyed out state) when the live communication session is initiated. In some embodiments, selection of live communication affordance 610 or options affordance 612 initiates a process for joining the live communication session. In some embodiments, notification 614 and/or live communication affordance 610 are displayed without audio and/or haptic output (e.g., phone ring output) (e.g., because it is being displayed in an active message conversation that the user is likely already focused on).

Figure 6C:
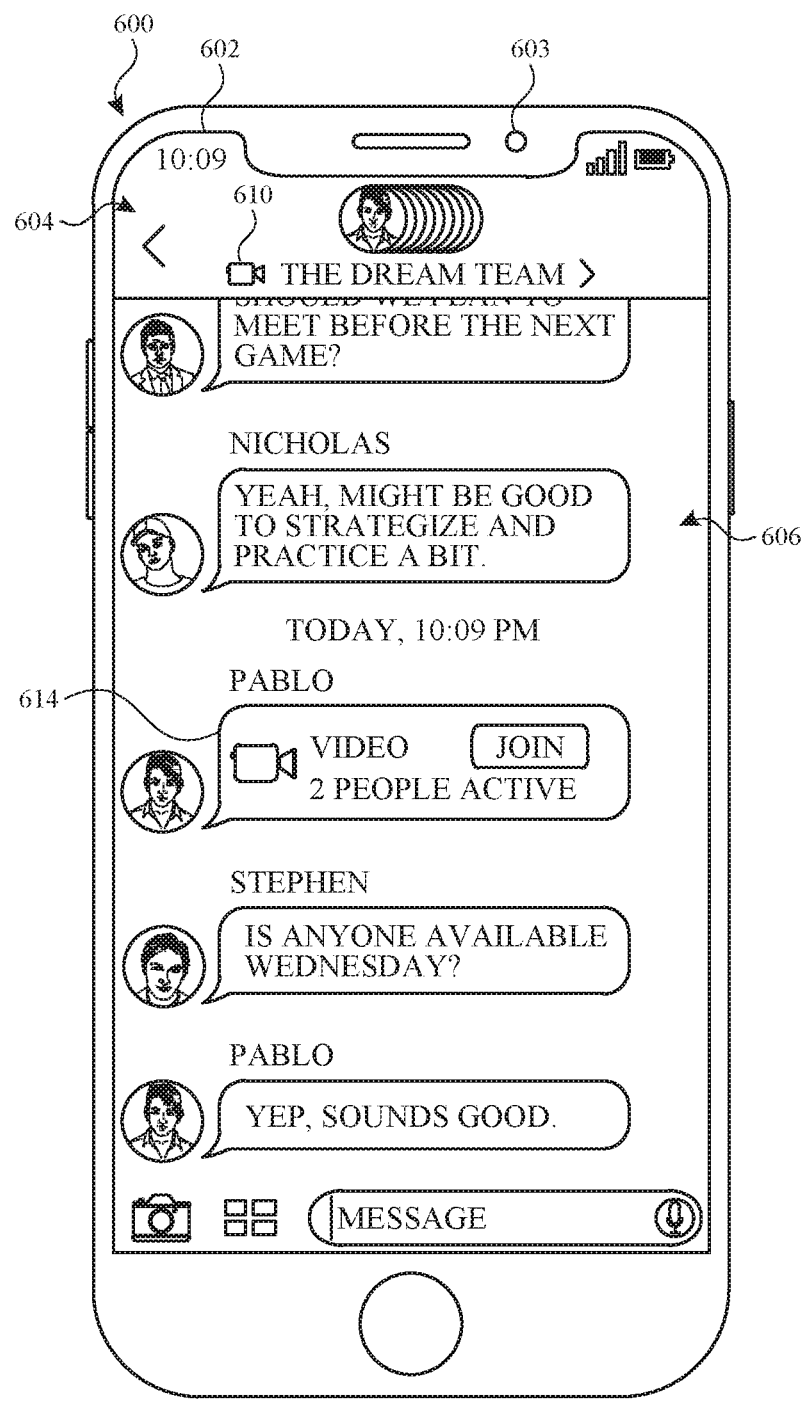

As illustrated in FIG. 6C, as additional messages are added to the message conversation in message region 606, notification 614 moves up to a different location in message region 606. In some embodiments, device 600 moves notification 614 to a location outside the message region (e.g., notification 614 transitions from a message to a banner at the top of display 602 outside message region 606).

In some embodiments, device 600 moves notification 614 in response to a notification relocation criteria being met. In some embodiments, the notification relocation criteria includes one or more criterion selected from the group consisting of: a predetermined time elapsing (e.g., elapsing after notification 614 is displayed), messaging user interface 604 ceasing to be displayed, the messaging application being closed, and/or the entirety of notification 614 or a portion of notification 614 being hidden in message region 606 (e.g., due to new incoming messages populating message region 606). In some embodiments, notification 614 is moved to the bottom, right, or left side of display 602. In some embodiments, notification 614 is a banner notification displayed near the top of display 612 directly in response to receiving the data indicating that the live communication session is available.

Figure 6D:
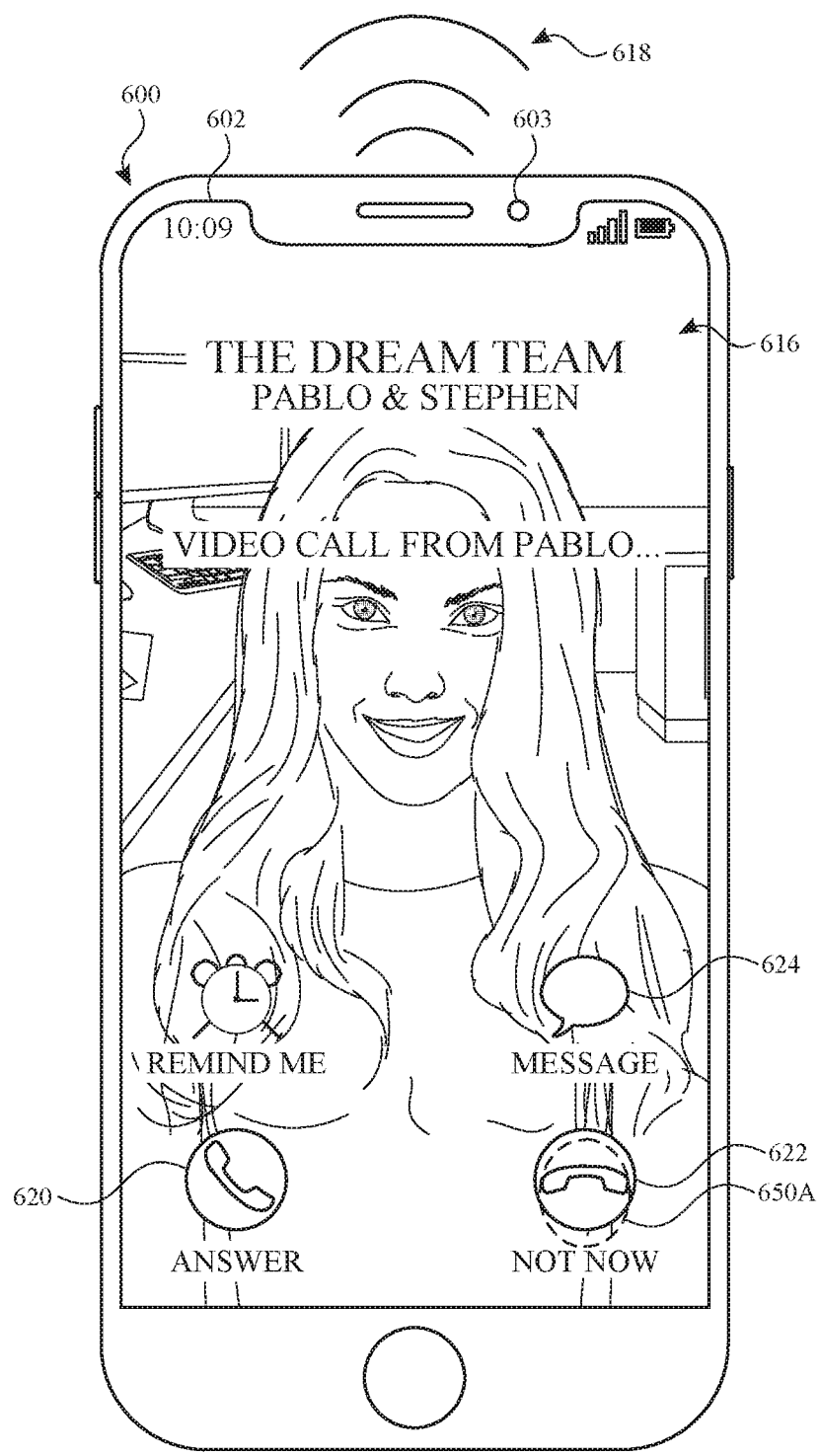

In some embodiments, device 600 receives reminder data indicating a reminder to join the live communication session (e.g., a reminder sent by a participant in the conversation or after a predetermined period of time). As illustrated in FIG. 6D, in response to receiving data indicating a reminder to join the live communication session, device 600 displays full screen notification 616 and outputs audio output 618. In some embodiments, audio output 618 is different than an audio output associated with a messaging application (e.g., a notification of a received message) and an audio output associated with a phone application (e.g., a ring for an incoming call). In some embodiments, audio output 618 is a hybrid of audio associated with a message notification and audio associated with an incoming call notification. In some embodiments, audio output 618 is shorter than an audio output associated with a phone application (e.g., a ring for an incoming call) and is longer than an audio output associated with a messaging application (e.g., a notification of a received message). In some embodiments, the ring for an incoming call includes multiple repetitions of a respective audio output and audio output 618 is a single repetition of the respective audio output. In some embodiments, audio output 618 shares audio characteristics (e.g., common tones, notes, cadence) with both the audio outputs for the phone call and message notifications. In some embodiments, device 600 outputs a haptic output. As illustrated in FIG. 6D, full screen notification 616 includes the name of the group ("THE DREAM TEAM"), names of participants currently active in the live communication session ("PABLO & STEPHEN"), and the name of the participant who originally initiated the live communication session or who initiated the reminder ("PABLO"). In some embodiments, full screen notification 616 includes names of participants that have been invited to join the live communication session (e.g., according to the order in which they were added to the group). Full screen notification 616 also includes answer affordance 620 for joining the live communication session (e.g., to immediately join the live communication session or display a menu with options for joining the live communication session), "Not Now" affordance 622 for dismissing full screen notification 616, and message affordance 624 for returning to messaging user interface 604 or sending a message to the Dream Team group. Full screen notification also includes an image (e.g., video of a user of device 600 from camera 603) (e.g., as a preview of the image of the user that would be seen by other participants in the live communication session, once joined).

Figure 6E:
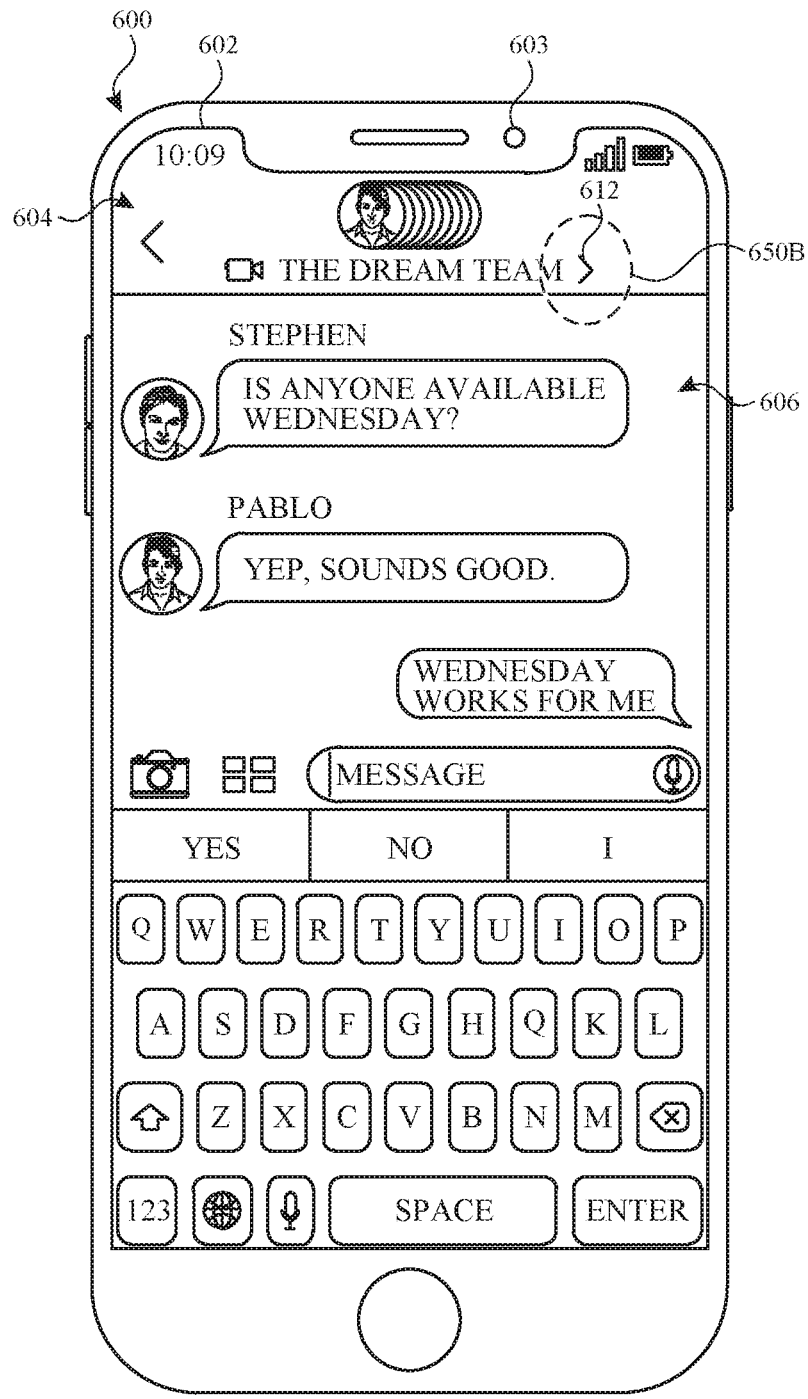

As illustrated in FIG. 6D, device 600 receives (e.g., detects) user input 650A (e.g., a tap) corresponding to selection of "Not Now" affordance 622. As illustrated in FIG. 6E, in response to user input 650A, device 600 ceases to display full screen notification 616 and returns to messaging user interface 604.

As illustrated in FIG. 6E, device 600 receives (e.g., detects) user input 650B (e.g., a tap) corresponding to selection of options affordance 612. In response to receiving user input 650B, device 600 expands the header of messaging user interface 604 to include audio affordance 626A, video join affordance 626B, and group details affordance 626C.

Figure 6F:
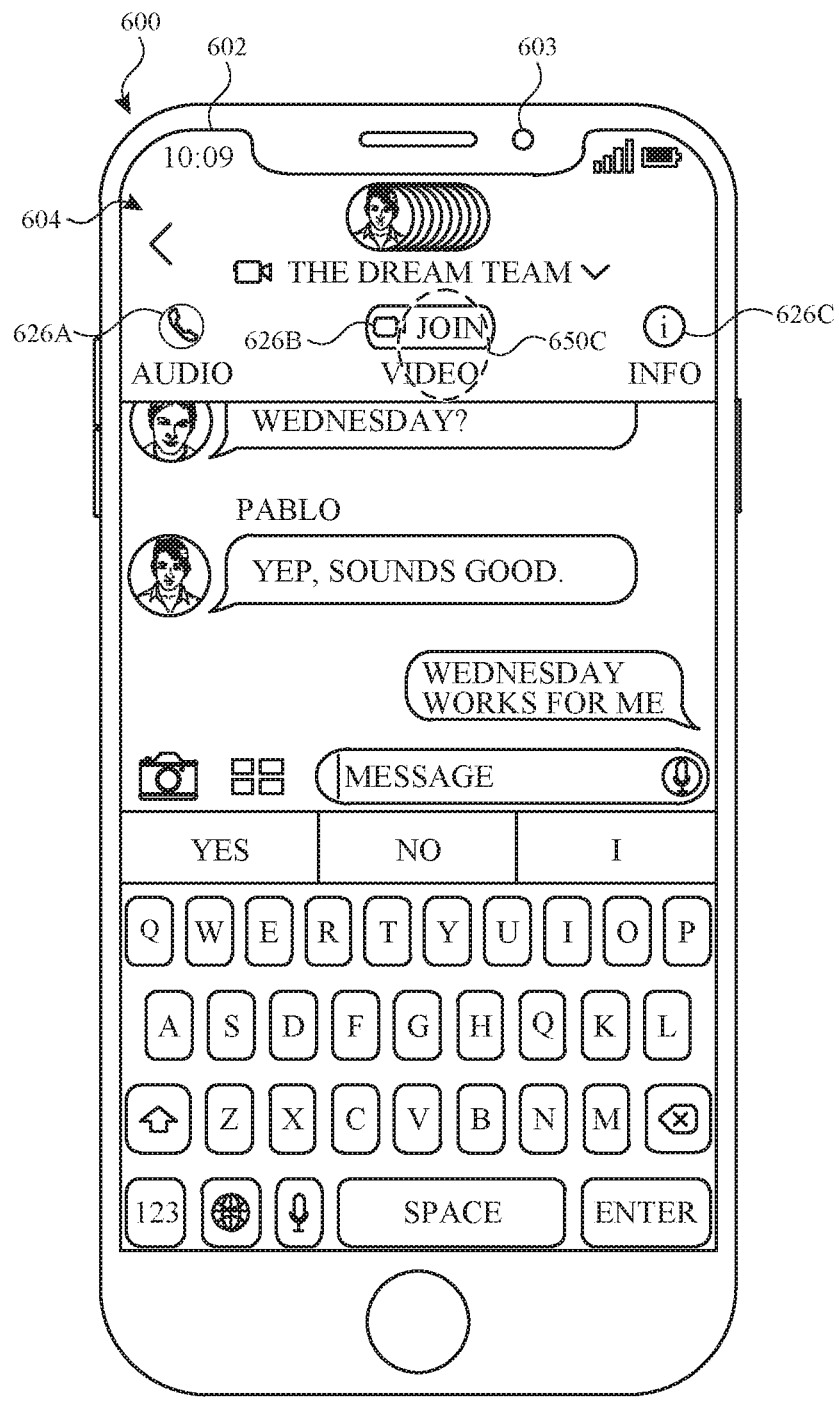

As illustrated in FIG. 6F, device 600 receives (e.g., detects) user input 650C (e.g., a tap) corresponding to selection of video join affordance 626B. In some embodiments, device 600 joins the live communication session directly in response to receiving user input 650B (e.g., without requiring additional inputs). In some embodiments, device 600 joins the live communication session and transmits both video and audio. In some embodiments, device 600 joins the live communication session and transmits only audio (e.g., without transmitting video). In some embodiments, in response to selection of audio affordance 626A, device 600 joins the live communication session with audio only or initiates a separate phone conference call with the participants of the group.

Figure 6G:
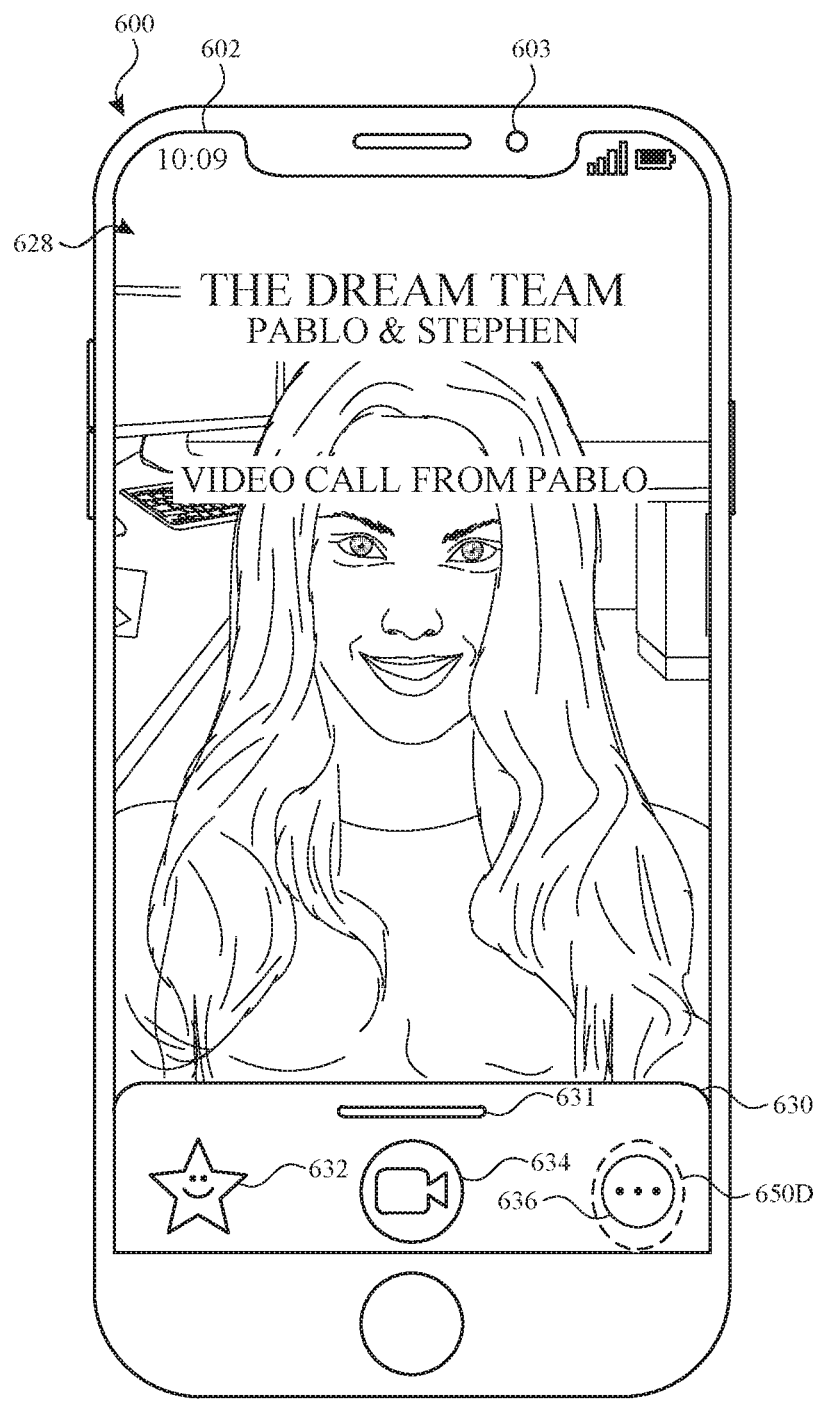

As illustrated in FIG. 6G, in response to receiving user input 650C, device 600 displays live communication interface 628 of a live communication application. Live communication interface 628 includes an indication of the group ("THE DREAM TEAM"), an image (e.g., video of a user of device 600 from a camera on the front of device 600 (e.g., camera 603)), an indication of the participants that are currently active in the live communication session ("PABLO & STEPHEN"), an indication of the participant that initiated the live communication session ("VIDEO CALL FROM PABLO"), and call control menu 630. Call control menu 630 includes handle affordance 631 effects affordance 632, call affordance 634, and menu affordance 636, and.

Figure 6H:
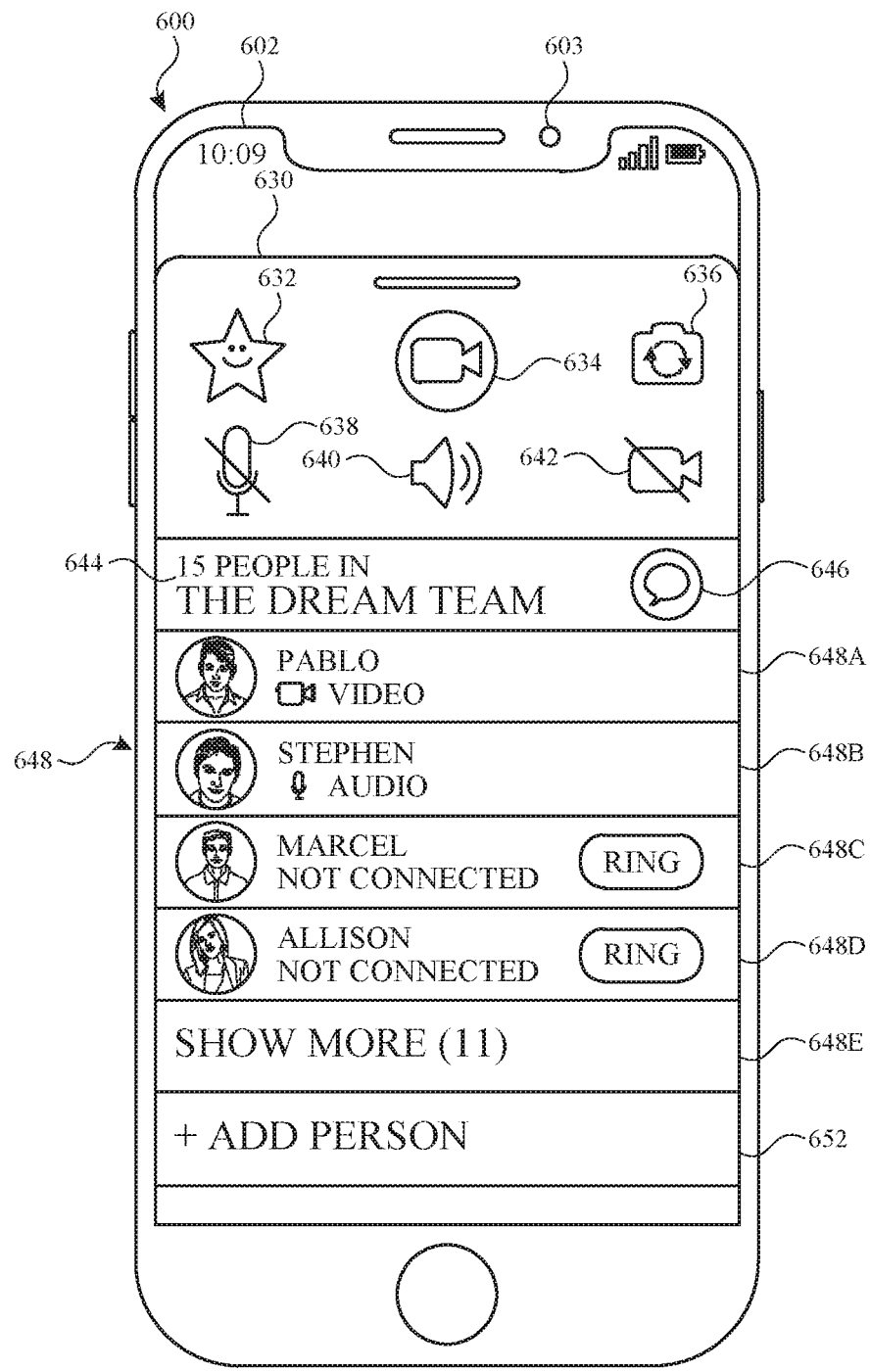

As illustrated in FIG. 6G, device 600 receives (e.g., detects) user input 650D on menu affordance 636. As illustrated in FIG. 6H, in response to user input 650D, device 600 expands call control menu 630 to display additional information and controls related to the live communication session. In some embodiments, device 600 expands call control menu 630 in response to an upward swipe starting near handle affordance 631. When expanded, call control menu 630 further includes audio ON/OFF affordance 638, audio source menu affordance 640, video ON/OFF affordance 642, group name 644 (with an indication of the number of participants in the group), group message affordance 646, list 648 including affordances 648A-648E corresponding to participants of the group, and add participant affordance 652. In some embodiments, in response to receiving selection of group message affordance 646, device 600 launches and/or displays messaging user interface 604 (e.g., FIG. 6F) for sending a message to the participants of the group.

As illustrated in FIG. 6H, the affordances of participants in list 648 include an indication of the communication status of the respective participant with respect to the live communication session. Representation 648A indicates that participant Pablo is connected to the live communication session and is providing video data (e.g., a live media stream including video and audio data). Representation 648B indicates that participant Stephen is connected and providing audio data (e.g., no video). Representations 648C and 648D indicate that participants Marcel and Allison, respectively, are not connected to the live communication session (e.g., not providing video and audio data). Participants that are not connected have either never joined the live communication session or have previously joined and then left the live communication session. Exemplary participant communication status types include audio-only (e.g., participant is communication using audio only); video (e.g., participant is talking using video and audio); video paused (e.g., participant's video is paused); video not decoded (e.g., participants video stream cannot be processed because of latency issues, issues with the format of the video stream, etc.); left (e.g., participant has left the live communication session); and waiting to join (e.g., participant was invited to the live communication session but has not joined the live communication session yet).

In some embodiments, participants of the live video communication include participants of the group that are currently connected to the communication session and participants of the group that are not currently connected to the live video communication session. That is, all participants of the group are referred to as participants of the live communication session, regardless of connection status. When a live communication session is active, participants can join (connect to) or leave (disconnect from) the live communication session.

Figure 6I:
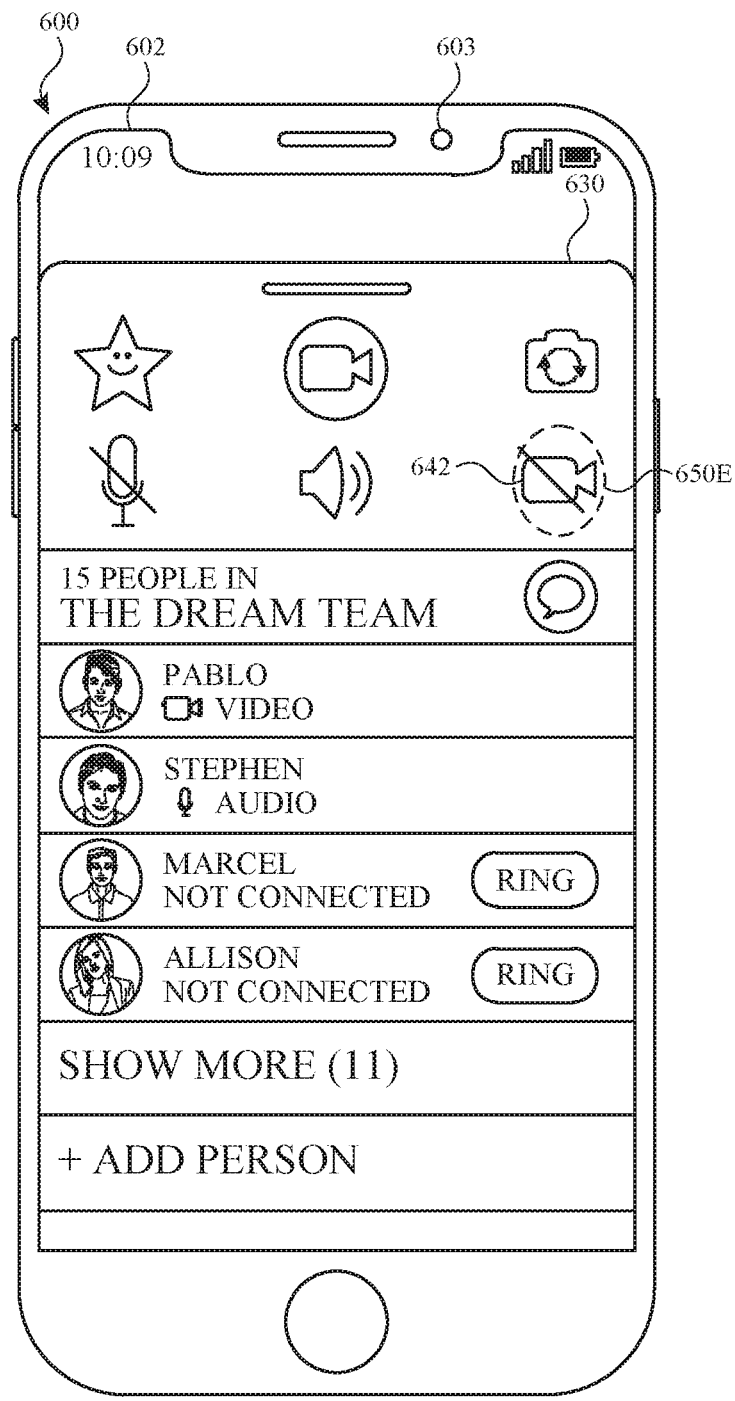
Figure 6J:
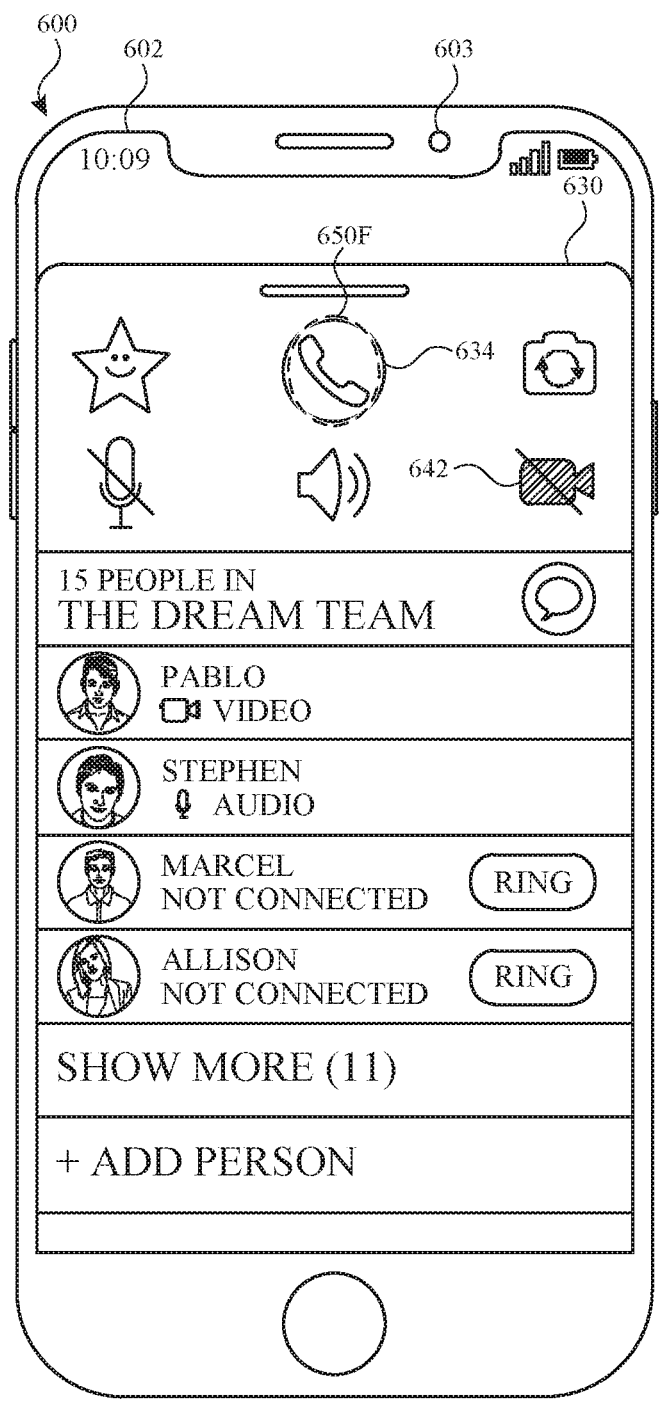

As illustrated in FIG. 6I, device 600 receives (e.g., detects) user input 650E (e.g., a tap) corresponding to selection of video ON/OFF affordance 642. As illustrated in FIG. 6J, in response to receiving user input 650E, device 600 modifies video ON/OFF affordance 642 to indicate a video OFF state and modifies call affordance 634 to indicate an audio only state by changing the representation of a video camera in FIG. 6I to a representation of a phone in FIG. 6J. In an audio only state, device 600 joins the live communication session with audio only (e.g., device 600 does not provide video data).

Figure 6K:
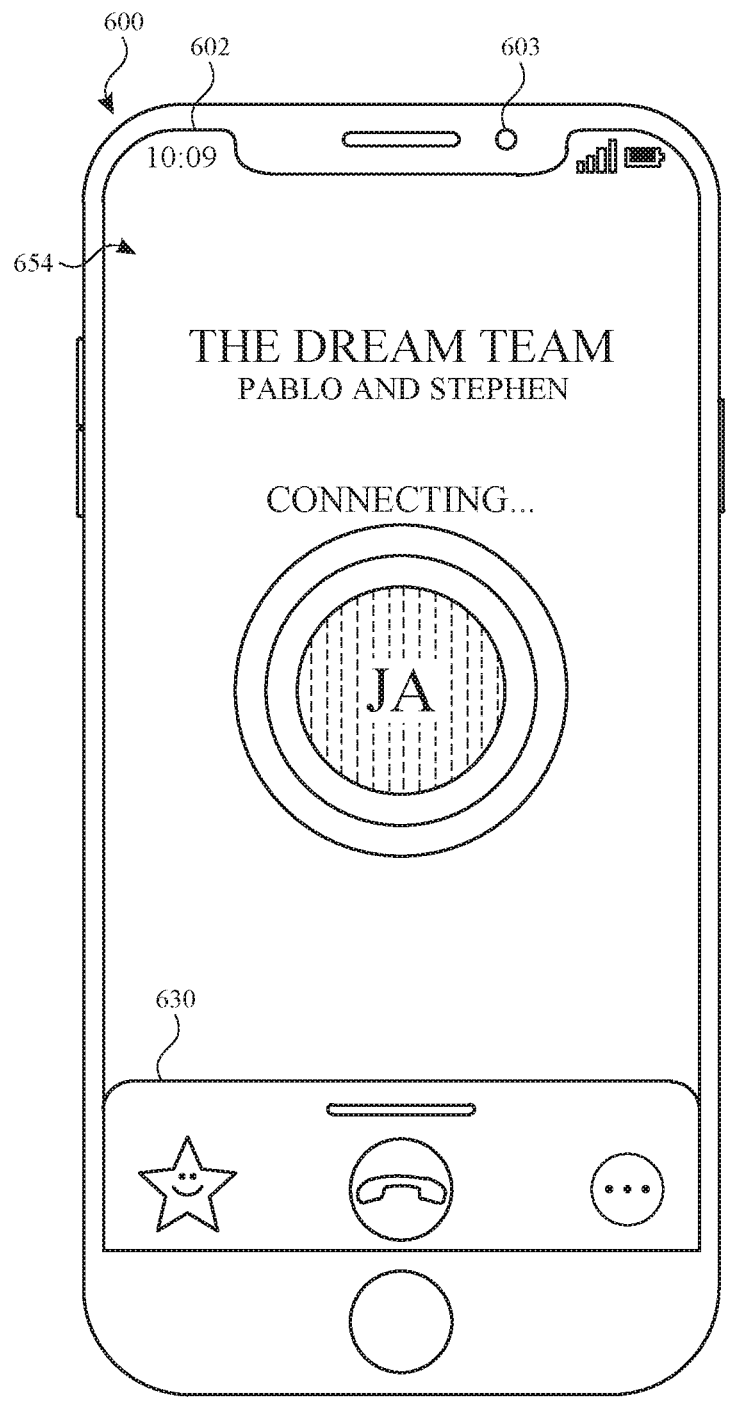

As illustrated in FIG. 6J, device 600 receives (e.g., detects) user input 650F (e.g., a tap) corresponding to selection of call affordance 634. As illustrated in FIG. 6K, in response to receiving user input 650F, device 600 initiates a connection to join the live communication session in an audio only mode. As illustrated in FIG. 6K, device 600 ceases displaying expanded call control menu 630 (e.g., device 600 reduces call control menu 630) and displays a connecting screen 654. In some embodiments, device 600 initiates a connection to join the live communication session and displays a connecting screen 654 in response to user input 650C on video join affordance 626B. In some embodiments, notification 614 includes an affordance (e.g., the "JOIN" icon on notification 614 or entire notification 614 itself is selectable). In some embodiments, device 600 initiates a connection to join the live communication session and displays a connecting screen 654 in response to selection of notification 614.

Figure 6L:
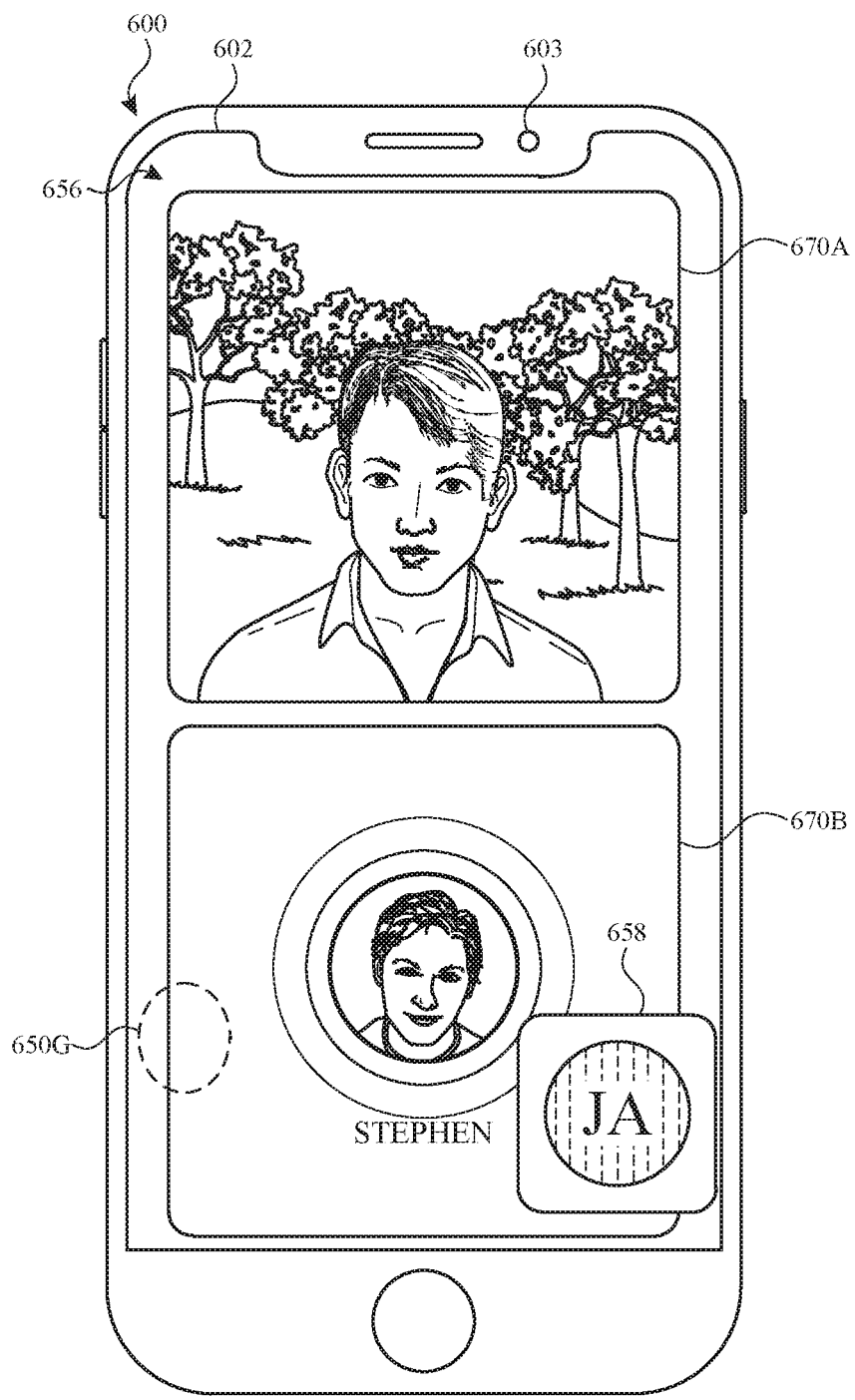

As illustrated in FIG. 6L, after device 600 has joined the live communication session, device 600 displays live communication user interface 656 including a representation 658 of the user of device 600, a representation 670A of participant Pablo (e.g., the participant that initiated the live communication session) and representation 670B of participant Stephen. In accordance with the communication status indicated in list 648, representation 670A of participant Pablo includes a live video stream. Since participant Stephen is providing only audio data, representation 670B of participant Pablo includes an avatar. In some embodiments, the layout of the representations on live communication user interface 656 is based on the number of participants currently connected to the live communication session (e.g., two participants and the user of device 600). The layout illustrated in FIG. 6L is referred to as a 2-on-1 layout, with a first position corresponding to the position of representation 670A and a second position corresponding to the position of representation 670B.

In some embodiments, when device 600 joins the live communication session, device 600 determines whether the number of participants (e.g., either active or total (active and invited)) exceeds a predetermined threshold number. In accordance with a determination that the number of participants exceeds the threshold, device 600 displays an overflow region with overflow representations (e.g., thumbnails) as described in greater detail below. Alternatively, in accordance with a determination that the number of participants does not exceed the threshold, device 600 does not display an overflow region with overflow representations.

When device 600 has joined a live communication session, device 600 transmits a live media stream to the other participants (e.g., the participants that have joined the live communication session). When a participant associated with another device has joined the live communication session and device 600 has also joined, device 600 receives a live media stream corresponding to that participant.

Figure 6M:
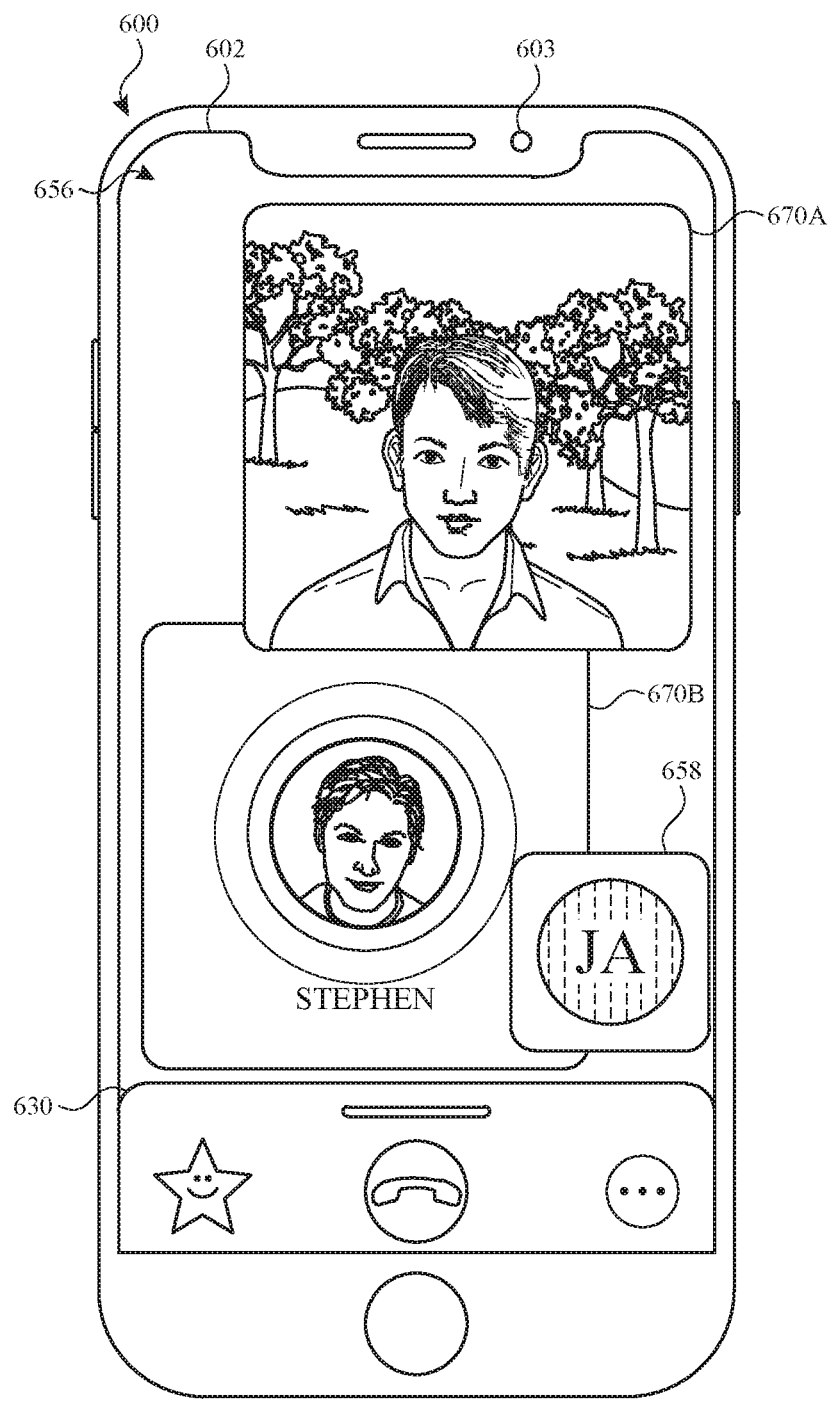

As illustrated in FIG. 6L, while displaying live communication user interface 656, device 600 receives (e.g., detects) user input 650G (e.g., a tap) on display 602. As illustrated in FIG. 6M, in response to receiving user input 650G, device 600 displays call control menu 630. Representations 670A and 670B are reduced in size and representations 670B and 658 are moved upward on display 602 such that call control menu 630 does not overlap with the representations. In contrast to the configuration illustrated in FIG. 6L where representations 670A and 670B are vertically aligned and do not overlap, when call control menu 630 is displayed in FIG. 6M, representations 670A and 670B are offset from each other and overlap.

Figure 6N:
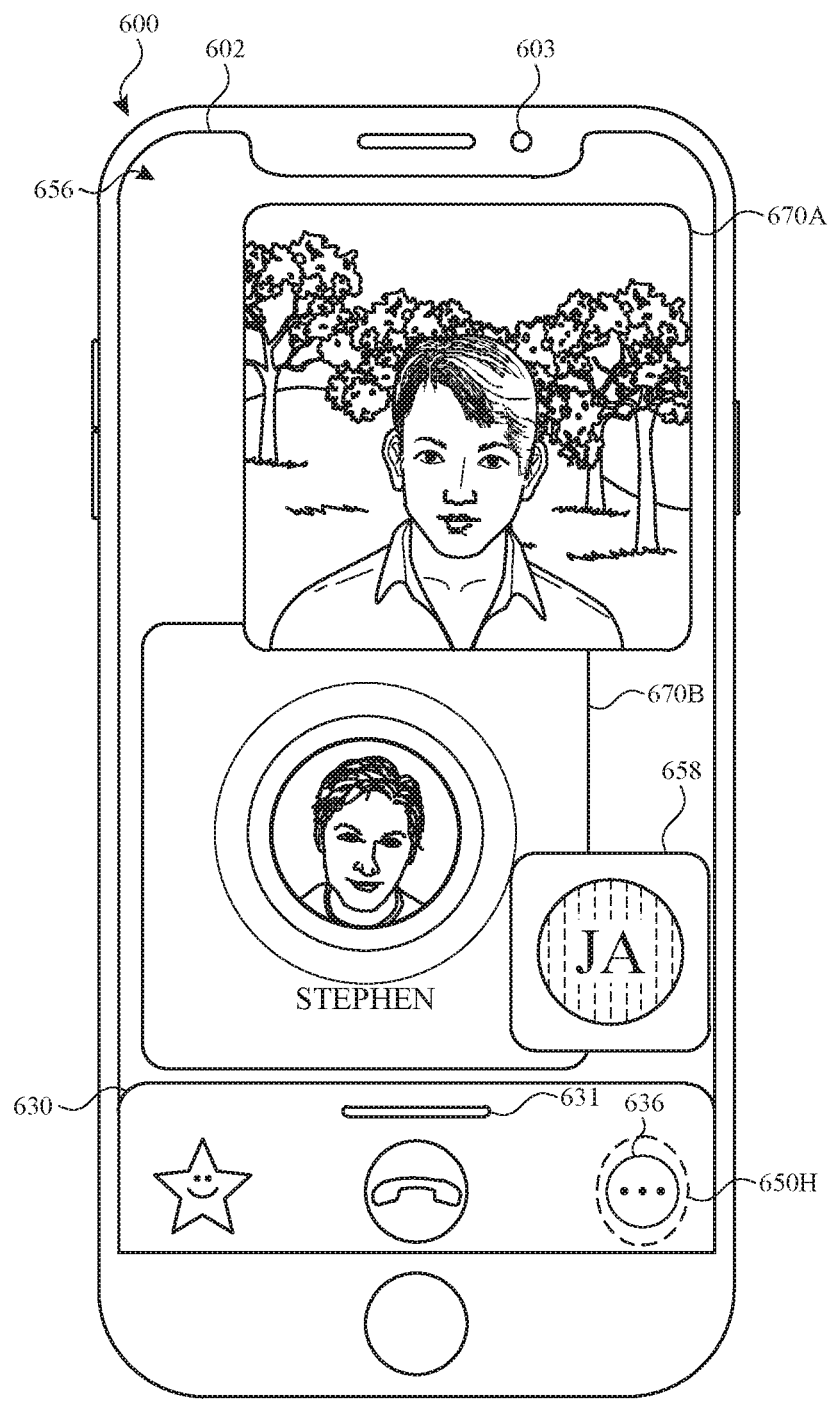
Figure 6O:
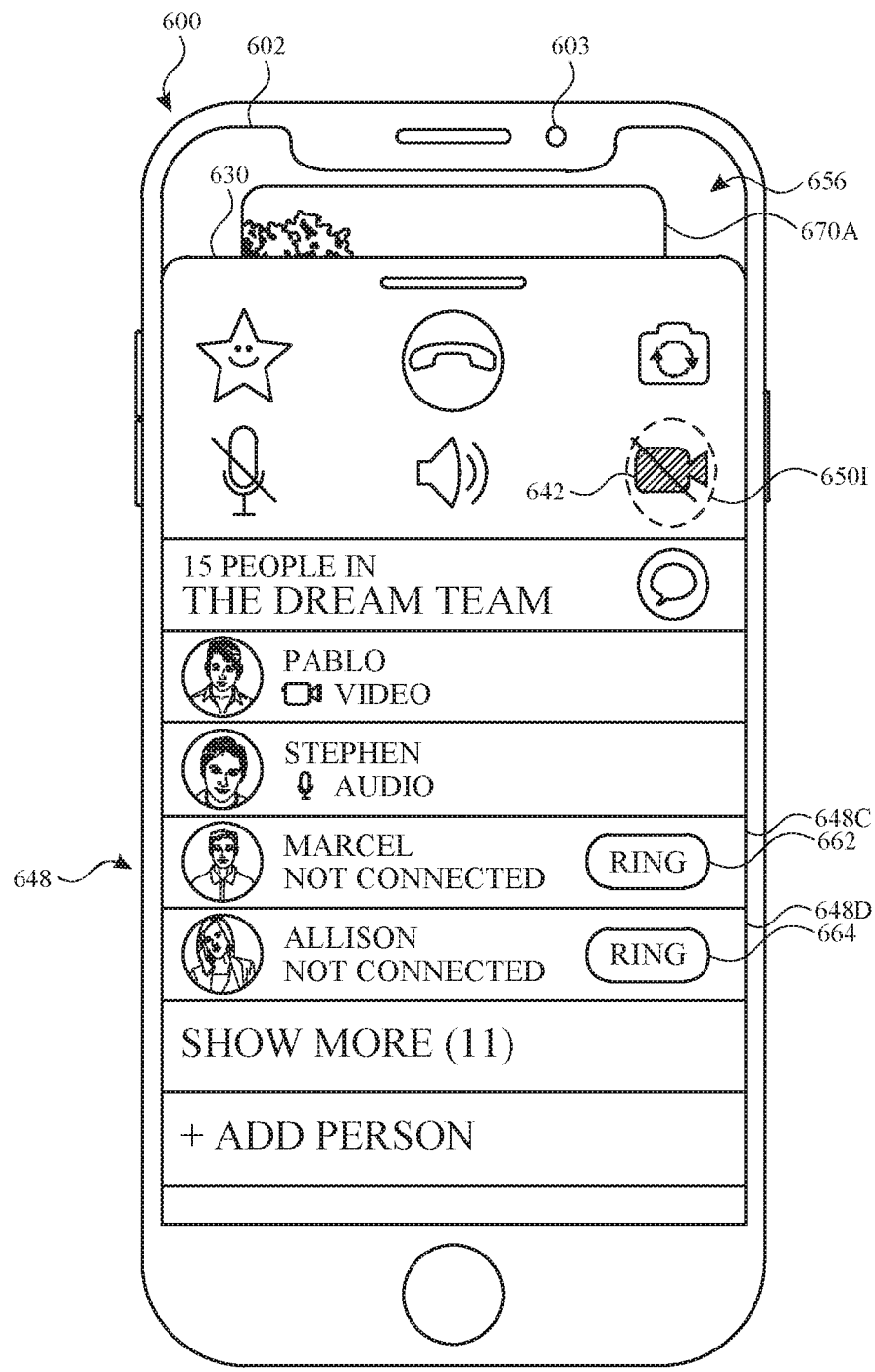

As illustrated in FIG. 6N, device 600 receives (e.g., detects) user input 650H (e.g., a tap) on menu affordance 636 in call control menu 630. As illustrated in FIG. 6O, in response to receiving user input 650H, device 600 expands call control menu 630 (e.g., as discussed with respect to FIG. 6H). In some embodiments, device 600 displays reminder affordances in call control menu 630 at representations of participants who are not connected to the live communication session. As illustrated in FIG. 6O, list 648 indicates that participants Marcel and Allison are not connected to the live communication session. Since participants Marcel and Allison (e.g., devices associated with participants Marcel and Allison) are not connected to the live communication session, expanded call control menu 630 includes ring affordances 662 and 664 at representations 648C and 648D of participants Marcel and Allison, respectively, in list 648. In response to selection of ring affordance 662 or 664, device 600 causes a notification (e.g., audio output, such as a call or a ring) to be provided at a device associated with the participant corresponding to the selected ring affordance. In some embodiments, the notification is a new notification that is different than a previous notification sent to the participant. In some embodiments, the new notification is more intrusive than the previous notification (e.g., an audio ring, haptic output, or full screen notification, as compared to a banner notification without audio or haptic output). In this way, a user can remind a participant who has not joined the live communication session that the live communication session is active and available for the participant to join (e.g., similar to the way in which the user of device 600 is reminded by the full screen notification illustrated in FIG. 6D).

Figure 6P:
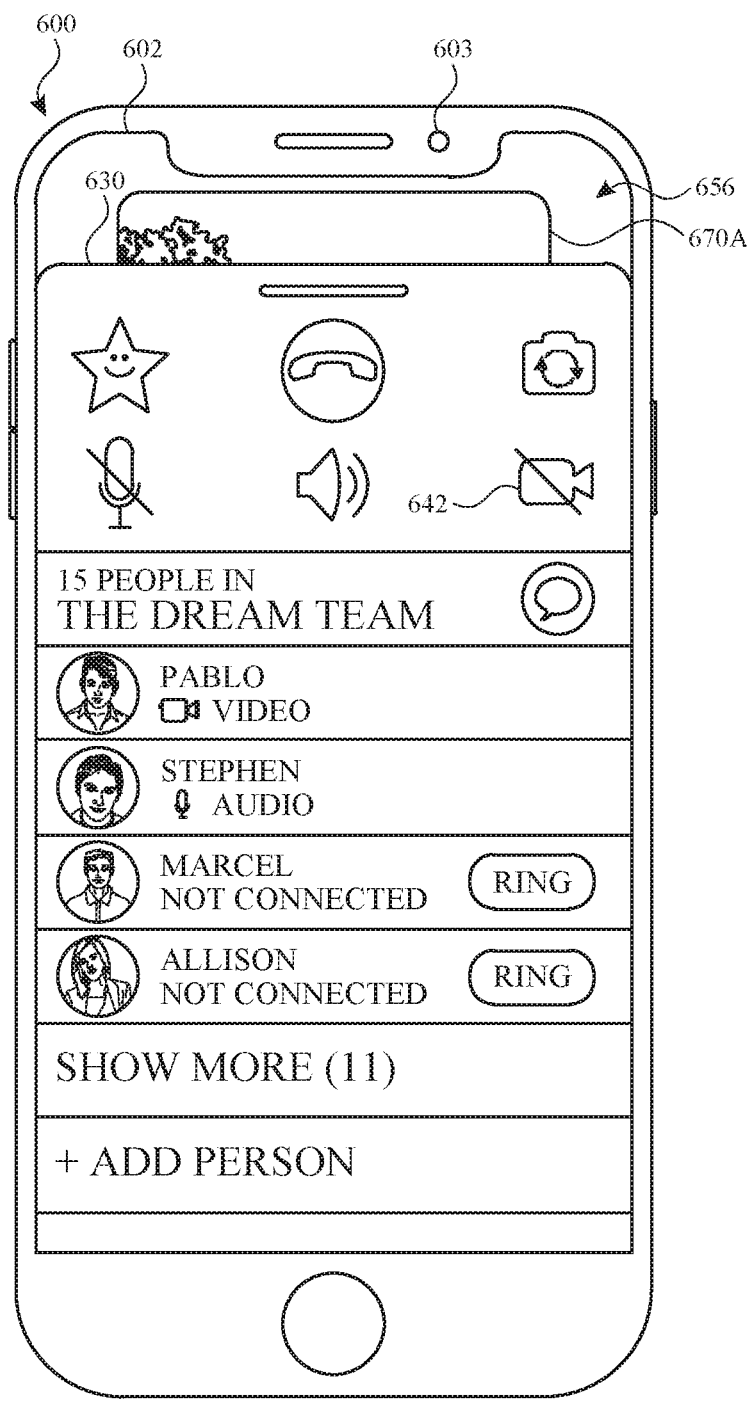
Figure 6Q:
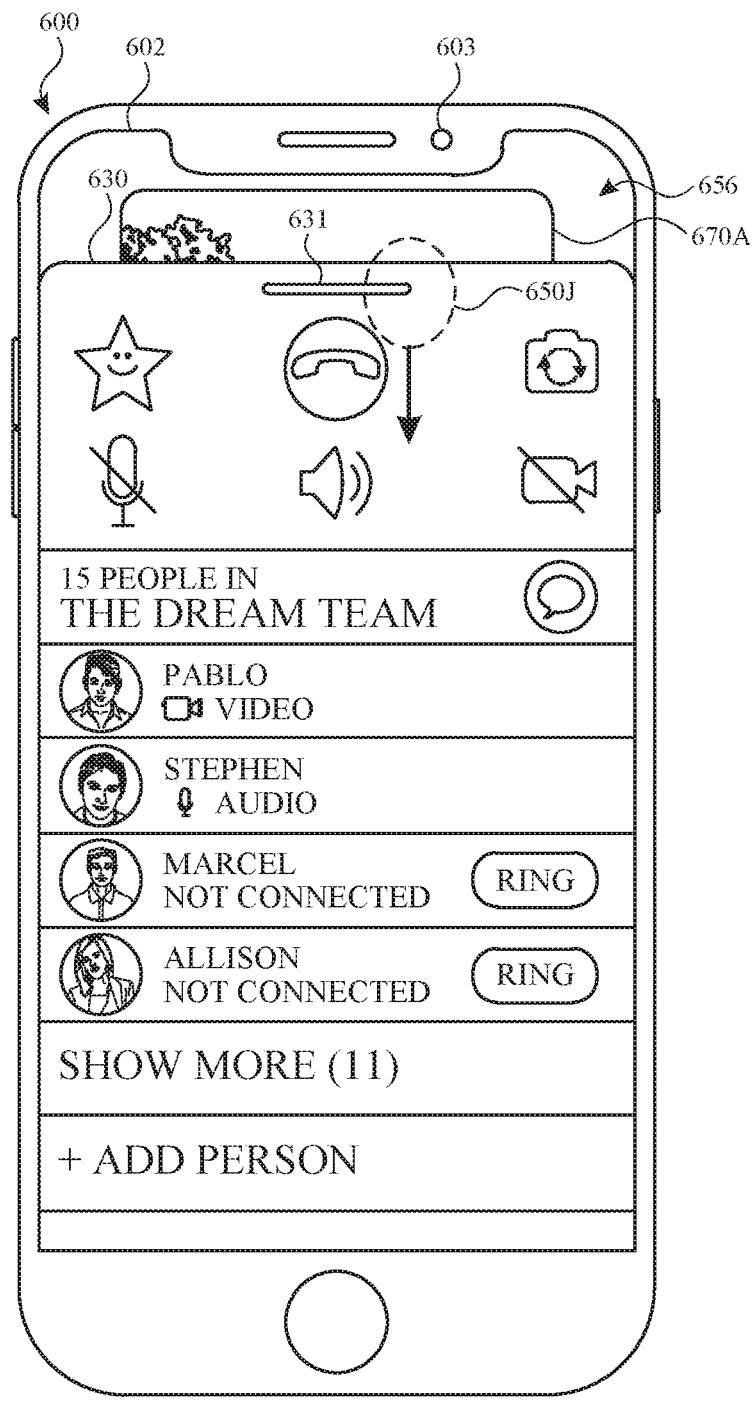
Figure 6R:
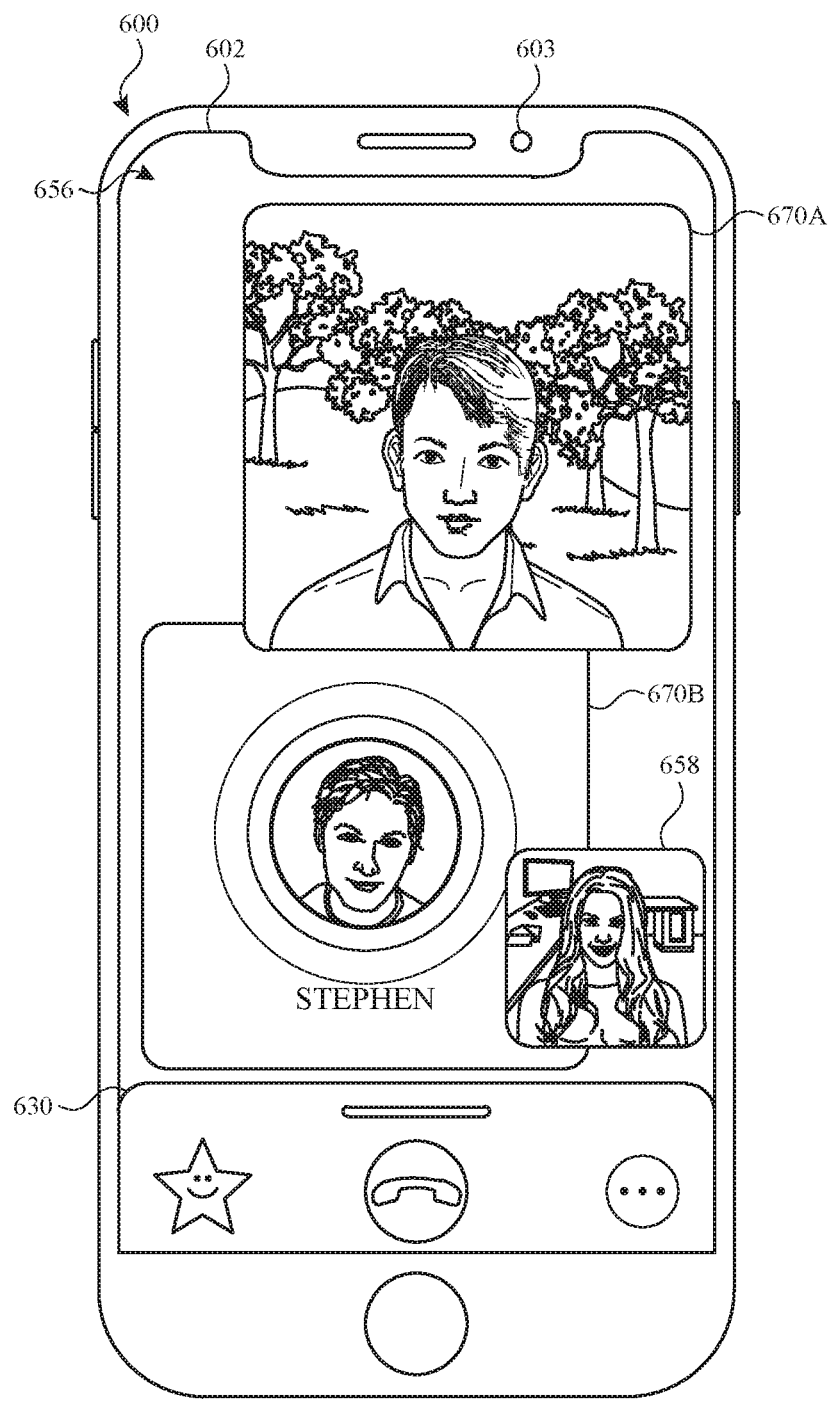

As illustrated in FIG. 6O, device 600 receives (e.g., detects) user input 650I (e.g., a tap) corresponding to selection of video ON/OFF affordance 642. In response to receiving user input 650I, device 600 provides a live video stream (e.g., from a camera on device 600) to the live communication session and modifies video ON/OFF affordance 642 to indicate that video is ON, as illustrated in FIG. 6P. In FIG. 6Q, device 600 receives (e.g., detects) user input 650J (e.g., a down swipe) on display 602 to reduce call control menu 630. As illustrated in FIG. 6R, when call control menu 630 is reduced, representation 658 corresponding to the user of device 600 includes video from camera 603 of device 600.

Figure 6S:
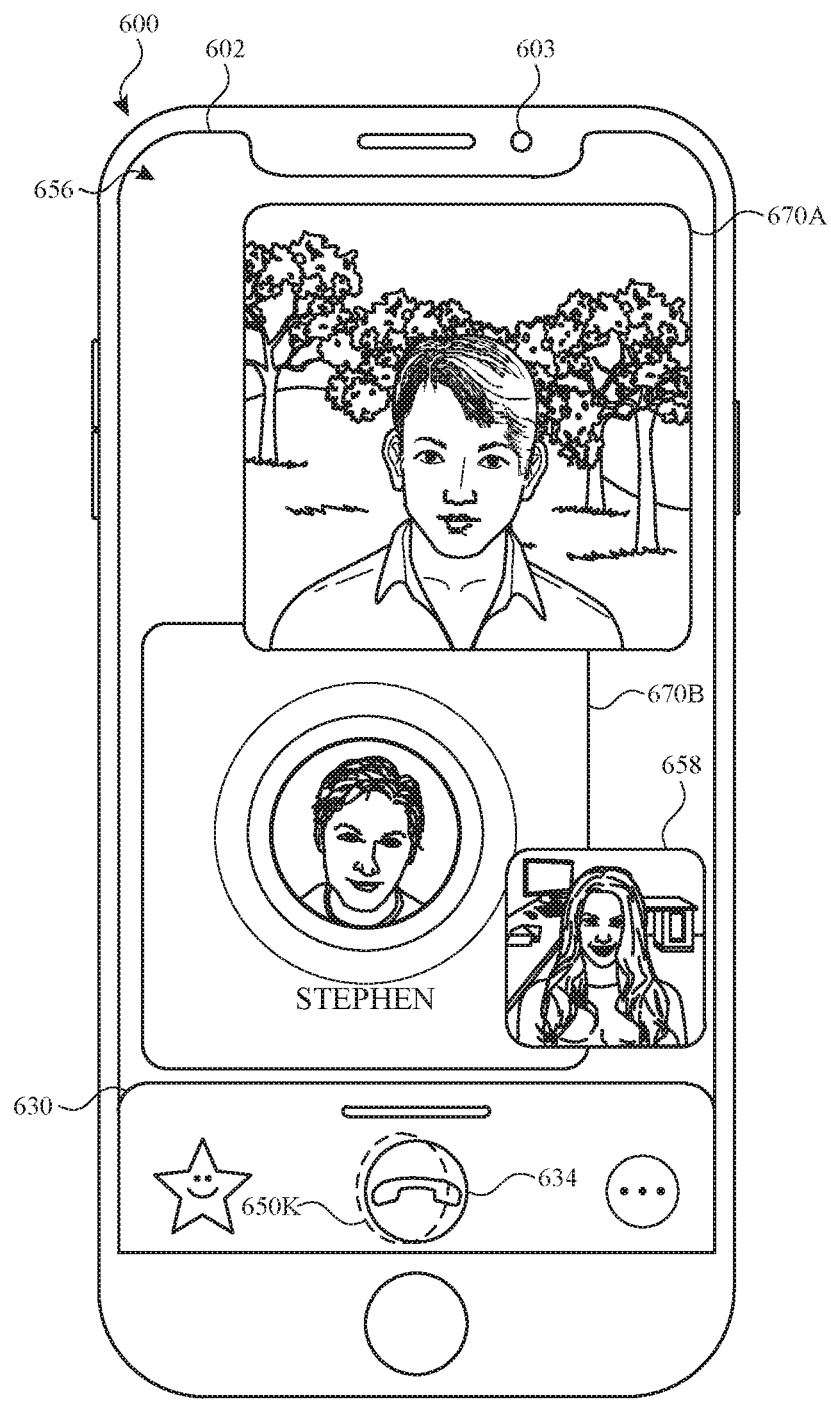
Figure 6T:
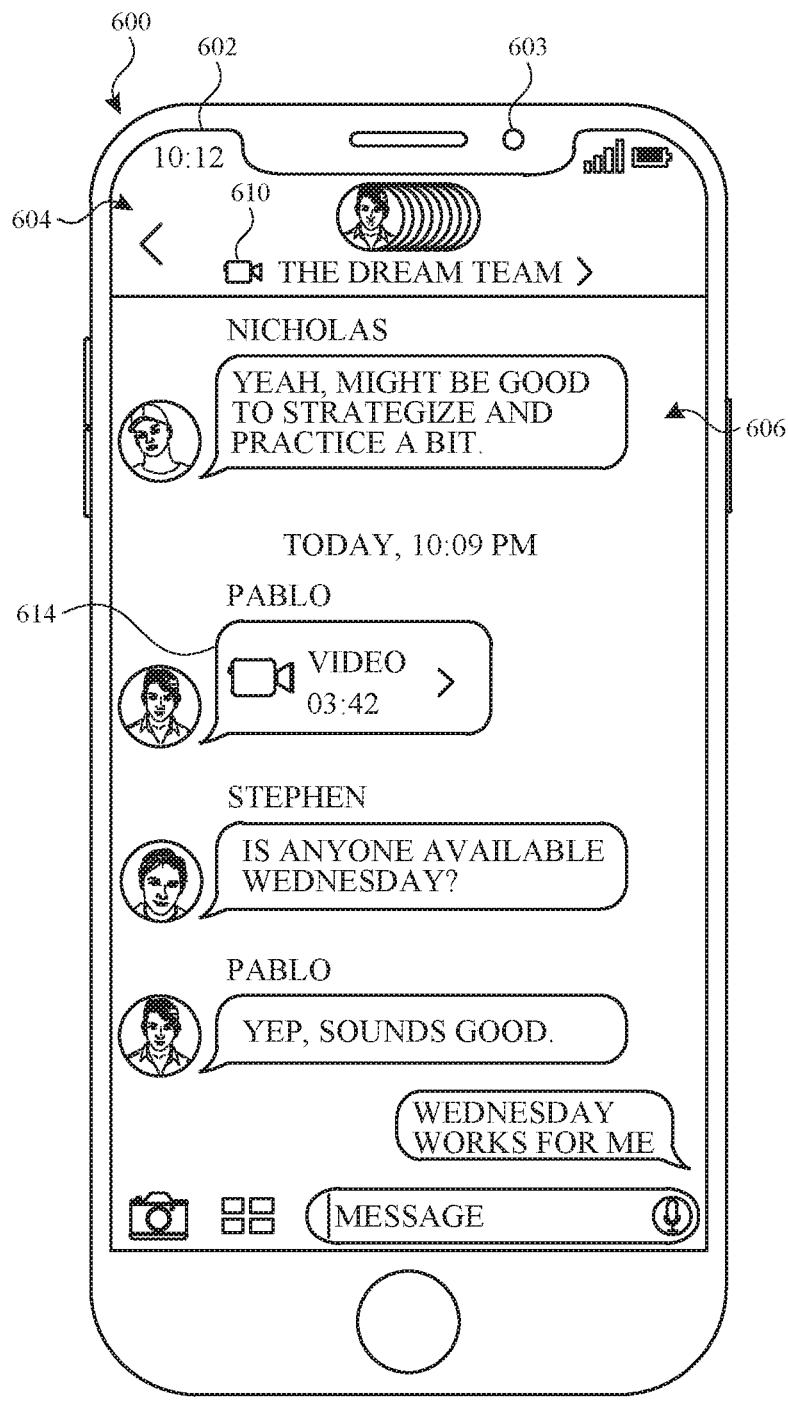

As illustrated in FIG. 6S, device 600 receives (e.g., detects) user input 650K (e.g., a tap) corresponding to selection of call affordance 634. In response to user input 650K, device 600 disconnects from the live communication session. FIG. 6T illustrates an embodiment of messaging user interface 604 of the messaging application displayed after device 600 has disconnected from the live communication session. Although device 600 has disconnected from the live communication session, the live communication session remains active. In some embodiments, a live communication session remains active as long as at least one of the participants is connected, even if the participant that initiated the live video communication session leaves the session. As illustrated in FIG. 6T, device 600 maintains display of notification 614 and live communication affordance 610, indicating that the live communication session is active. Notification 614 is updated to indicate the duration of the live communication session (e.g., three minutes and forty-two seconds, corresponding to the amount of time since the live communication session was initiated).

Figure 6U:
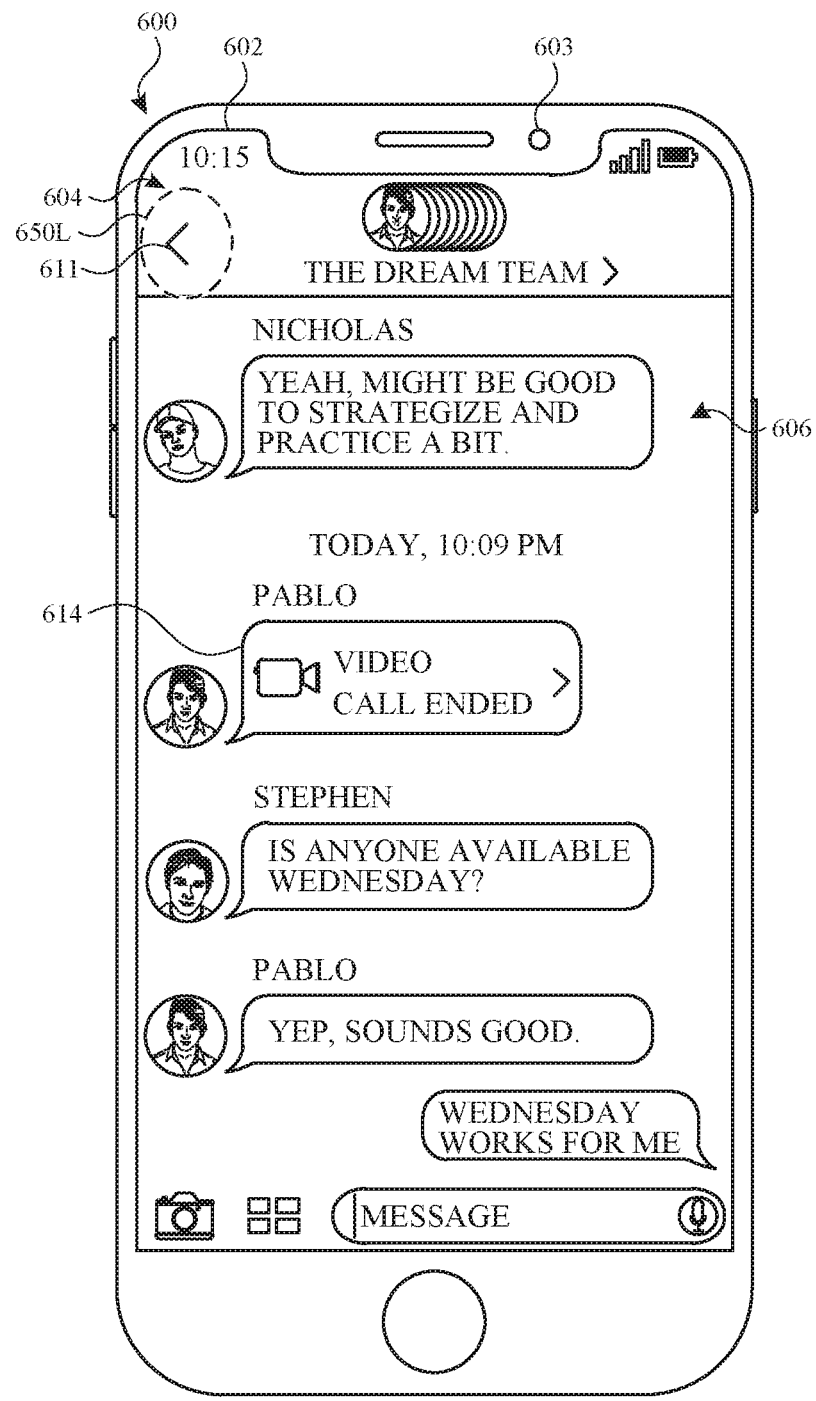

While displaying notification 614 indicating that the live communication session is active, device 600 receives data indicating that the live communication session is no longer active (e.g., has ended). In some embodiments, the live communication session ends when no participant is connected to the live communication session (e.g., all participants that had either initiated or joined the live communication session are no longer connected). In response to receiving the data indicating that the live communication session is no longer active, device 600 ceases displaying notification 614 and/or updates notification 614 to indicate that the live communication session is no longer active. FIG. 6U illustrates an embodiment of messaging user interface 604 of the messaging application displayed after the live communication session has ended (e.g., in response to receiving the data indicating that the live communication session is no longer active). As illustrated in FIG. 6U, notification 614 is updated to include an indication (e.g., text "CALL ENDED") that the live communication session is no longer active and live communication affordance 610 is removed. In some embodiments, live communication affordance 610 and/or notification 614 is greyed out to indicate that the live communication session is no longer active. In some embodiments, notification 614 is no longer selectable after the live communication session has ended. In some embodiments, after the live communication session has ended, notification 614 remains selectable and can be selected to initiate a new live communication session with the group. In some embodiments, if device 600 had not joined the live communication session, device 600 updates notification 614 to indicate that the user missed the live communication session (e.g., "MISSED CALL").

Figure 6V:
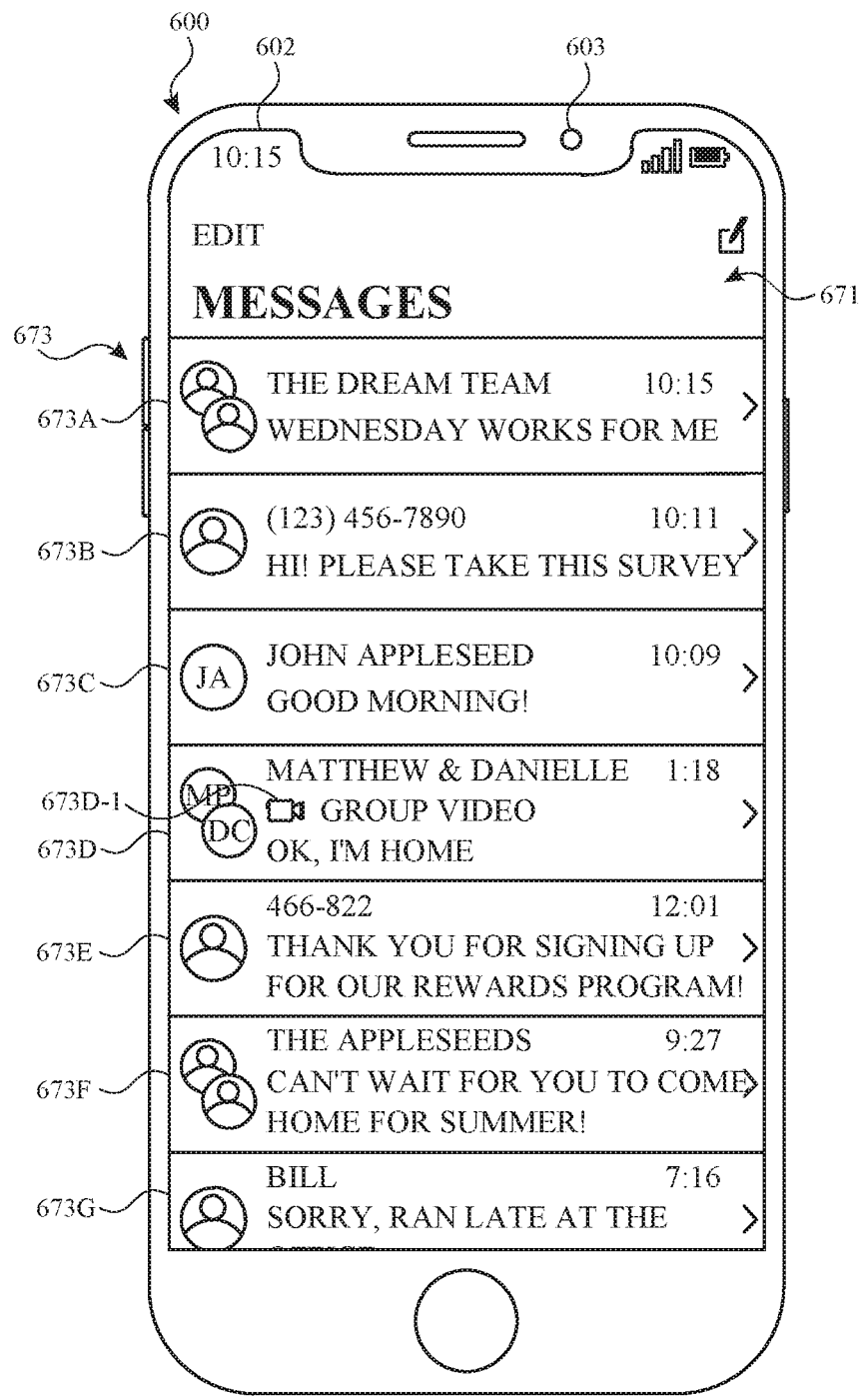

As illustrated in FIG. 6U, device 600 receives (e.g., detects) user input 650L (e.g., a tap) corresponding to selection of back affordance 611. As illustrated in FIG. 6V, in response to receiving user input 650L, device 600 displays user interface 671 of the messaging application, which includes list 673 of affordances 673A-673G for accessing respective message conversations. Affordance 673D corresponds to a message conversation between a group of three participants (Matthew, Danielle, and the user of device 600). Affordance 673D includes live communication indicator 675, which indicates that there is an active live communication session for this group. In contrast, since a live communication session for The Dream Team is not active, affordance 673A corresponding to The Dream Team does not include live communication indicator 675.

Figure 6W:
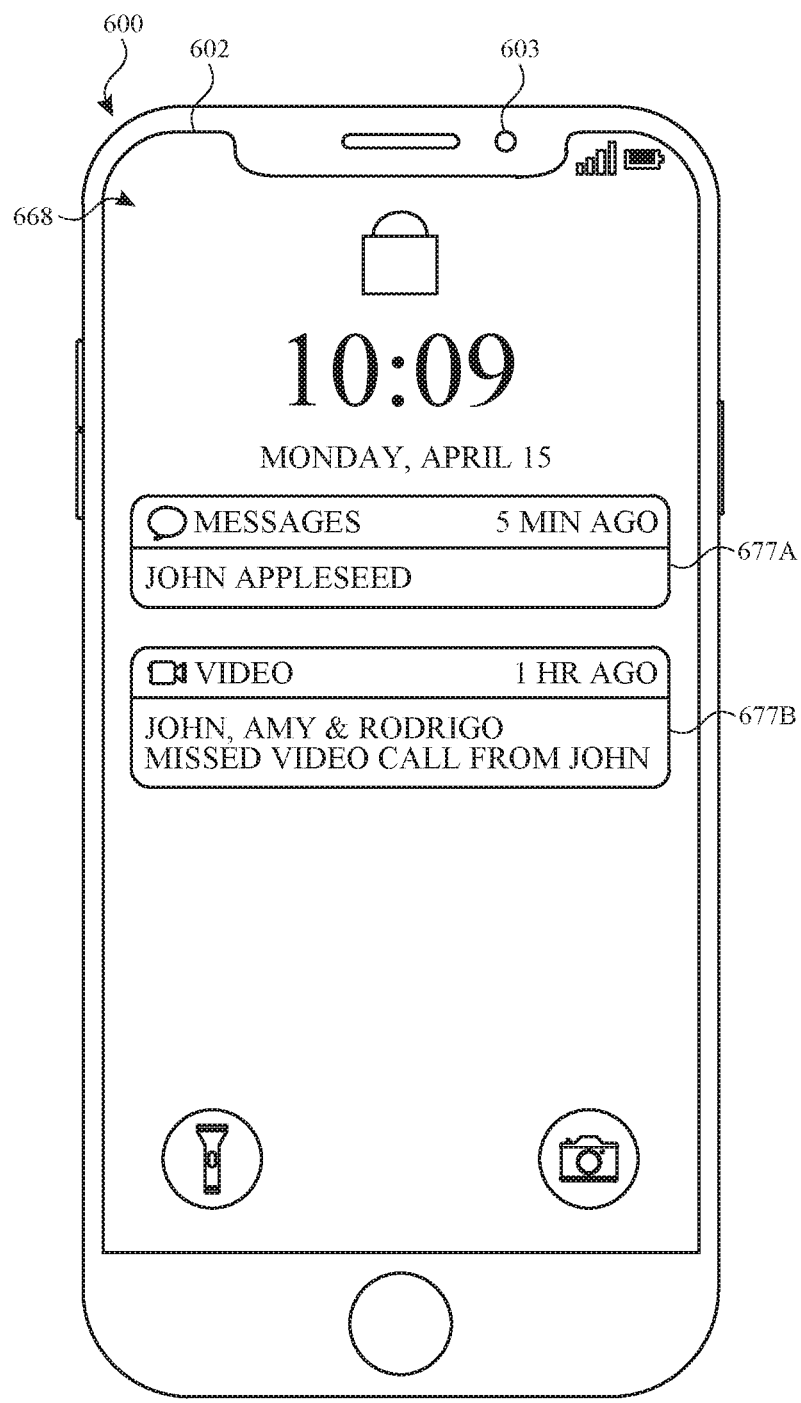

Turning now to FIG. 6W, device 600 is illustrated as displaying an interface other than messaging user interface 604. In FIG. 6W, device 600 displays lock screen 668 indicating that device 600 is in a locked state. Lock screen 668 includes notifications 677A and 677B. Notification 677A indicates that a message from a user John Appleseed was received five minutes ago. Notification 677B represents a live communication session that is no longer available to join (e.g., a missed video call). Missed video call notification includes indications of the invited participants (John, Amy, & Rodrigo), the status of the live communication session ("MISSED"), and a time when the live communication session was either initiated or ended ("1 HR AGO"). In the lock state, device 600 does not display an active application.

Figure 6X:
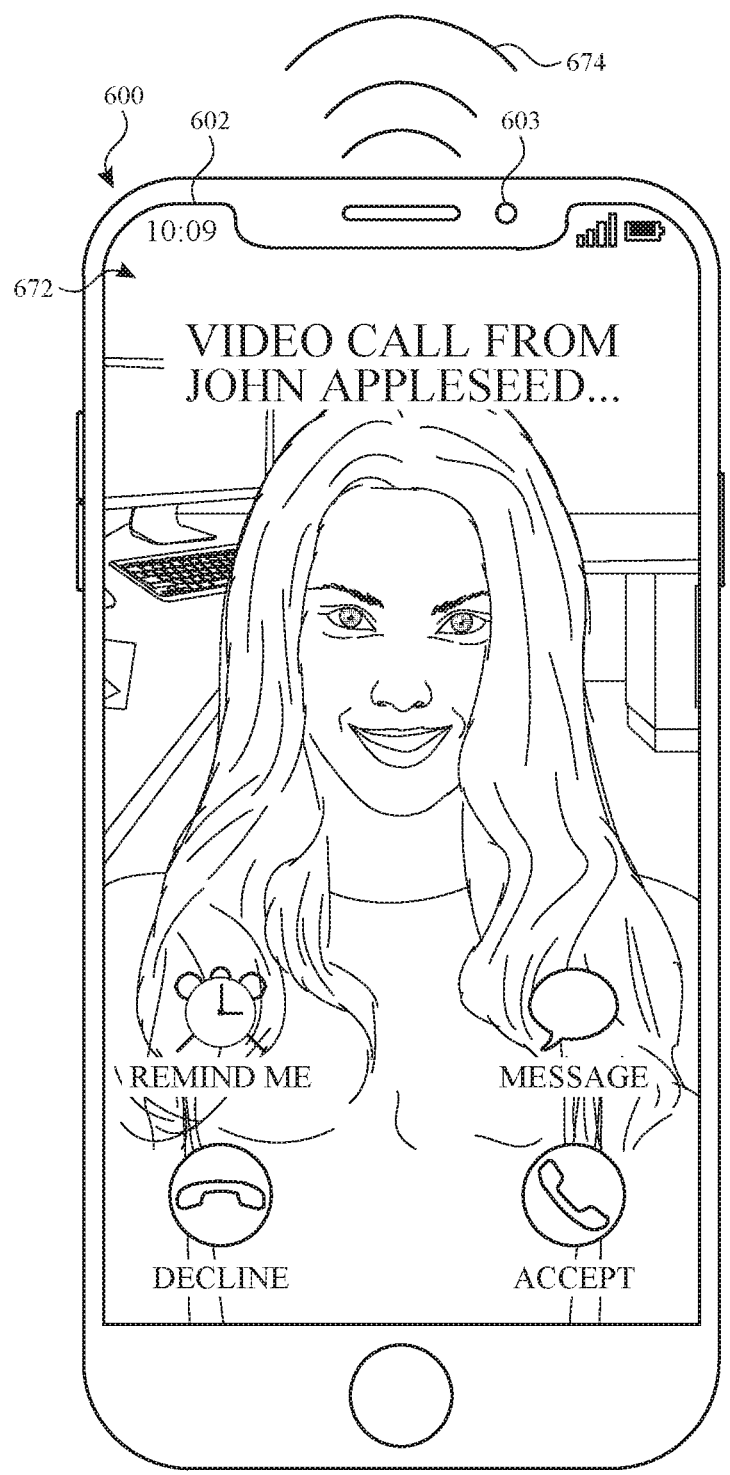
Figure 6Y:
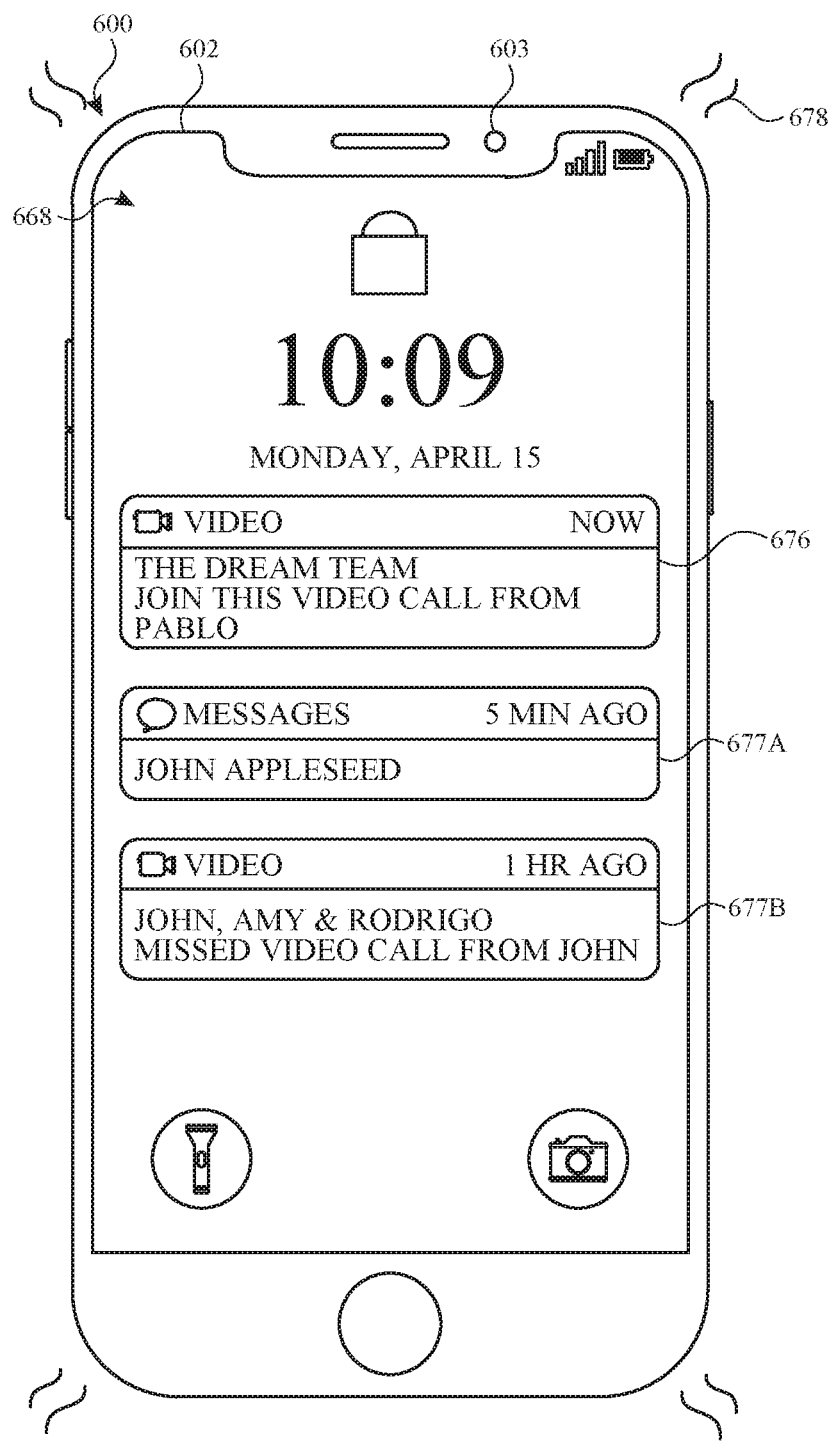

While in the locked state, device 600 receives data indicating that a live communication session is available to join. In some embodiments, the response of device 600 to receiving the data indicating that a live communication session is available to join depends on a context of device 600, the available live communication session, or other factor(s). In some embodiments, in accordance with the live communication session being available between two participants (e.g., a one-on-one communication session), device 600 displays a first type of notification. As illustrated in FIG. 6X, the first type of notification includes full screen notification 672 and audio output 674. In some embodiments, audio output 674 is different than an audio output associated with a phone call notification and an audio output associated with a message notification. In some embodiments, audio output 674 shares audio characteristics (e.g., common tones, notes, cadence) with both the audio outputs for the phone call and message notifications. Alternatively, in accordance with the live communication session being available between three or more participants (e.g., a group live communication session), device 600 displays a second type of notification. As illustrated in FIG. 6Y, the second type of notification includes a banner notification 676 (e.g., not full screen) and haptic output 678 (e.g., but no audio output). In some embodiments, in accordance with the live communication session being available between three or more participants (e.g., a group live communication session), device 600 initially displays a full screen notification (e.g., similar to full screen notification 616 illustrated in FIG. 6E) and then displays (e.g., transitions to) banner notification 676. In some embodiments, notification 676 includes an affordance that when selected initiates a process for joining the corresponding live communication session (e.g., as described above with reference to FIGS. 6F-6L).

In contrast to notification 677B, which corresponds to a missed video call, notification 676 corresponds to an active live communication session. Notification 676 includes an indication of the group (The Dream Team), the participant that performed an action triggering presentation of the notification (Pablo), and a time when the live communication session was initiated ("NOW"). In some embodiments, notification 676 updates to accurately reflect the time at which the live communication session was initiated and the status of the live communication session. In some embodiments, when the live communication session represented by notification 676 ends, the text of notification 676 is updated from "JOIN THIS VIDEO CALL FROM PABLO" to "MISSED VIDEO CALL FROM PABLO".

In some embodiments, in accordance with a determination that an active application is not being displayed (as in FIG. 6W), device 600 displays a full screen notification in response to receiving the data indicating that a live communication session is available to join. In some embodiments, in accordance with a determination that an active application (e.g., the messaging application) is being displayed, device 600 displays a non-full screen notification (e.g., a banner notification).

Figure 6Z:
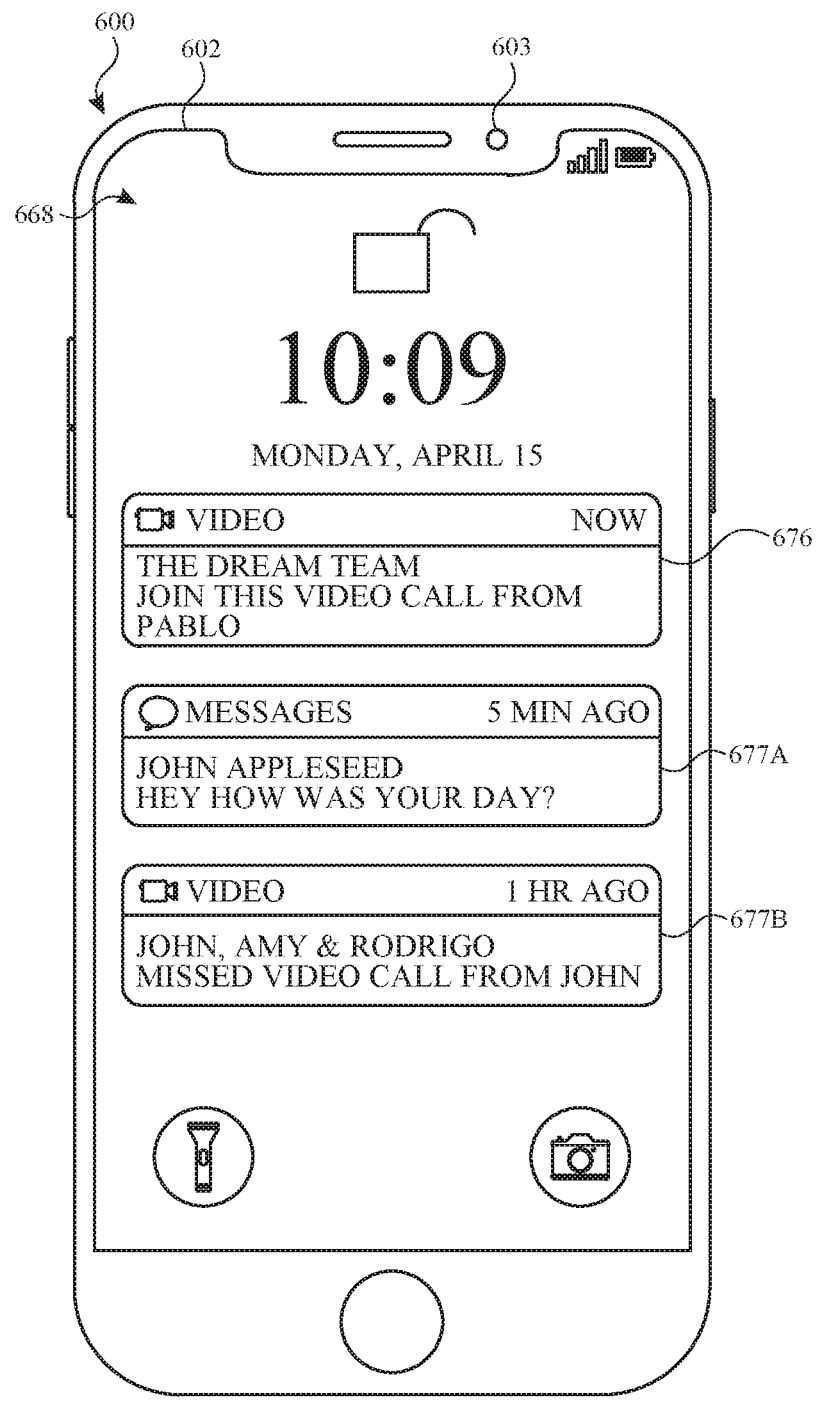
Figure 6A:
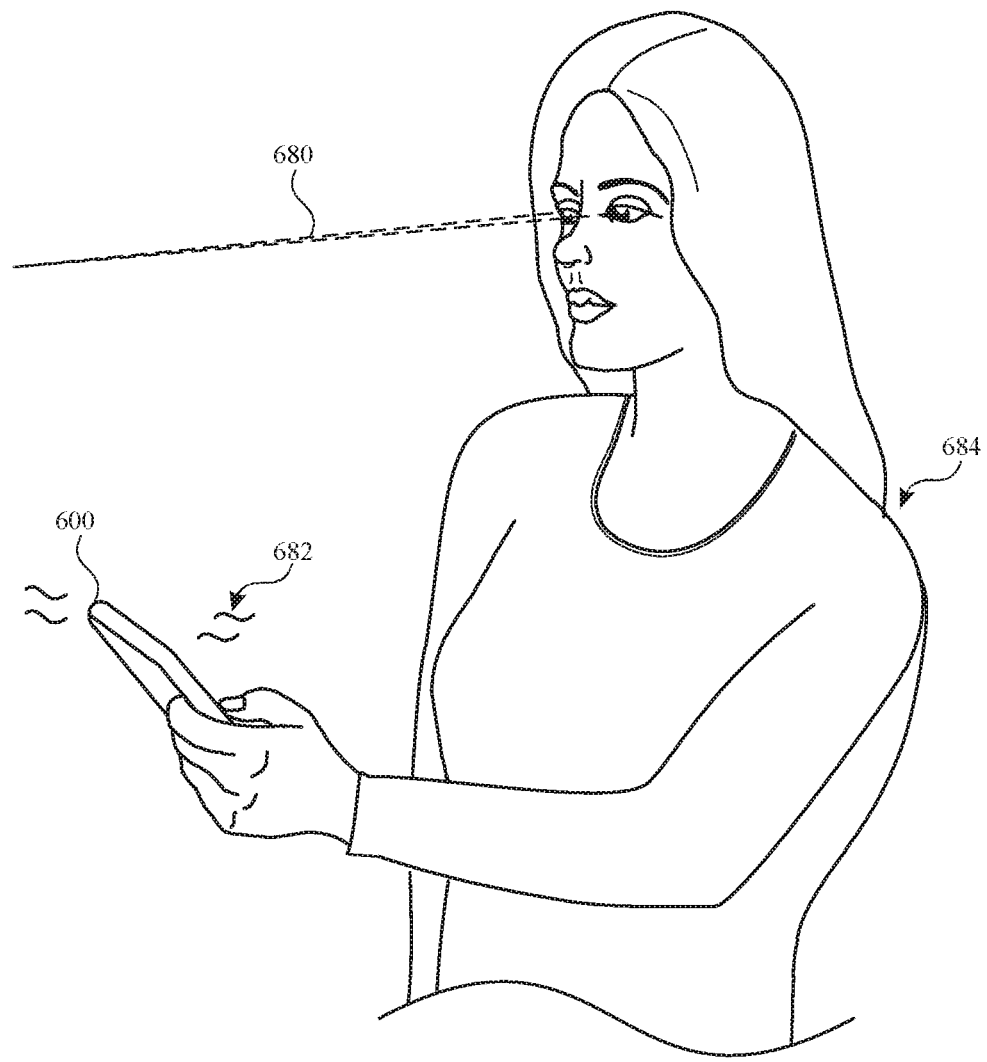
Figure 6A:
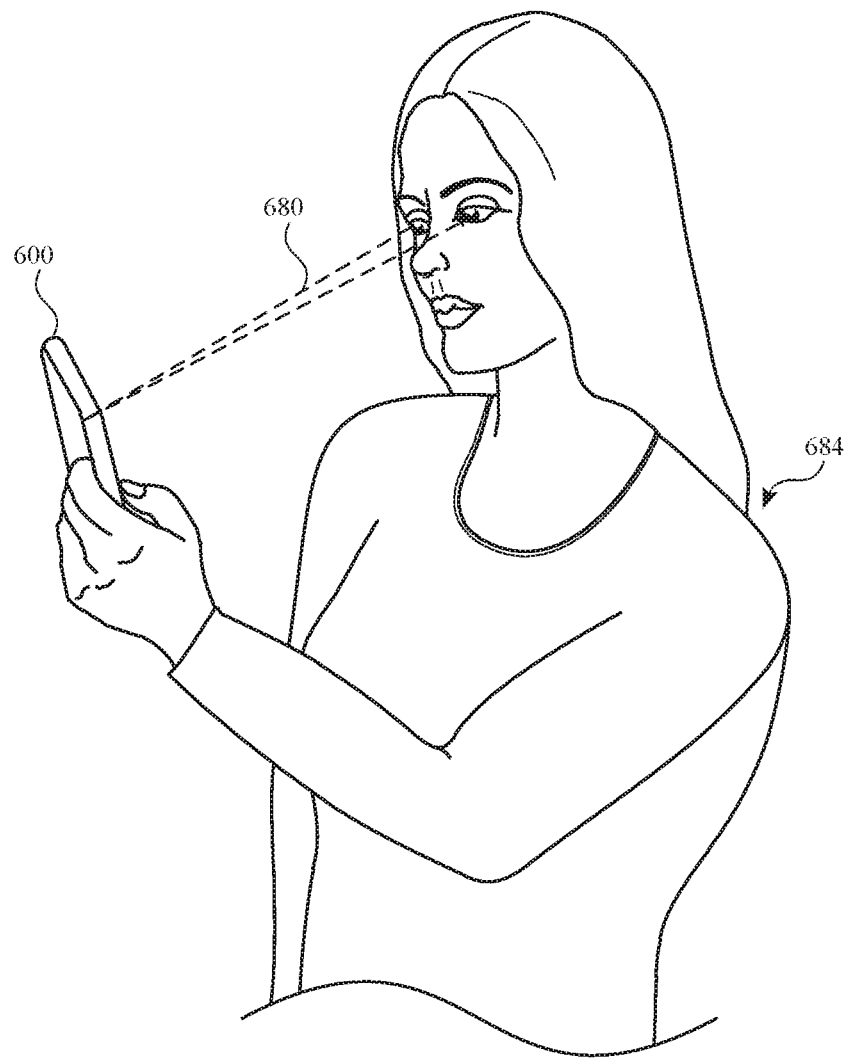
Figure 6A:
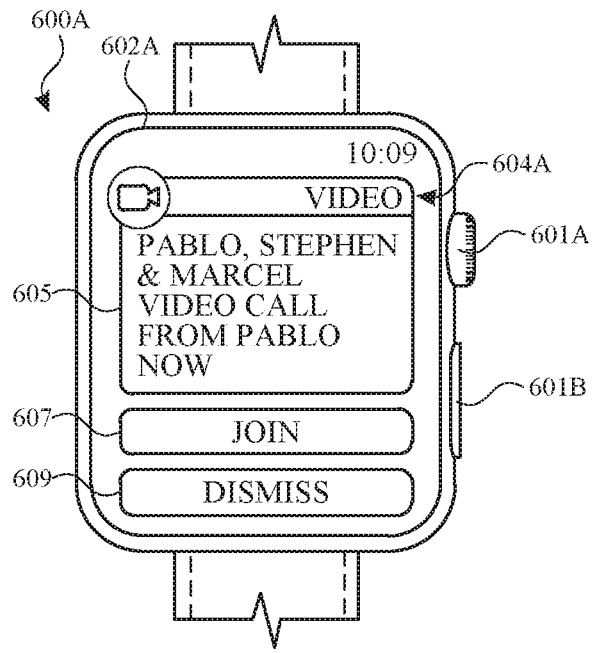
Figure 6A:
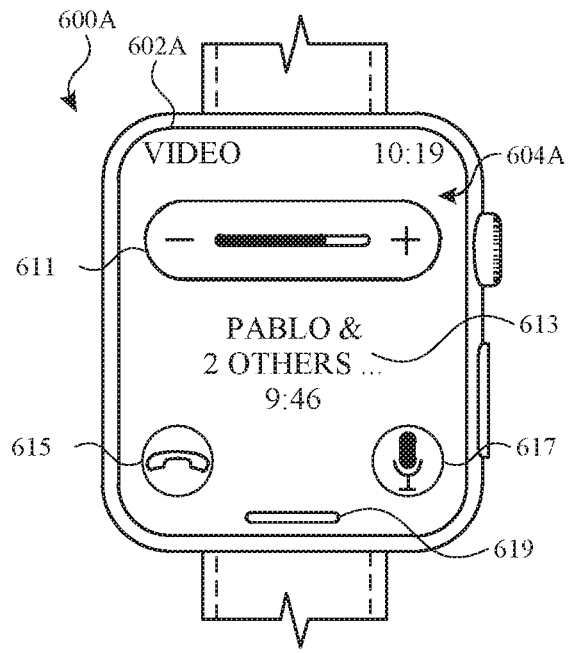
Figure 6A:
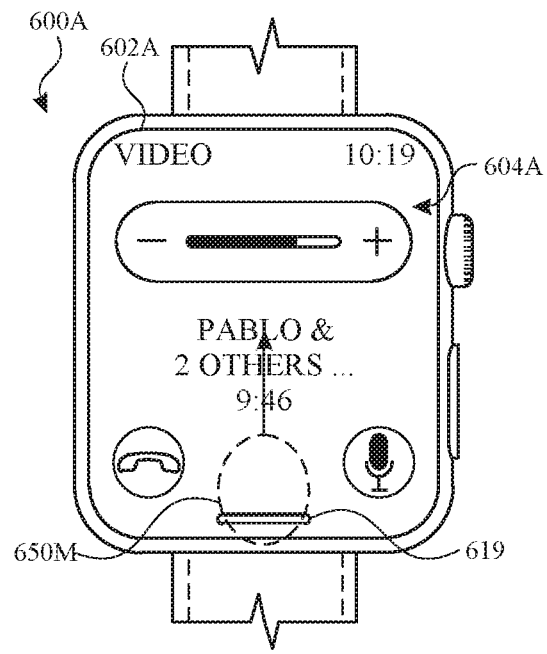
Figure 6A:
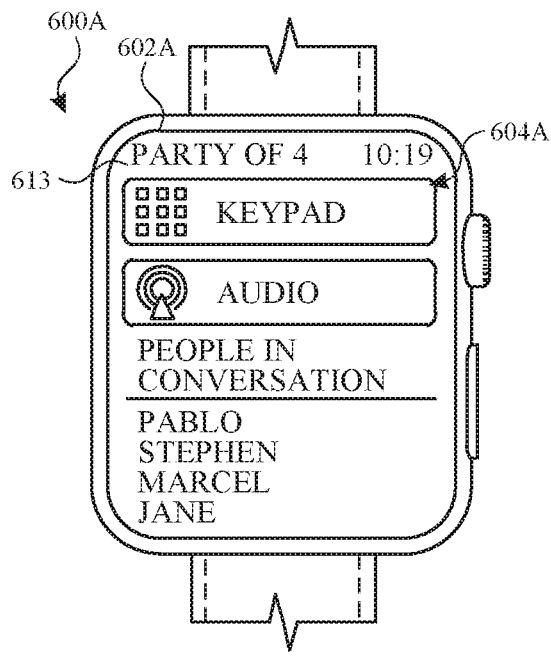
Figure 7A:
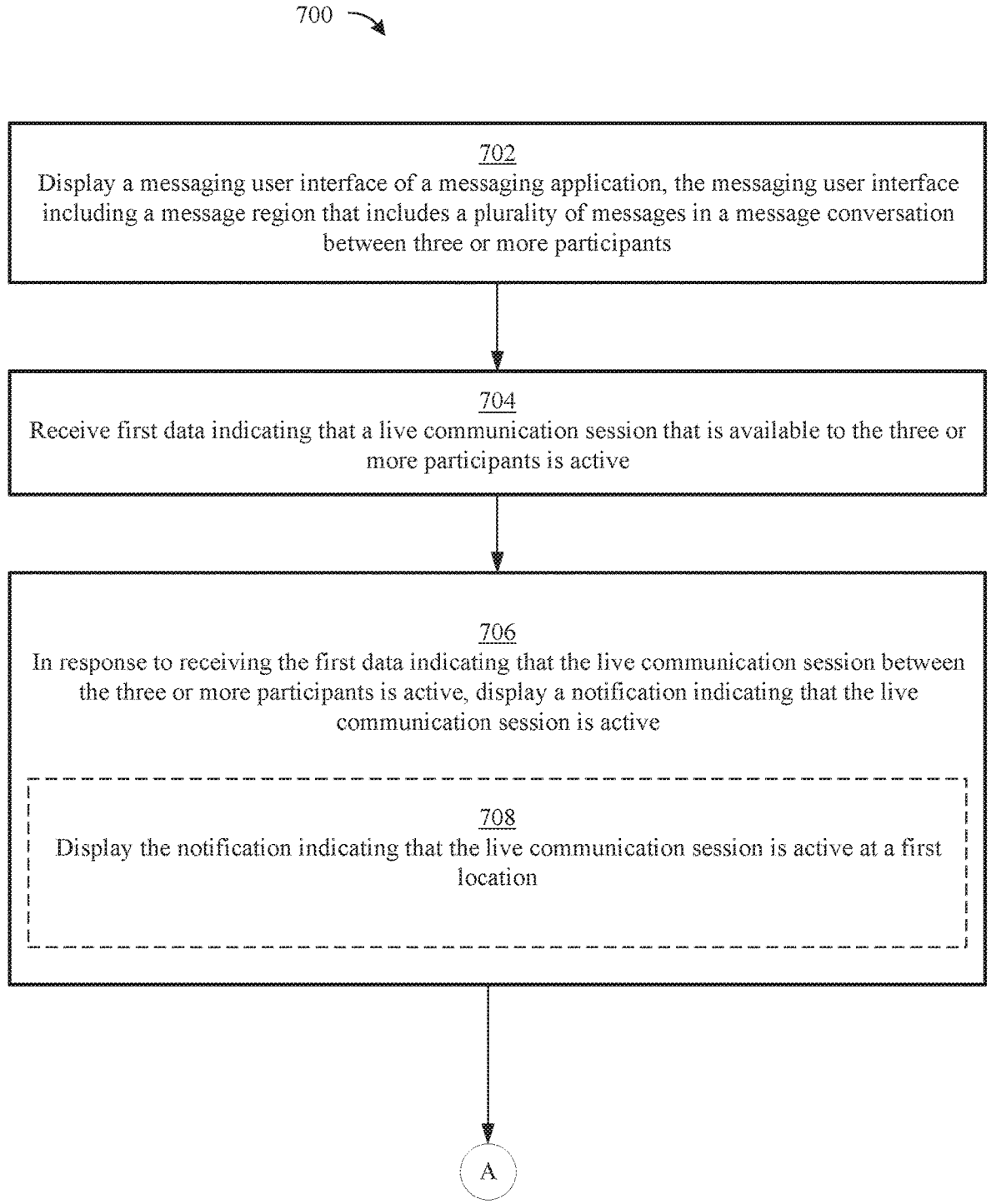
FIGS. 7A-7F illustrate an exemplary method in accordance with some embodiments.
Figure 7B:
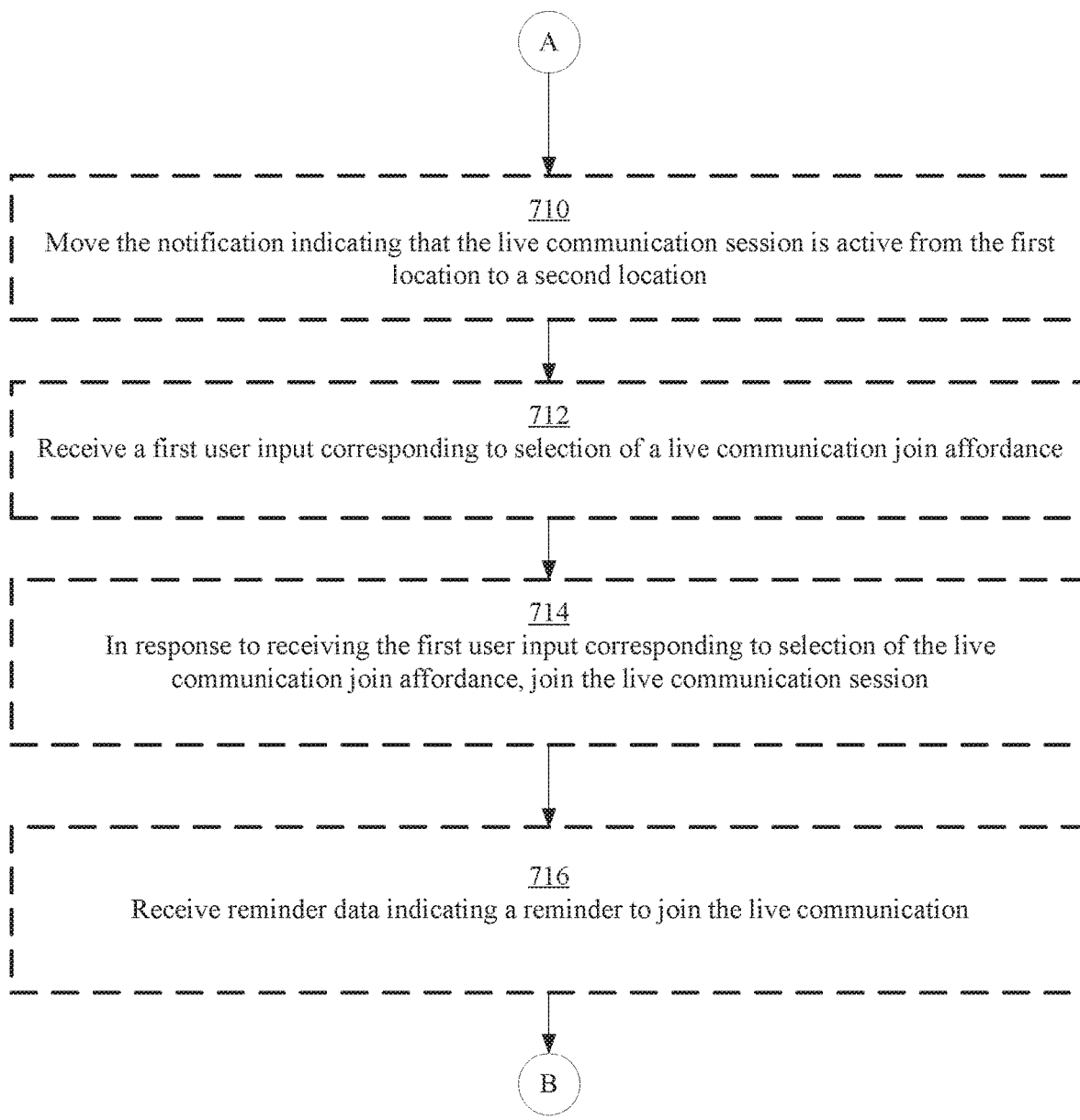
Figure 7C:
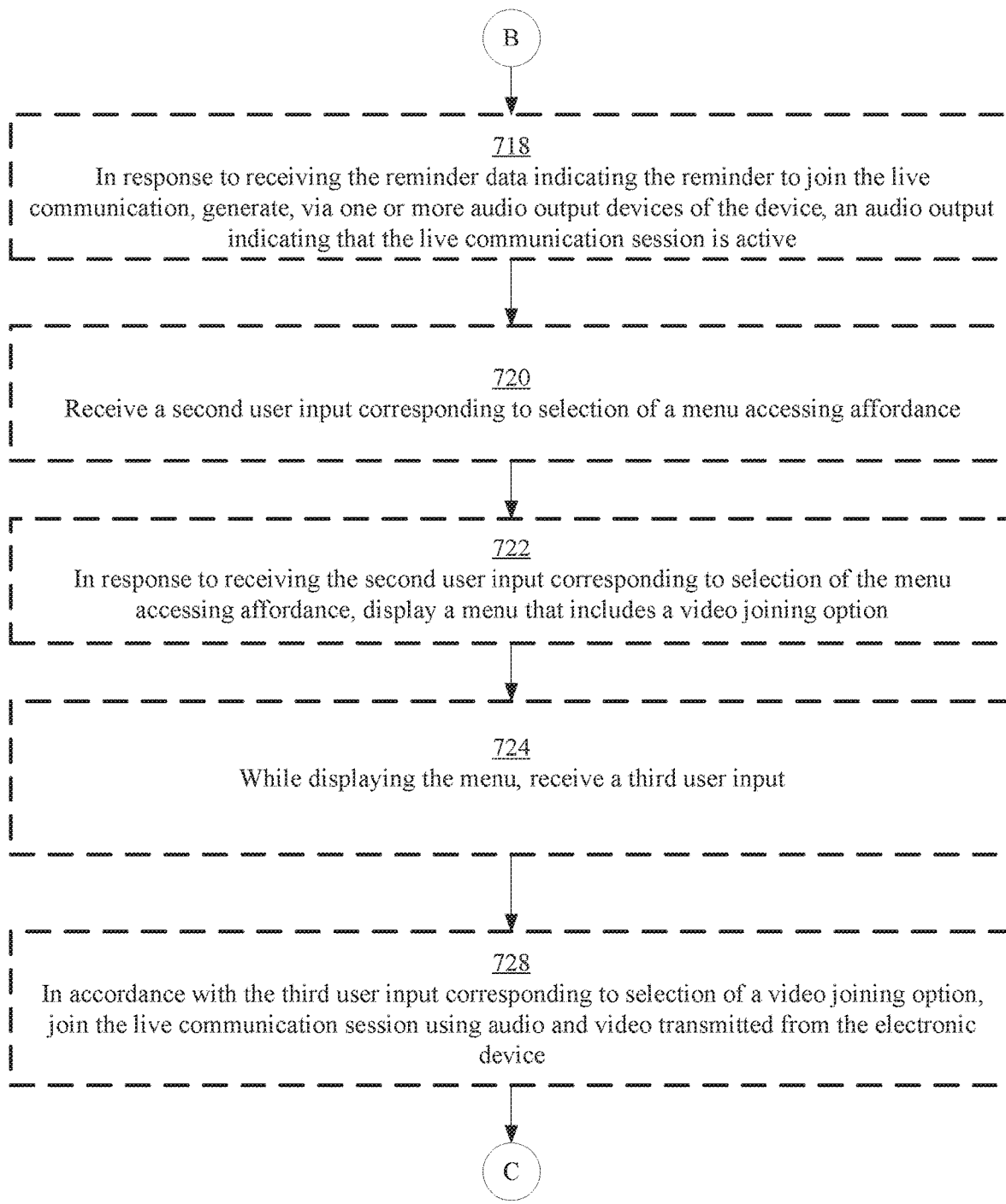
Figure 7D:
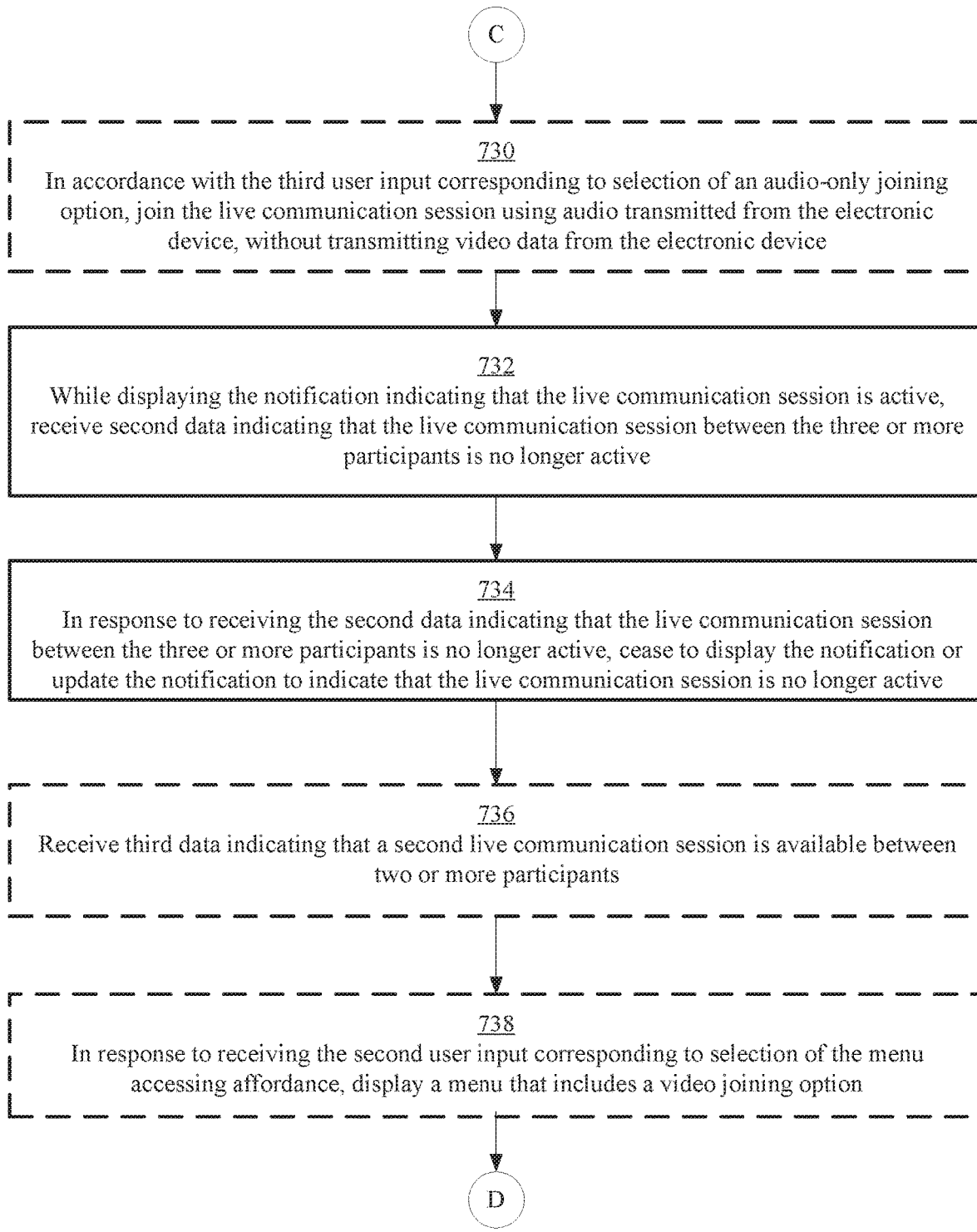
Figure 7E:
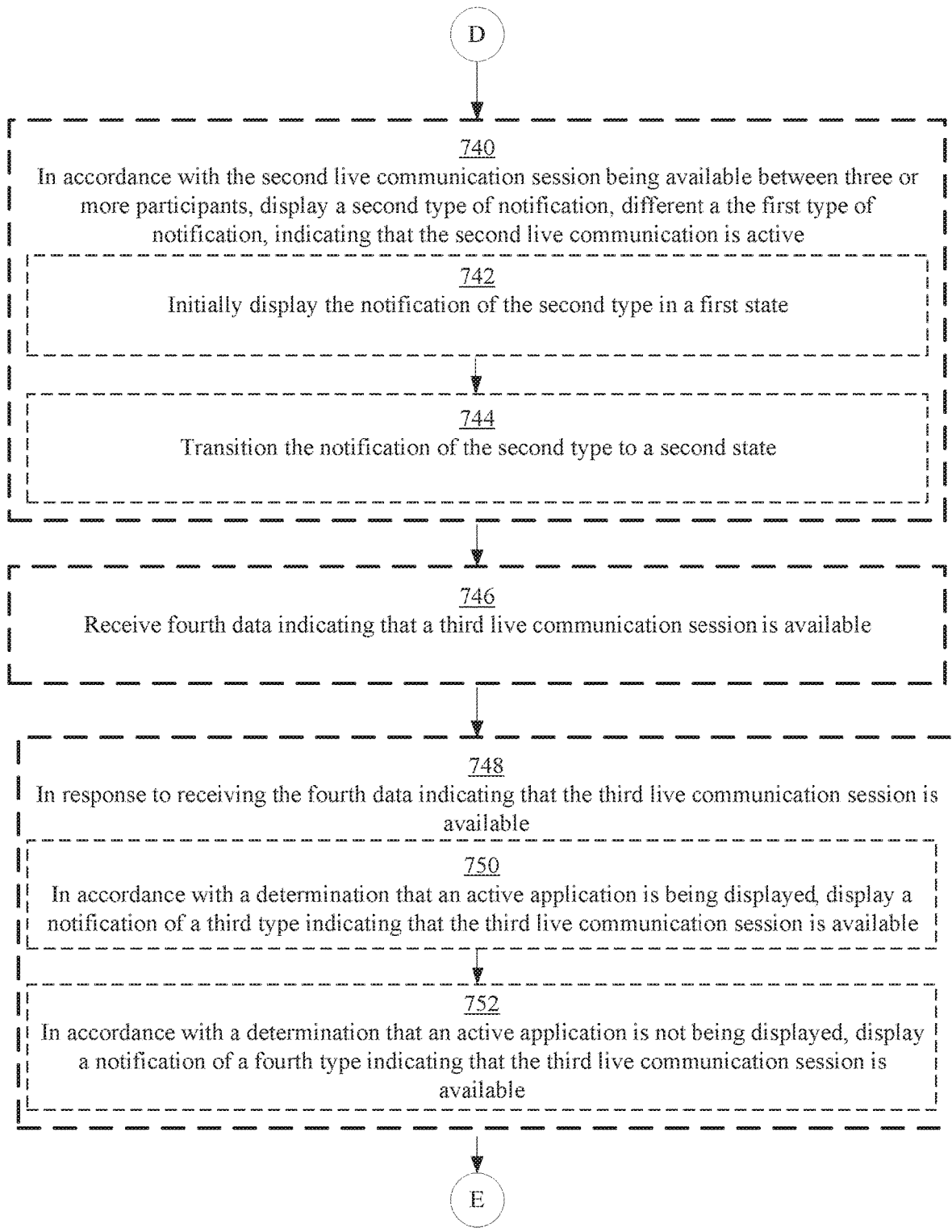
Figure 7F:
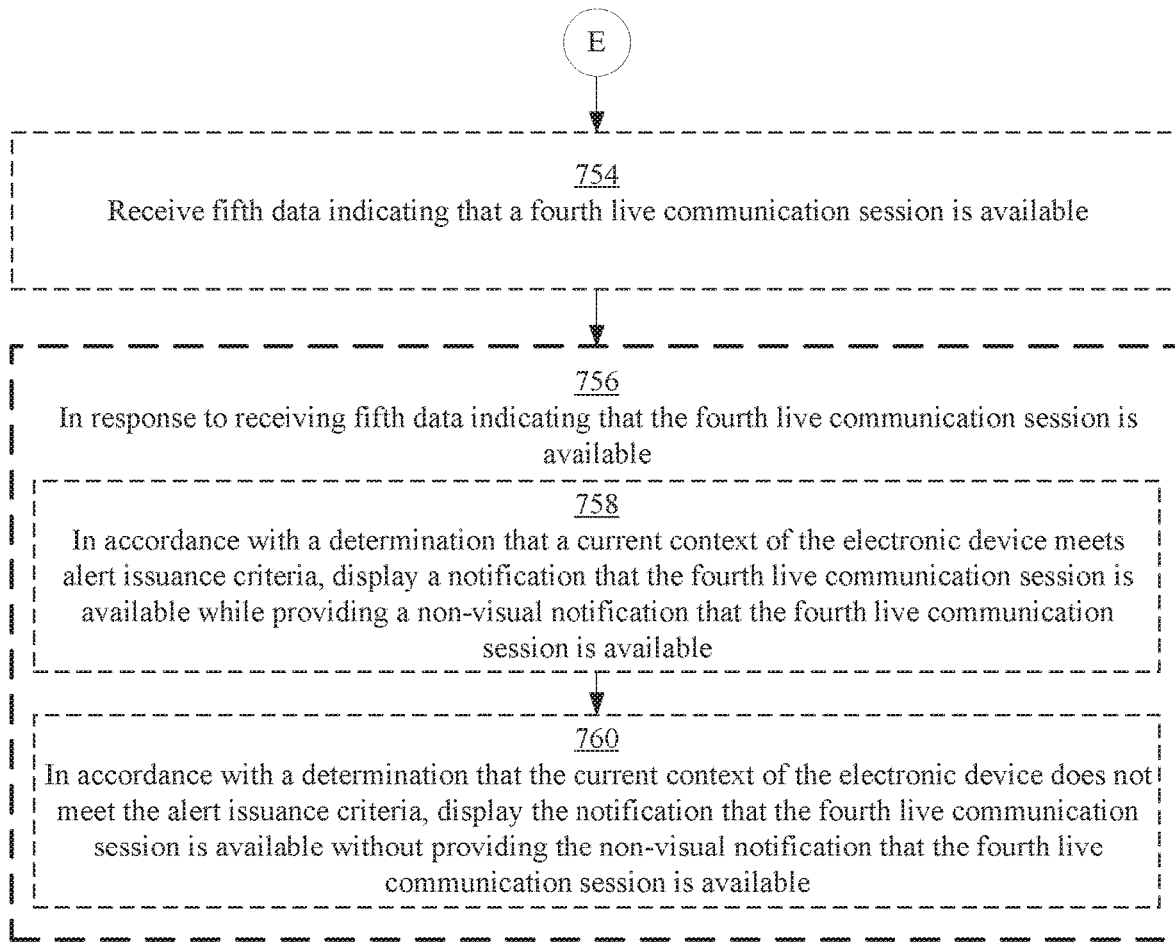

In some embodiments, in accordance with a determination to alert a user of device 600, device 600 outputs an alert (e.g., a notification or an audio or haptic output); and in accordance with a determination to not alert the user of device 600, device 600 refrains from outputting the alert. In some embodiments, the determination to alert a user is based on a disturbance criterion (e.g., whether the device is locked or unlocked). In some embodiments, in accordance with device 600 being locked (e.g., as illustrated in FIG. 6Y), device outputs an alert (e.g., haptic output 678); and in accordance with device 600 being unlocked (e.g., as illustrated in FIG. 6Z), device 600 displays a notification (e.g., banner notification 676 and refrains from providing the alert (e.g., no haptic output).

In some embodiments, the disturbance criterion indicates whether a user is looking at device 600 or not (e.g., based on data from a sensor on the front of device 600). FIG. 6AA illustrates user 684 holding device 600. The user's gaze 680 is not directed at device 600. Device 600 determines whether user 684 is not looking at device 600, and in accordance with a determination that user 684 is not looking at device 600, device 600 provides a non-visual notification 682 (e.g., a haptic or audio output). As illustrated in FIG. 6AB, user's gaze 680 is directed at device 600. In accordance with a determination that user 684 is looking at device 600, device 600 refrains from providing a non-visual notification (e.g., device 600 displays a banner notification without haptic or audio output). In some embodiments, device 600 determines whether a user is looking at device 600 using an image sensor configured to identify a face of a user.

Turning to FIGS. 6AC-6AF, device 600A includes display 602A (e.g., touch-sensitive display), rotatable input mechanism 601A, and mechanical button 601B. In some embodiments, device 600A includes features of device 100, 300, 500, or 600. In some embodiments, device 600A communicates with device 600 (e.g., via two-way wireless communication). In some embodiments, device 600A is in a paired relationship with device 600.

In some embodiments, device 600A receives (e.g., from device 600) data indicating that a live communication session that is available to the three or more participants is active. As illustrated in FIG. 6AC, in response to receiving the data indicating that the live communication session is active, device 600A displays user interface 604A, which includes notification 605, live communication join affordance 607, and dismiss affordance 609. In some embodiments, notification 605 includes features of notification 614 described above (e.g., participant names, number of participants, the name of the participant that triggered the notification). In some embodiments, device 600A generates audio and/or haptic output in response to receiving the data indicating that the live communication session is active. In some embodiments, device 600A generates audio and/or haptic output different from audio and/or haptic output generated by device 600 in response to receiving the data indicating that the live communication session is active. In some embodiments, a notification (e.g., display, audio, and/or haptic output) that a live communication session is active is provided at device 600 (e.g., not at device 600A) in response to receiving initial data indicating that a live communication session is active, and a notification is provided at both device 600 and device 600A in response to receiving reminder data indicating a reminder that the live communication session is active. In some embodiments, a notification (e.g., display, audio, and/or haptic output) that a live communication session is active is provided at both device 600 and device 600A in response to receiving initial data indicating that a live communication session is active, and a notification is provided at device 600 (e.g., not at device 600A) in response to receiving reminder data indicating a reminder that the live communication session is active.

In some embodiments, device 600A receives user input corresponding to selection of live communication join affordance 607 (e.g., a tap on live communication affordance 617). In response to receiving selection of live communication join affordance 607, device 600A causes device 600 and/or device 600A to join the live communication session or initiate a process for joining the live communication session. In some embodiments, In response to receiving selection of live communication join affordance 607, device 600A causes device 600 to display live communication user interface 628 (FIG. 6G), 654 (FIG. 6K), or 656 (FIG. 6L).

FIG. 6AD illustrates user interface 604A displayed on device 600A after joining the live communication session. In some embodiments, device 600A includes a microphone for a user to provide audio inputs to live communication session via device 600A. In FIG. 6AD, user interface 604A includes volume control 611, indication 613 of the participants ("PABLO & 2 OTHERS") and duration ("9:45") of the live communication session, end call affordance 615, audio ON/OFF affordance 617, and menu affordance 619.

In FIG. 6AE, device 600A receives (e.g., detects) user input 650M (e.g., upward swipe gesture beginning at or near menu affordance 619). As illustrated in FIG. 6AF, in response to receiving user input 650M, device 600A modifies indication 613 ("PARTY OF 4") and displays keypad affordance 621, audio source affordance 623 (e.g., to participate in the live communication session using device 600), and list 625 of participants of the live communication session (e.g., joined and/or invited participants). In some embodiments, device 604A displays list 625 in response to receiving user input 650M on user interface 604 in FIG. 6AC (e.g., prior to joining the live communication session). In some embodiments, list 625 includes an indication of the communication status of the participants. In some embodiments, list 625 includes reminder affordances that can be selected to send reminder notifications to participants that have not joined the live communication session.

FIGS. 7A-7F are a flow diagram illustrating a method in accordance with some embodiments. Method 700 is performed at a device (e.g., 100, 300, 500, or 600) with a display. Some operations in method 700 are, optionally, combined, the orders of some operations are, optionally, changed, and some operations are, optionally, omitted.

As described below, method 700 provides, among other things, an intuitive way for providing an interactive notification (e.g., 614, 672, 676) for a live communication session between multiple participants. The method reduces the cognitive burden on a user using innovative techniques to provide a notification for a live communication session between multiple participants, thereby creating a more efficient human-machine interface. For battery-operated computing devices, enabling a user to quickly interact with the notification for live communication sessions between multiple participants is faster and more efficient, and thus, conserving power and increasing the time between battery charges.

At block 702, the device displays a messaging user interface (e.g., 604) of a messaging application. The messaging user interface (e.g., 604) includes a message region (e.g., 606). The message region includes a plurality of messages (e.g., 608A-608D) in a message conversation between three or more participants.

At block 704, the device receives first data indicating that a live communication session (e.g., an audio communication session or an audio/video communication session) that is available to the three or more participants is active. In some embodiments, a participant of a live communication session has a status of "currently joined" (e.g., providing a live media stream to the other participants; also referred to as "connected" or "active") or "not currently joined" (e.g., participants that have never joined the session or have previously joined the session and then left the session; also referred to as "not connected" or "invited"). In some embodiments, participants of the live communication session include participants that are currently joined in the live communication session and participants that are not currently joined in the live communication session (e.g., 648A-648D). When a live communication session is active, participants join (connect to) or leave (disconnect from) the live communication session. When a participant associated with another device has joined the live communication session, the device receives a live media stream corresponding to that participant. When the user of the device has joined a live communication session, the device transmits a live media stream to the other participants (e.g., the participants that have joined the live communication session). In some embodiments, a live communication session remains active as long as at least one of the participants is connected (e.g., even if the participant that initiated the live communication session leaves the session).

At block 706, in response to receiving the first data indicating that the live communication session between the three or more participants is active, the device displays a notification (e.g., 614) indicating that the live communication session is active. In some embodiments, the notification indicating that the live communication session is active includes a live communication join affordance (e.g., 614A). In some embodiments, the notification includes an indication of the number of participants in the live communication session (e.g., number of participants active in the session; number of participants invited to the session). In some embodiments, the notification includes an indication (e.g., a name, initials, photo, or avatar) of the participant that performed an action triggering presentation of the notification on the display (e.g., a participant that initiated the live communication session, or a participant that selected a "ring again" button or the like to remind the user of the device to join the live communication session). In some embodiments, in response to receiving the first data indicating that the live communication session between the three or more participants is active, the device generates, via one or more audio output devices of the device, an audio output (e.g., 618) indicating that the live communication session is active, where the audio output indicating that the live communication session is active is different than an audio output associated with a phone call notification and an audio output associated with a message notification. In some embodiments, the audio output indicating that the live communication session is active shares audio characteristics (e.g., common tones, notes, cadence) with both the audio outputs for the phone call and message notifications. Displaying a notification (e.g., 614) and/or generating an audio output (e.g., 618) indicating that the live communication session is active provides the user with feedback about the current state of a live communication session and provides visual feedback to the user indicating that certain operations associated with the notification and/or the live communication session will be performed if the user activates the notification (e.g., when the notification includes a join affordance). Providing improved visual feedback to the user enhances the operability of the device and makes the user-device interface more efficient (e.g., by helping the user to provide proper inputs and reducing user mistakes when operating/interacting with the device), which additionally, reduces power usage and improves battery life of the device by enabling the user to use the device more quickly and efficiently.

Optionally, at block 704, the device displays the notification indicating that the live communication session is active at a first location in the message region (e.g., 606). In some embodiments, the notification (e.g., 614) indicating that the live communication session is active includes a live communication join affordance (e.g., 614A).

At block 710, while displaying the notification (e.g., 614) indicating that the live communication session is active, the device receives second data indicating that the live communication session between the three or more participants is no longer active.

Optionally, at block 712, the device moves the notification indicating that the live communication session is active from the first location (e.g., bottom of message region 606) to a second location (e.g., middle or top of message region 606 or top, bottom, right, and/or left sides of the display (602)). In some embodiments, moving the notification (e.g., 614) occurs in response to notification relocation criteria being met. In some embodiments, the notification relocation criteria includes one or more criteria, such as a predetermined amount of time being elapsed (e.g., elapsing after the notification is displayed), the messaging user interface (e.g. 604) ceasing to be displayed, the messaging application being closed, the entire notification (e.g., 614) or a portion of the notification (e.g., 614) being hidden in the message region (e.g., 606) due to new incoming messages populating the message region (e.g., 606), or the like. Moving the notification indicating that the live communication session is active provides the user with feedback about the current state of a live communication session, provides visual feedback to the user indicating that certain operations associated with the notification and/or the live communication session will be performed, if selected, and reduces the number of inputs needed to perform an operation. Providing improved visual feedback to the user enhances the operability of the device and makes the user-device interface more efficient (e.g., by helping the user to provide proper inputs and reducing user mistakes when operating/interacting with the device), which additionally, reduces power usage and improves battery life of the device by enabling the user to use the device more quickly and efficiently. In addition, reducing the number of inputs needed to perform an operation further enhances the operability of the device and makes the user-device interface more efficient (e.g., by providing more accessible inputs to the user and reducing the number of inputs), which additionally, reduces power usage and improves battery life of the device by enabling the user to use the device more quickly and efficiently.

Optionally, at blocks 714 and 716, the device receives a first user input (e.g., 650C) corresponding to selection of the live communication join affordance (e.g., 614A or 626B). In response to receiving the first user input corresponding to selection of the live communication join affordance, the device joins the live communication session (e.g., joining the live communication session and transmitting both video and audio from the electronic device and/or joining the live communication session and transmitting only audio (without transmitting video) from the electronic device). Joining the live communication in response to receiving a selection of a live communication join affordance that is included in a notification reduces the number of inputs needed to perform the operation of joining the live communication session. Reducing the number of inputs needed to perform an operation further enhances the operability of the device and makes the user-device interface more efficient (e.g., by providing more accessible inputs to the user and reducing the number of inputs required to join a live communication session), which additionally, reduces power usage and improves battery life of the device by enabling the user to use the device more quickly and efficiently.

Optionally, at blocks 718 and 720, the device receives reminder data indicating a reminder to join the live communication session (e.g., FIG. 6D) (e.g., a reminder sent by a participant in the conversation or after a predetermined period of time). In response to receiving the reminder data indicating the reminder to join the live communication (e.g., the reminder is sent by a participant in the conversation), the device generates, via one or more audio output devices of the device, an audio output (e.g., 618) (e.g., phone ring output) indicating that the live communication session is active. In some embodiments, the audio output (e.g., 618) is generated in conjunction with re-displaying a notification (e.g., 616). In some embodiments, the display of the notification is ongoing at the time the reminder data is received. In some embodiments, the audio output indicating that the live communication session is active is different than an audio output associated with a phone call notification and an audio output associated with a message notification. In some embodiments, the audio output indicating that the live communication session is active shares audio characteristics (e.g., common tones, notes, cadence) with both the audio outputs for the phone call and message notifications. In some embodiments, an initial audio output indicating that the live communication session is active is different from (e.g., shorter, quieter or less intense than) a reminder audio output indicating that the live communication session is active (e.g., the audio output generated based on a participant selecting the "ring" affordance). In some embodiments, an initial audio output indicating that the live communication session is active is a single repetition of a repeated audio output that is used for phone calls and a reminder audio output indicating that the live communication session is active is multiple repetitions of the repeated audio output that is used for phone calls or is the same as the audio output that is used for phone calls. In some embodiments, in response to receiving the reminder data indicating the reminder to join the live communication, the device displays an indication (e.g., a name, initials, photo, or avatar) of a participant in the live communication session that initiated the reminder. Generating a reminder that includes an audio output when prescribed conditions are met allows the user to quickly recognize that a live communication session is available if they missed a visual notification (e.g., 614). Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at blocks 722 and 724, in embodiments where the notification includes a menu accessing affordance (e.g., 626B), the device receives a second user input (e.g., 650C) corresponding to selection of the menu accessing affordance. The device, in response to receiving the second user input corresponding to selection of the menu accessing affordance, displays a menu (e.g., 630) that includes a video joining option (e.g., 634) (e.g., affordance, dropdown menu, checkbox) and an audio-only option (e.g., 642) (e.g., affordance, dropdown, checkbox). Displaying a menu that includes different options for joining the live communication session in response to receiving a selection of a menu accessing affordance provides additional control options without cluttering the UI with additional displayed controls. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at blocks 726 and 728, the device, while displaying the menu (e.g., 630), receives a third user input. In accordance with the third user input (e.g., 650F) corresponding to selection of the video joining option (e.g., 634), the device joins the live communication session using audio and video transmitted from the electronic device. In some embodiments, the device prompts the user to check to see if they want to join with audio-only and/or video only (e.g., "do you want to join with video?"). Joining the live communication session using audio and video transmitted from the electronic device when prescribed conditions are met (e.g., in response to a video joining option being selected) allows a user to join live communication sessions using audio and video without the user having to select or modify additional input and outputs of the device (e.g., turning on camera and/or turning on microphone). Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at block 730, in accordance with the third user input corresponding to selection of the audio-only joining option (e.g., 642), the device joins the live communication session using audio transmitted from the electronic device (e.g., audio recorded by one or more microphones of the device), without transmitting video data from the electronic device. In some embodiments, the device displays an indicator that the user has joined the live communication using audio only (e.g., 658 in FIG. 6L). This gives the user comfort in that video is not being shared). Joining the live communication session using audio transmitted from the electronic device when prescribed conditions are met allows a user to join live communication sessions using only audio without the user having to select or modify additional input and outputs of the device (e.g., turning off camera and/or turning on microphone). Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

At block 732, in response to receiving the second data indicating that the live communication session between the three or more participants is no longer active, the device ceases to display the notification (e.g., 614) or updates the notification to indicate that the live communication session is no longer active. In some embodiments, while the live communication session is active, the notification is updated to indicate the current duration of the live communication session. In some embodiments, when the live communication session is no longer active, the notification ceases displaying the duration of the session and displays an indication that the session has ended (e.g., "call ended"). Ceasing to display the notification in response to receiving data indicating that the live communication session is no longer active provides visual feedback to the user indicating that certain operations associated with the notification and/or the live communication session are no longer available. Providing improved visual feedback to the user enhances the operability of the device and makes the user-device interface more efficient (e.g., by helping the user to provide proper inputs and reducing user mistakes when operating/interacting with the device), which additionally, reduces power usage and improves battery life of the device by enabling the user to use the device more quickly and efficiently. In addition, ceasing to display the notification in response to receiving data indicating that the live communication session is no longer active automatically performs an operation when a set of conditions have been met without further user input. Performing an optimized operation when a set of conditions have been met without further user input enhances operability of the device and makes the user-device interface more efficient (e.g., by decreasing unneeded elements on the user interface and helping the user to provide proper inputs and reducing user mistakes when operating/interacting with the device), which additionally, reduces power usage and improves battery life of the device by enabling the user to use the device more quickly and efficiently.

Optionally, at blocks 736, 738, and 740, the device receives third data indicating that a second live communication session is available between two or more participants.

In accordance with the second live communication session being available between two participants, the device displays a first type of notification (e.g., 672) (e.g., full screen notification) indicating that the second live communication is active. In some embodiments, the first type of notification (e.g., 672) includes a menu (e.g., 630) with options for video (e.g., 634), audio only (e.g., 643), and/or decline (e.g., 622). In accordance with the second live communication session being available between three or more participants, the device displays a second type of notification (e.g., 676), different than the first type of notification, indicating that the second live communication is active. In some embodiments, the second type of a notification is a banner notification (e.g., 676) that is not full screen or not persistently full-screen. Optionally, at block 742, the device initially displays the notification of the second type in a first state (e.g., full screen state 672). Optionally, at step 744, the device transitions the notification (e.g., 672) of the second type to a second state (e.g., 676) (e.g., a persistent, non-full screen state (e.g., a persistent banner positioned at the top edge of the display). Displaying a certain type of notification that a live communication session is active based on when prescribed conditions are met allows the user to quickly recognize that the live communication is available while providing more and/or less decreasing distractions for the user based on the prescribed condition (e.g., displaying a full screen notification when there is a live communication session available between two participants and displaying a banner when there is a live communication session available between two participants). Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at blocks 746, 748, 750, and 752, the device receives fourth data indicating that a third live communication session is available. In response to receiving the fourth data indicating that the third live communication session is available, in accordance with a determination that an active application (e.g., an application (instead of, for example, a lock screen (e.g., 668) or home screen (e.g., 1400) of the device), such as a messaging application or a third party application provided by an application developer other than the developer of the operating system) is being displayed, the device displays a notification (e.g., 614 or 676) of a third type (e.g., a non-full screen state (e.g., a banner positioned at the top edge of the display)) indicating that the third live communication session is available. In response to receiving the fourth data indicating that the third live communication session is available, in accordance with a determination that an active application is not being displayed (e.g., FIG. 6W), the device provides a notification of a fourth type (e.g., 678 or a full screen notification (e.g., 616)) indicating that the third live communication session is available. Displaying a certain type of notification that a live communication session based on when prescribed conditions are met allows the user to quickly recognize that the live communication is available while providing more and/or less decreasing dissections for the user based on the prescribed condition (e.g., displaying a full screen notification when the device is displaying an application and displaying a banner when the device is not displaying an application). Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at blocks 754, 756, 758, and 760, the device receives fifth data indicating that a fourth live communication session is available. In response to receiving fifth data indicating that the fourth live communication session is available, in accordance with a determination that a current context (e.g., a current operational mode of the device (e.g., whether the device is in a do-not-disturb (DND) mode; whether certain applications or hardware are operationally active; whether the device is locked or unlocked; whether one or more sensors of the device detect that a user is looking at the display) of the electronic device meets alert issuance criteria, the device displays a notification (e.g., 676) that the fourth live communication session is available while providing a non-visual notification (e.g., 678) that the fourth live communication session is available (e.g., an audio or haptic output). In some embodiments, the output or alert corresponds to the notification (e.g., 614). In response to receiving fifth data indicating that the fourth live communication session is available, in accordance with a determination that the current context of the electronic device does not meet the alert issuance criteria, the device displays the notification (e.g., 614) that the fourth live communication session is available without providing the non-visual notification (e.g., 678) that the fourth live communication session is available. In some embodiments, while an alert of the first type is not issued, an alert of a second type is issued (e.g., a visual alert, such as a banner notification (e.g., 676)). In some embodiments, a relevant context of the device is whether the device is in a locked or unlocked state. In some embodiments, when the device is locked, an alert of a first type (e.g., an audio or haptic output) is issued; when the device is unlocked (e.g., when a user is actively operating/interacting with the device), an alert is not issued (e.g., suppressed). In some embodiments, a relevant context of the device is whether the device detects (e.g., via one or more sensors (e.g., cameras, infrared sensors) that a user is looking at the display or not. In some embodiments, when the device is locked, an alert of a first type (e.g., an audio or haptic output) is issued. In some embodiments, when the device detects that a user is not looking at the display (e.g., FIG. 6AA), an alert of the first type (e.g., 682) is generated. In some embodiments, when a user is actively operating/interacting with the device (e.g., FIG. 6AB), an alert of the first type is not generated (e.g., suppressed).)

In some embodiments, the alert issuance criteria include a requirement that the device is locked in order for the alert issuance criteria to be met. In some embodiments, the alert issuance criteria includes a requirement that the device does not detect the attention of a user on the device in order for the alert issuance criteria to be met. (e.g., based on detected user inputs with input devices of the electronic device, based on a detected gaze (e.g., 680) of the user via gaze tracking, face tracking, or the like). Displaying a notification (e.g., 614) and determining whether to provide a non-visual notification based on when prescribed conditions are met allows the user to quickly recognize that the live communication is available while providing more and/or less interruption to the user based on the prescribed. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 700 (e.g., FIGS. 7A-7F) are also applicable in an analogous manner to the methods described below. For example, method 700 optionally includes one or more of the characteristics of the various methods described below with reference to methods 900, 1100, 1300, and 1500. For example, method 700 may launch a live communication session using methods 1300 and 1500, and starting and running the live communication session may include methods 900 and 1100. For brevity, these details are not repeated below.

FIGS. 8A-8BK illustrate exemplary user interfaces for a live communication session, in accordance with some embodiments. The user interfaces in these figures are used to illustrate the processes described below, including the processes in FIG. 9A-9K.

FIG. 8A illustrates device 600 displaying messaging user interface 604 for a message conversation between the group The Dream Team. A live communication session between the participants of the group is not active (e.g., as indicated by the absence of live communication affordance 610). As illustrated in FIG. 8A, the header of messaging user interface 604 is expanded to show video join affordance 626B (as described above). As illustrated in FIG. 8A, device 600 receives user input 850A (e.g., a tap on video join affordance 626B) corresponding to a request to display a user interface for a live communication session between the participants of the participant group The Dream Team. As illustrated in FIG. 8A, the request includes a request to start a new live video communication session. In some embodiments, the request includes a request to join an existing live communication session (e.g., as described above with respect to FIG. 6F).

In response to user input 650A, device 600 displays message 800 in message region 606 and indication 802 that the live communication session is being initiated. In some embodiments, message 800 includes some of the characteristics of notification 614 described above. Once the live communication session is initiated, device 600 displays live communication user interface 804, which concurrently includes a plurality of representations of participants in the live communication session.

In accordance with a determination that the number of participants in the live communication session includes more than a threshold number of participants (e.g., more than five participants, including the user of device 600), device 600 concurrently displays representations of a first plurality of the participants other than a user of device 600 at one or more sizes (e.g., three different sizes) greater than a respective threshold size while displaying representations of a second plurality of the participants in an overflow region, where the second plurality of participants includes one or more participants not included in the first plurality of participants and the representations of the one or more other participants displayed in the overflow region are displayed at a size smaller than the respective threshold size.

Figure 8C:
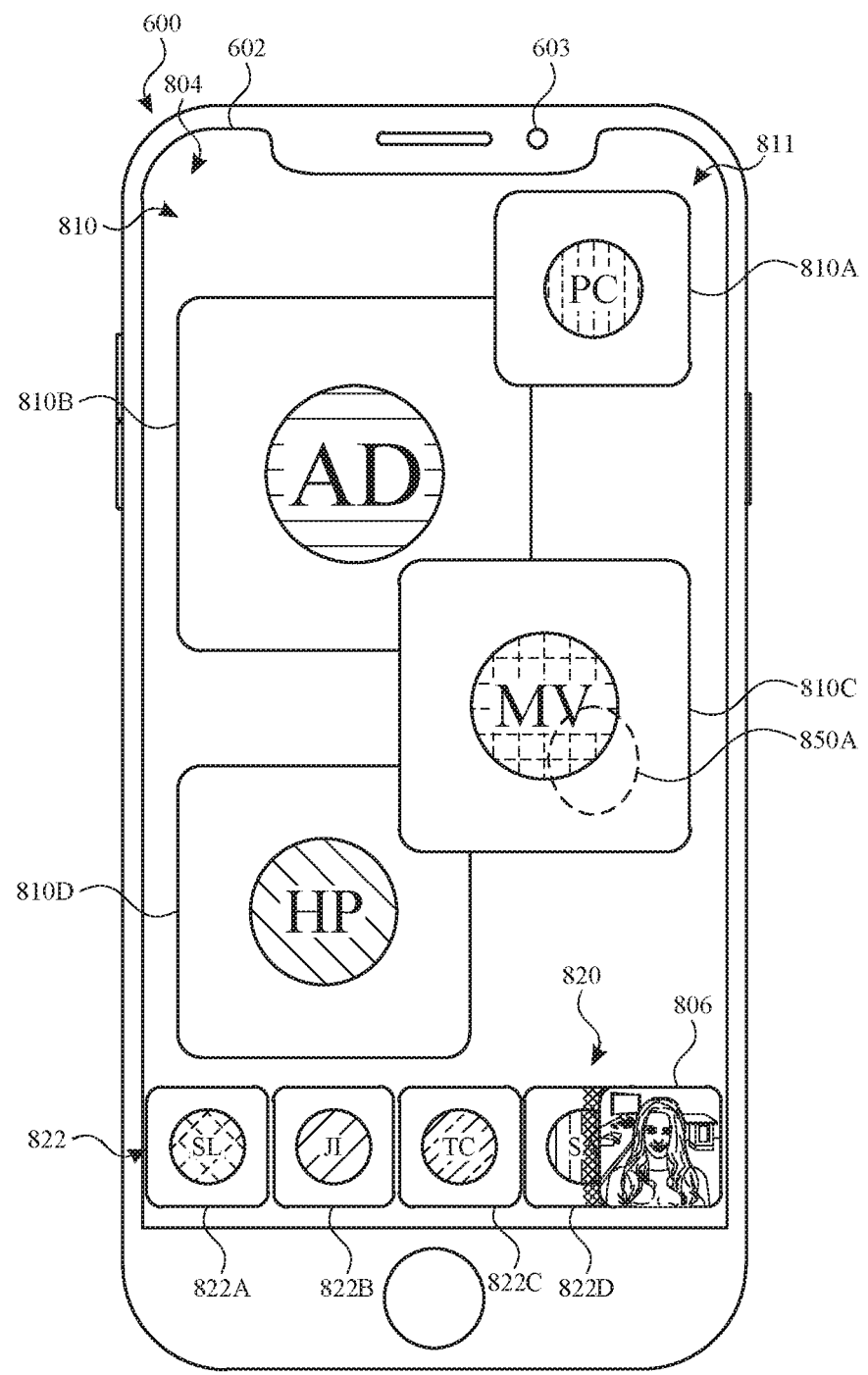

In the embodiments illustrated in FIGS. 8A-8BK, the threshold number of participants is five participants (including the user of device 600). Since the group The Dream Team includes fifteen participants, device 600 determines that the number of participants in the live communication session includes more than the threshold number of participants. As illustrated in FIG. 8C, in accordance with this determination, live communication user interface 804 includes a 4-on-1 layout of four primary representations 810A-810D (collectively 810) of four respective participants other than the user of device 600 displayed in canvas region 811, user representation 806 of a view of a camera of device 600 (corresponding to the user of device 600), and overflow region 820 with overflow representations 822A-822J (collectively 822) corresponding to the participants of the live communication session other than the user of device 600 and the participants represented in canvas region 811, a subset of which (e.g., 822A-822D) is displayed at any one time. In some embodiments, the layout is one of a plurality of predefined layouts in which representations of participants are anchored at different locations in user interface 804. FIG. 8AW illustrates another embodiment of user interface 804. In the embodiment illustrated in FIG. 8AW, overflow region 820 includes overflow representations for all of the participants of the live communication session other than the user of device 600, such that participants represented in canvas region 811 are also represented in overflow region 820.

If the number of participants in the group is less than or equal to five, then in accordance with a determination that the number of participants in the live communication session is less than or equal to five, device 600 displays primary representations of the participants and a representation of the user of device 600 without displaying overflow representations in an overflow region.

Each of primary representations 810 is displayed at one of three predetermined representation sizes (small, medium, and large). Primary representation 810A is displayed at the small size, primary representation 810B is displayed at the large size, and primary representation 810C and primary representation 810D are displayed at the medium size. In FIG. 8C, each of primary representations 810 overlaps with at least one other primary representation. Overflow representations 822 are all displayed at the same size, which is smaller than the small representation size associated with primary representations 810. In the illustrated embodiment, the respective threshold size referred to above is greater than the size of the overflow representations 822 and smaller than the small representation size for the primary representations 810. User representation 806 is the same size as the overflow representations 822 and is aligned with or displayed within overflow region 820.

As illustrated in FIG. 8C, live communication session user interface 804 displays three full overflow representations and one partial overflow representation at one time. The remaining overflow representations are hidden, and can be displayed by scrolling overflow region 820 (e.g., either in response to user input or a detected event such as a participant actively participating by talking or moving). In FIG. 8C, overflow representation 820D is partially shaded to indicate that more overflow representations exist and/or that overflow region 820 can be scrolled. In some embodiments, the order of overflow representations 822 in overflow region 820 depends on the order in which participants join the live communication session. In some embodiments, the order of overflow representations 822 in overflow region 820 changes over time (e.g., as participants join or leave the live communication session or as participants move in or out of canvas region 811 due to, e.g., user selection of overflow representations or active participation by participants represented in the overflow region, as described in greater detail below). In some embodiments, the order of the overflow representations in overflow region 820 is fixed (e.g., the order in which overflow representations are displayed does not change over time). In some embodiments, the order of the overflow representations is based on the order of a list associated with a group (e.g., the order in which the participants were added to the group when the group was created). In some embodiments, the display (e.g., live video feed) of primary representations 810 is updated at a higher rate than display of overflow representations 822.

FIG. 8C illustrates live communication session interface 804 shortly after initiation of the live communication session and before any of the participants (other than the participant associated with device 600) has joined the live communication session. As illustrated in FIG. 8C, primary representations 810 and overflow representations 822 include placeholders for participants that are not connected with the live communication session. As illustrated in FIG. 8C, the placeholders include a representation with an indication of the participant's name (e.g., first name or first and last initial) and a colored object. In some embodiments, the color and/or pattern of each colored object is different or is selected from a set of predefined colors and/or patterns. Optionally, the placeholders include a status indicator indicating that the participant is waiting to connect to the live communication session, and a reminder affordance ("RING") for sending a reminder to the corresponding participant that the live communication session is available. In some embodiments, reminder affordances are not initially included on the placeholders and are displayed in accordance with a determination that the corresponding participant has not joined the live communication session after a predetermined period of time.

Figure 8D:
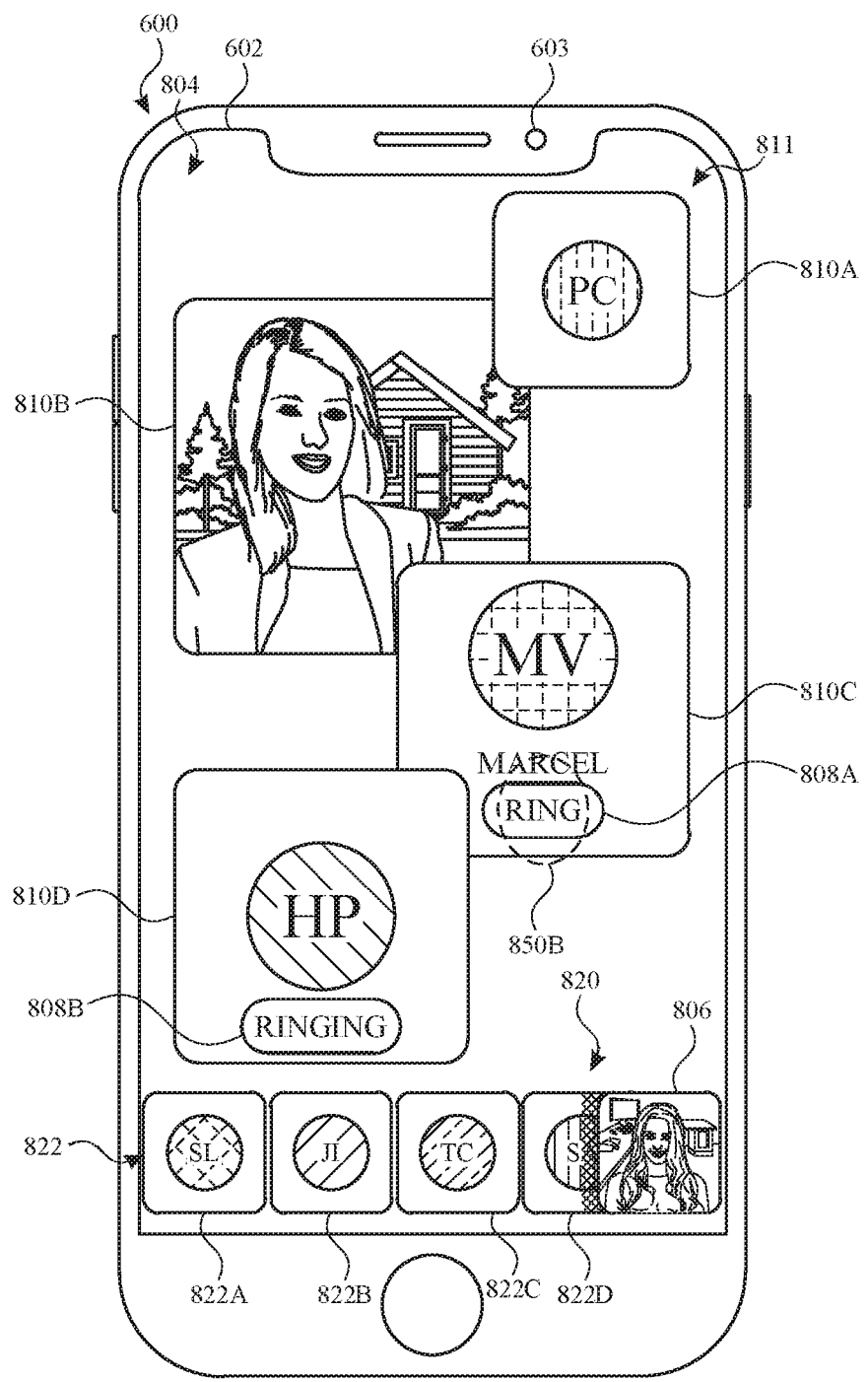

As illustrated in FIG. 8C, device 600 receives (e.g., detect) user input 850A (e.g., a tap) corresponding to selection of primary representation 810C. As illustrated in FIG. 8D, in response to receiving user input 850A, device 600 modifies primary representation 810C to include additional identifying information (e.g., the participant's first name, Marcel) and reminder affordance 808A for sending a reminder to the corresponding participant that the live communication session is available.

FIG. 8D also shows that the participant corresponding to primary representation 810B joins the live communication session. In some embodiments, device 600 receives data indicating that the participant corresponding to primary representation 822B has joined the live communication session. As illustrated in FIG. 8D, in response to the participant corresponding to primary representation 822B joining the live communication session, device 600 replaces the placeholder of primary representation 822B with live video data from the corresponding participant. In some embodiments (e.g., FIG. 8AX), device 600 replaces overflow representation 822B corresponding to the participant with live video data from the participant. As used herein, the phrase "live video data from a participant" (or equivalents thereof) includes live video data transmitted by a device (e.g., smartphone, laptop computer, desktop computer, or tablet computer) associated with the participant or by a device associated with an account associated with the participant (e.g., an email account or cloud storage account).

As illustrated in FIG. 8D, device 600 receives (e.g., detects) user input 850B (e.g., a tap) corresponding to selection of reminder affordance 808. In response to input 850B, device 600 sends instructions to cause a new notification (e.g., call, ring, etc.) indicating that the live communication session is available at a device associated with the corresponding participant, where the new notification is different than a previous notification sent to the participant. In some embodiments, the new notification is more intrusive than the previous notification (e.g., an audio ring, haptic output, or full screen notification, as compared to a banner notification without audio or haptic output). In FIG. 8D, device 600 also displays reminder affordance 808B on primary representation 810D to indicate that the participant corresponding to primary representation 810D is currently being reminded that the live communication session is available (e.g., due to a reminder sent from another participant currently connected to the live communication session, such as the participant represented by primary representation 810B or a reminder sent previously by the user of device 600). Device 600 also modifies reminder affordance 808A to indicate that the corresponding participant is being notified (e.g., by replacing "RING" with "RINGING", as illustrated in FIG. 8E).

Figure 8E:
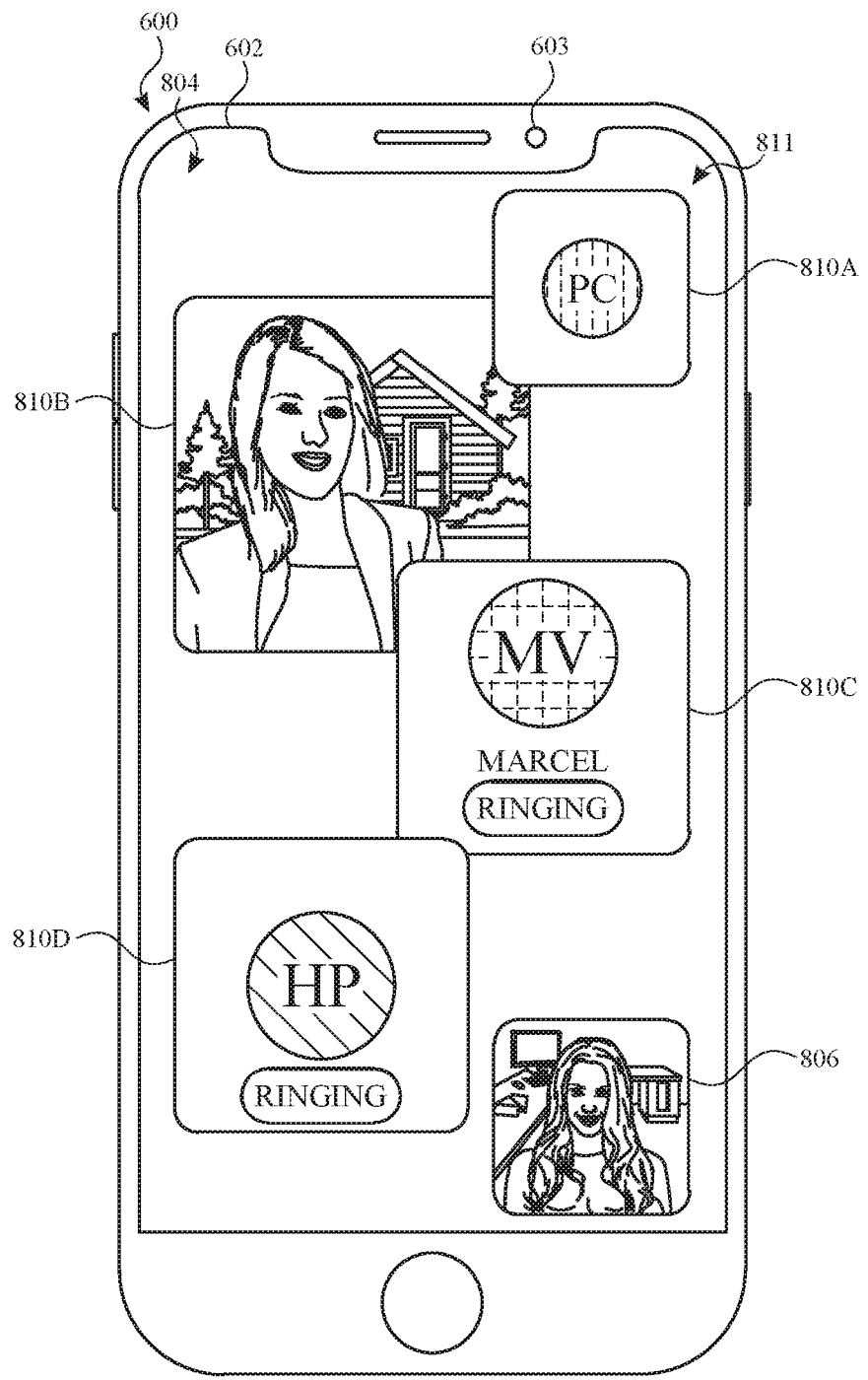

As illustrated in FIG. 8E, in accordance with a determination that a predetermined period of time has elapsed since the live communication session started, device 600 ceases to display overflow representations 822 and increases the size of user representation 806. In some embodiments, primary representation 810 are resized and/or moved when overflow representations 822 are removed. In the illustrated embodiment, primary representation 810D is moved down. In some embodiments, device 600 ceases to display overflow representations 822 in accordance with a determination that the number of participants currently joined in the live communication session is less than or equal to the threshold number of participants (e.g., five participants, including the user of device 600).

At the time corresponding to FIG. 8E, there are two participants joined in the live communication session. In some embodiments, after a further amount of time, device 600 ceases to display one of the primary representations 810 and changes the layout of live communication user interface 804 to a 3-on-1 layout. In some embodiments, the 4-on-1 layout and the 3-on-1 layout are in a set of predetermined layouts that have similar relative placement of primary representations 810. In some embodiments, having a relatively similar placement of primary representations includes a placement in which a primary representation remains in a similar position on user display 602 when there is a transition between layouts within the set (e.g., the position of a representation in one layout overlaps the position of the representation in another layout of the same set).

Figure 8F:
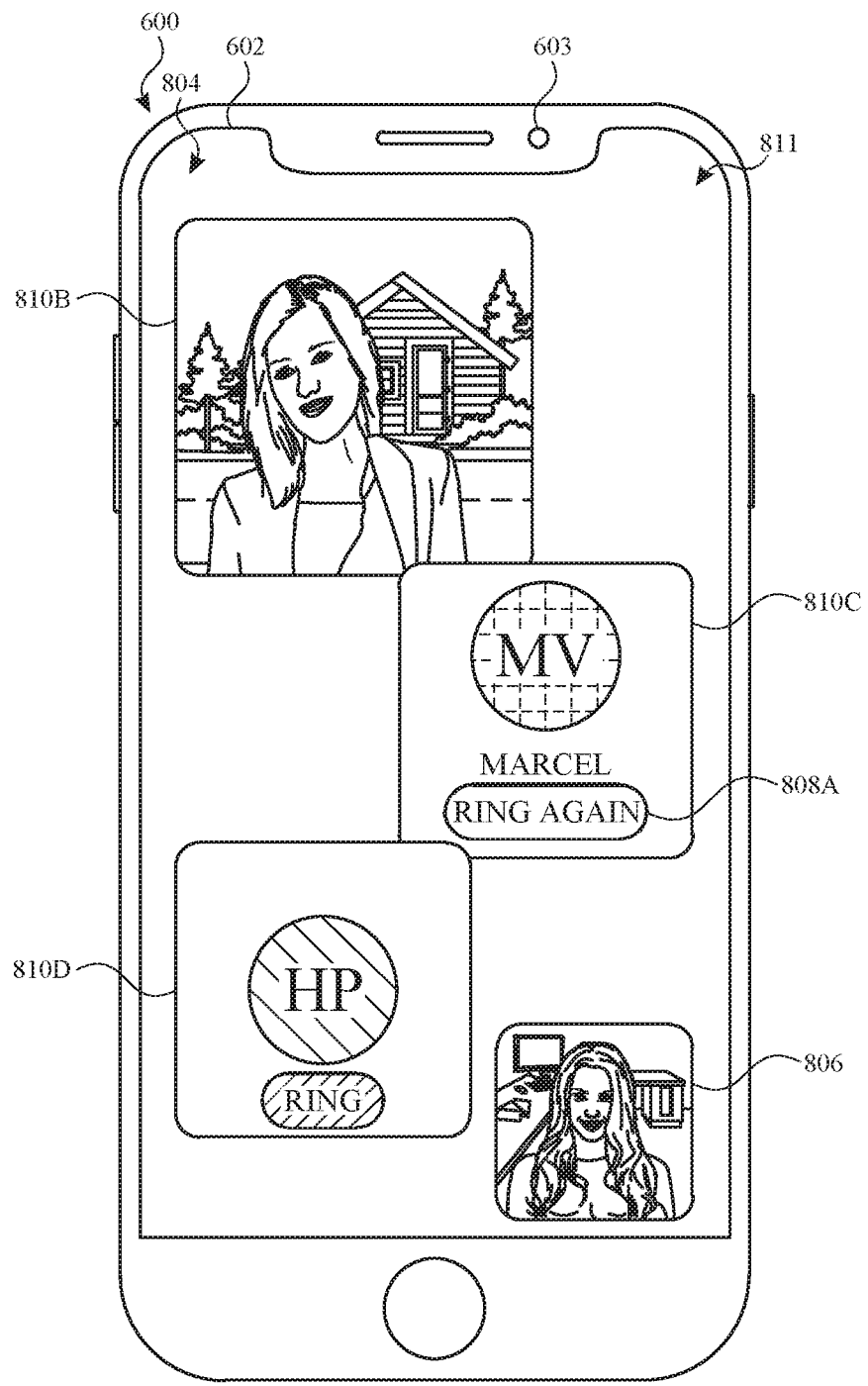

In some embodiments, device 600 determines which primary representation to remove based on whether the corresponding participant has joined the live communication session (e.g., a representation is not removed if the corresponding participant has joined), whether a participant has been reminded (e.g., a representation of a participant that has been reminded will not be removed until a predetermined amount of time after selection of the corresponding reminder affordance), the placement of a participant in the list of participants (e.g., a representation of a participant earlier in the list is removed before a representation of a participant later in the list), and the placement of the representation on live communication user interface 804 (e.g., representations closer to the top of display 602 are removed before representations lower on display 602). As illustrated in FIG. 8F, device 600 ceases to display primary representation 810A and moves primary representation 810B up (e.g., to reduce the overlap between representations 810B and 810C), while maintaining and the relative vertical order of the remaining representations (e.g., representation 810B is larger than and above representation 810C, and representations 810C is above and the same size as representation 810D). FIG. 8F also illustrates that reminder affordance 808A is modified to "RING AGAIN", which indicates that the corresponding participant has been reminded at least one time and is not currently being reminded. Reminder affordance 808B is also modified (e.g., from "RINGING" to "RING" and a different color) to indicate that the corresponding participant has previously been reminded, but not by the user of device 600.

Figure 8G:
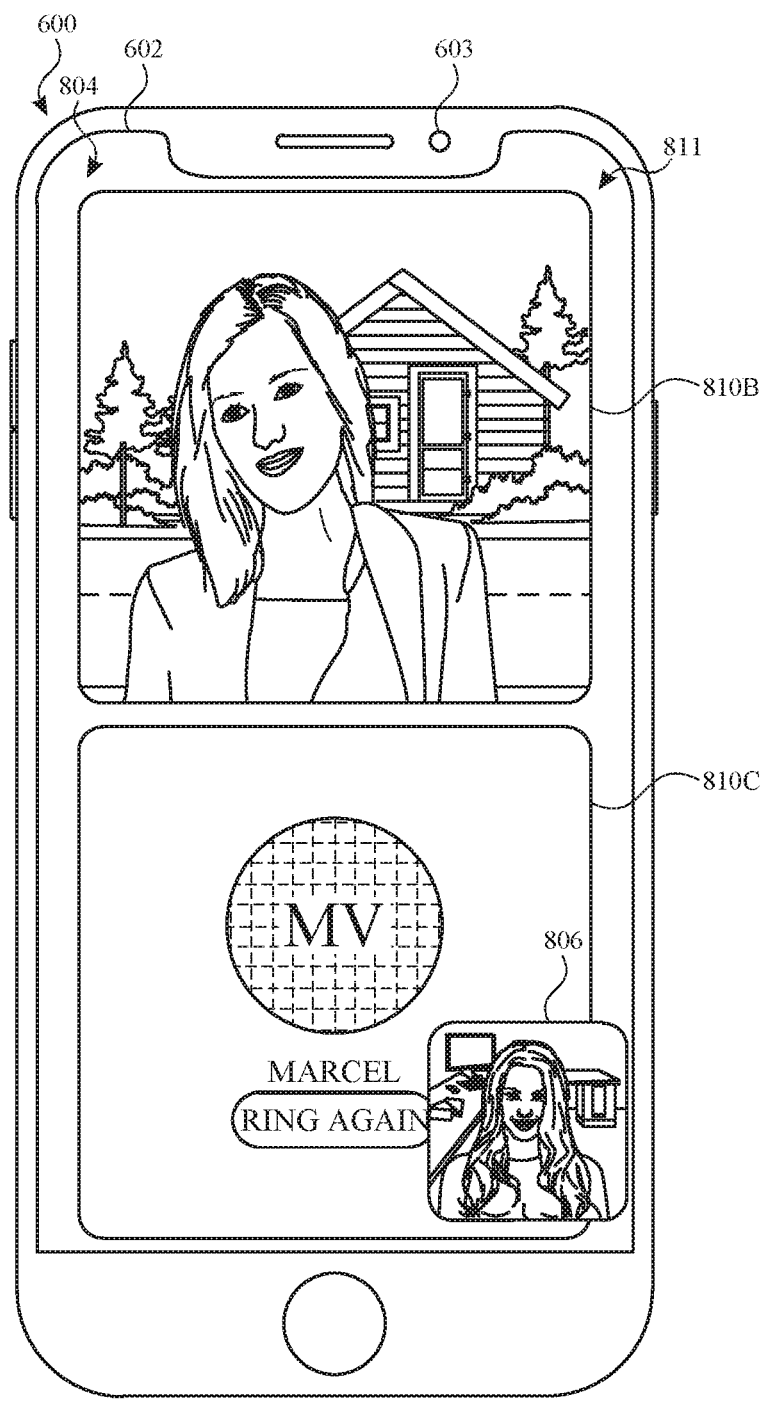

At the time corresponding to FIG. 8F, there are still only two participants joined in the live communication session. In some embodiments, after a further amount of time, device 600 ceases to display another primary representation 810 and changes the layout of live communication user interface 804 to a 2-on-1 layout (e.g., in the same set of predetermined layouts at the 4-on-1 and 3-on-1 layouts illustrated in FIGS. 8E-8F). As illustrated in FIG. 8G, device 600 ceases to display primary representation 810D and enlarges primary representations 810B and 810C. FIG. 8G illustrates a three participant (e.g., 2-on-1) layout in which the primary representations of the two participants besides the user of device 600 are equal size and vertically aligned one above the other. The vertical order of primary representations 810B and 810C is maintained, with primary representation 810B above primary representation 810C. In the layout of FIG. 8F, there is no overlap between primary representations, and user representation 806 overlaps primary representation 810C.

Figure 8H:
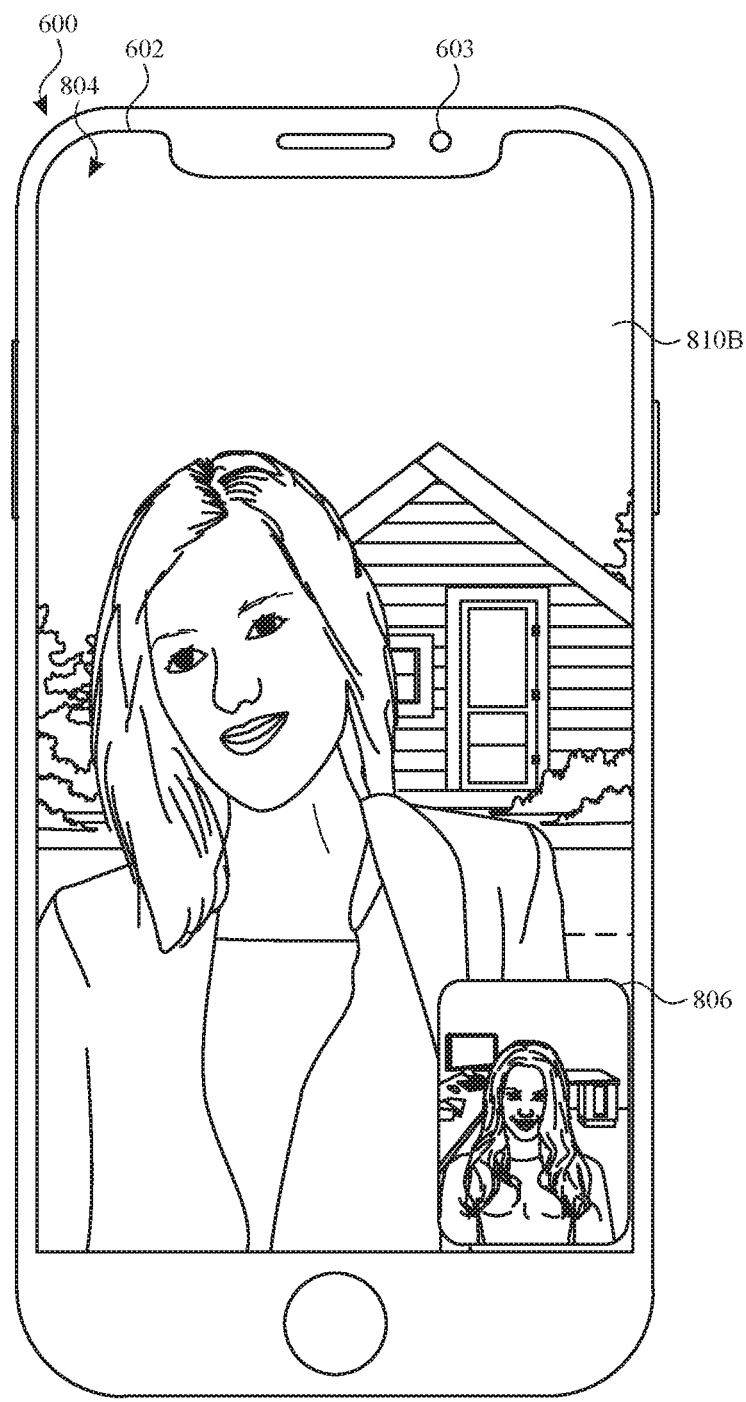

At the time corresponding to FIG. 8G, there are still only two participants joined in the live communication session. In some embodiments, after a further amount of time, device 600 ceases to display another primary representation and changes the layout of live communication user interface 804 to a 1-on-1 layout. As illustrated in FIG. 8H, device 600 ceases to display primary representation 810C and enlarges primary representation 810B to a full screen size. In some embodiments, device 600 changes from the layout of FIG. 8G to the layout of FIG. 8H a predetermined amount of time after selection of reminder affordance 808A. FIG. 8H illustrates a two-participant (e.g., 1-on-1) layout in which the remaining primary representation 810B is displayed in full screen and is overlapped by user representation 806. As illustrated in FIG. 8H, remaining primary representation 810B and user representation 806 are vertically elongated rectangles (e.g., in profile orientation), compared to the square shapes of the primary representations 810 and user representation 806 in the 4-on-1, 3-on-1, and 2-on-1 layouts illustrated in FIGS. 8E-8G, respectively.

Figure 8I:
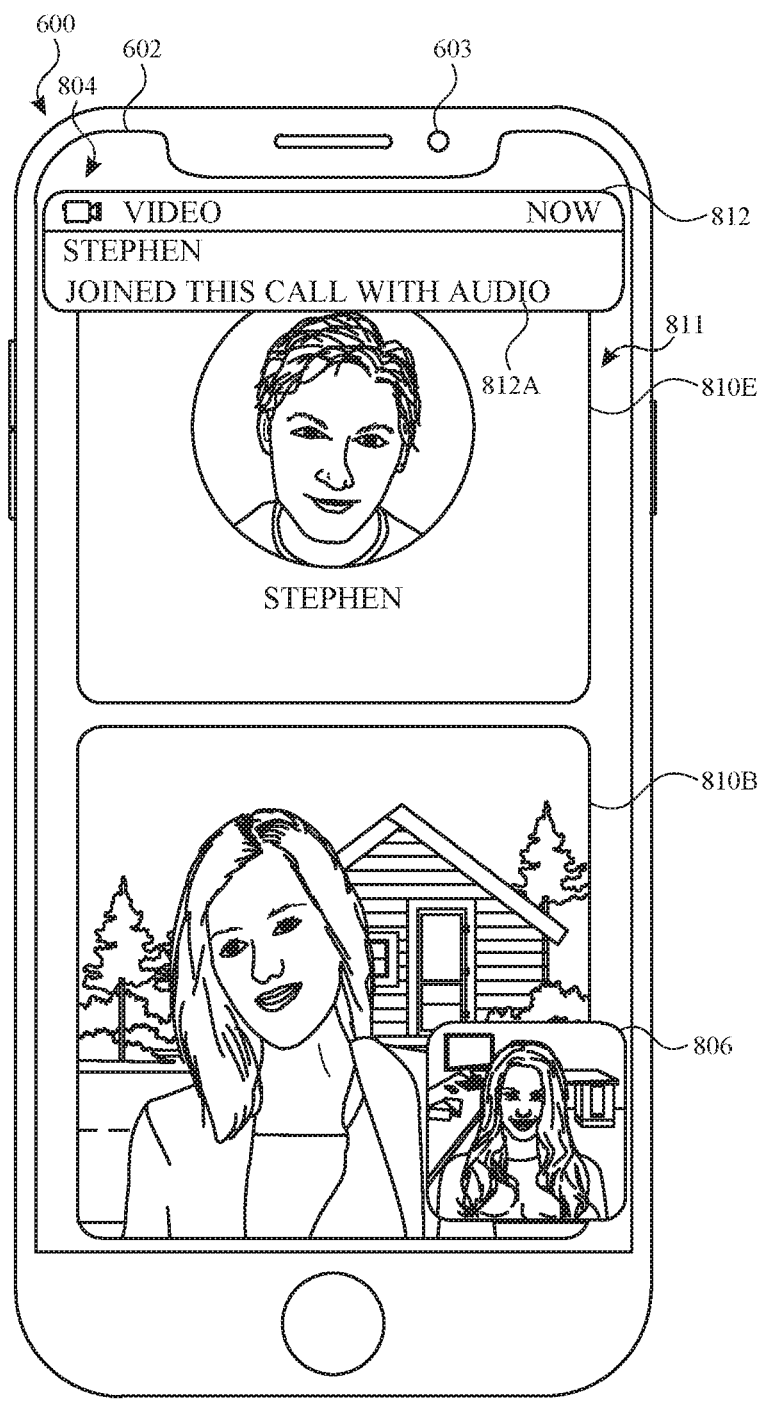

Turning to FIG. 8I, a third participant, Stephen, joins the live communication session. As illustrated in FIG. 8I, in response to participant Stephen joining the live communication session, device 600 transitions from display of the 1-on-1 layout of FIG. 8H to the 2-on-1 layout, with primary representation 810E of the most recently joined participant above representation 810B of the existing participant (other than the user of device 600). In some embodiments, device 600 displays notification 812 and/or generates an audio or haptic output indicating that a participant has joined the live communication session, as illustrated in FIG. 8I. In some embodiments, since a new primary representation is displayed when participant Stephen joins the live communication session, device 600 refrains from displaying notification 812 or generating an audio or haptic output, as primary representation 810E serves as an indication that a participant has joined the live communication session.

Figure 8J:
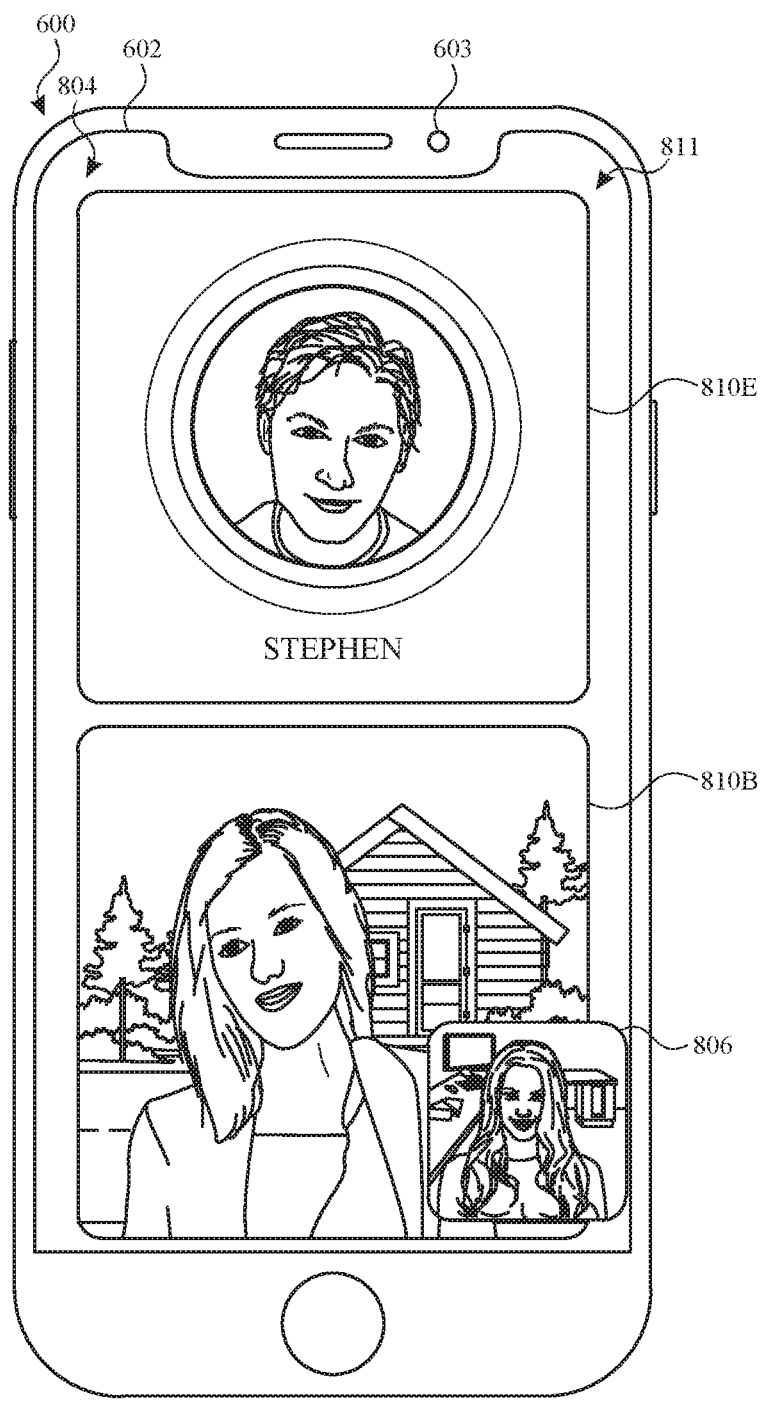

Participant Stephen joins the live communication session in an audio only mode and provides live audio data without video. The audio-only communication status of participant Stephen is indicated by primary representation 810E and notification 812. Primary representation 810E indicates the audio-only communication status by displaying the participant's name and an avatar associated with the participant. Notification 812 indicates the communication status with text ("JOINED THIS CALL WITH AUDIO"). As illustrated in FIG. 8J, device 600 ceases to display notification 812 (e.g., after a predetermined amount of time after participant Stephen joins the live communication session).

In some embodiments, in response to receiving data indicating that a participant that is joined via audio only is actively participating (e.g., speaking), device 600 displays a visual indication on the representation of the participant who is speaking. In FIG. 8J, the representative image (e.g., avatar) within primary representation 810E is animated (e.g., with "voice circles") to indicate that participant Stephen is speaking.

Figure 8K:
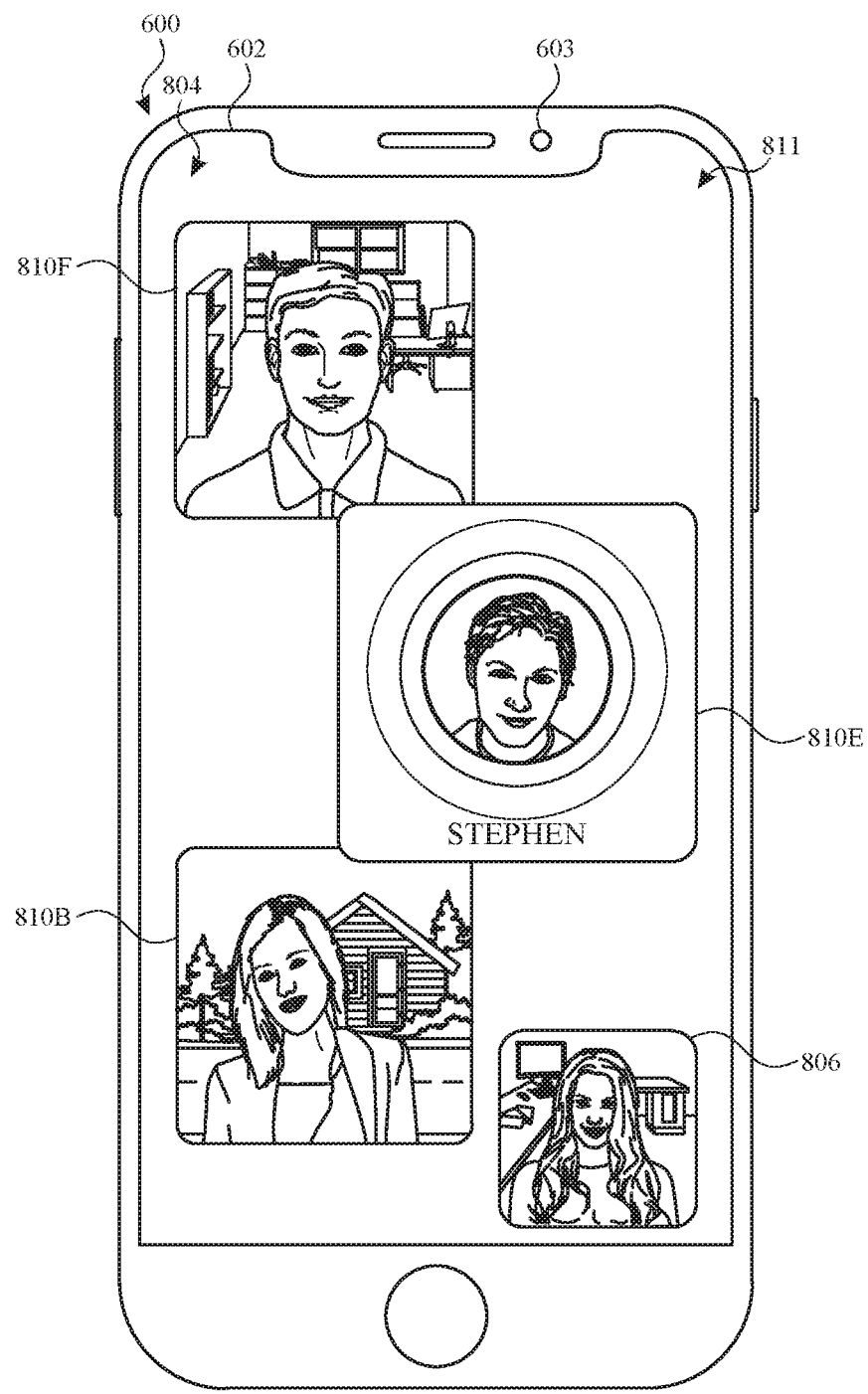

Turning to FIG. 8K, a fourth participant, Marcel, joins the live communication session. As illustrated in FIG. 8K, in response to the fourth participant joining the live communication session, device 600 transitions from the 2-on-1 layout to the 3-on-1 layout (e.g., as illustrated in FIG. 8F), with primary representation 810F of the most recently joined participant above primary representations 810B and 810E of the existing participants (other than the user of device 600).

Participant Marcel joins the live communication session in a video mode and provides live video and audio data. The video communication status of participant Marcel is indicated by primary representation 810F. Primary representation 810F indicates the video communication status by displaying a live video stream. As illustrated in FIG. 8K, device 600 does not immediately display a notification indicating that participant Marcel has joined the live communication session.

Figure 8L:
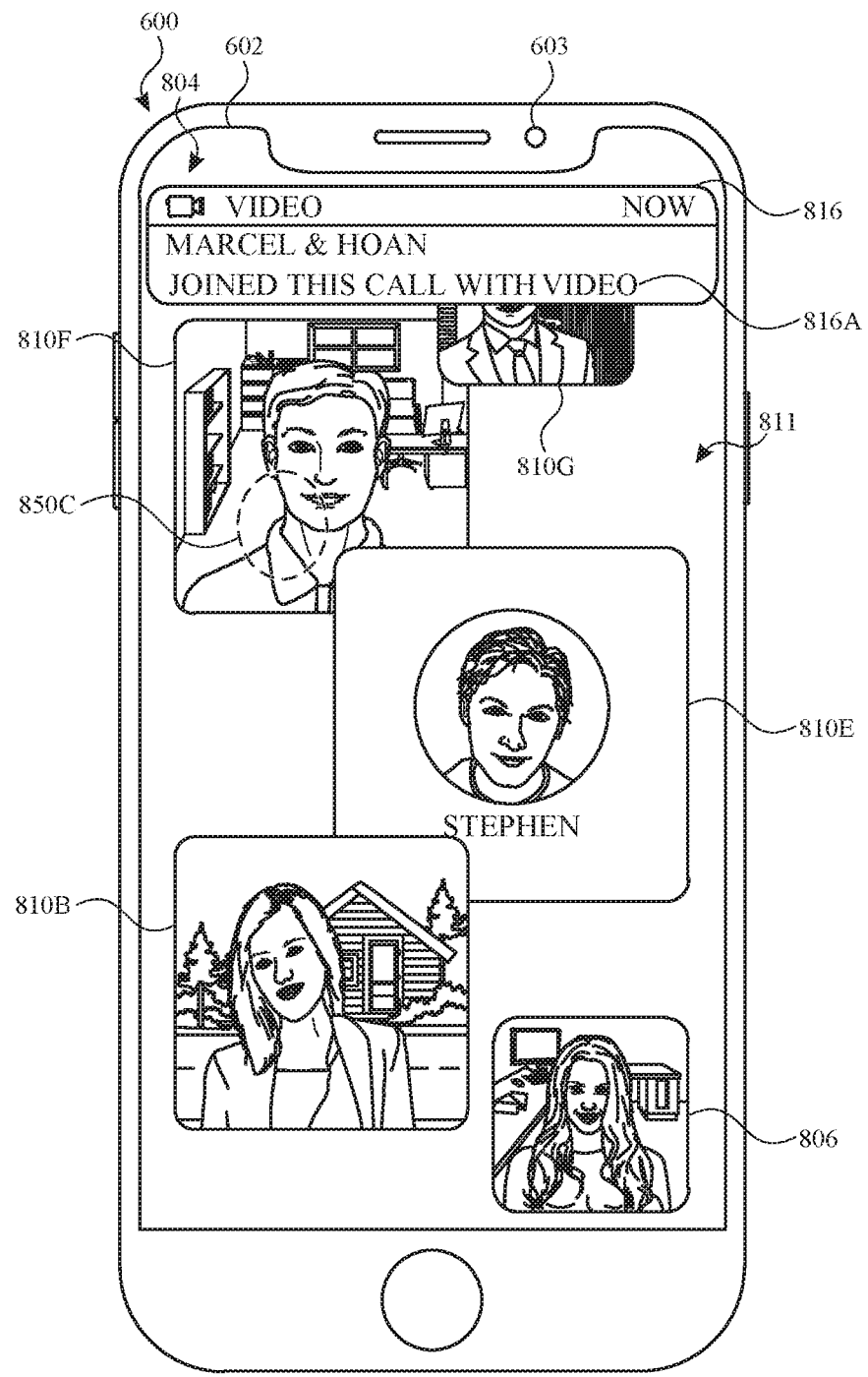

Turning to FIG. 8L, a fifth participant, Hoan, joins the live communication session. As illustrated in FIG. 8L, in response to participant Hoan joining the live communication session, device 600 transitions from the 3-on-1 layout to the 4-on-1 layout, with primary representation 810G of the most recently joined participant as the smallest primary representation and positioned above and to the right of primary representation 810F. In some embodiments, in accordance with a determination that participants Marcel and Hoan both joined the live communication session within a predetermined window of time, device 600 displays combined notification 816 indicating that participants Marcel and Hoan have joined the live communication session, as illustrated in FIG. 8L. In some embodiments, combined notification 816 is displayed in accordance with a determination that the participants joined with the same communication status (e.g., video).

As indicated by the live video stream displayed in primary representation 810G and the representation 816A of the video camera in notification 816, participant Hoan joins the live communication session in a video mode such that device 600 receives live video and audio data associated with participant Hoan.

Figure 8M:
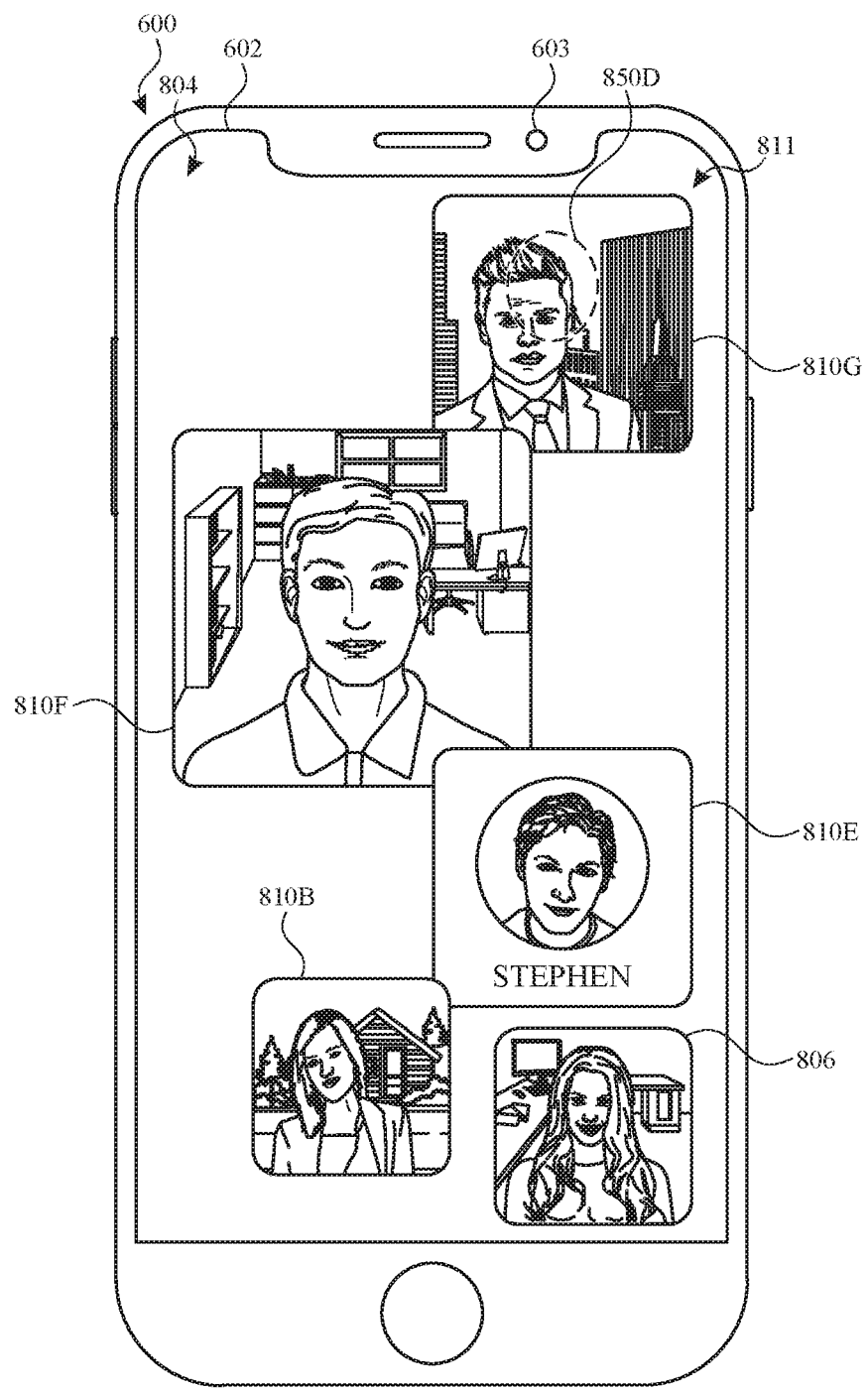

As illustrated in FIG. 8L, device 600 receives (e.g., detects) user input 850C (e.g., a double tap) on display 602 at a location of primary representation 810F. In some embodiments, as illustrated in FIG. 8M, in response to receiving user input 850C, device 600 enlarges primary representation 810F to the largest representation size and reduces primary representation 810E to a medium size (while maintaining the 4-to-1 layout). As illustrated in FIG. 8M, device 600 ceases to display notification 816 (e.g., after a predetermined amount of time after participant Hoan joins the live communication session).

In some embodiments, the configuration of a layout is dynamically changed in response to receiving data indicating that a participant is actively participating in the live communication session. In FIG. 8M, device 600 receives data indicating that participant Hoan, corresponding to primary representation 810G is actively participating. As illustrated in FIG. 8M, in response to receiving data indicating that the participant corresponding to primary representation 810G is actively participating, device 600 enlarges primary representation 810G from the small representation size to a medium representation size and reduces primary representation 810B from a medium representation size to the small representation size. In this way, the 4-on-1 layout maintains one small sized representation, two medium sized representations, and one large sized representation.

Figure 8N:
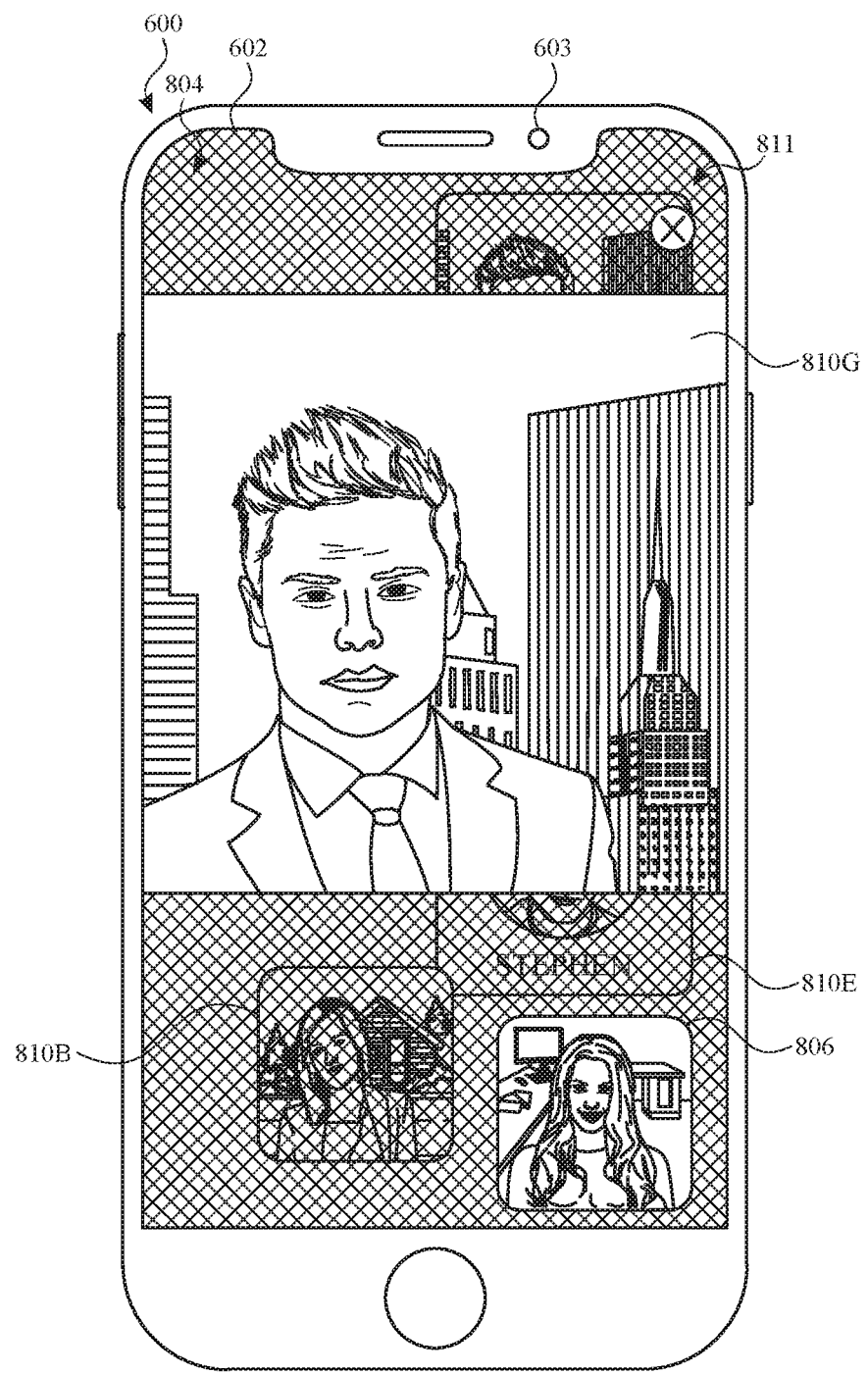

As illustrated in FIG. 8M, device 600 receives (e.g., detects) user input 850D (e.g., a double tap) on display 602 at a location of primary representation 810G. In some embodiments, as illustrated in FIG. 8N, in response to receiving user input 850D, device 600 enlarges primary representation 810G and brings primary representation 810G to the foreground in front of the other displayed primary representations. The background behind enlarged primary representation 810G is greyed out, except for user representation 806.

Figure 8O:
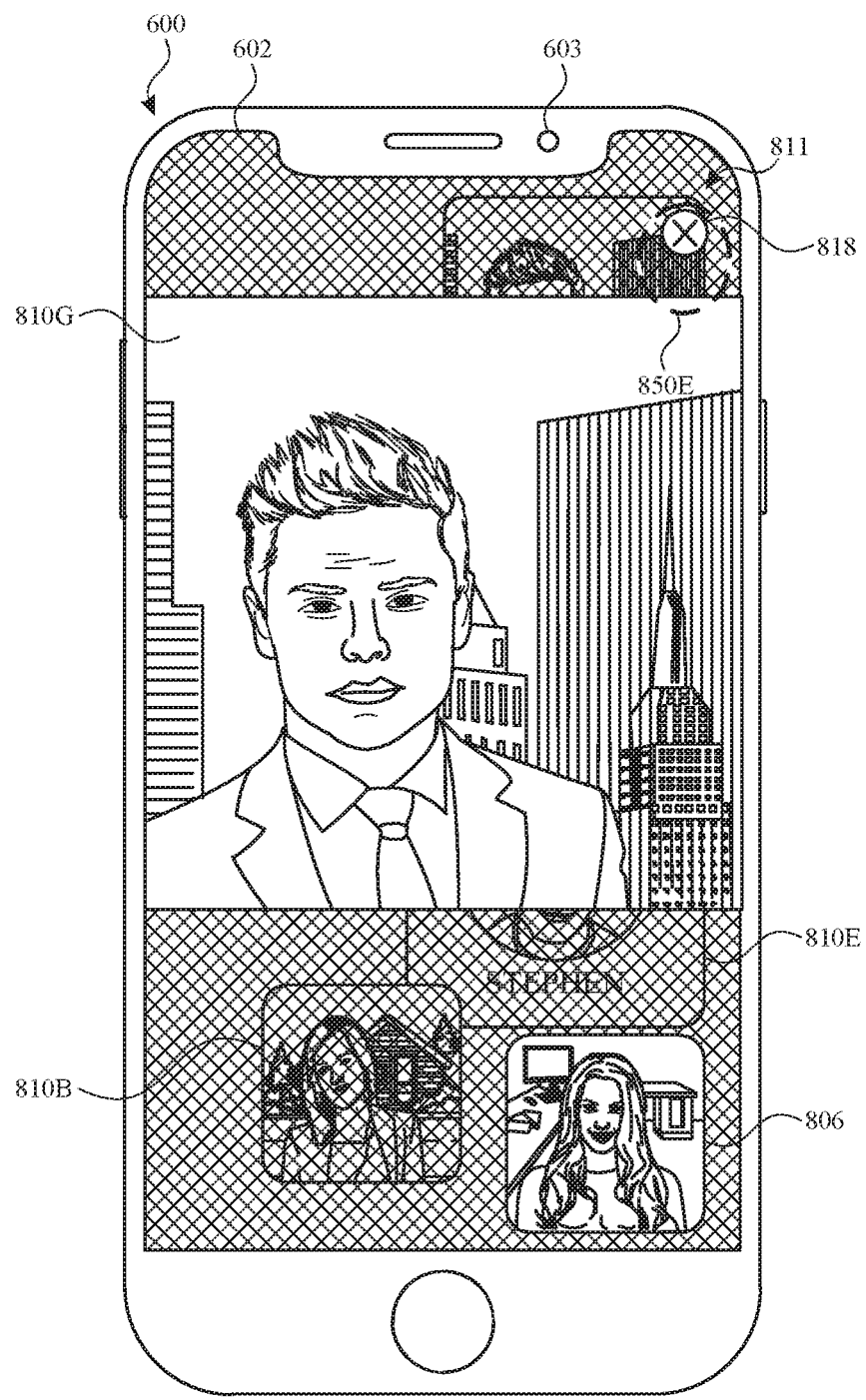
Figure 8P:
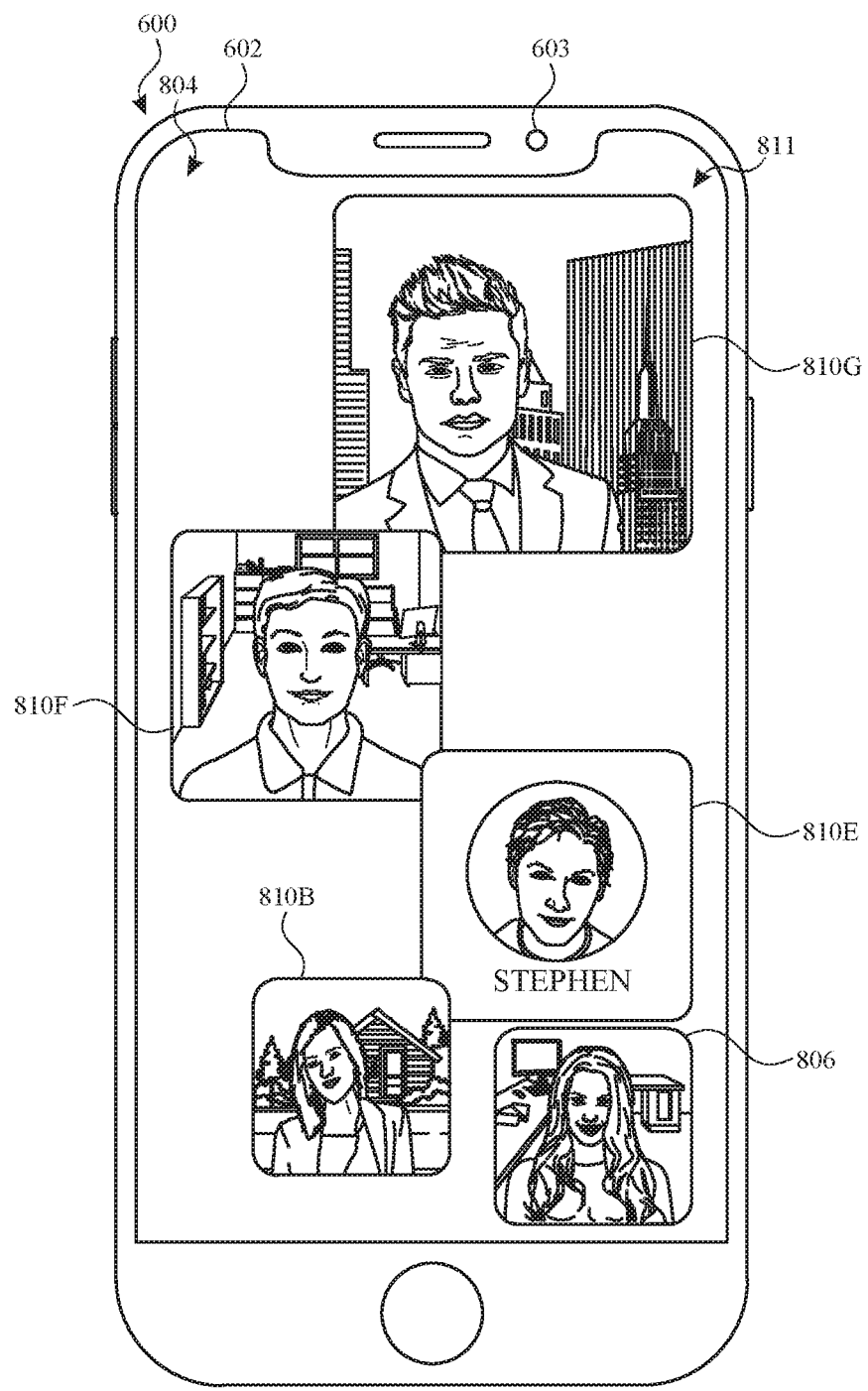

As illustrated in FIG. 8O, device 600 receives (e.g., detects) user input 850E (e.g., a tap) on cancel affordance 818. As illustrated in FIG. 8P, in response to receiving user input 850E, device 600 reduces the size of primary representation 810G and returns the display to the 4-on-1 layout displayed prior to user input 850D, except with primary representation 810G occupying the large size primary representation instead of primary representation 801F, which is reduced to a medium representation size.

Figure 8Q:
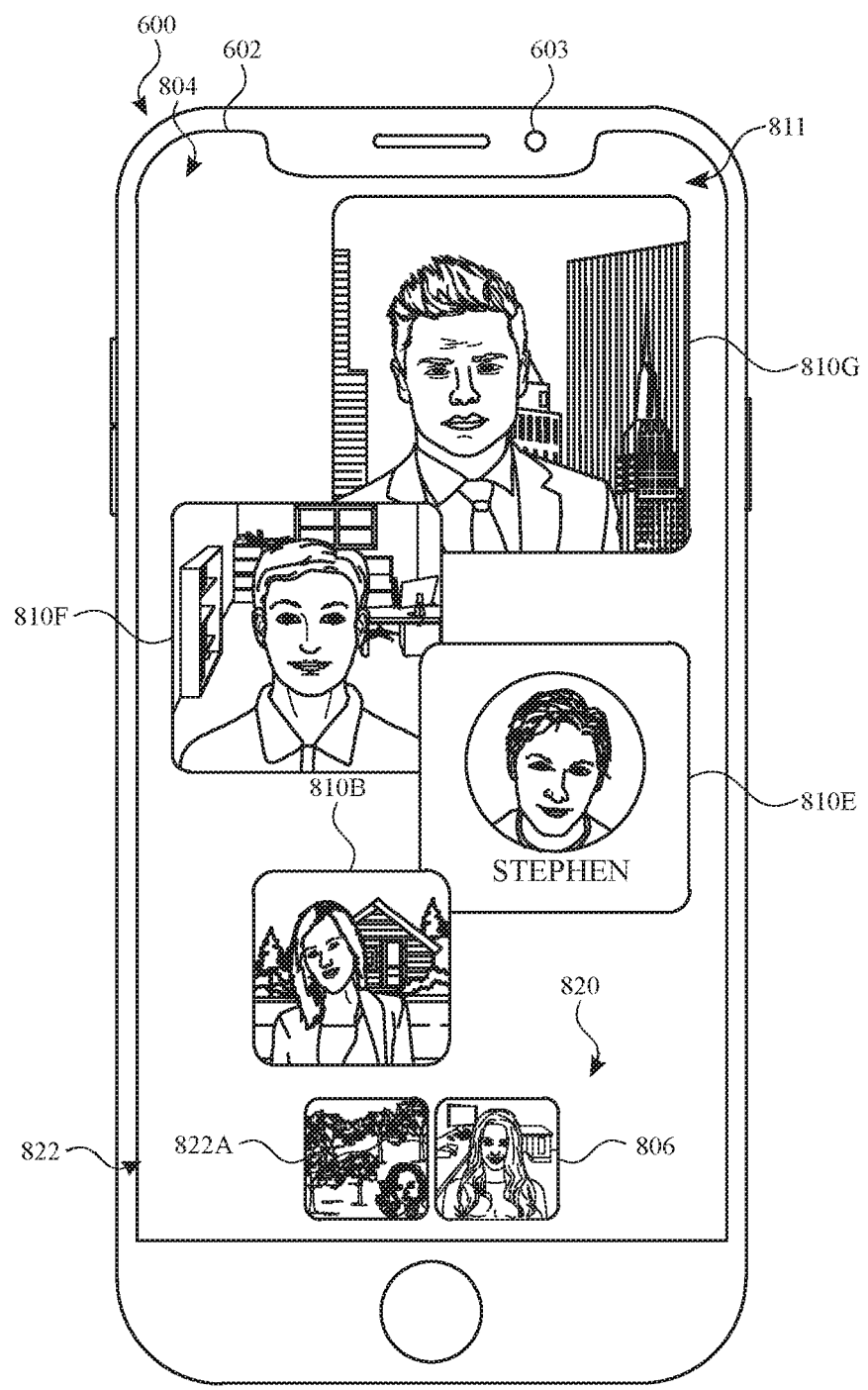

Turning to FIG. 8Q, a sixth participant joins the live communication session. As illustrated in FIG. 8Q, in response to the sixth participant joining the live communication session, and in accordance with the number of connected participants exceeding the predetermined threshold of five participants, device 600 displays overflow representation 822A of the sixth participant in overflow region 820 and moves user representation 806 to overflow region 820, with overflow representation 822A to the left of user representation 806. As illustrated in FIG. 8Q, overflow representation 822A and user representation 806 are centrally aligned in overflow region 820. In some embodiments, device 600 replaces the smallest of the primary representations (e.g., 810B) with a representation of a newly joined participant (e.g., the sixth participant) and displays an overflow representation of the replaced participant in overflow region 820 (e.g., representation 810B is reduced in size and moved to overflow region 820 in the location of overflow representation 822A). In some embodiments, in response to the sixth participant joining the live communication session, and in accordance with the number of connected participants exceeding the predetermined threshold of five participants, device 600 displays overflow representations of the currently joined participants or all of the participants (currently joined and invited) in the overflow region, as illustrated, e.g., in FIG. 8AY.

As illustrated in FIG. 8Q, the overflow region 820 and the primary representations 810 do not overlap. In some embodiments, to make room for the overflow region, device 600 reduces the size and/or vertically translates one or more of the primary representations. In some embodiments, device 600 reduces the size of the medium sized primary representations and maintains the size of the small and large primary representations. In some embodiments, device 600 reduces the vertical separation and/or increases the vertical overlap between the primary representations.

Figure 8R:
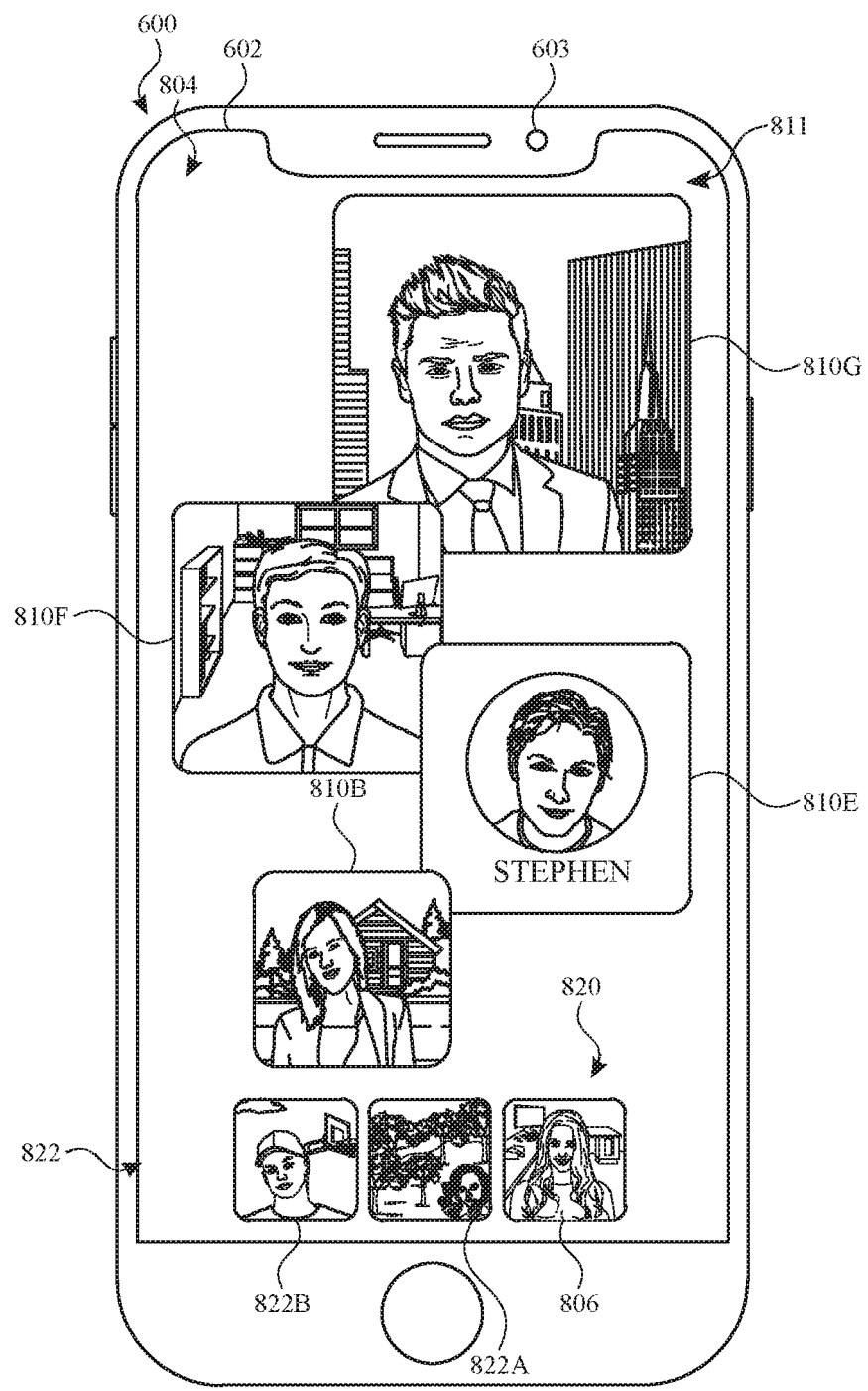

As illustrated in FIG. 8R, a seventh participant joins the live communication session. In response to the seventh participant joining the live communication session, device 600 adds overflow representation 822B of the seventh participant in overflow region 820 to the left of overflow representation 822A. As illustrated in FIG. 8R, overflow representation 822A and user representation 806 are moved to the right (compared to FIG. 8Q) such that overflow representations 822A and 822B and user representation 806 are centrally aligned in overflow region 820. In some embodiments, overflow representation 822B of the seventh participant is added to the right of overflow representation 822A, between overflow representation 822A and user representation 806. In the embodiment illustrated in FIG. 8AZ, in response to the seventh participant joining the live communication session, device 600 replaces the smallest primary representation (e.g., 810H in FIG. 8AY) with primary representation 810I, and changes overflow representation 822F corresponding to participant Pablo from a placeholder to a live video stream.

Figure 8S:
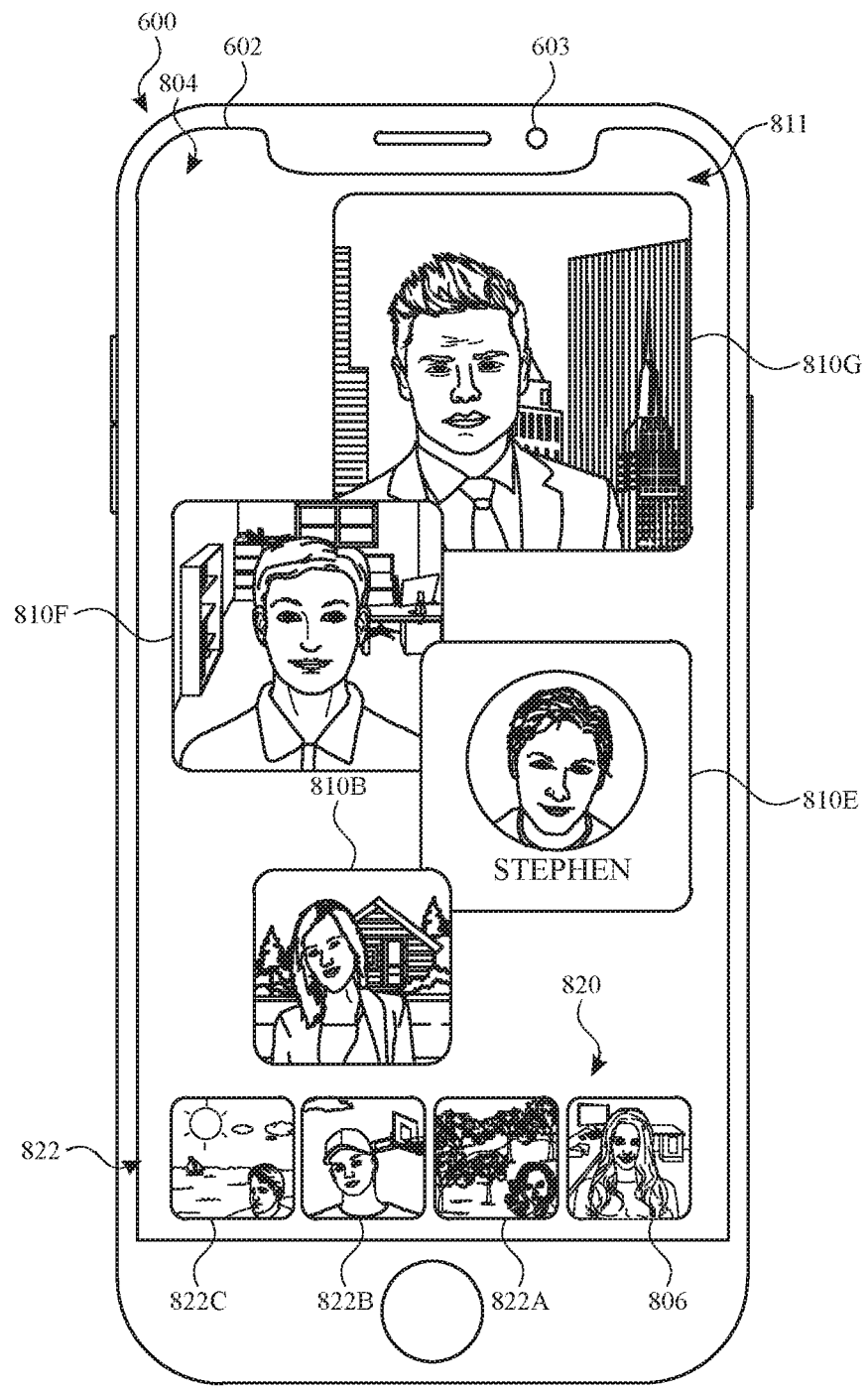

As illustrated in FIG. 8S, an eighth participant joins the live communication session. In response to the eighth participant joining the live communication session, device 600 adds overflow representation 822C of the eighth participant in overflow region 820 to the left of overflow representation 822B. As illustrated in FIG. 8S, overflow representations 822A and 822B and user representation 806 are moved to the right (compared to FIG. 8Q) such that overflow representations 822A, 822B, and 822C and user representation 806 are centrally aligned in overflow region 820.

Figure 8T:
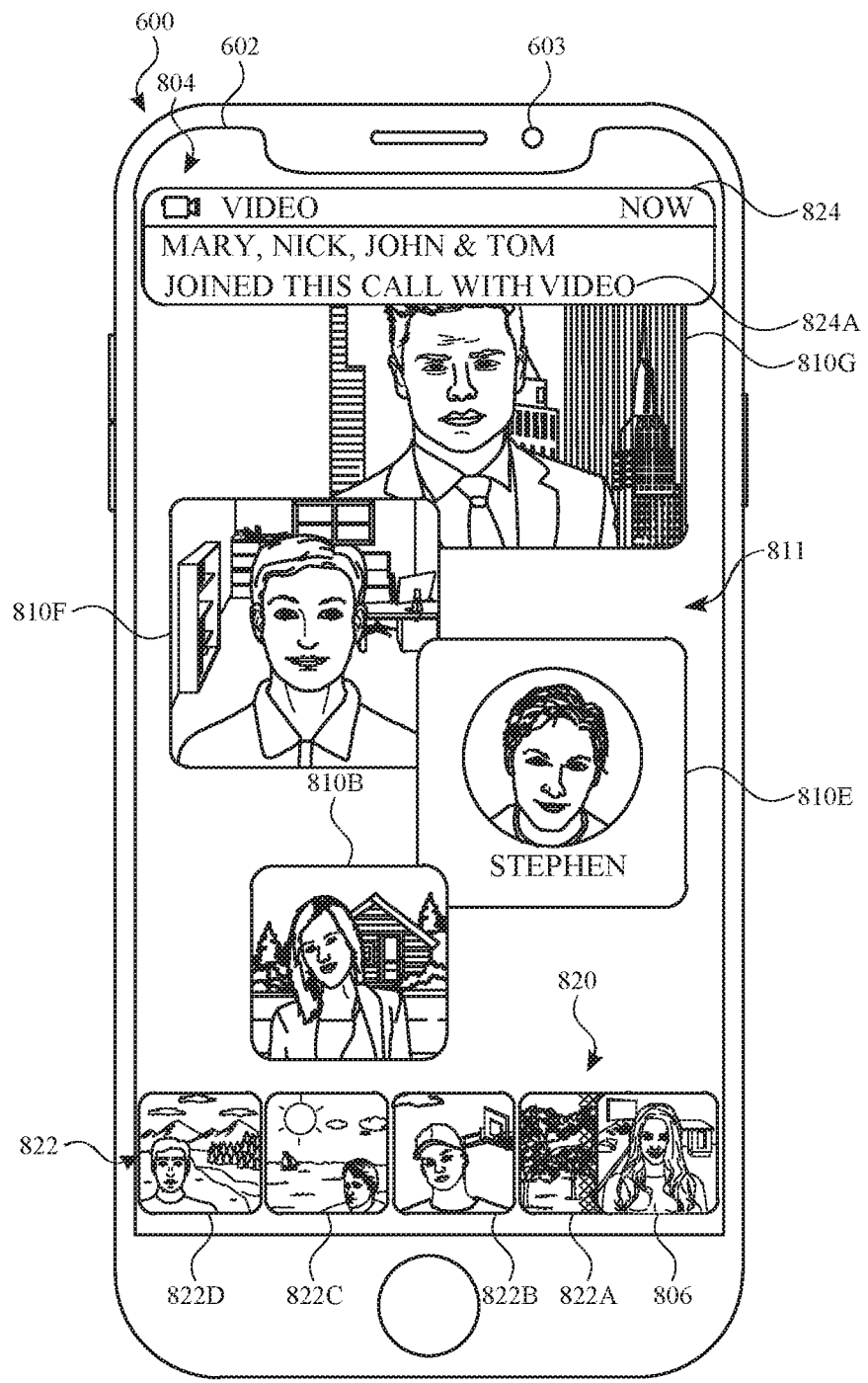

As illustrated in FIG. 8T, a ninth participant joins the live communication session. In response to the ninth participant joining the live communication session, device 600 adds overflow representation 822D of the ninth participant in overflow region 820 to the left of overflow representation 822C. As illustrated in FIG. 8T, overflow representations 822D, 822C, and 822B and user representation 806 are fully displayed. Overflow representation 822A is partially displayed, with the right side portion overlapped by user representation 806. Overflow representation 822A is shaded (e.g., with a shadow effect) where overflow representation 822A meets user representation 806. In the illustrated embodiment, the size of overflow representations 822 and user representation 806 remain the same as the seventh, eighth, and ninth participants join the live communication session. FIG. 8T illustrates that device 600 displays combined notification 824 indicating that participants Mary, Mick, John, and Tom have joined the live communication (represented by overflow representations 822A, 822B, 822C, and 822D, respectively). In some embodiments, as additional participants (e.g., beyond the ninth participant) join the live communication session, overflow representations of newly joined participants are added to the left end of the existing overflow representations, with the existing overflow representations shifting to the right in overflow region 820 to make room for the new overflow representation and user representation 806 remaining fully displayed at the right side of overflow region 820 (e.g., existing overflow representations are scrolled to the right "underneath" user representation 806). In some embodiments, overflow representations of newly joined participants are added to the right end of the existing overflow representations, with user representation 806 remaining fully displayed at the right side of overflow region 820. In some embodiments, if the overflow region is fully occupied, a representation of a newly joined participant added to the right end of the existing overflow representations is not immediately displayed (e.g., the new overflow representation is displayed in response to scrolling the overflow representations to the left).

Figure 8U:
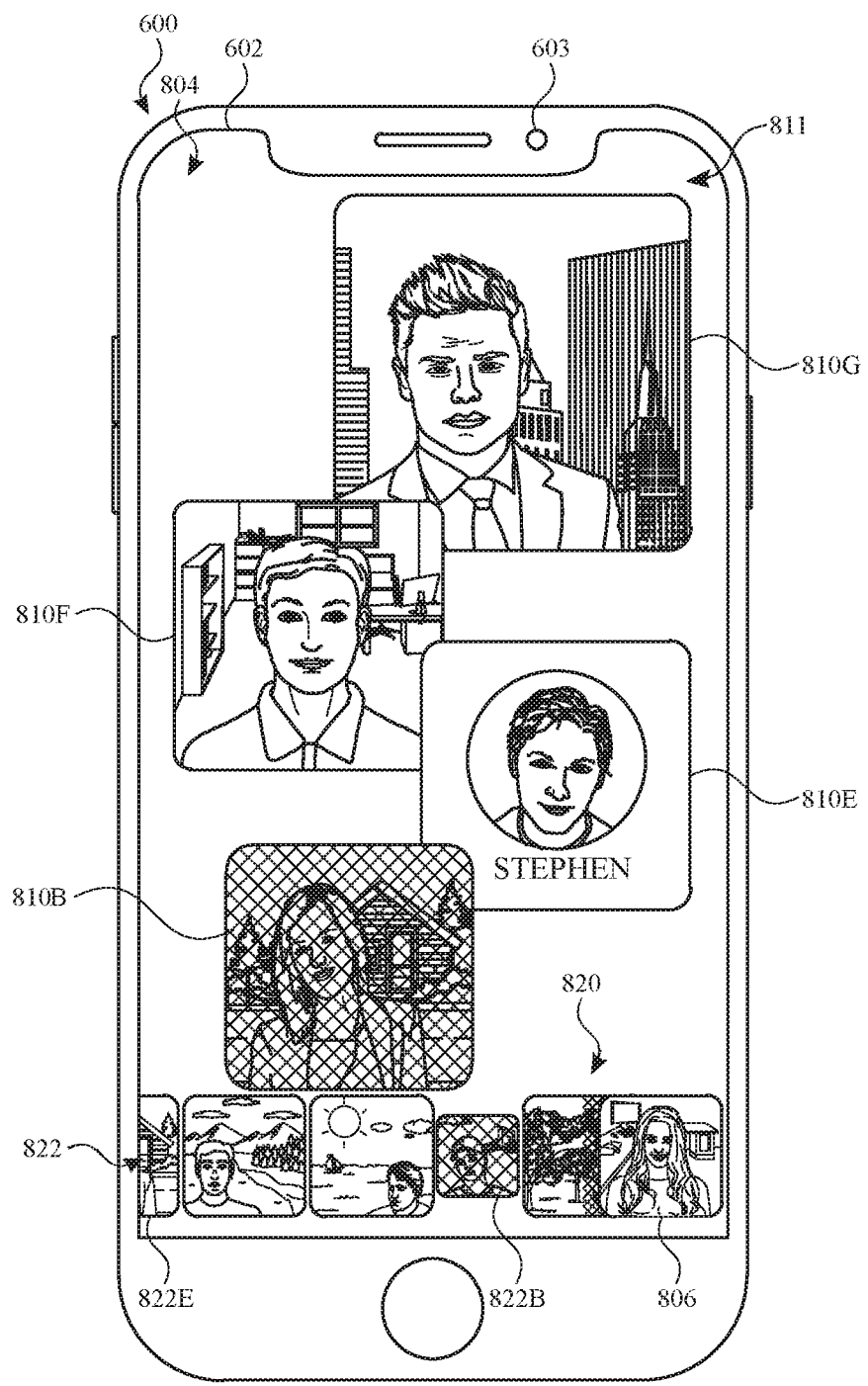
Figure 8V:
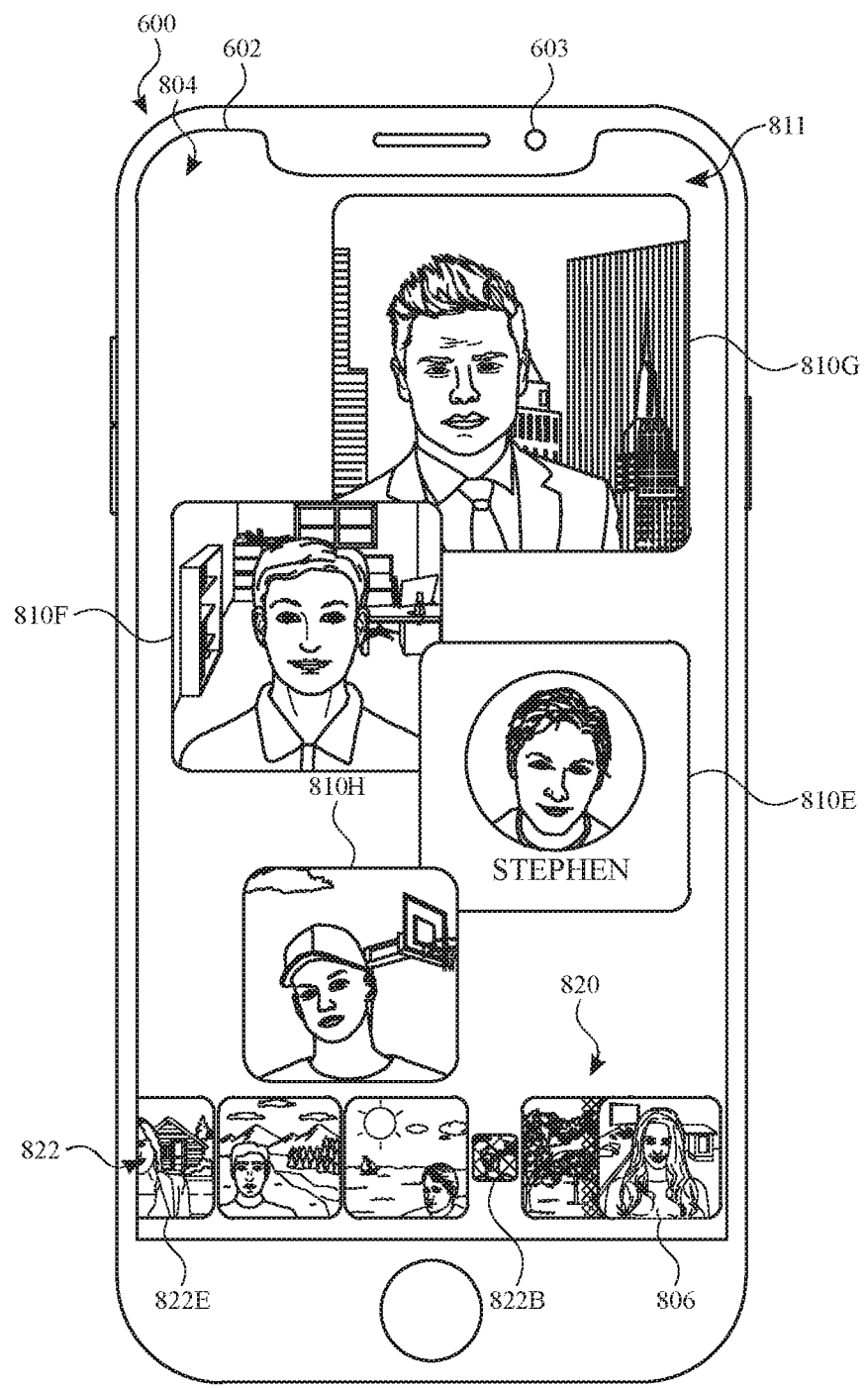
Figure 8W:
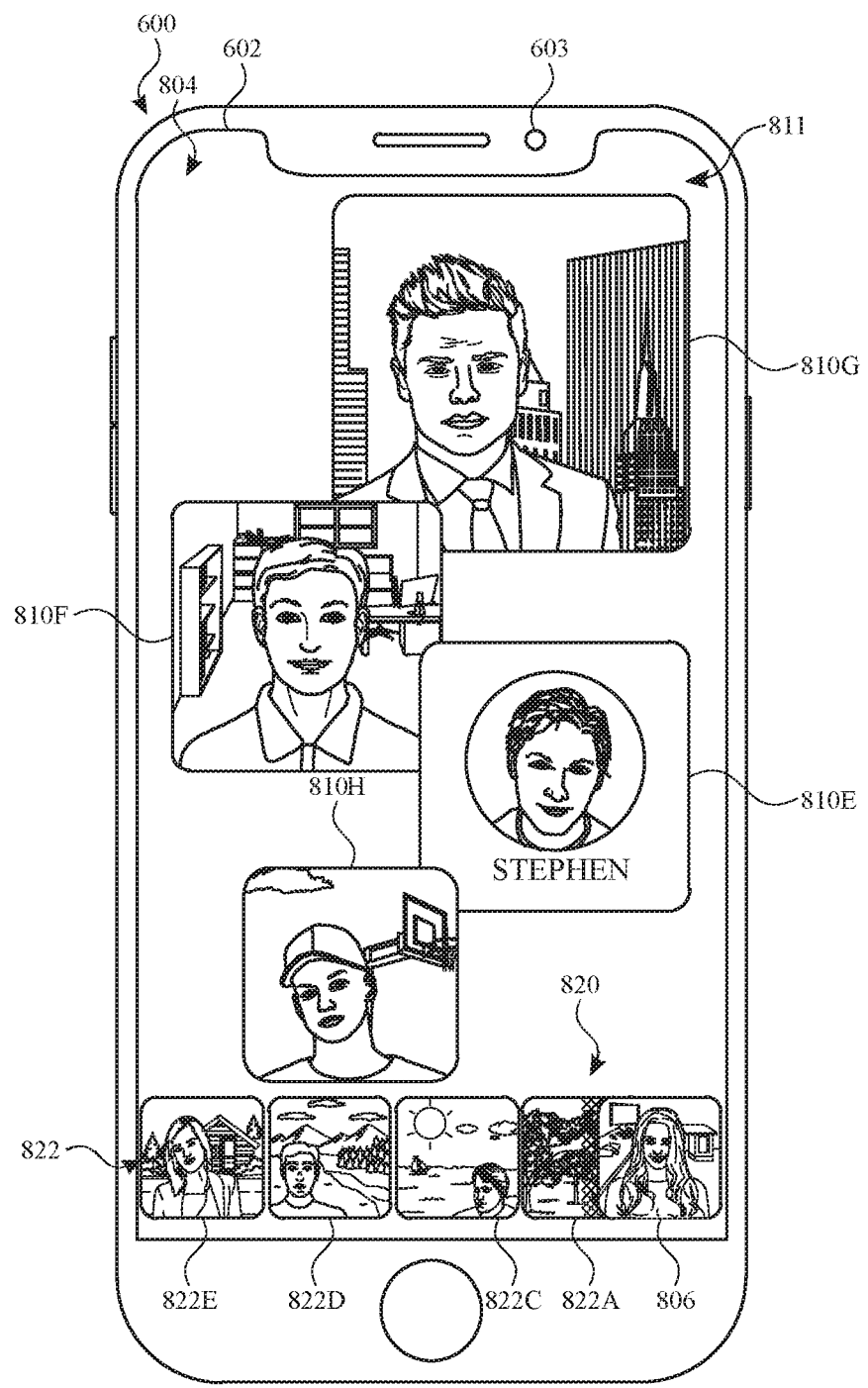

Turning to FIG. 8U, device 600 receives data indicating that the participant corresponding to overflow representation 822B actively participates in the live communication session. In some embodiments, device 600 replaces a primary representation with a representation of the actively participating participant in response to a determination that the activity level of the actively participating participant has increased above the activity level of a participant represented by a primary representation. In the illustrated embodiment, in response to receiving data indicating that the participant corresponding to overflow representation 822B actively participates in the live communication session, device 600 replaces the smallest primary representation with a representation of the actively participating participant and displays an overflow representation of the participant corresponding to the replaced primary representation. As illustrated in FIG. 8U, primary representation 810B (the smallest primary representation) is shaded or begins to fade out; overflow representation 822B of the actively participating participant is shaded or begins to fade and is reduced in size; and overflow representations 822C and 822D are shifted to the right as new overflow representation 822E corresponding to the participant of primary representation 810B (the primary representation being replaced) enters overflow region 820 from the left edge of display 602 to the left of overflow representation 822D. In some embodiments, primary representation 810B is slightly enlarged (e.g., to emphasize that it is being replaced). As illustrated in FIGS. 8V-8W, primary representation 810B is replaced with primary representation 810H of the actively participating participant; overflow representation 822B continues to shrink until it is removed; and overflow representations 822C and 822D continue shifting to the right until overflow representation 822E is fully displayed and overflow representation 822C occupies the position of overflow region 820 previously occupied by removed overflow representation 822B. In FIGS. 8U-8W, overflow representation 822A and user representation 806 remain in the same positions.

In some embodiments, in response to the user of device 600 actively participating, device 600 visually distinguishes user representation 806. In the embodiment illustrated in FIG. AZ, device 600 displays a bold border around user representation 806 and highlights the initials bar at the bottom of user representation 806.

Figure 8X:
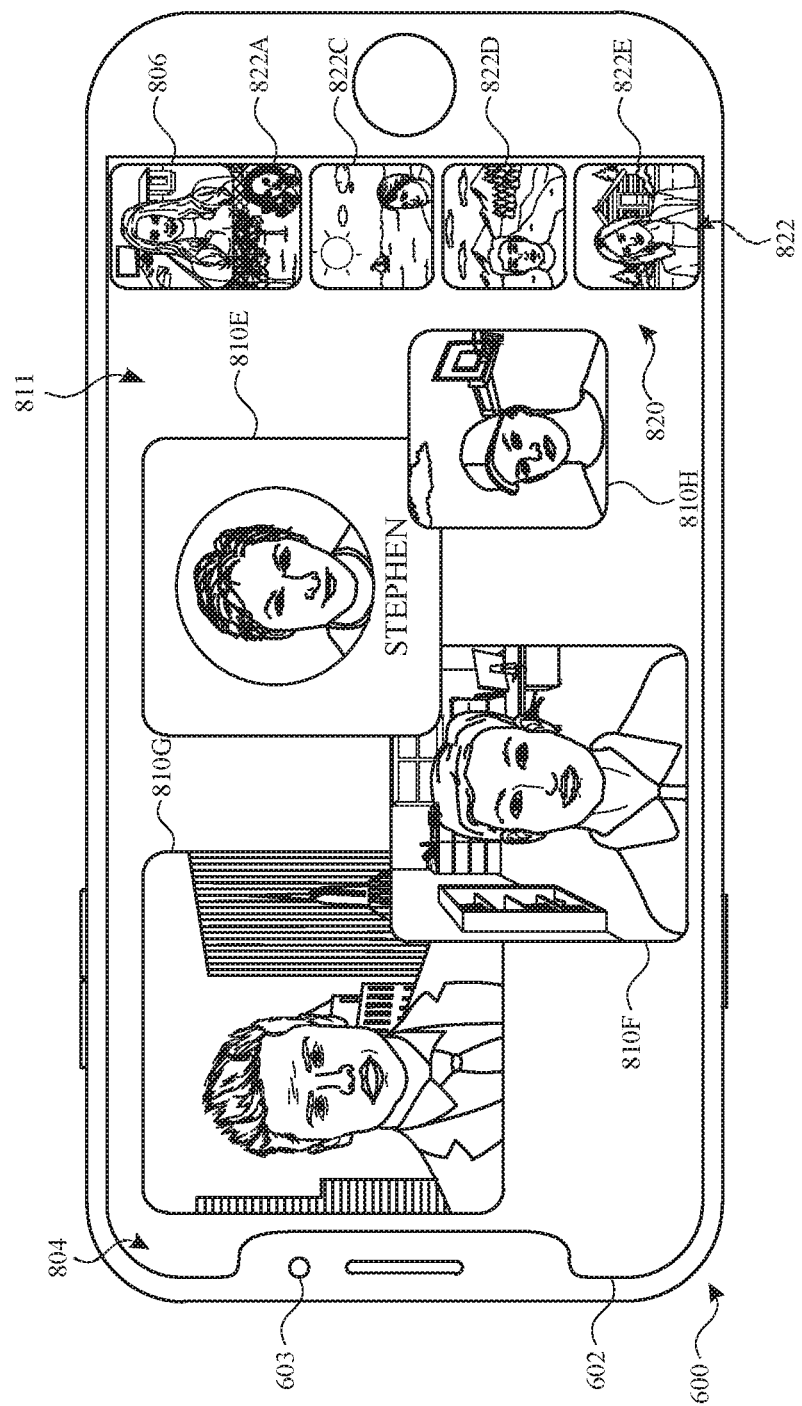

Turning to FIG. 8X, device 600 is rotated from a portrait (vertical) orientation to a landscape (horizontal) orientation. As illustrated in FIG. 8X, in response to device 600 being rotated, device 600 maintains the representations in the respective areas of display 602 occupied prior to rotation of device 600 (e.g., the user representation and each primary and overflow representation occupies the same area on display 602 before and after rotation of device 600). The images within the representations are rotated so that the participants appear upright relative to the landscape orientation. In some embodiments, device 600 displays an animated rotation of the primary representations or the images within the primary representations (e.g., 90 degrees opposite the direction of rotation of device 600). In some embodiments in which the overflow representations are not squares, video data of a participant is cropped and/or translated to include (e.g., center) a user's face in the respective overflow representation when device 600 is rotated. In some embodiments in which the primary representations are not squares, video data of a participant is cropped and/or translated to center a user's face in the respective primary representation when device 600 is rotated. In some embodiments, video data of a participant is cropped to include a user's face (e.g., regardless of whether or not device 600 is rotated, such as when received video data has a different aspect ratio or format than the representation in which it is displayed).

Figure 8Y:
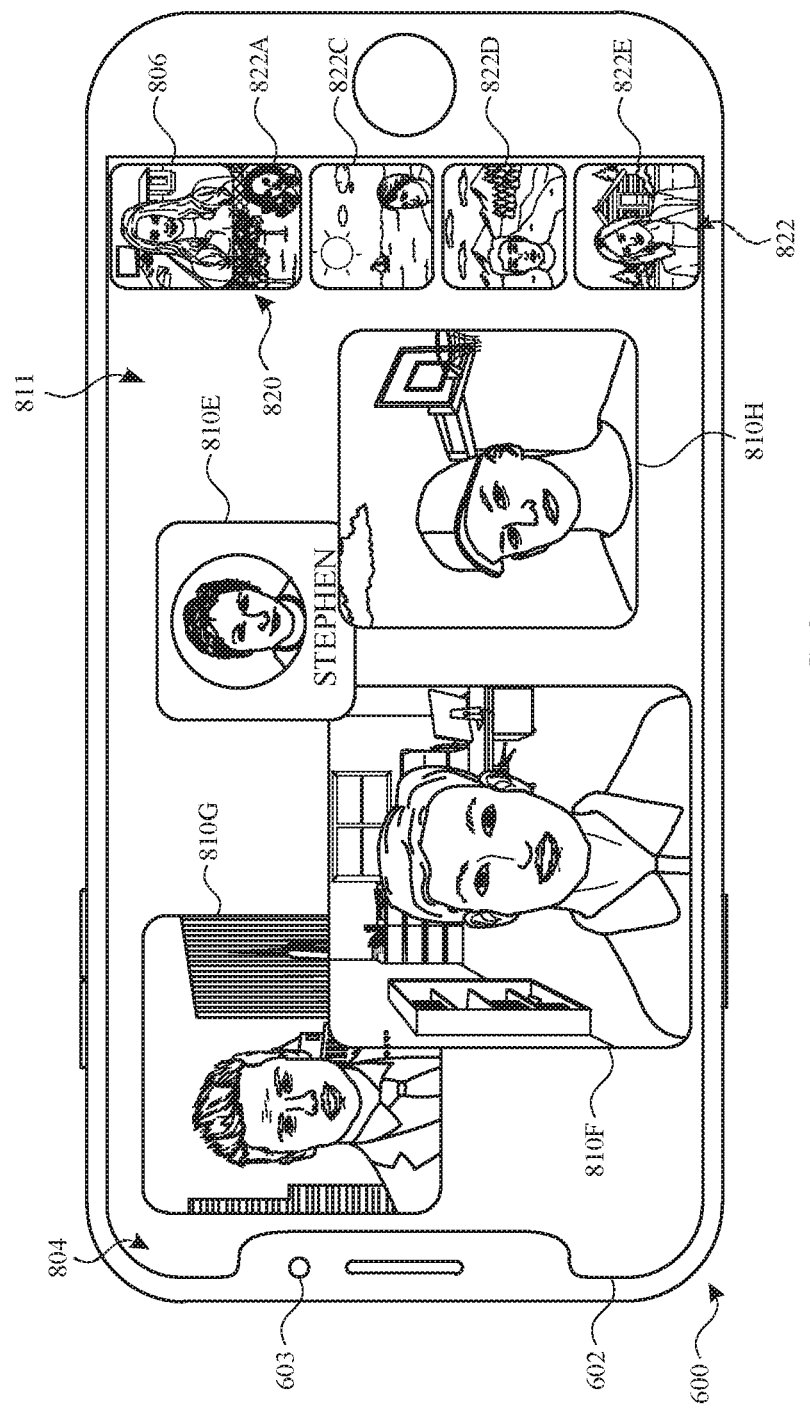

As illustrated in FIG. 8X, the participant corresponding to primary representation 810H begins actively participating. In response, device 600 enlarges primary representation 810H and reduces the size of primary representation 810E, as illustrated in FIG. 8Y. In the embodiment illustrated in FIGS. 8BA-8BB, device 600 visually distinguishes overflow representation 822F (e.g., emphasized initials bar) corresponding to the active participant.

Figure 8Z:
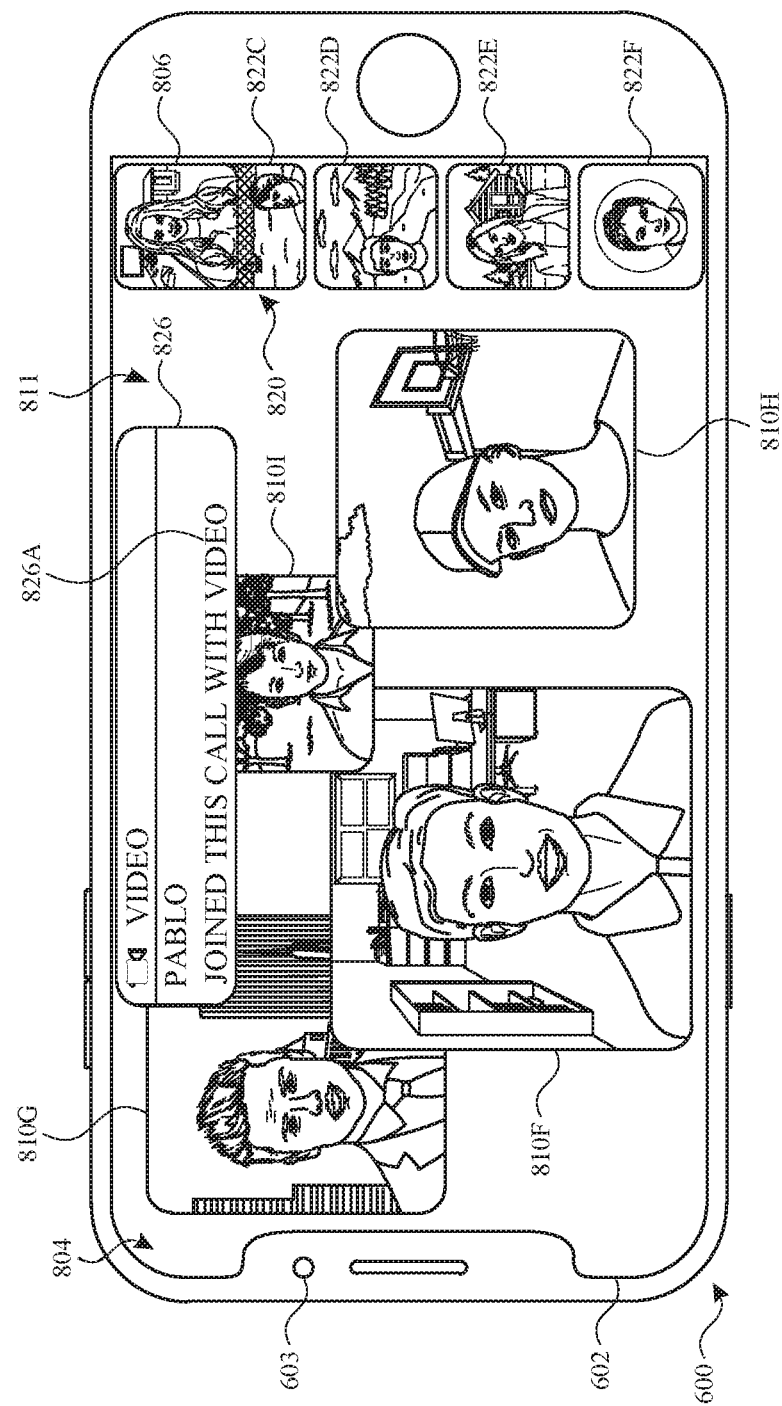
Figure 8A:
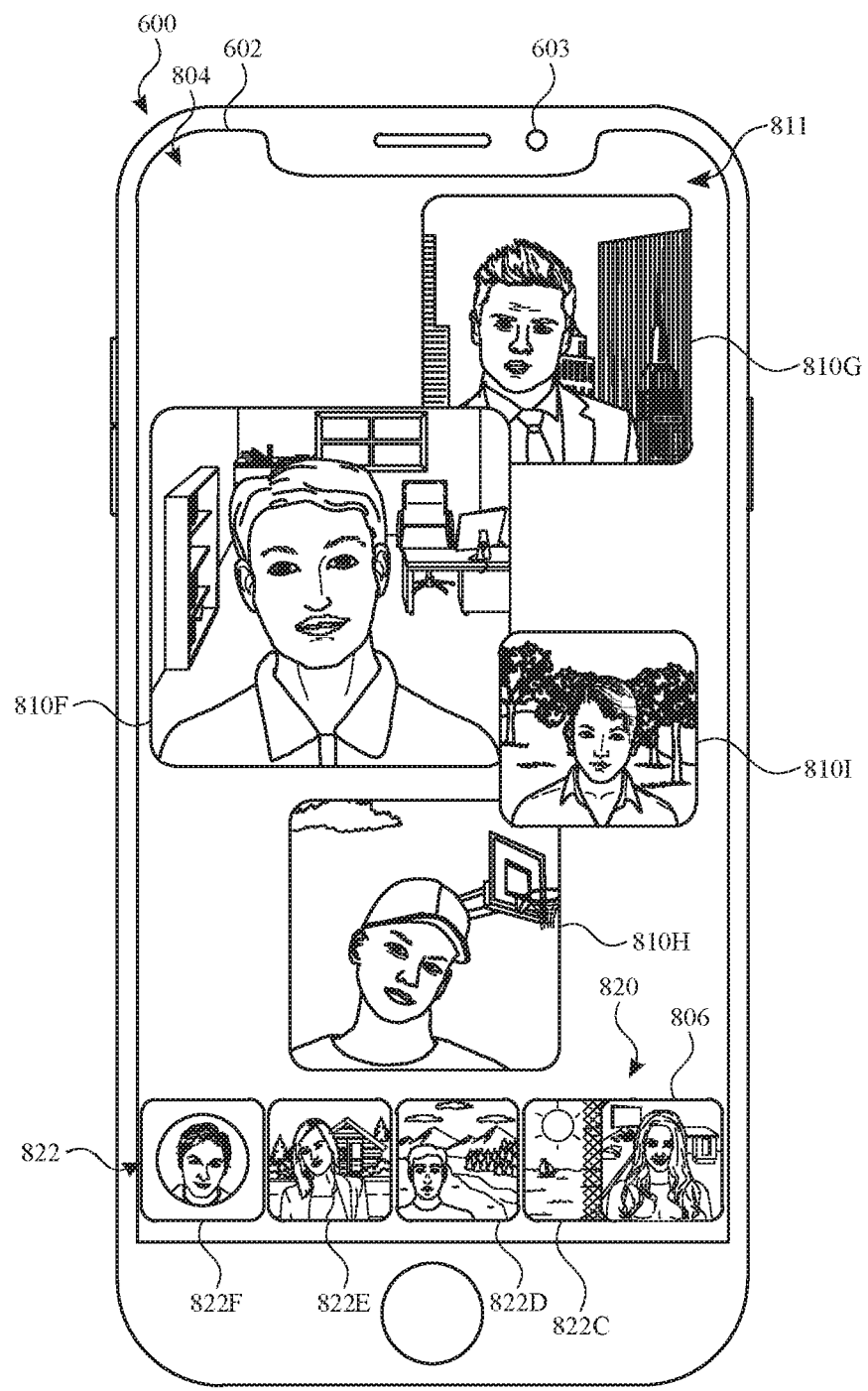
Figure 8A:
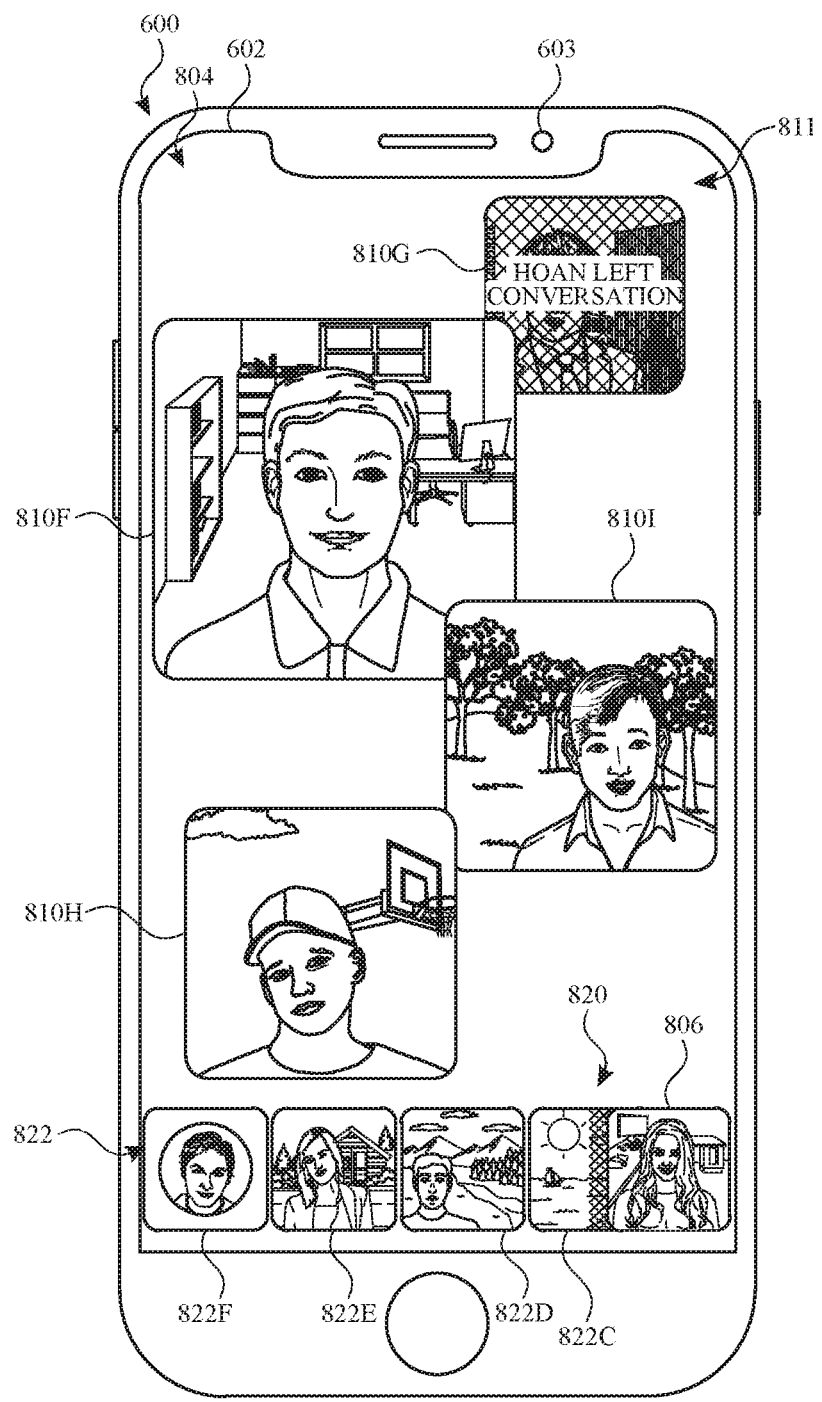
Figure 8A:
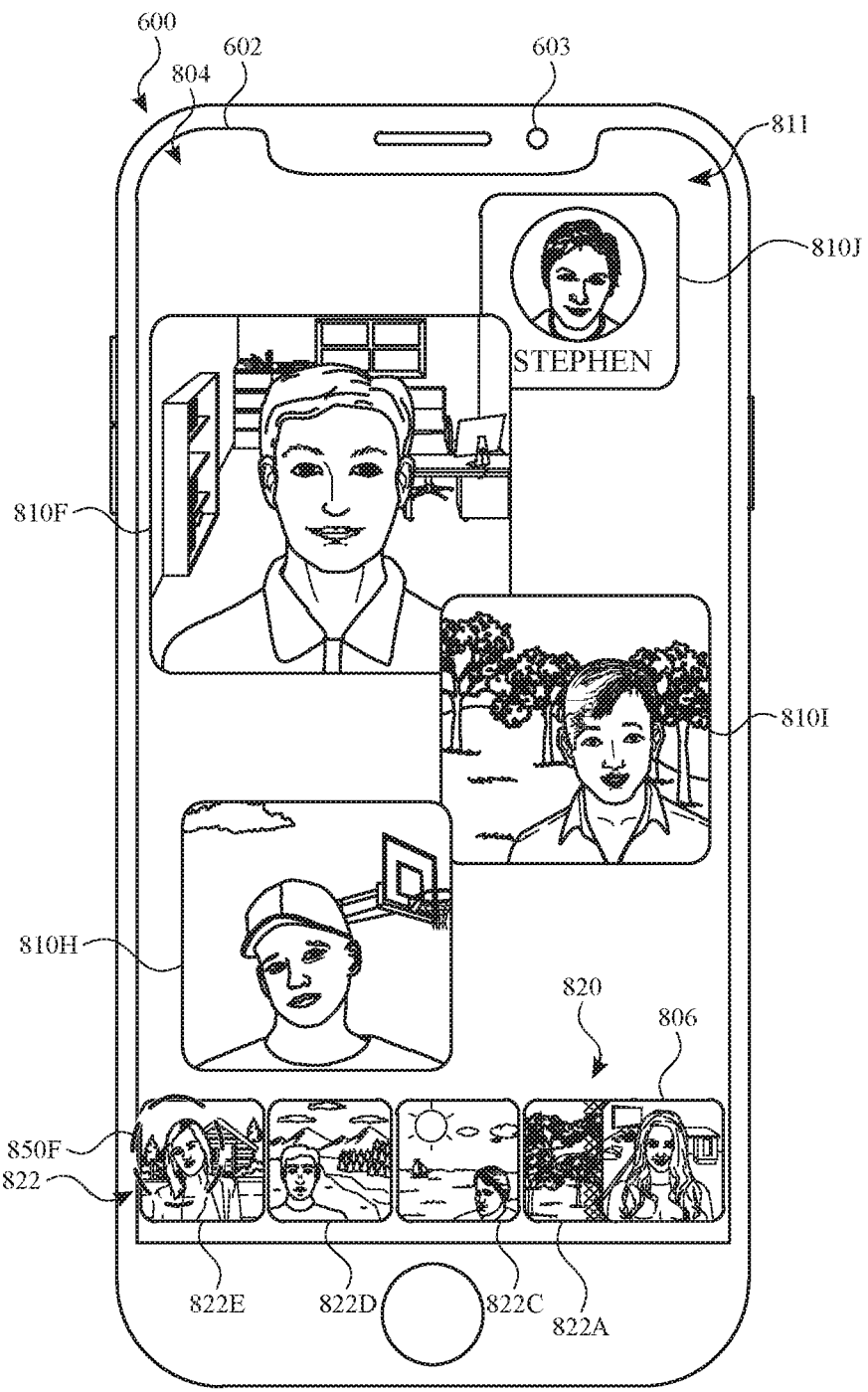
Figure 8A:
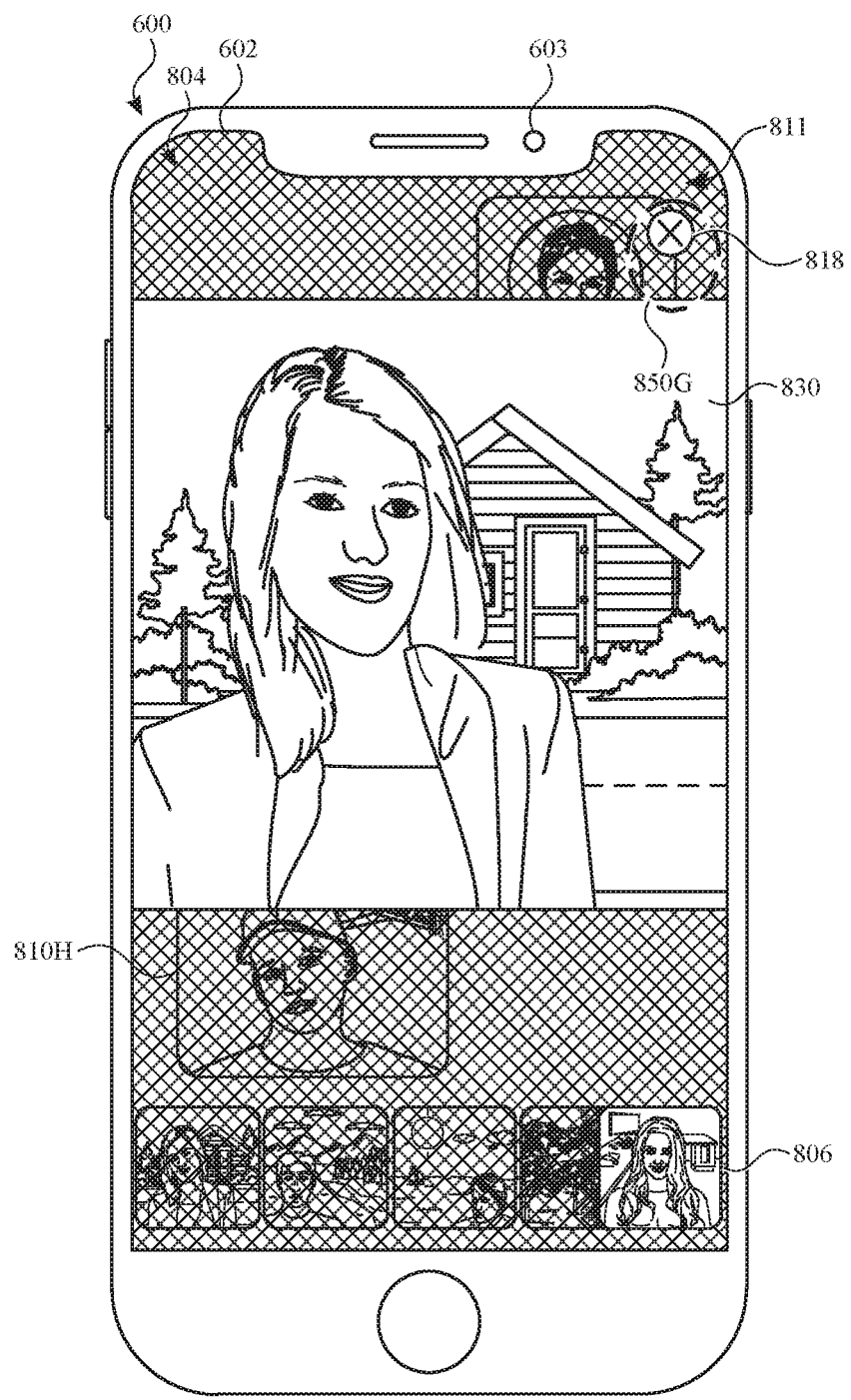
Figure 8A:
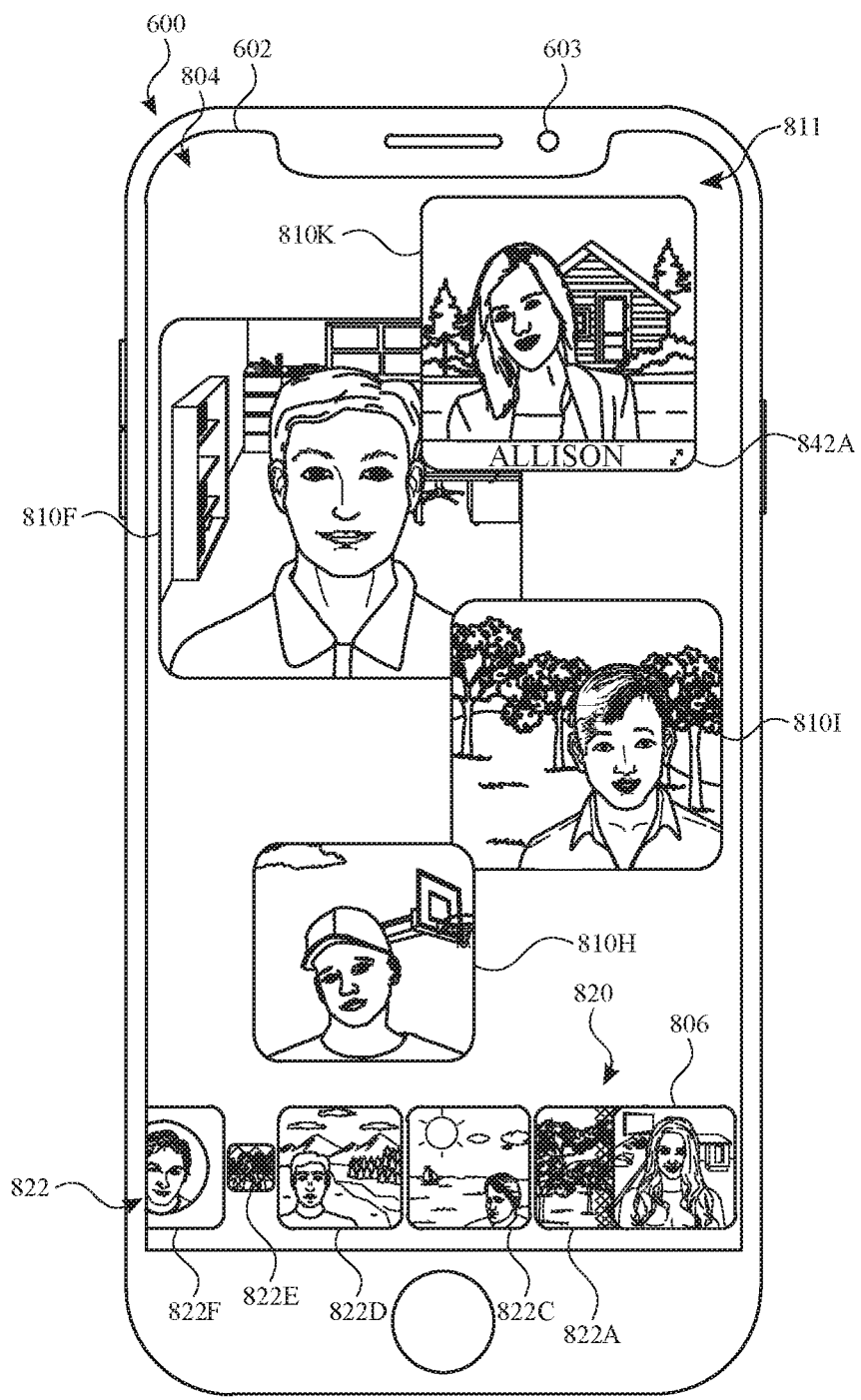
Figure 8A:
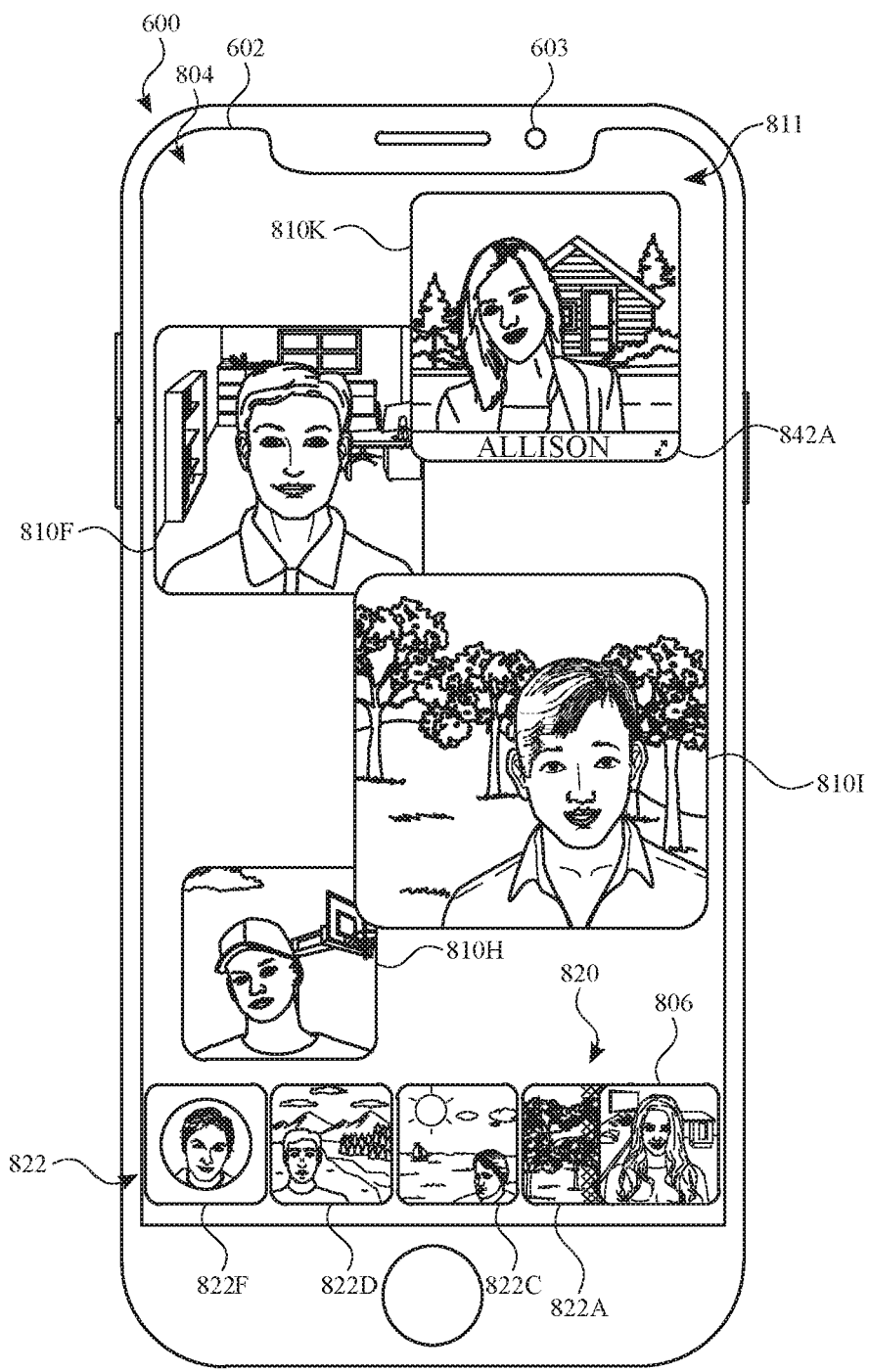
Figure 8A:
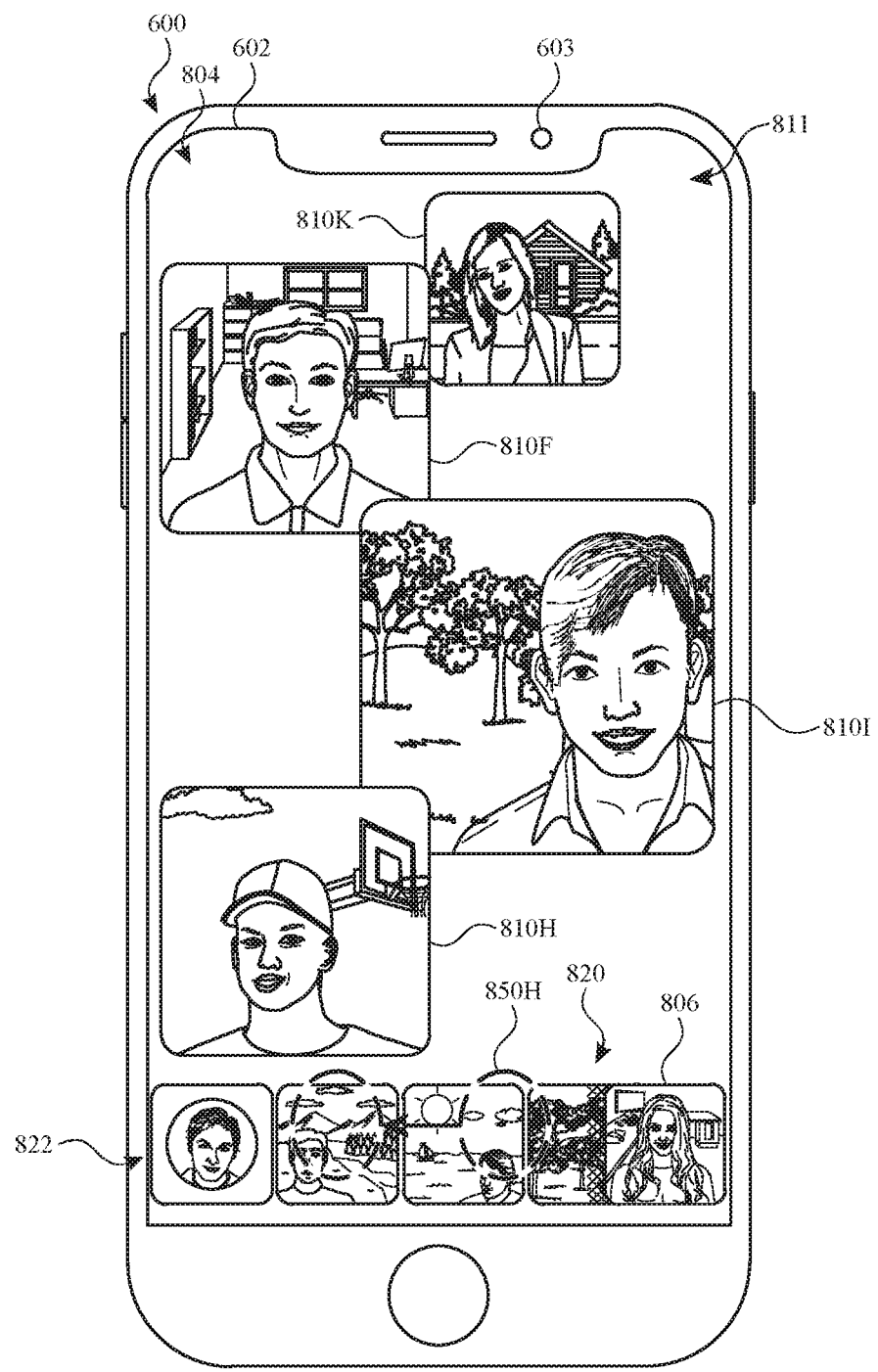
Figure 8A:
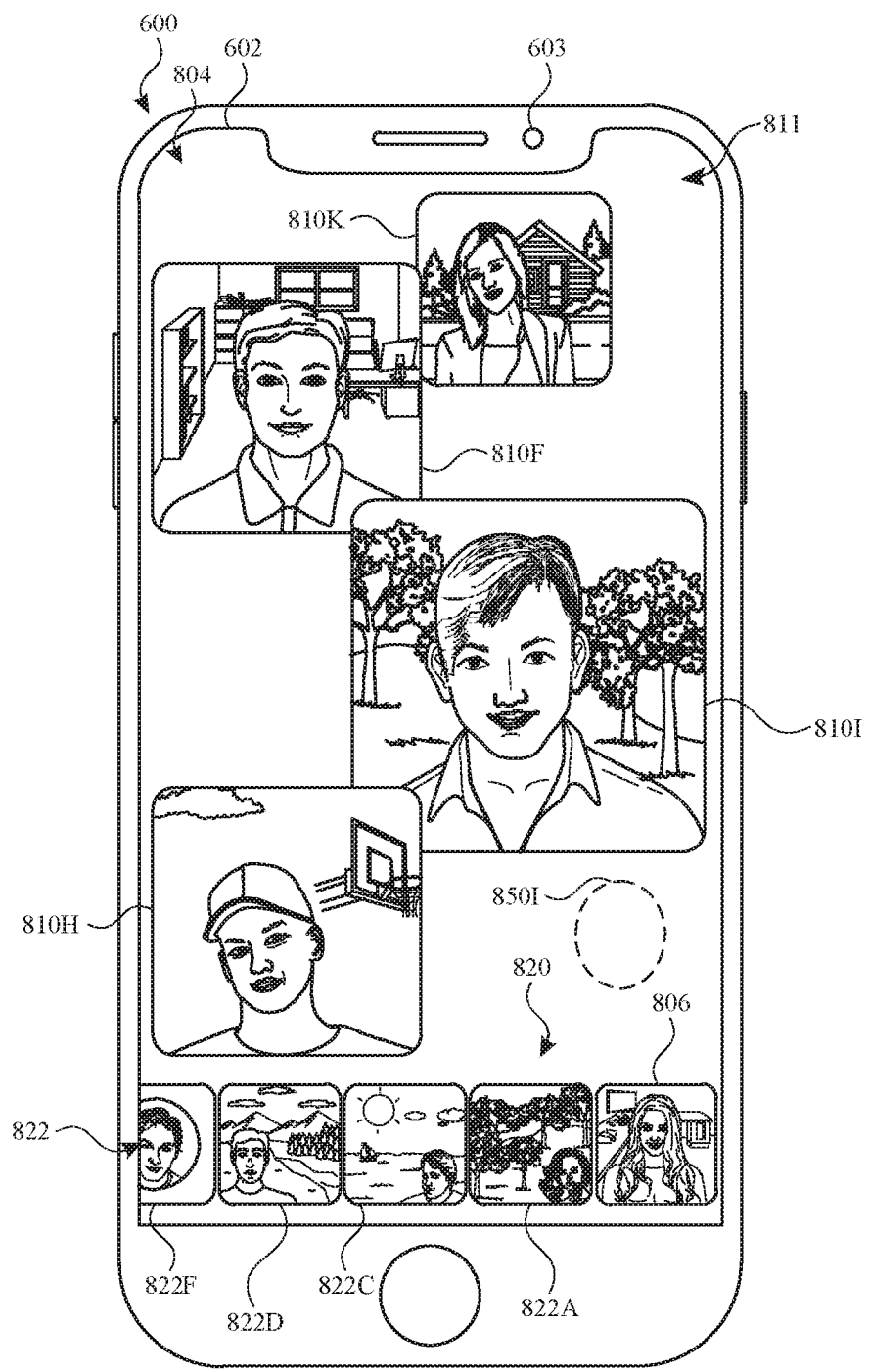
Figure 8A:
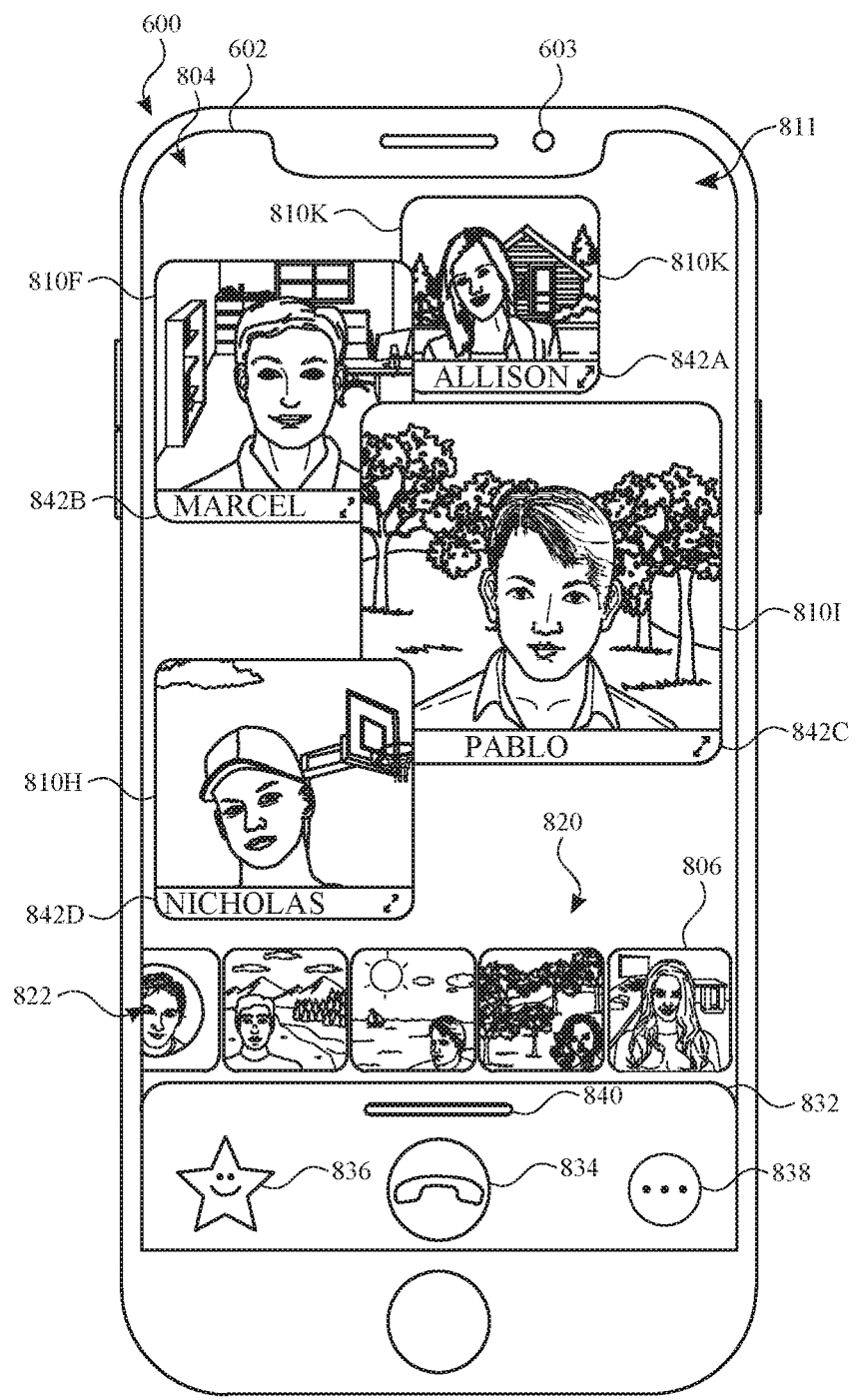
Figure 8A:
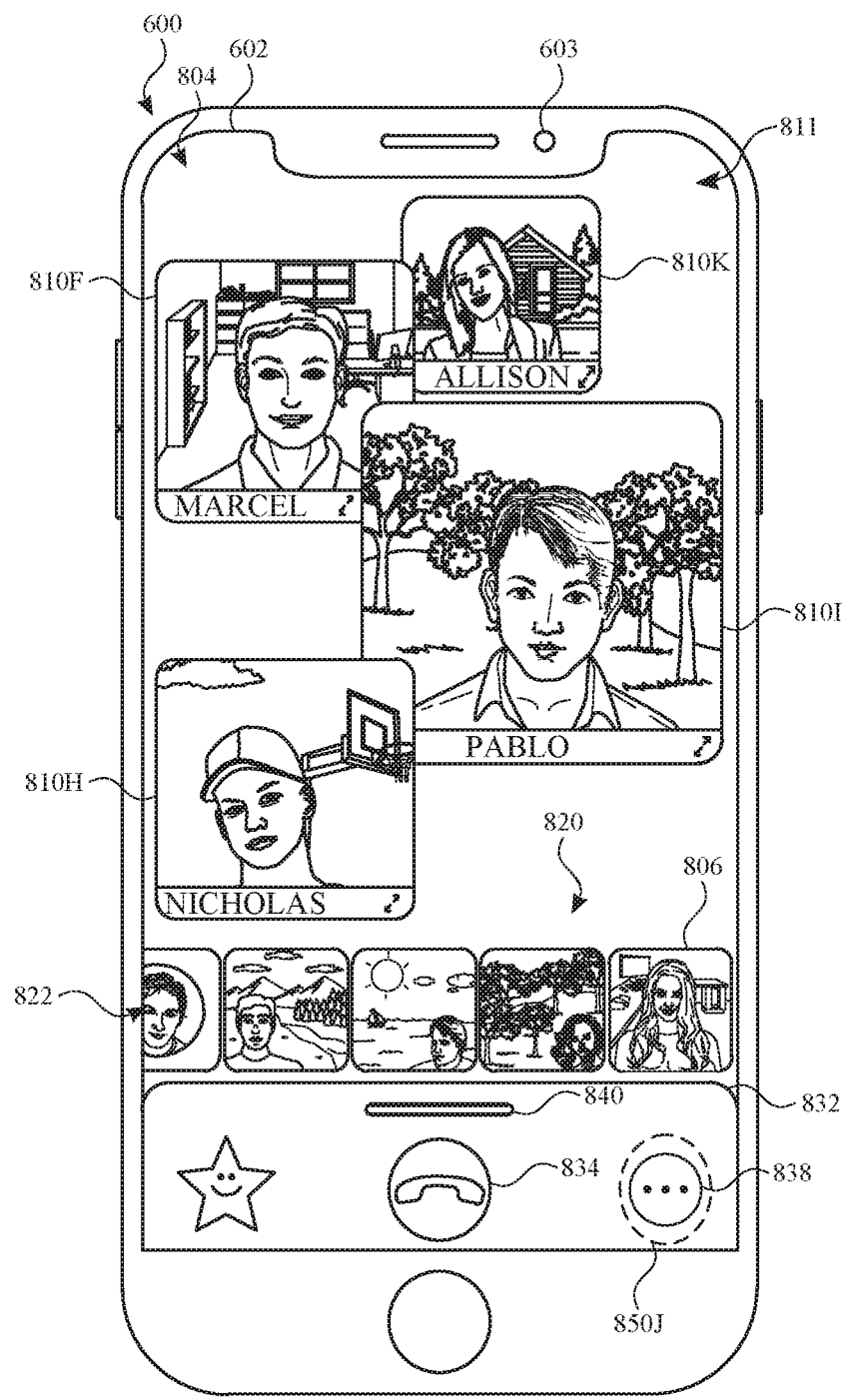
Figure 8A:
Figure 8A:
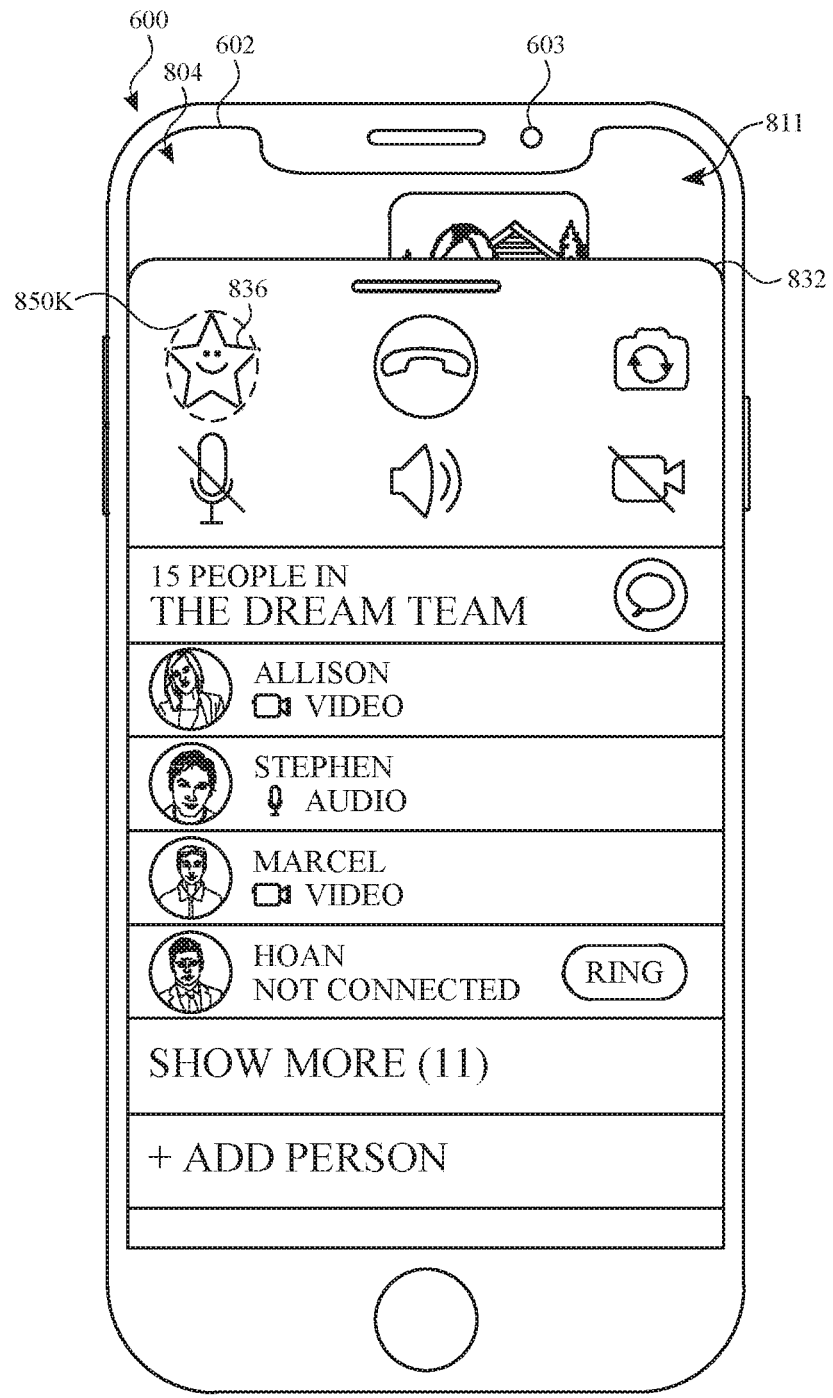
Figure 8A:
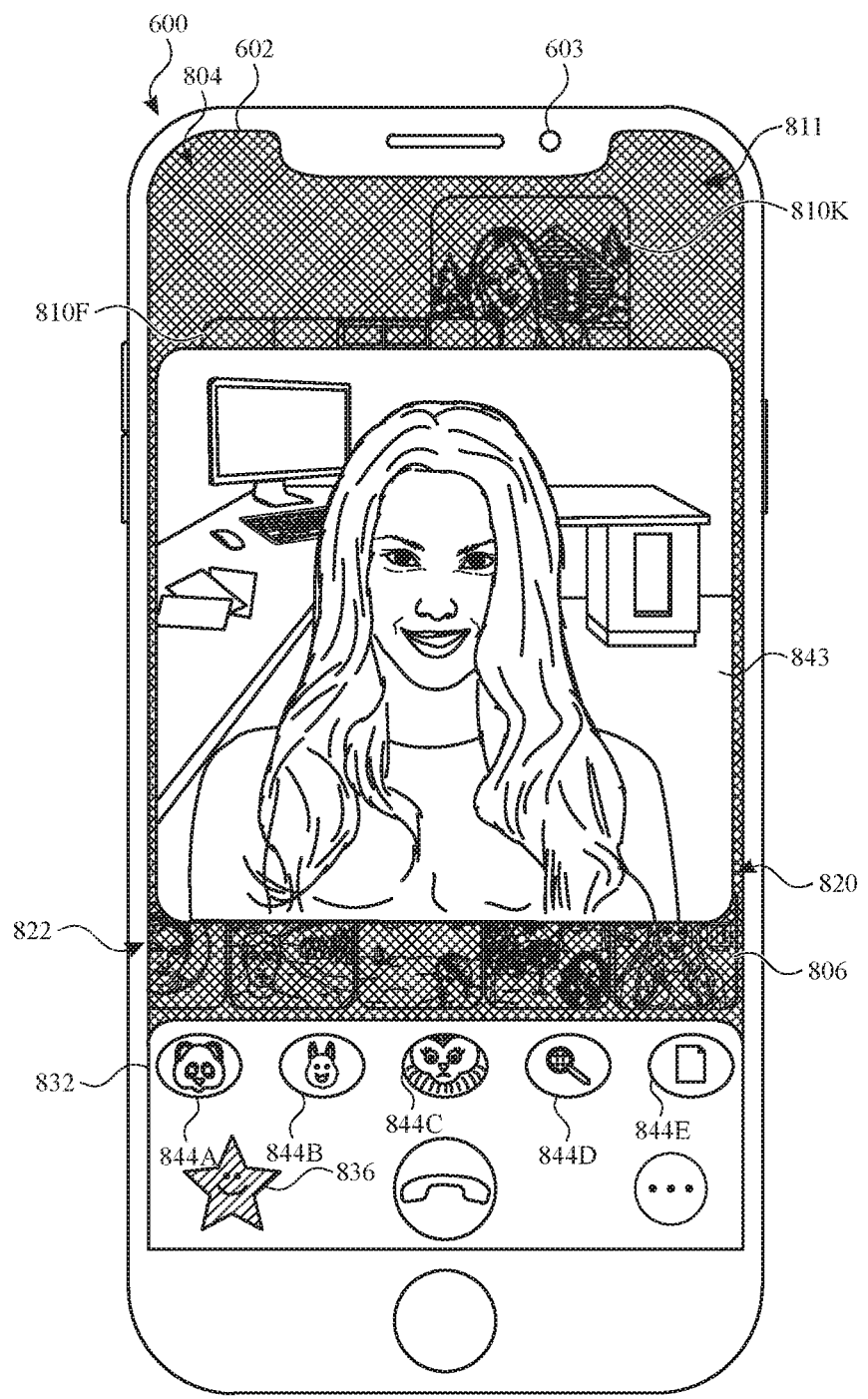
Figure 8A:
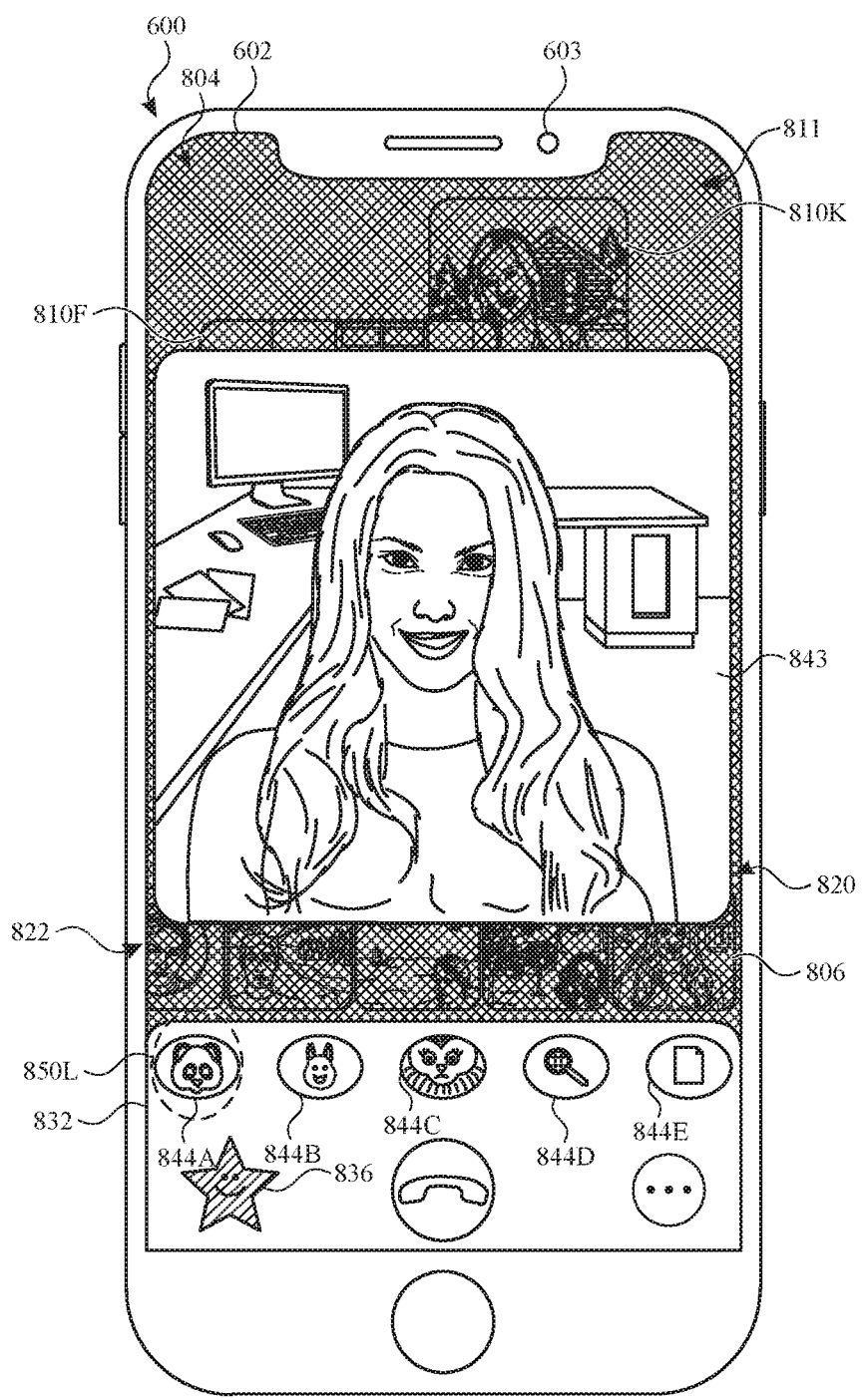
Figure 8A:
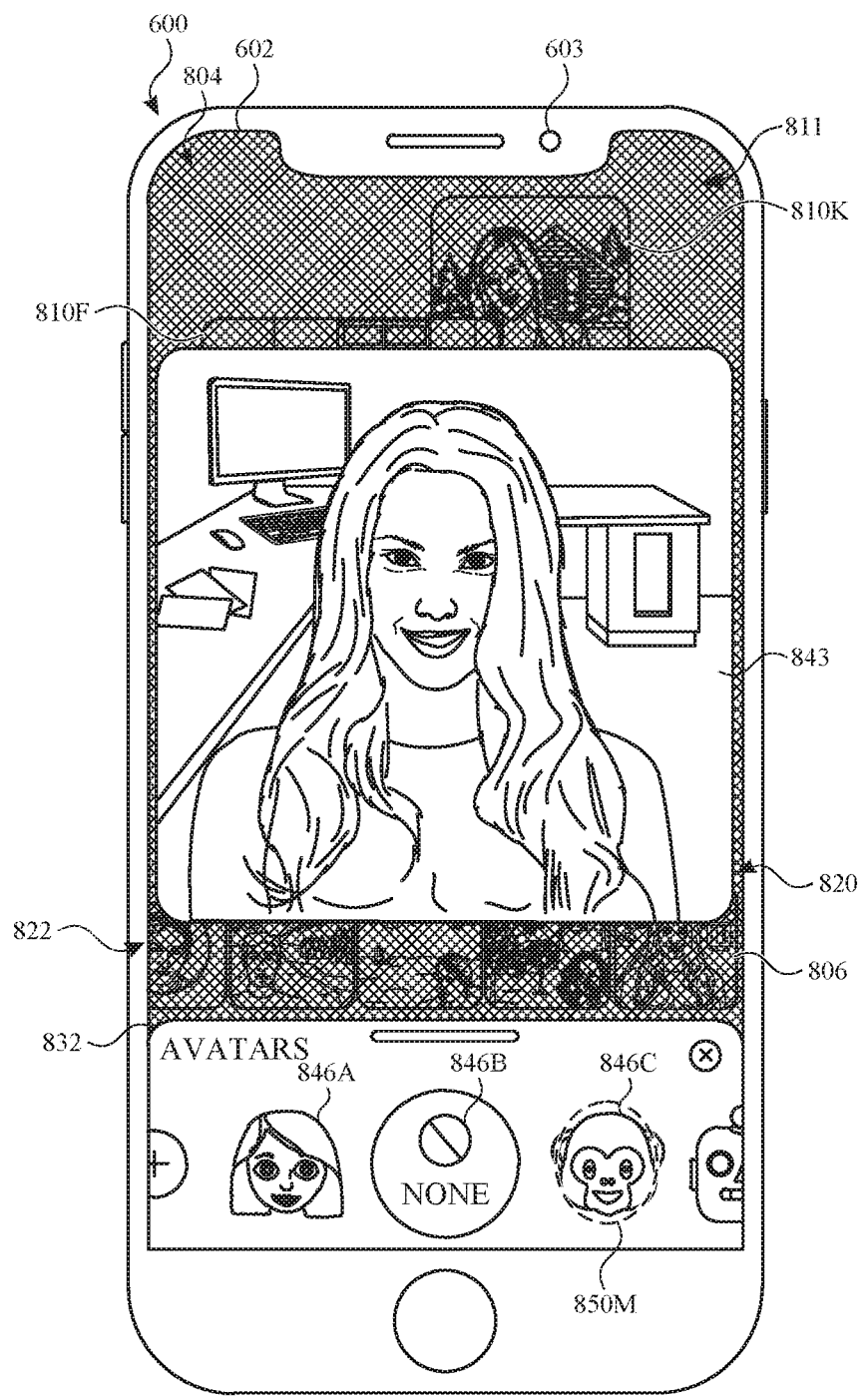
Figure 8A:
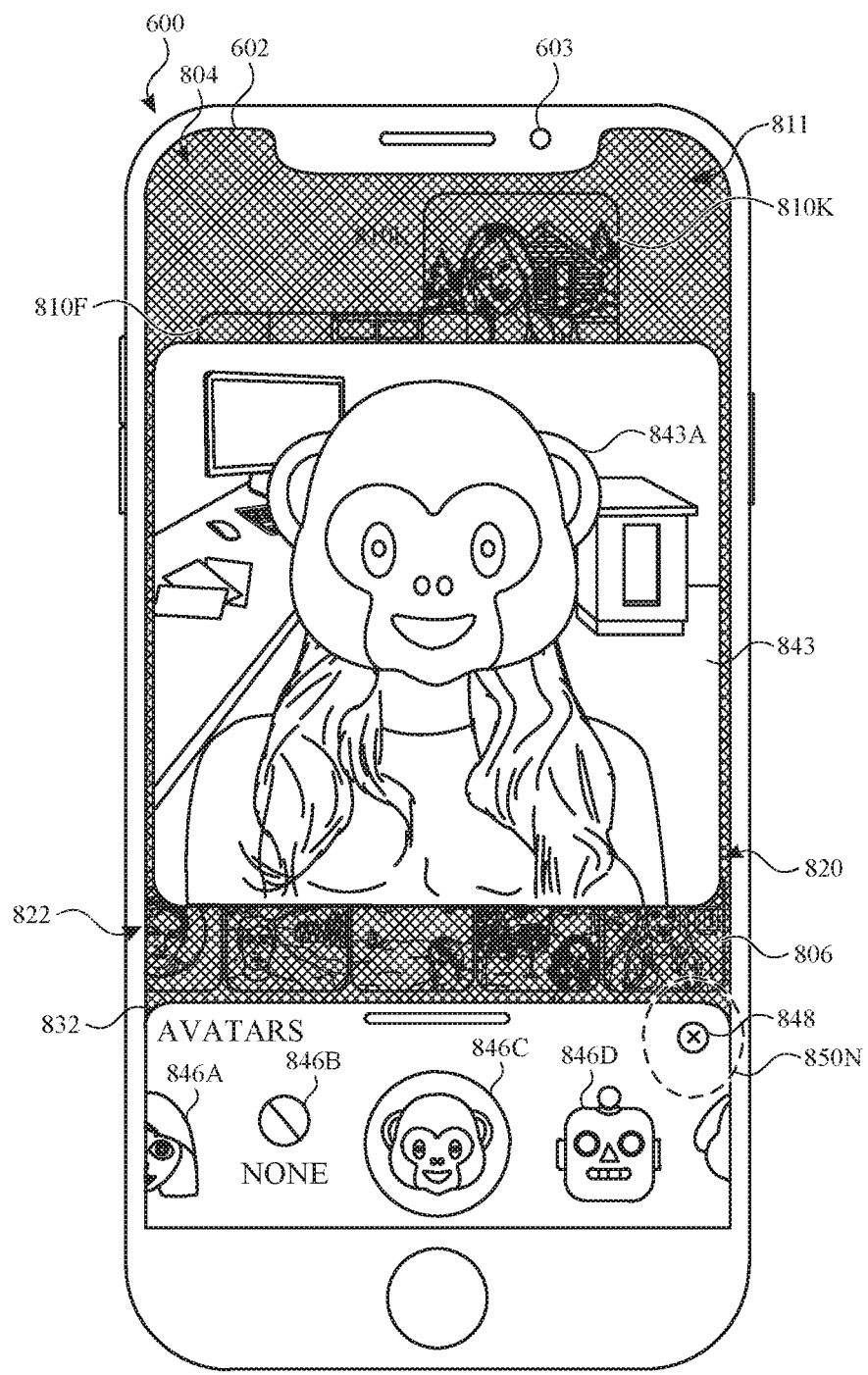
Figure 8A:
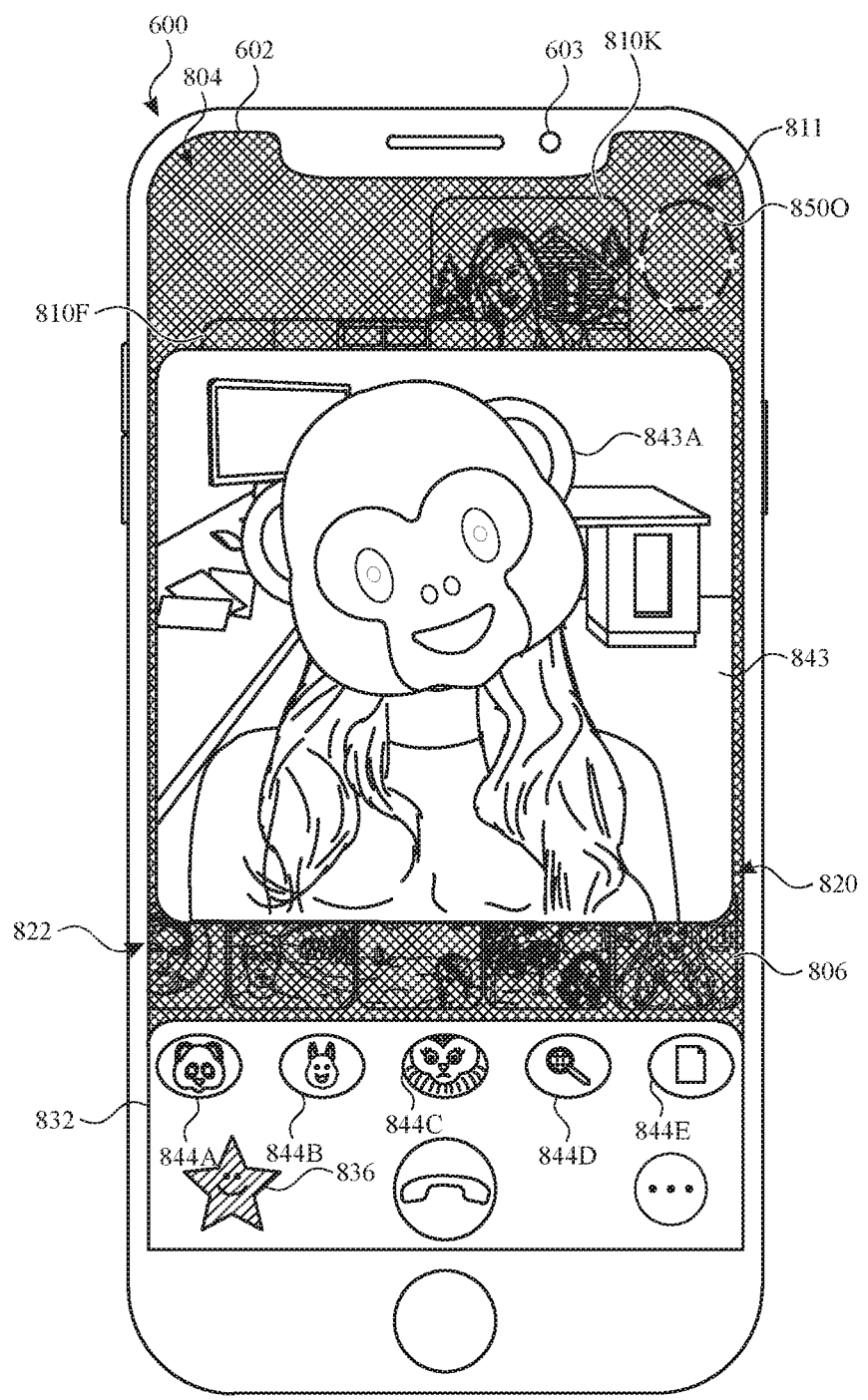
Figure 8A:
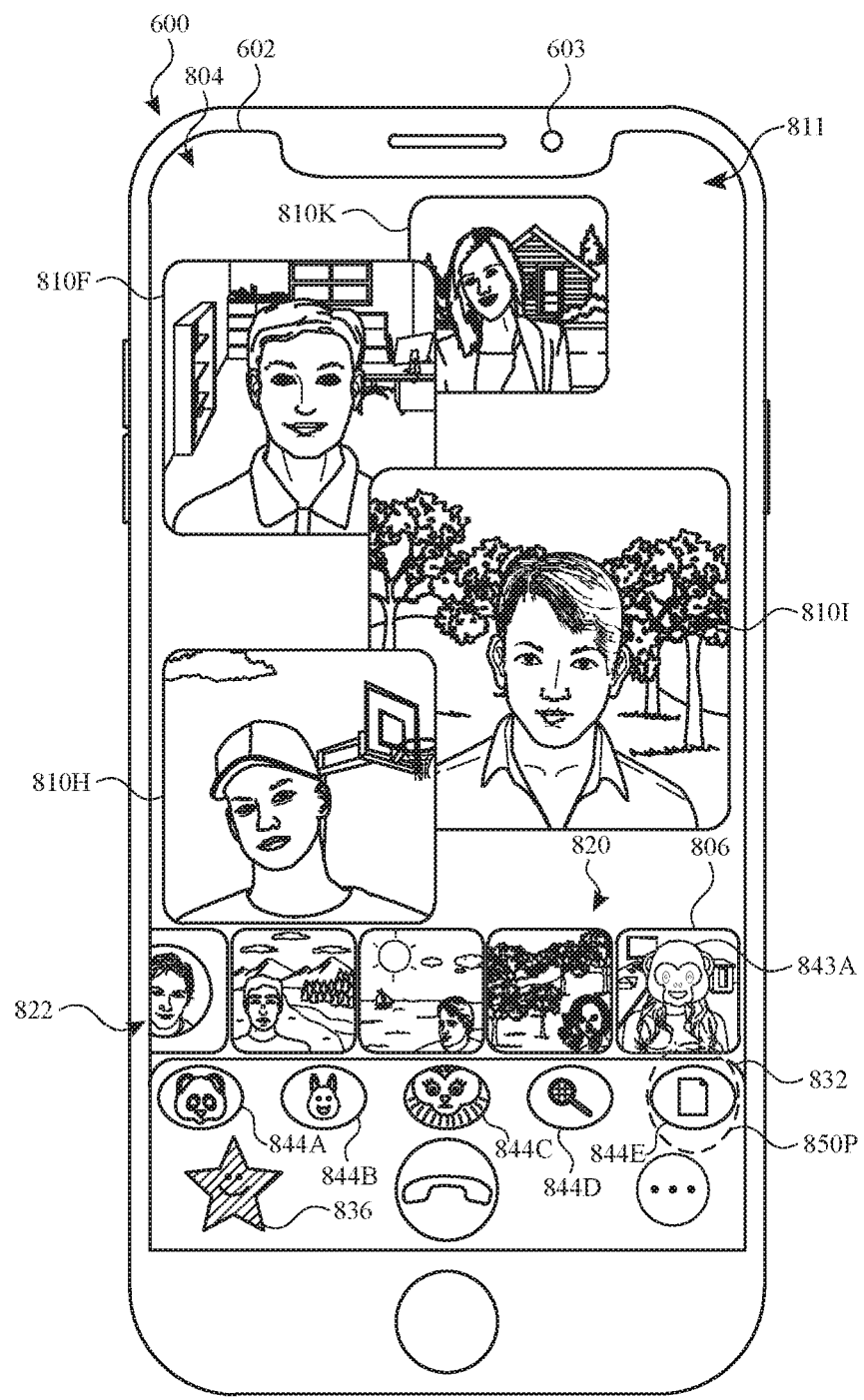
Figure 8A:
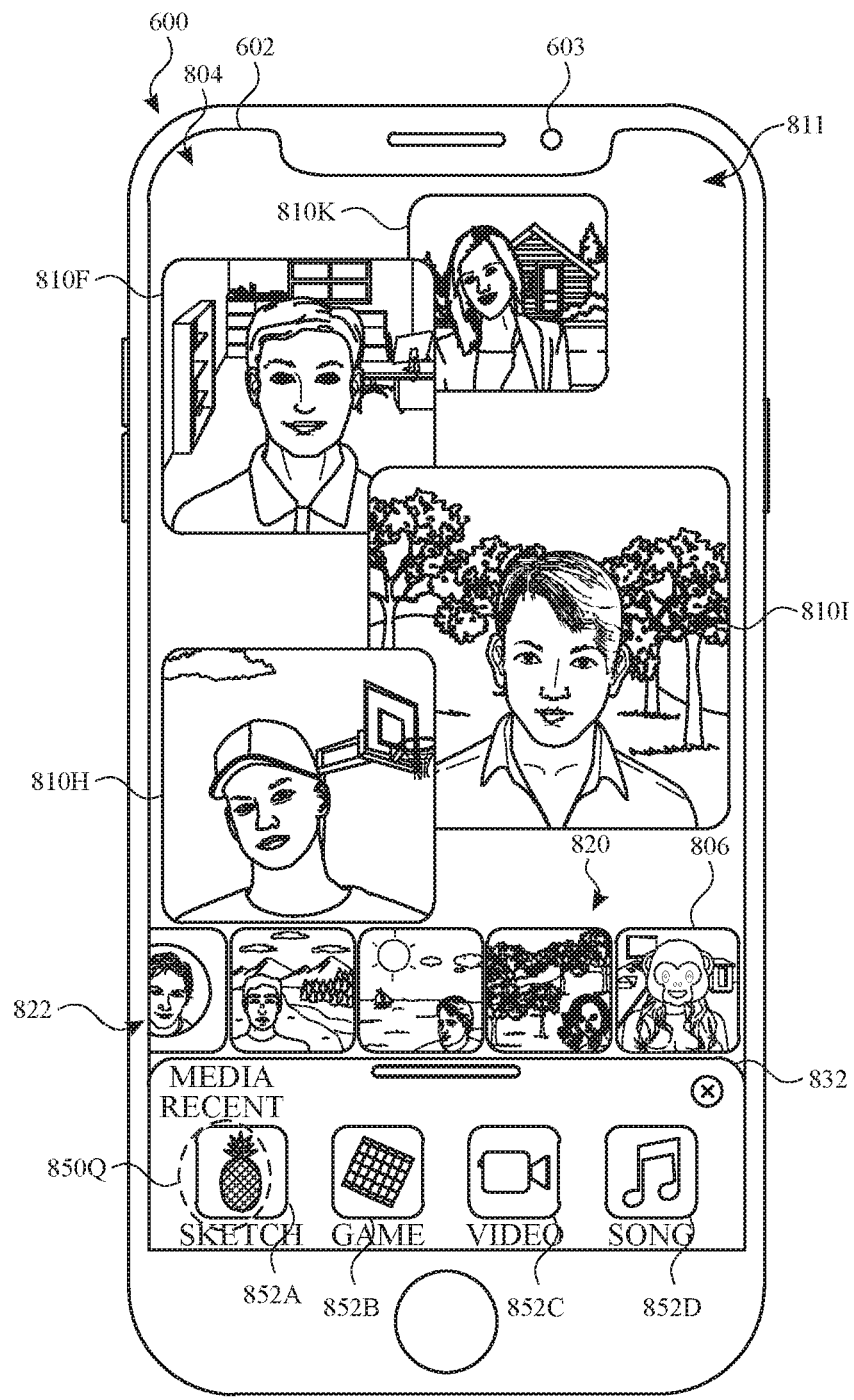
Figure 8A:
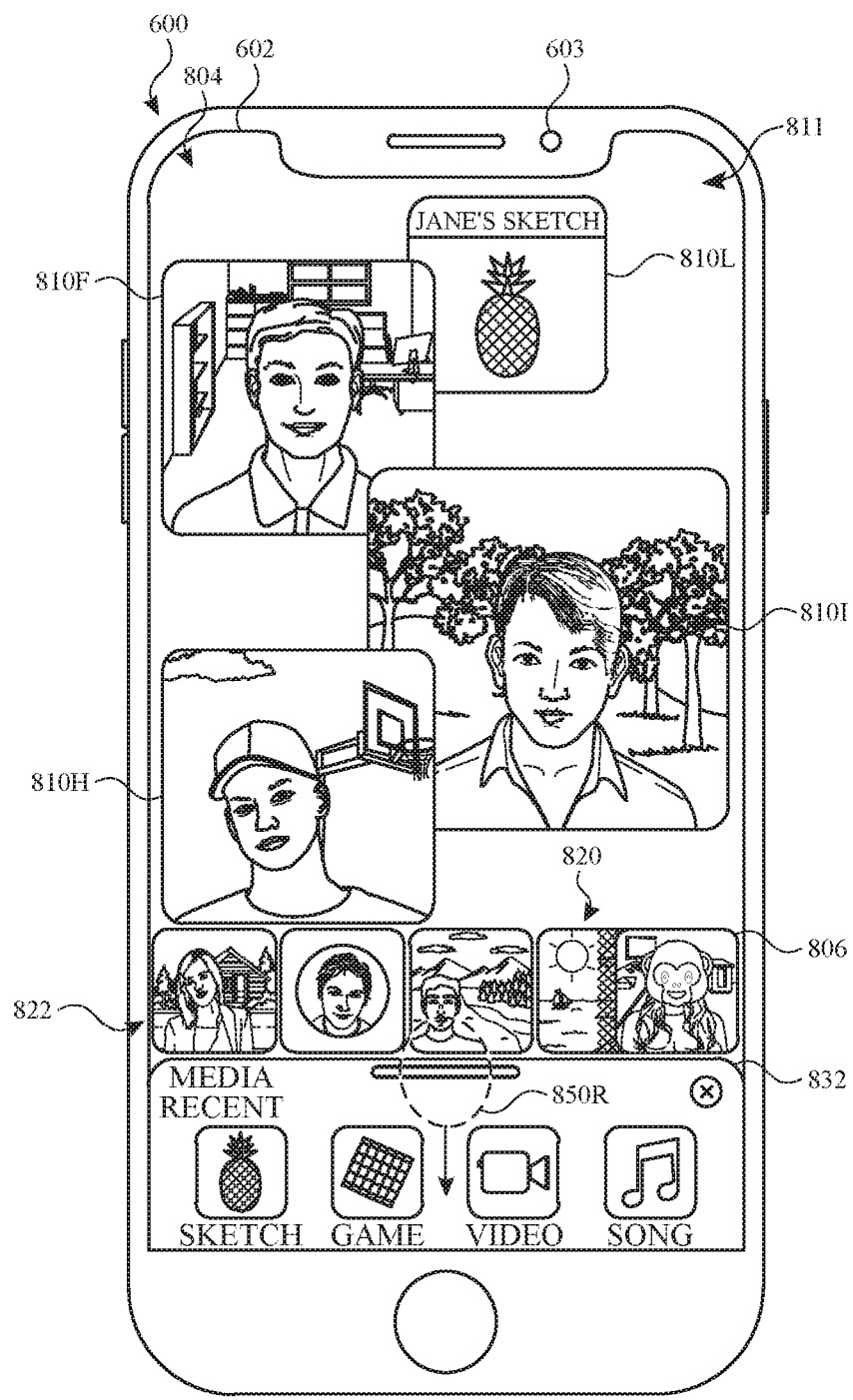
Figure 8A:
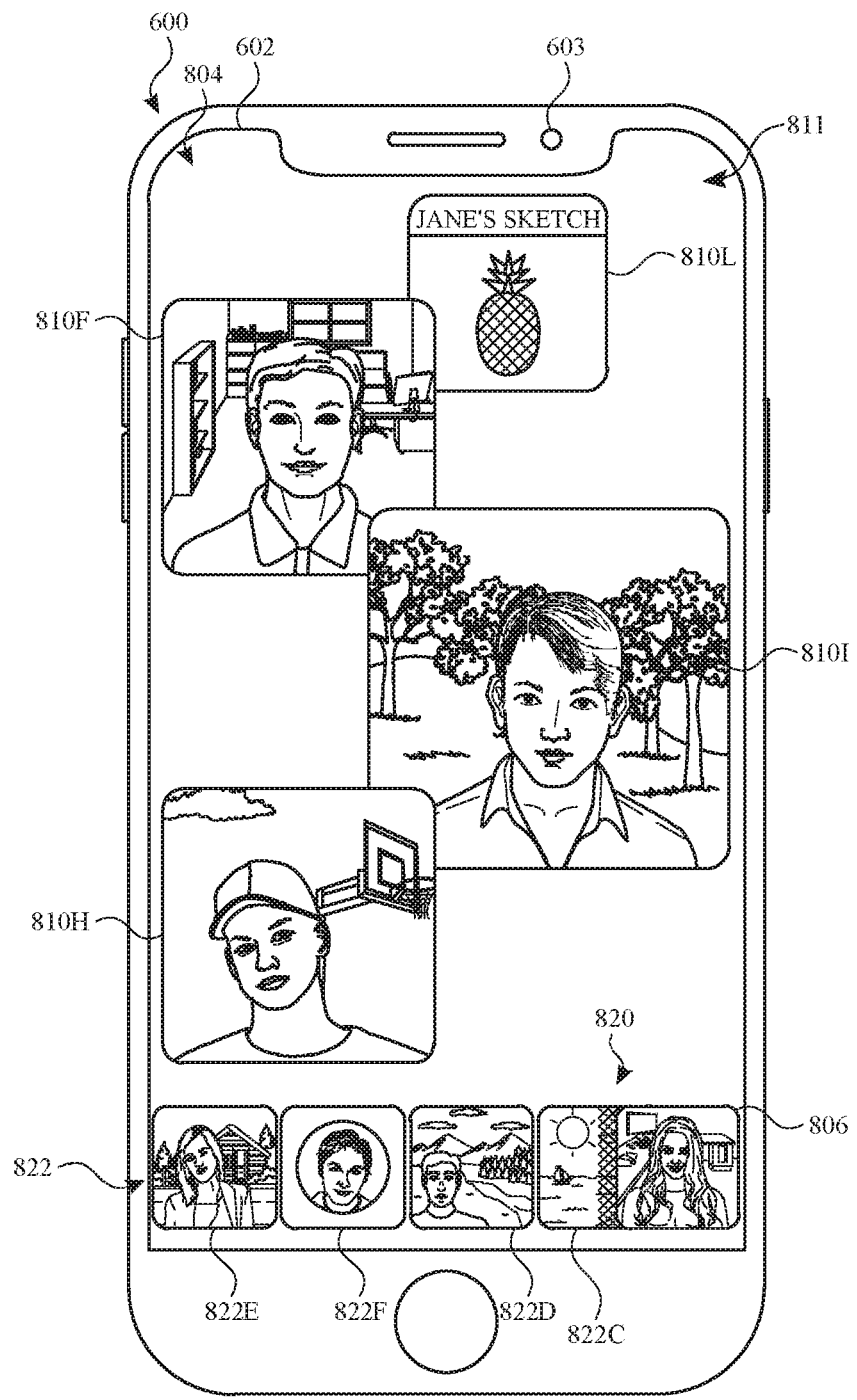
Figure 8A:
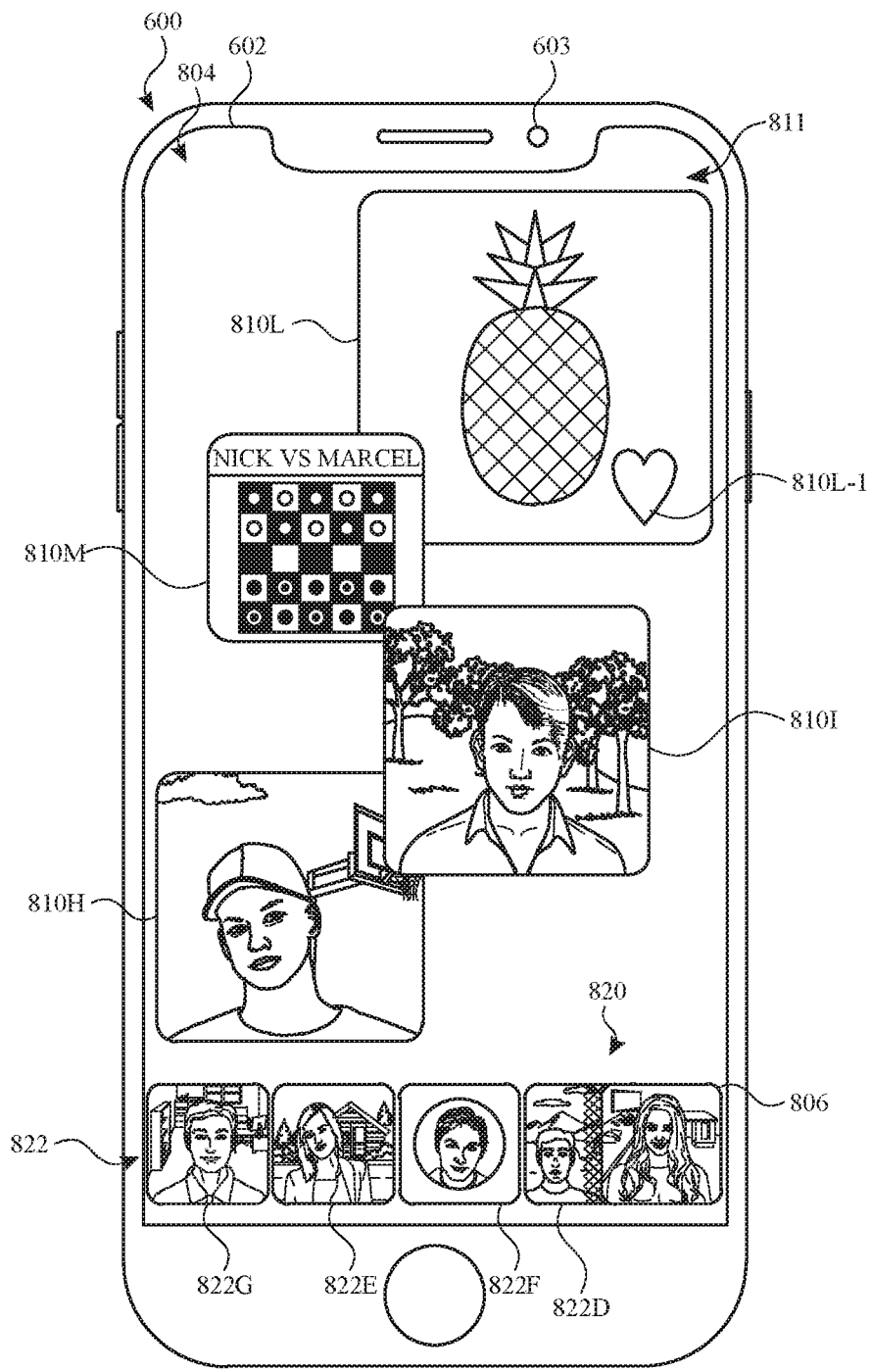
Figure 8A:
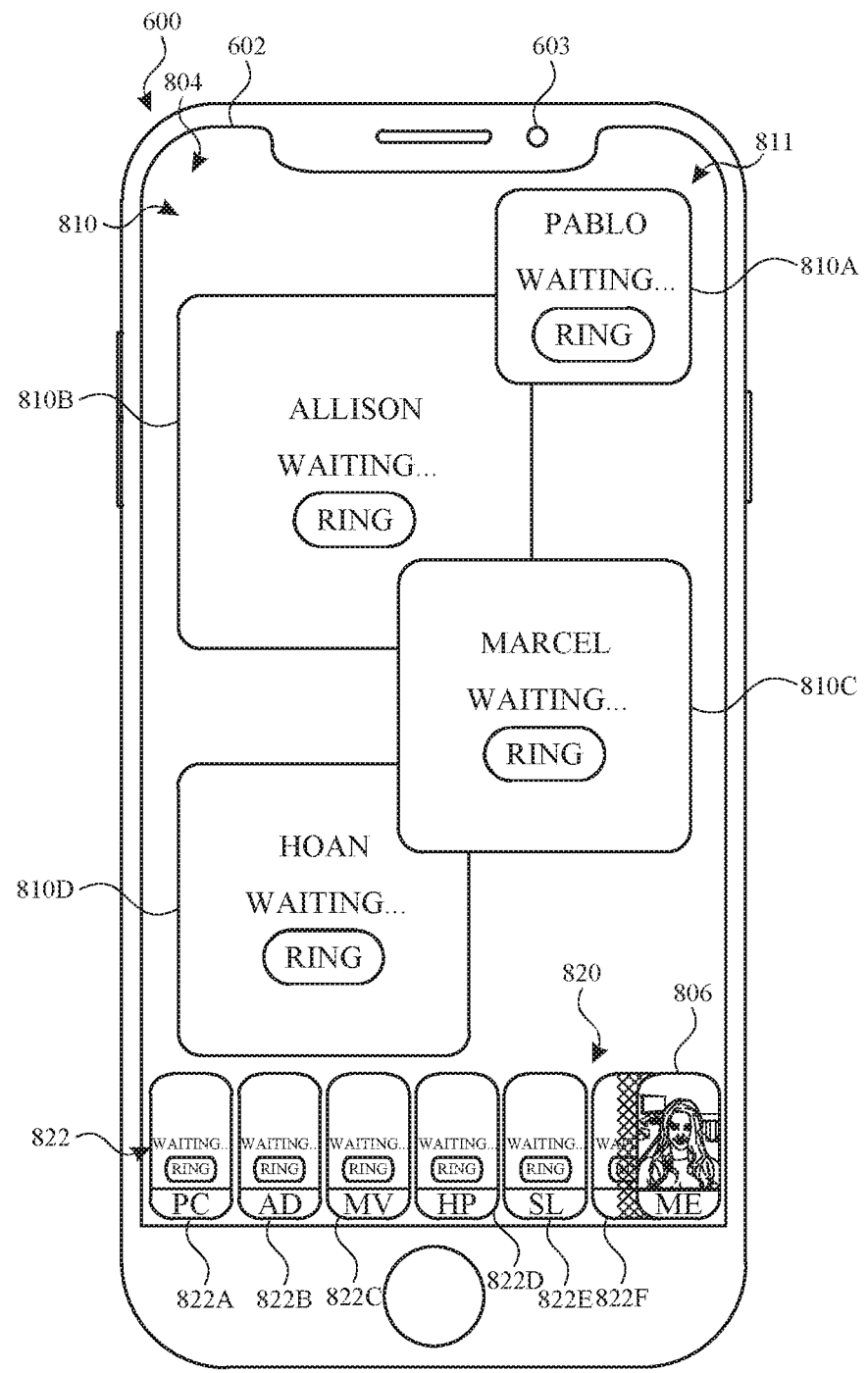
Figure 8A:
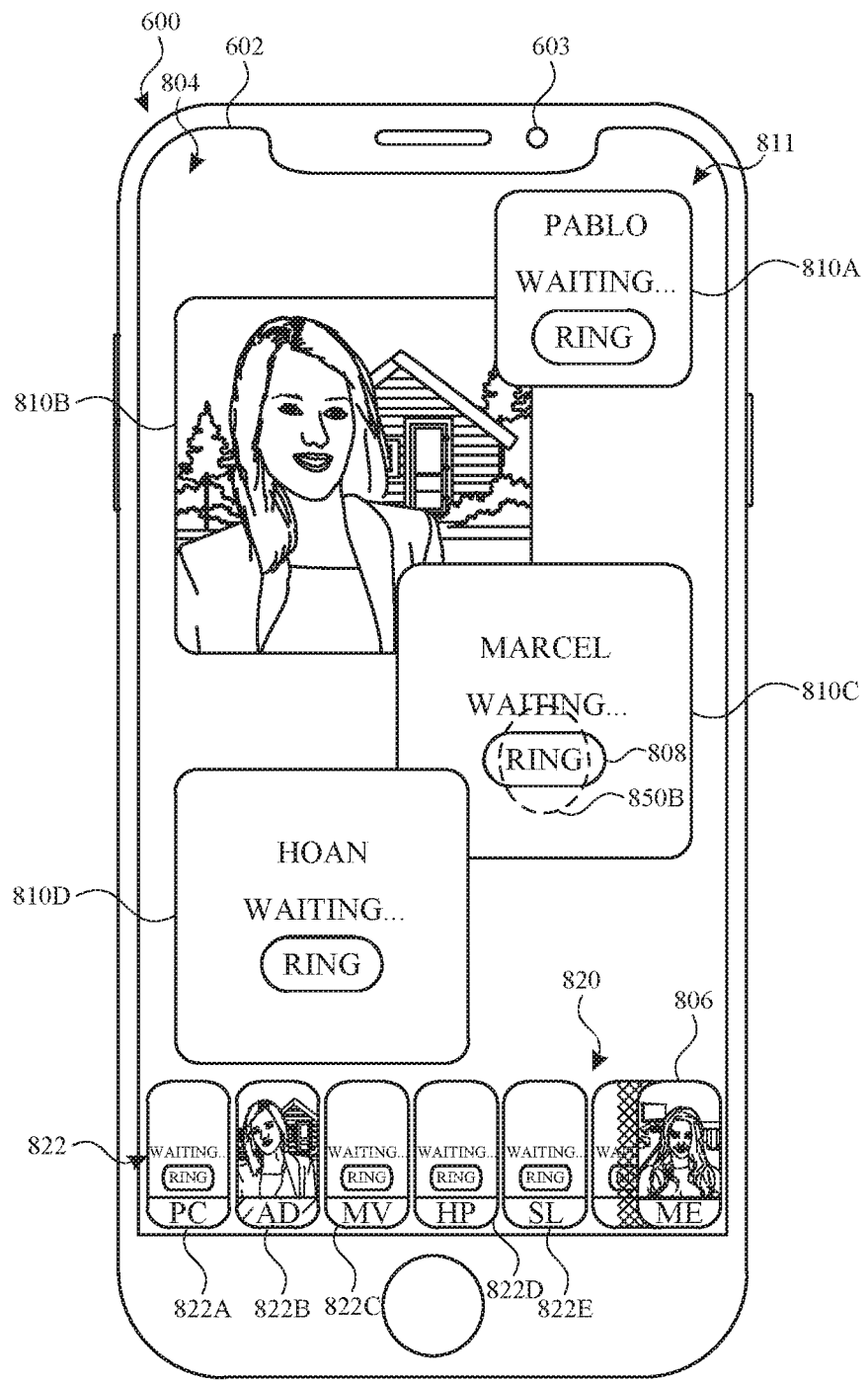
Figure 8A:
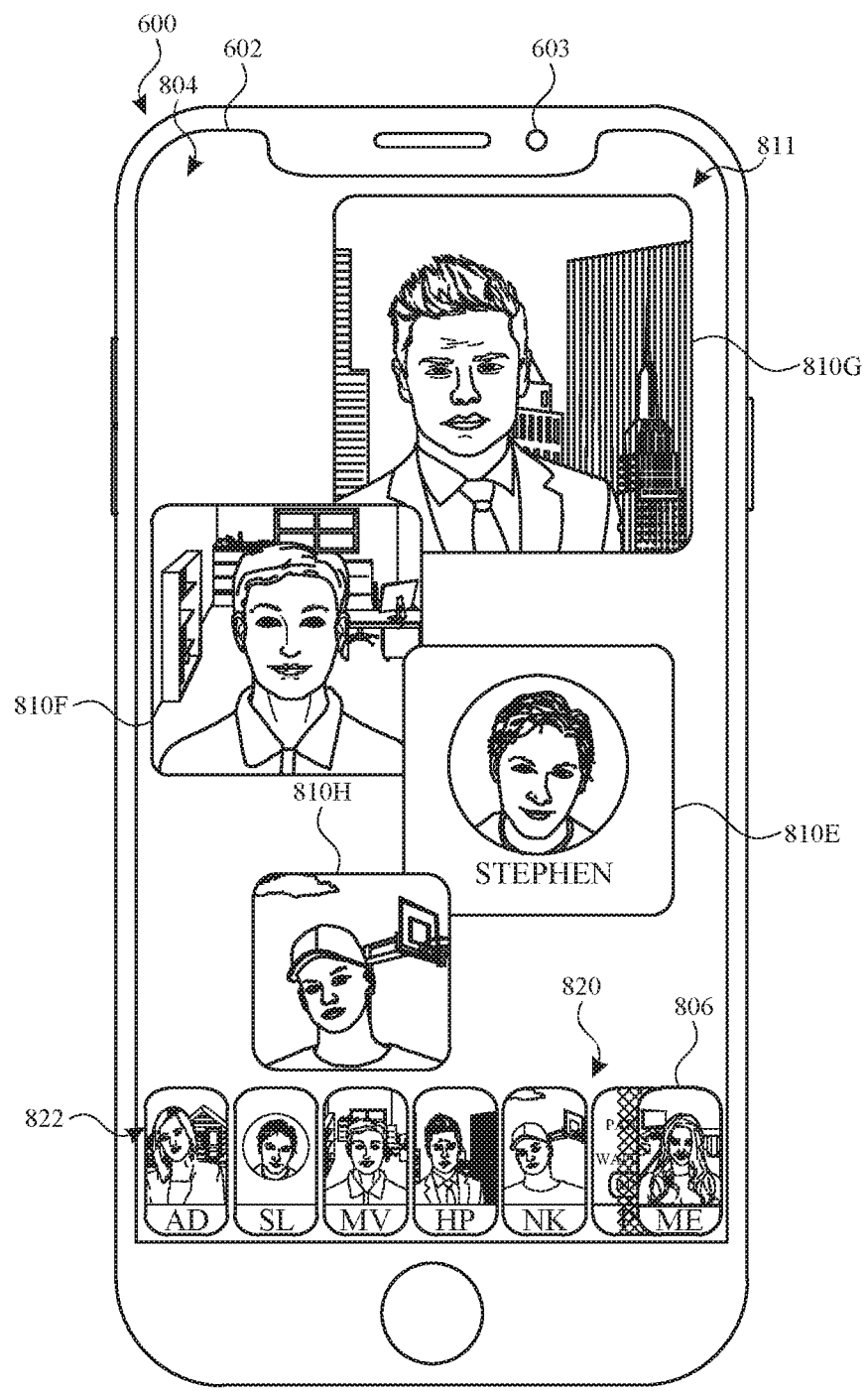
Figure 8A:
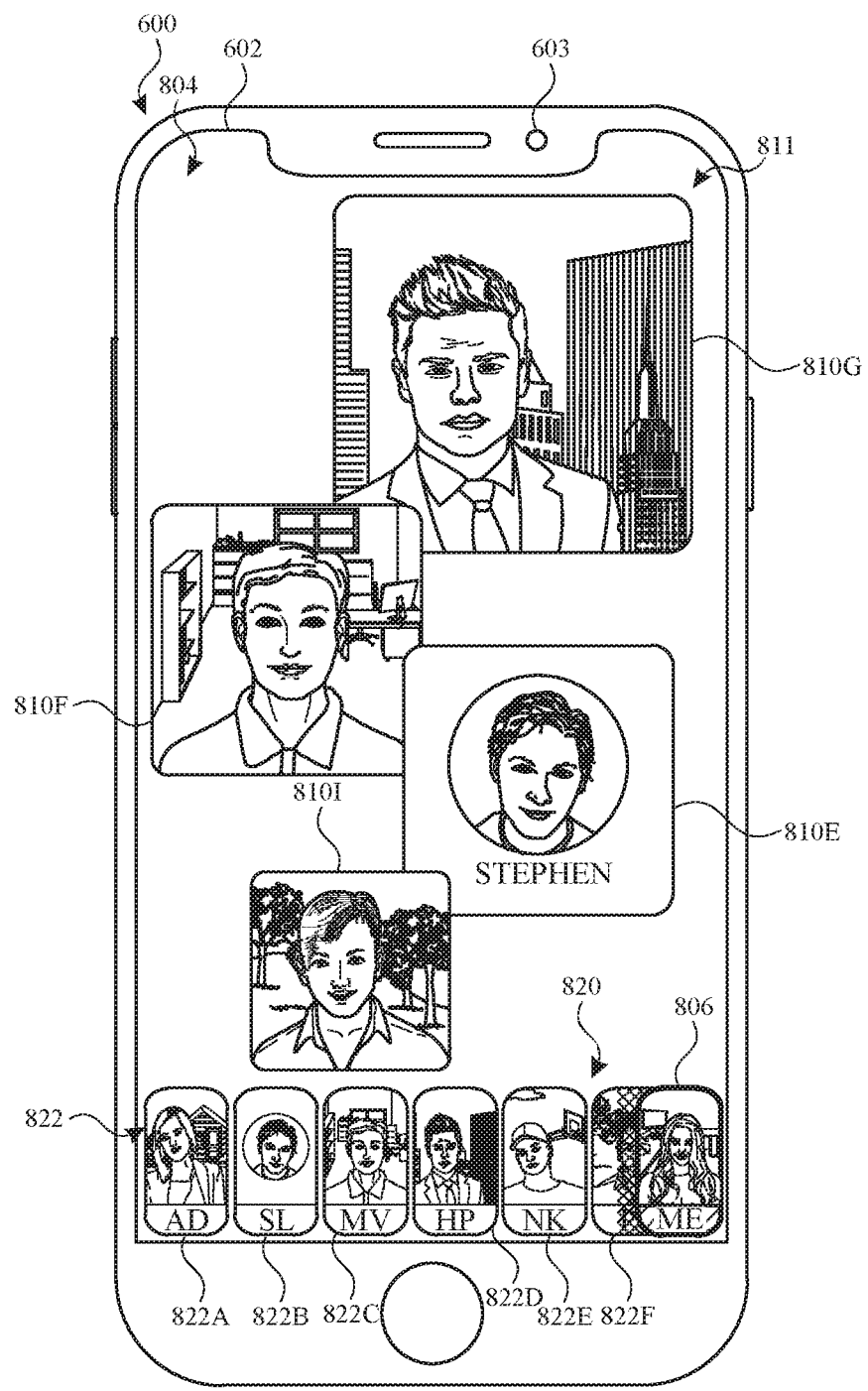
Figure 8B:
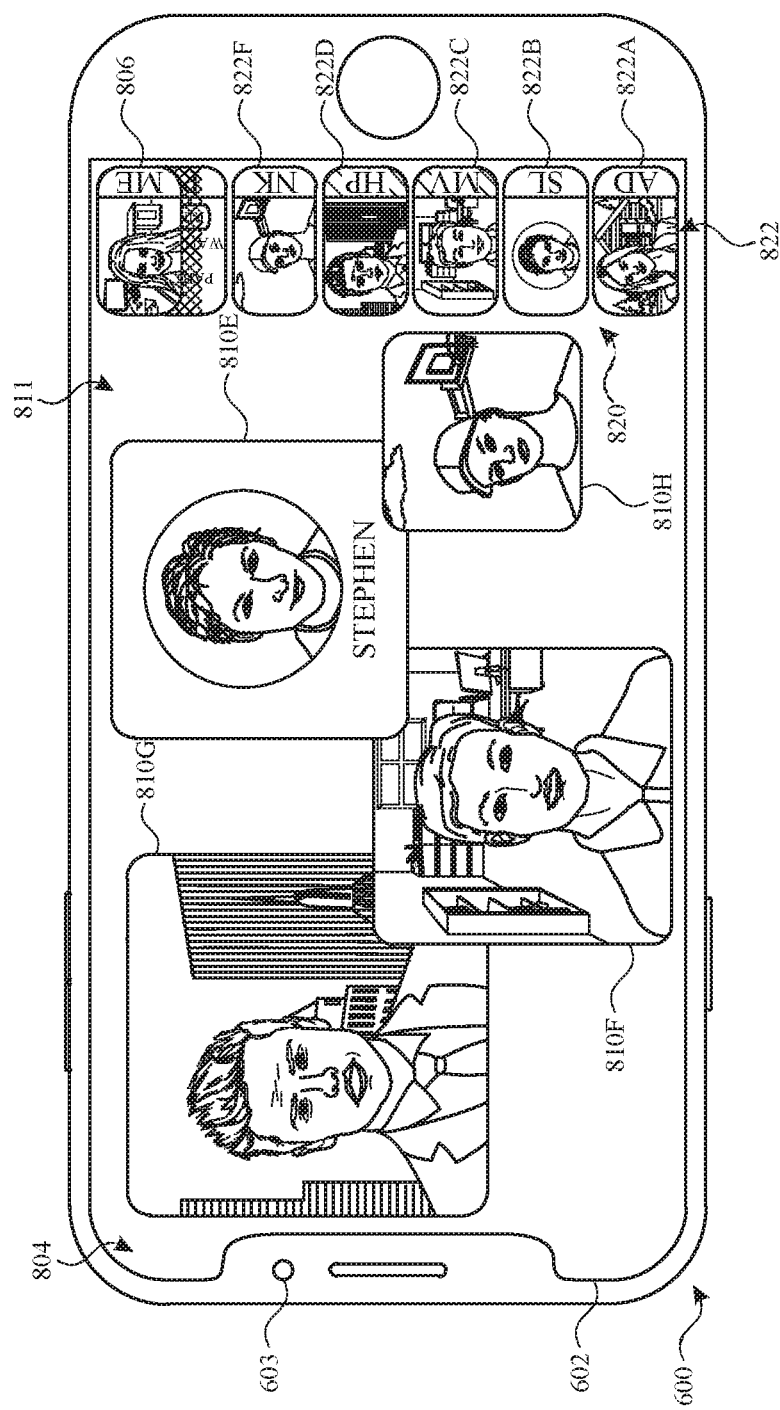
Figure 8B:
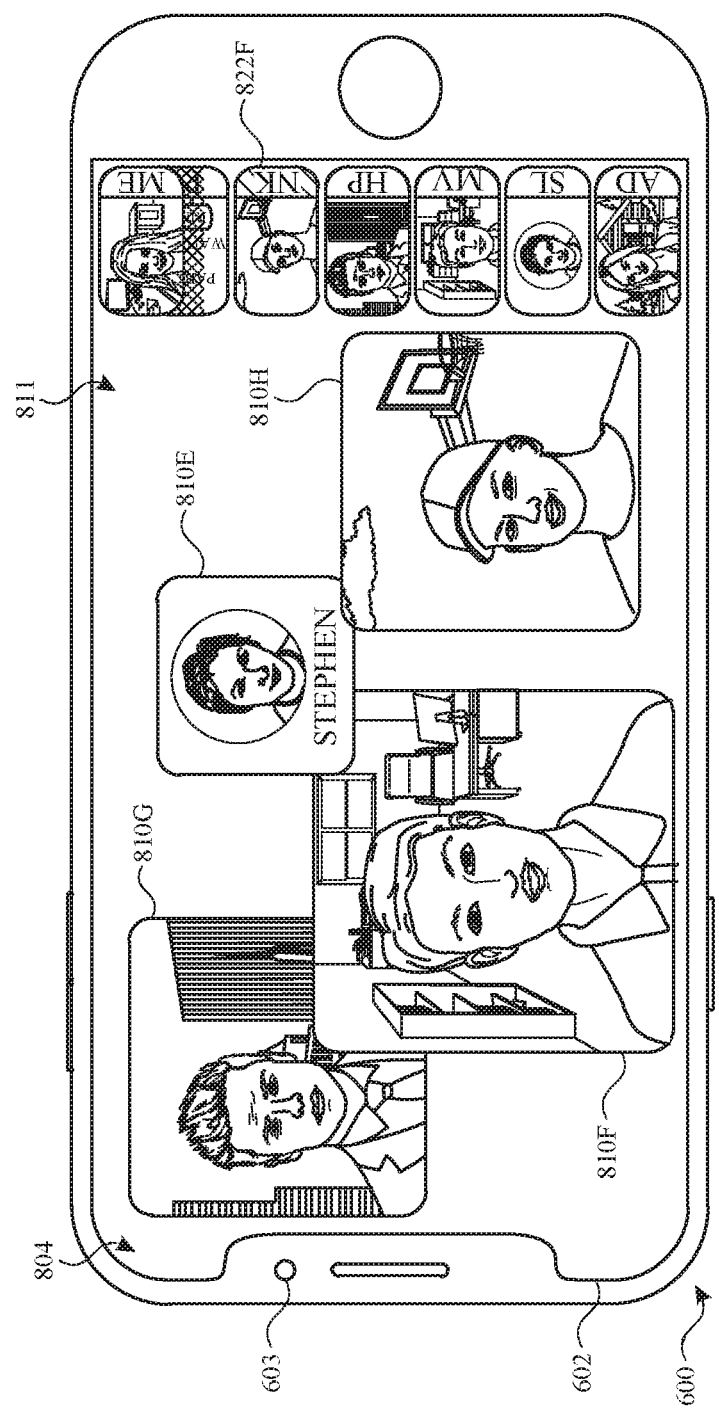
Figure 8B:
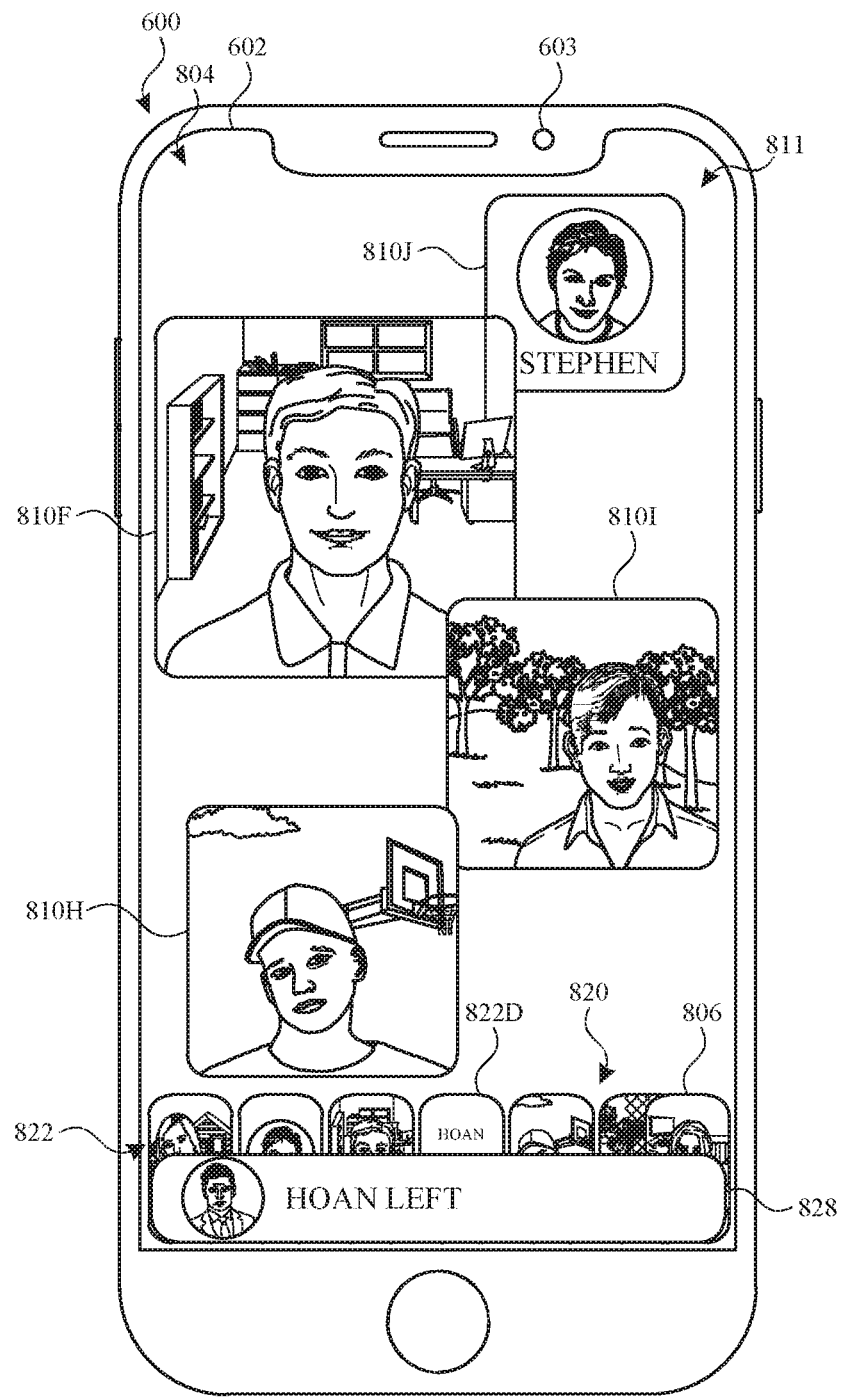
Figure 8B:
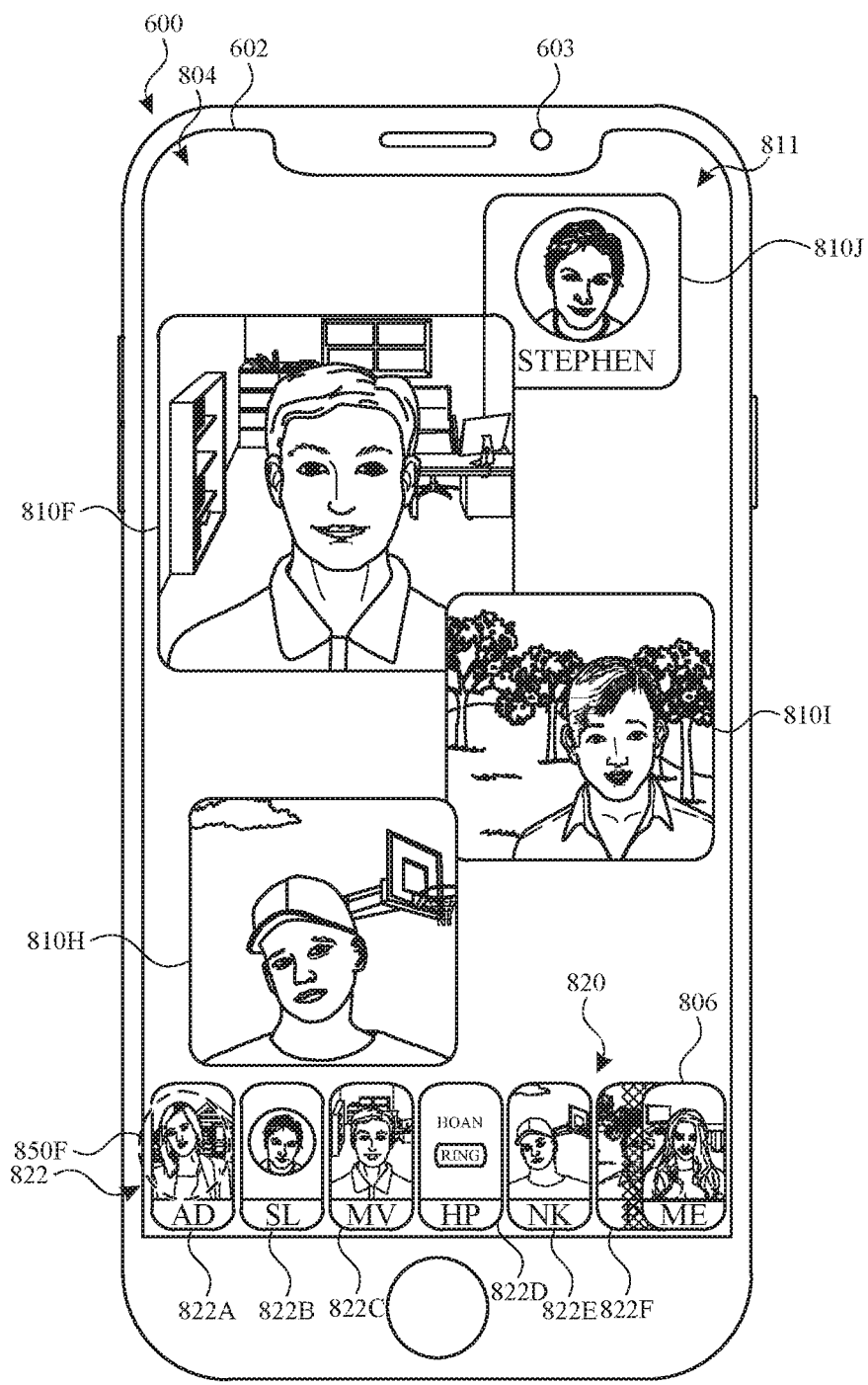
Figure 8B:
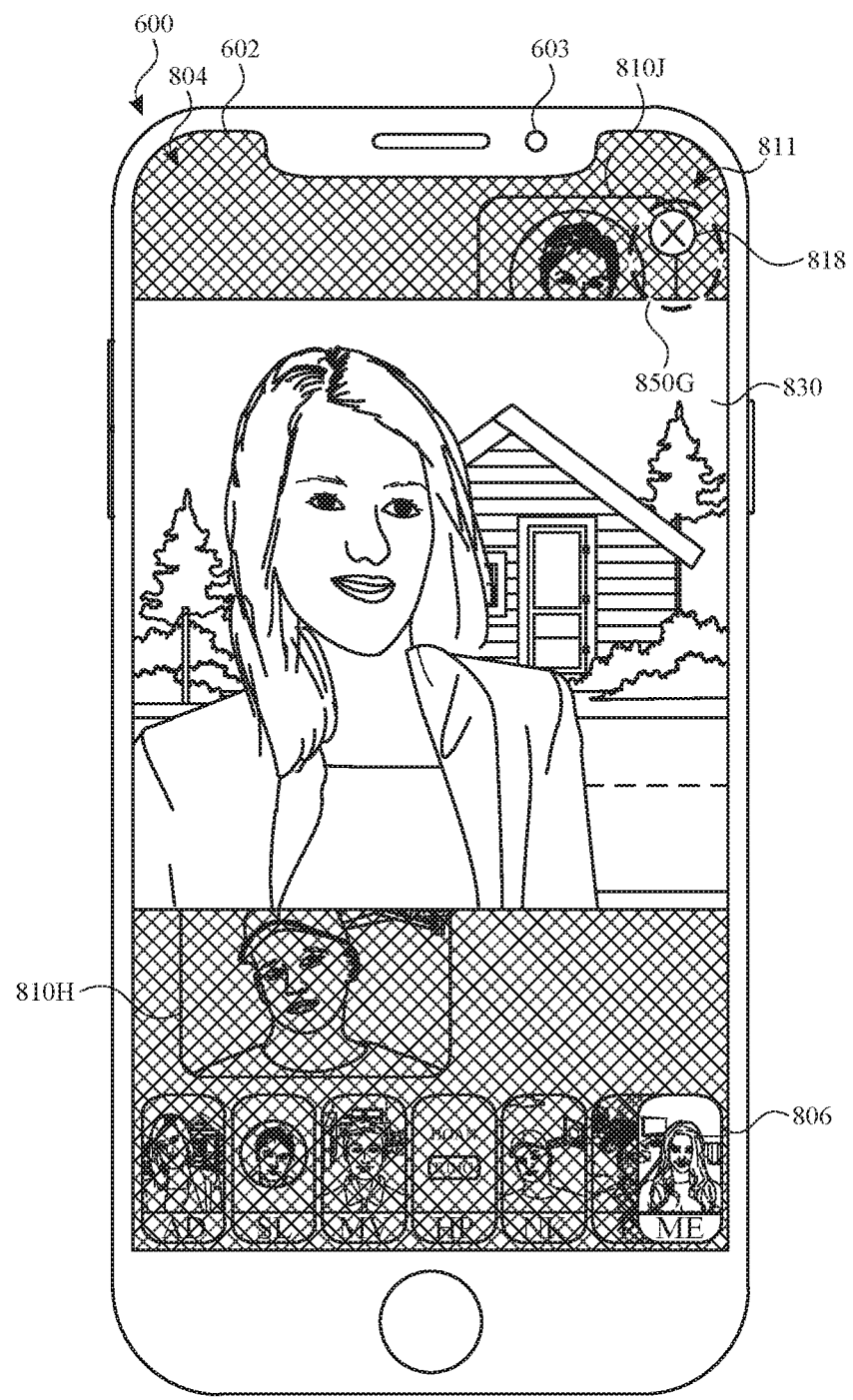
Figure 8B:
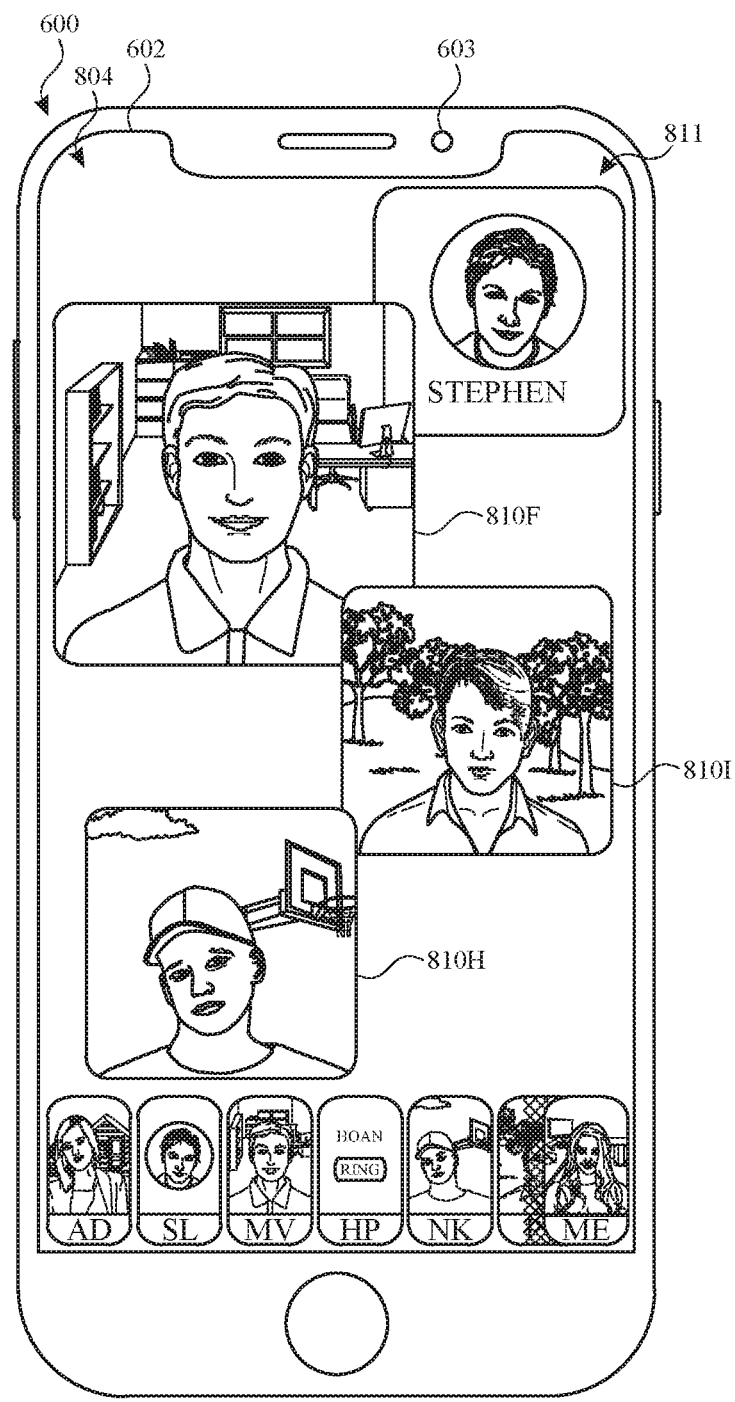
Figure 8B:
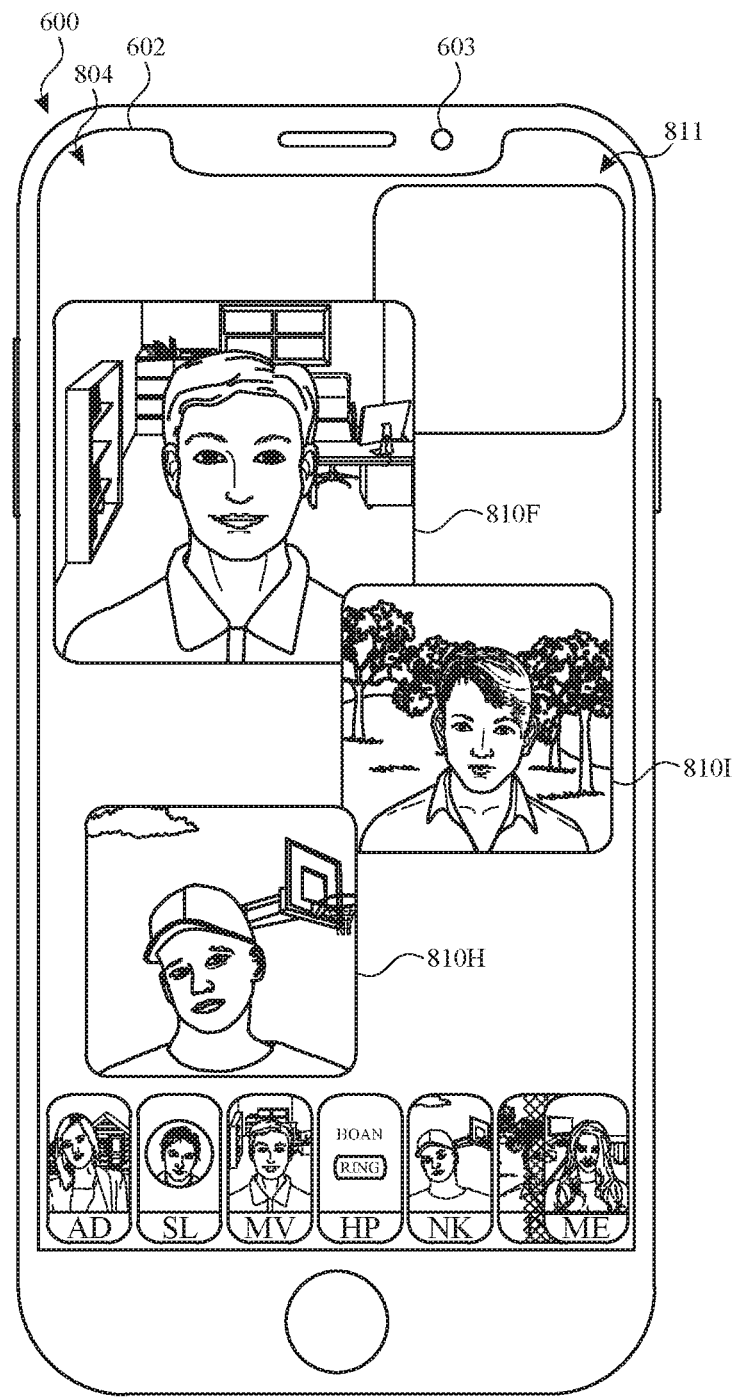
Figure 8B:
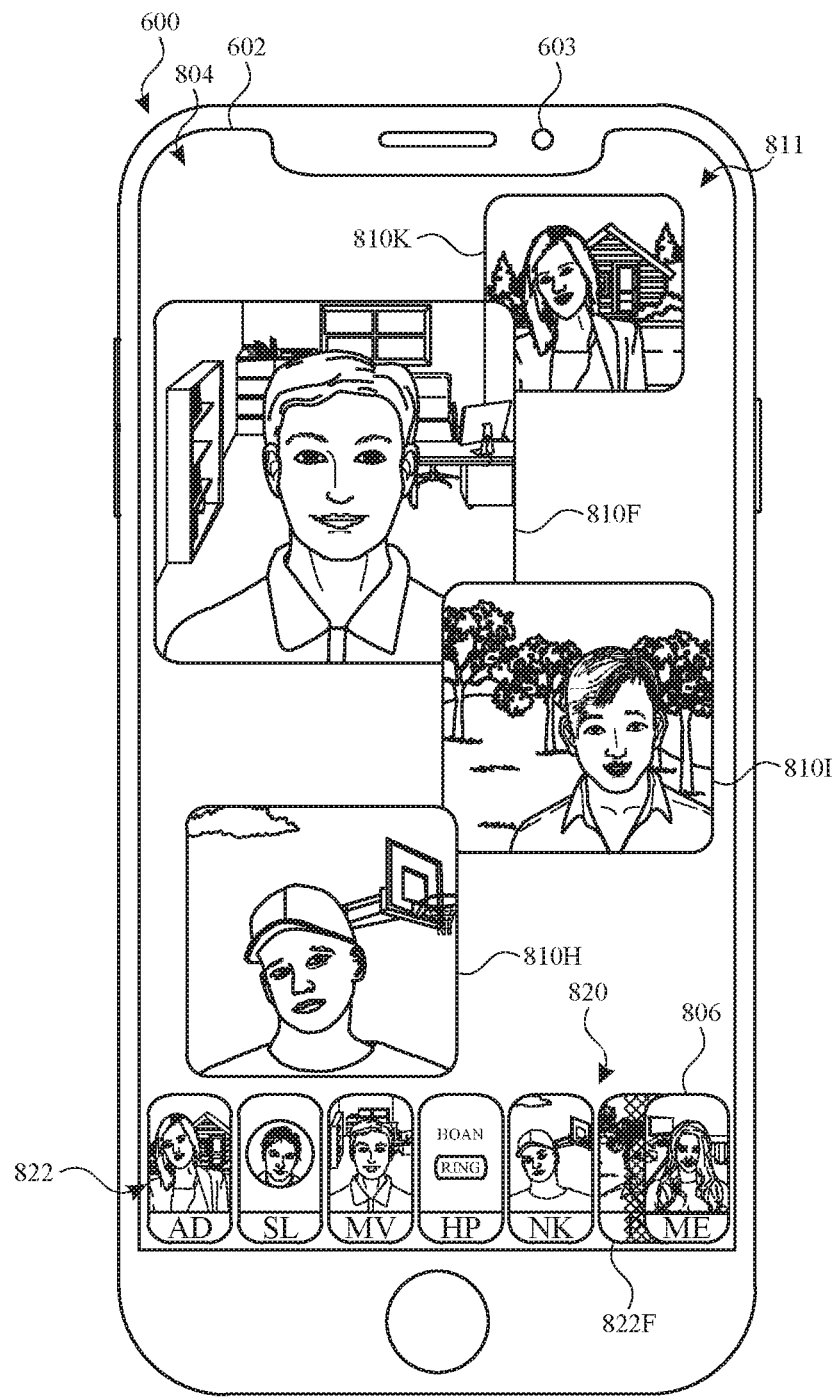
Figure 8B:
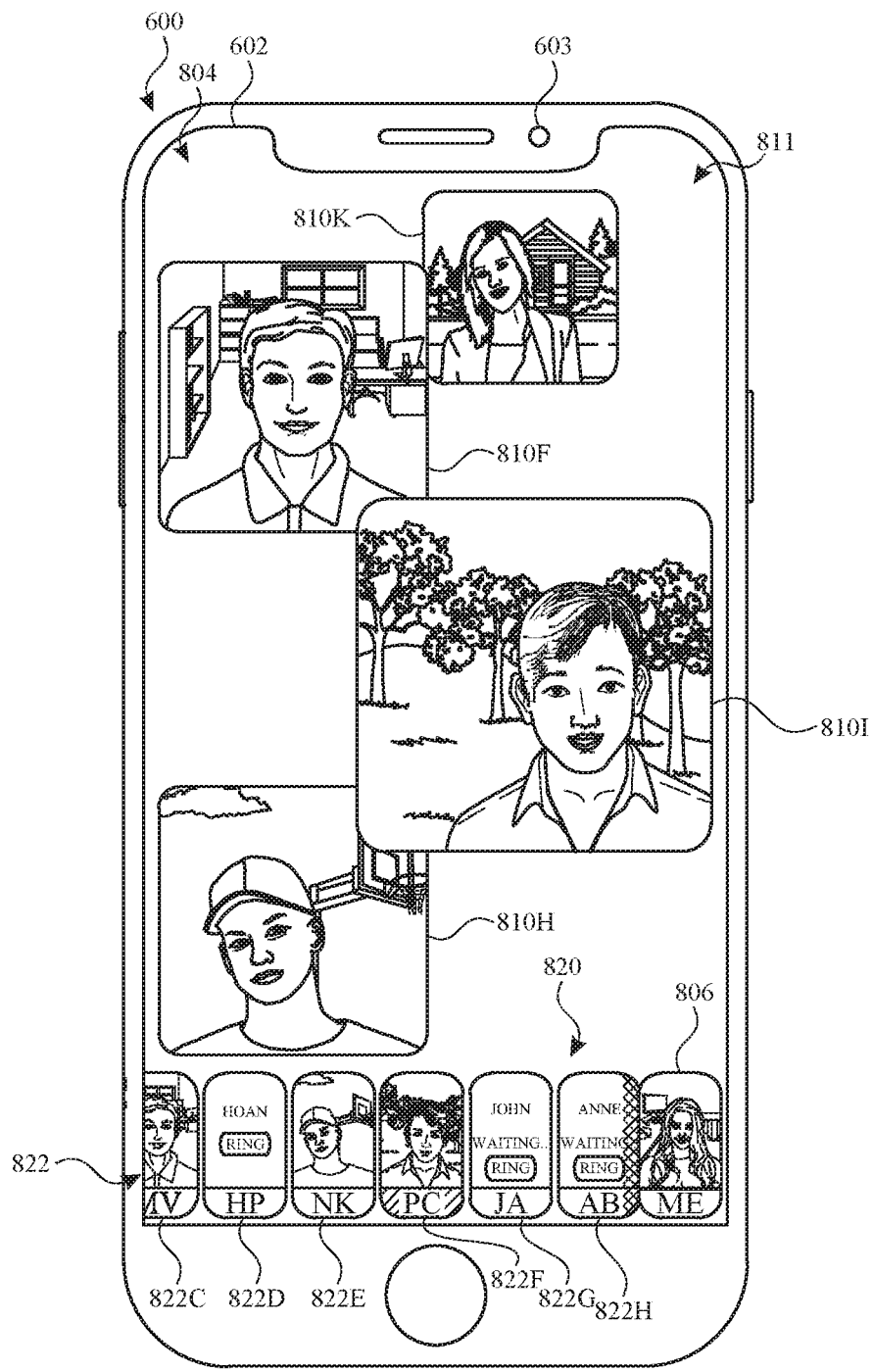
Figure 8B:
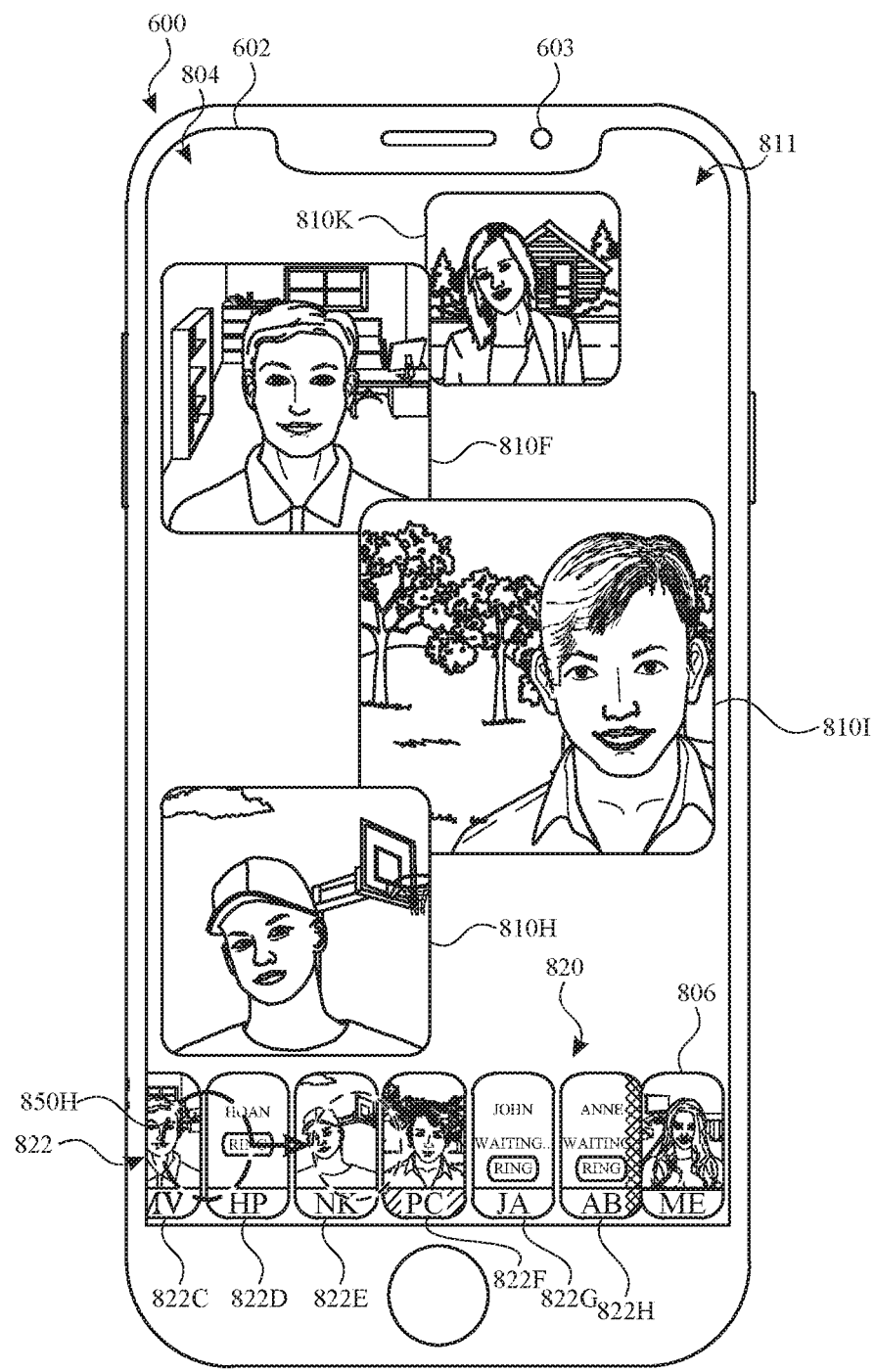
Figure 8B:
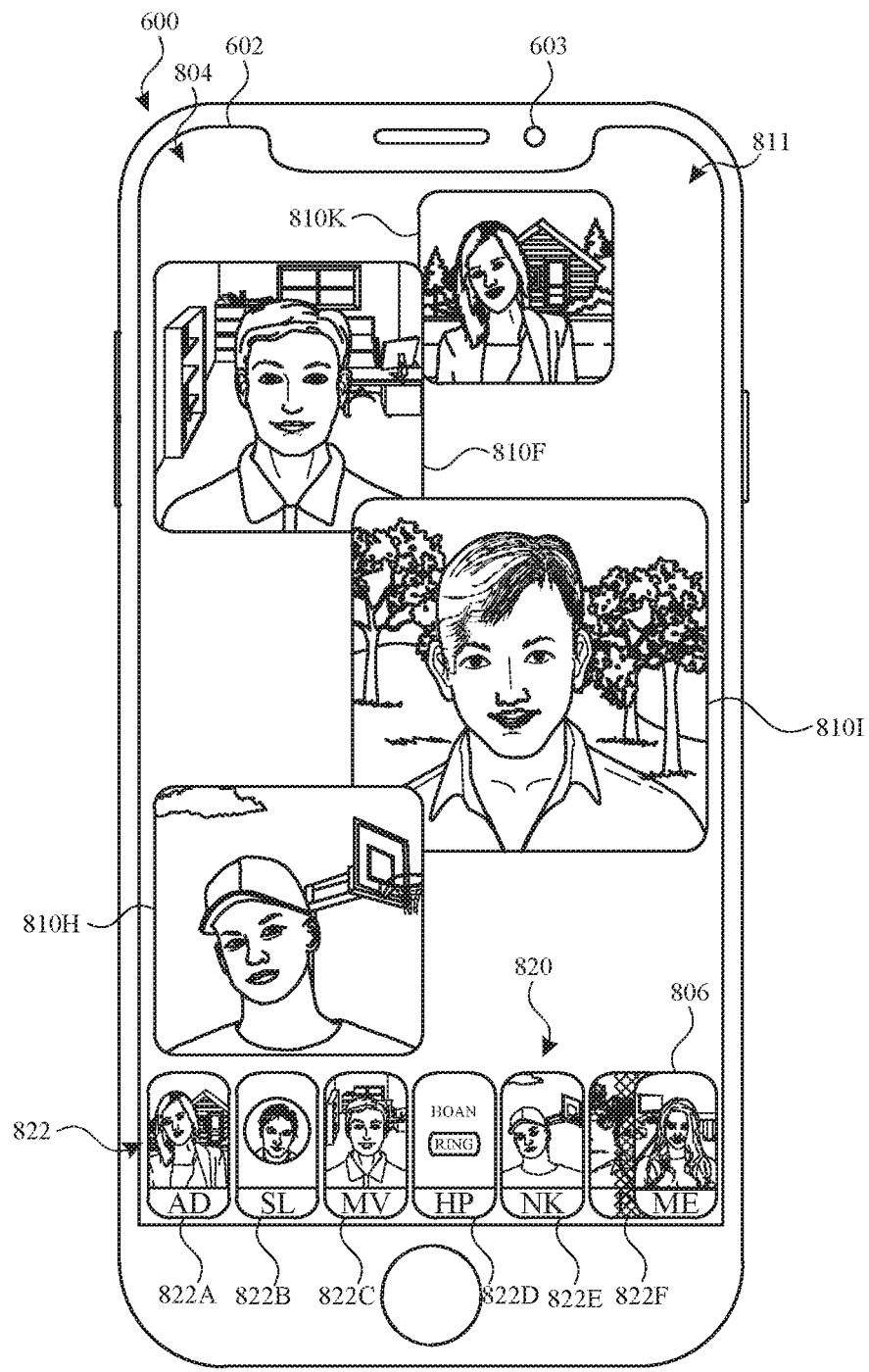
Figure 9A:
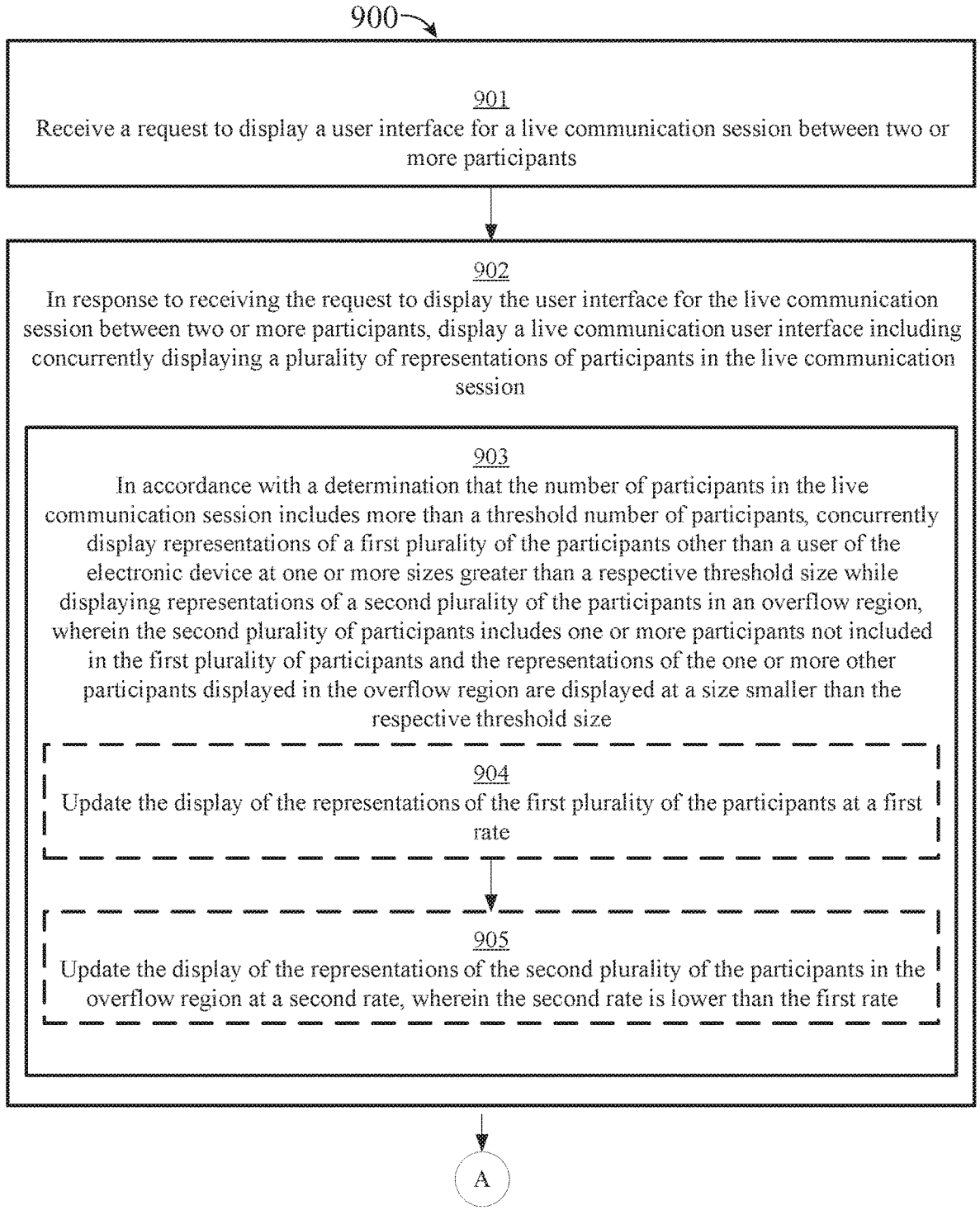
FIGS. 9A-9K illustrate an exemplary method in accordance with some embodiments.
Figure 9B:
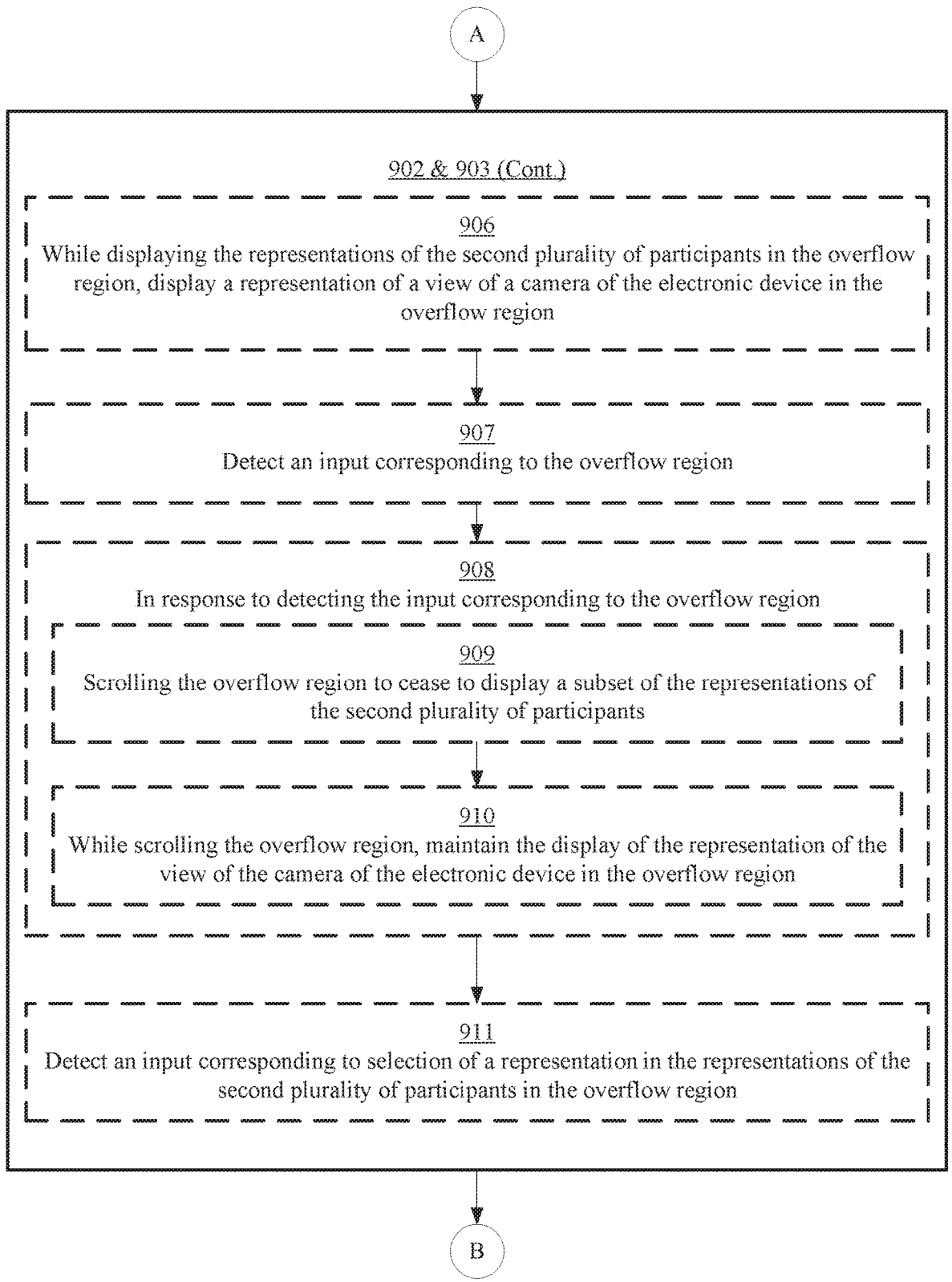
Figure 9C:
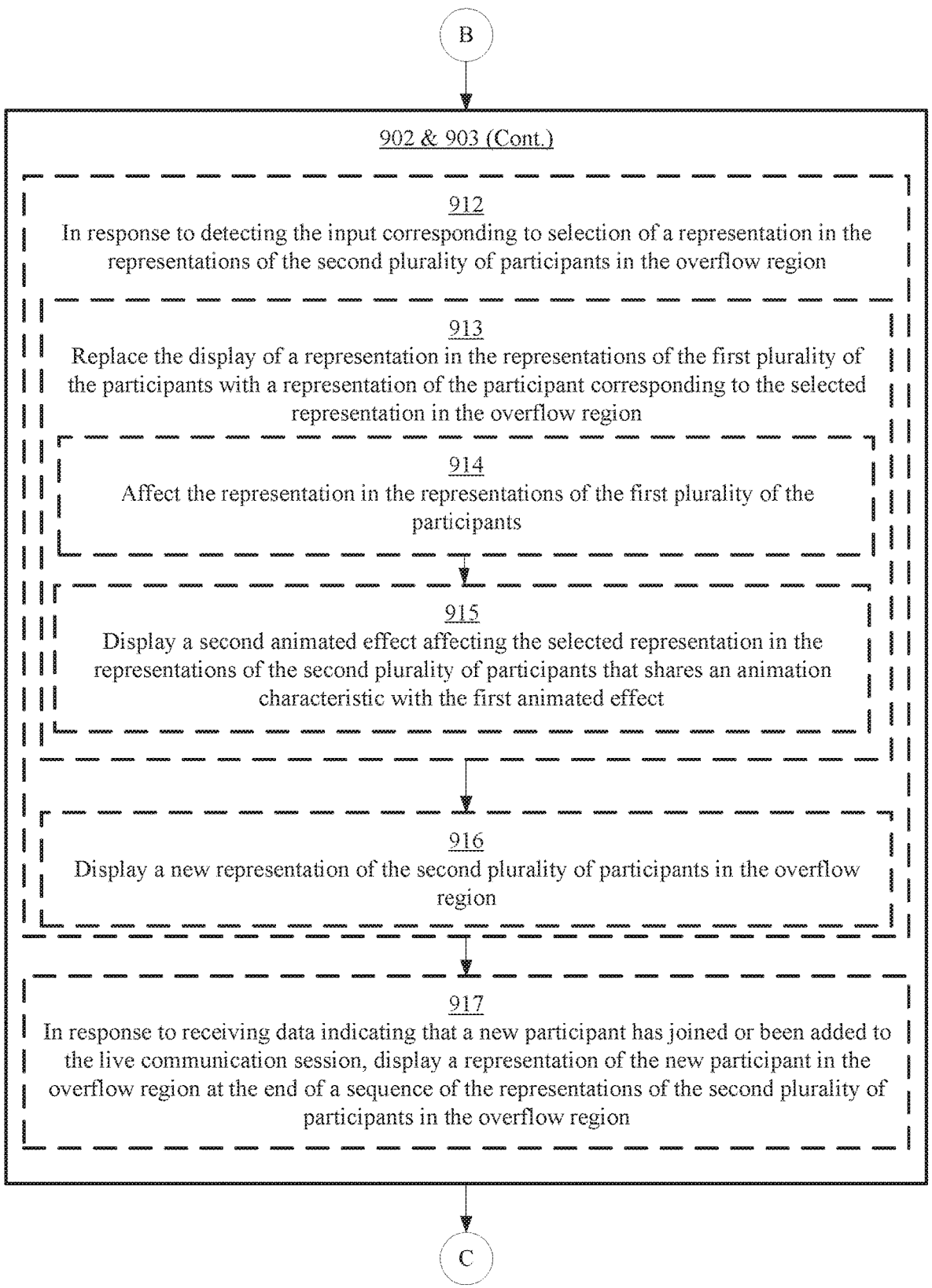
Figure 9D:
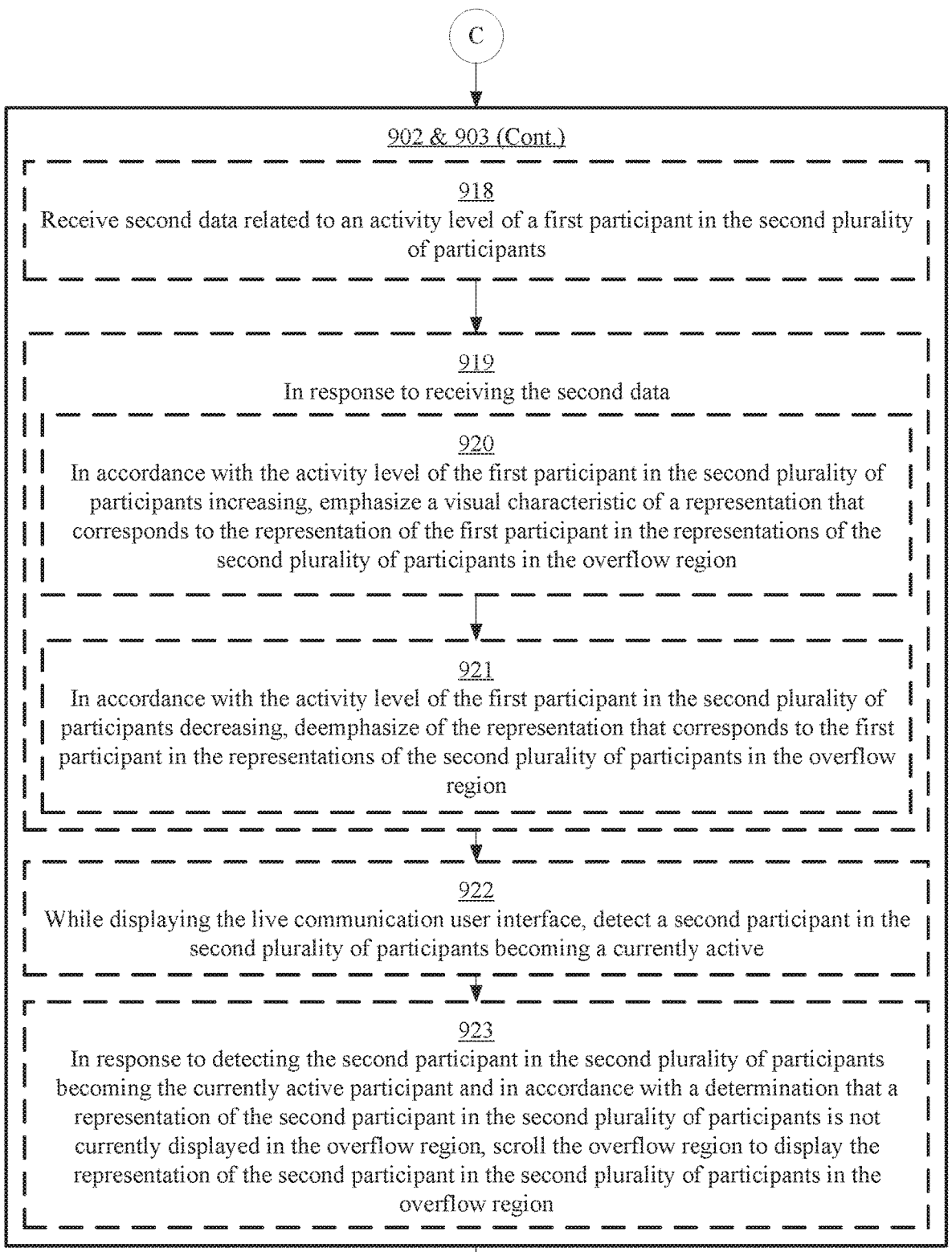
Figure 9E:
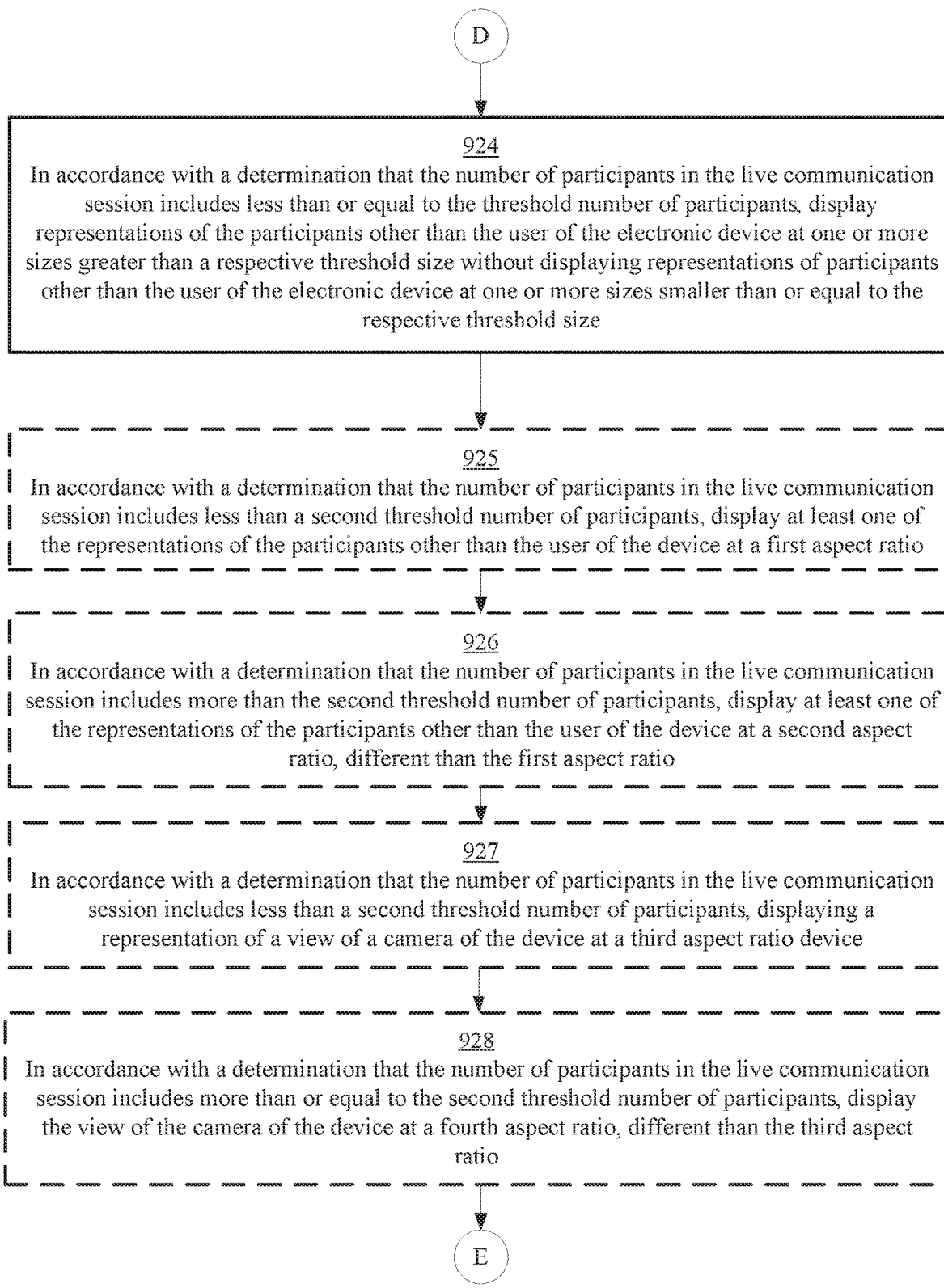
Figure 9F:
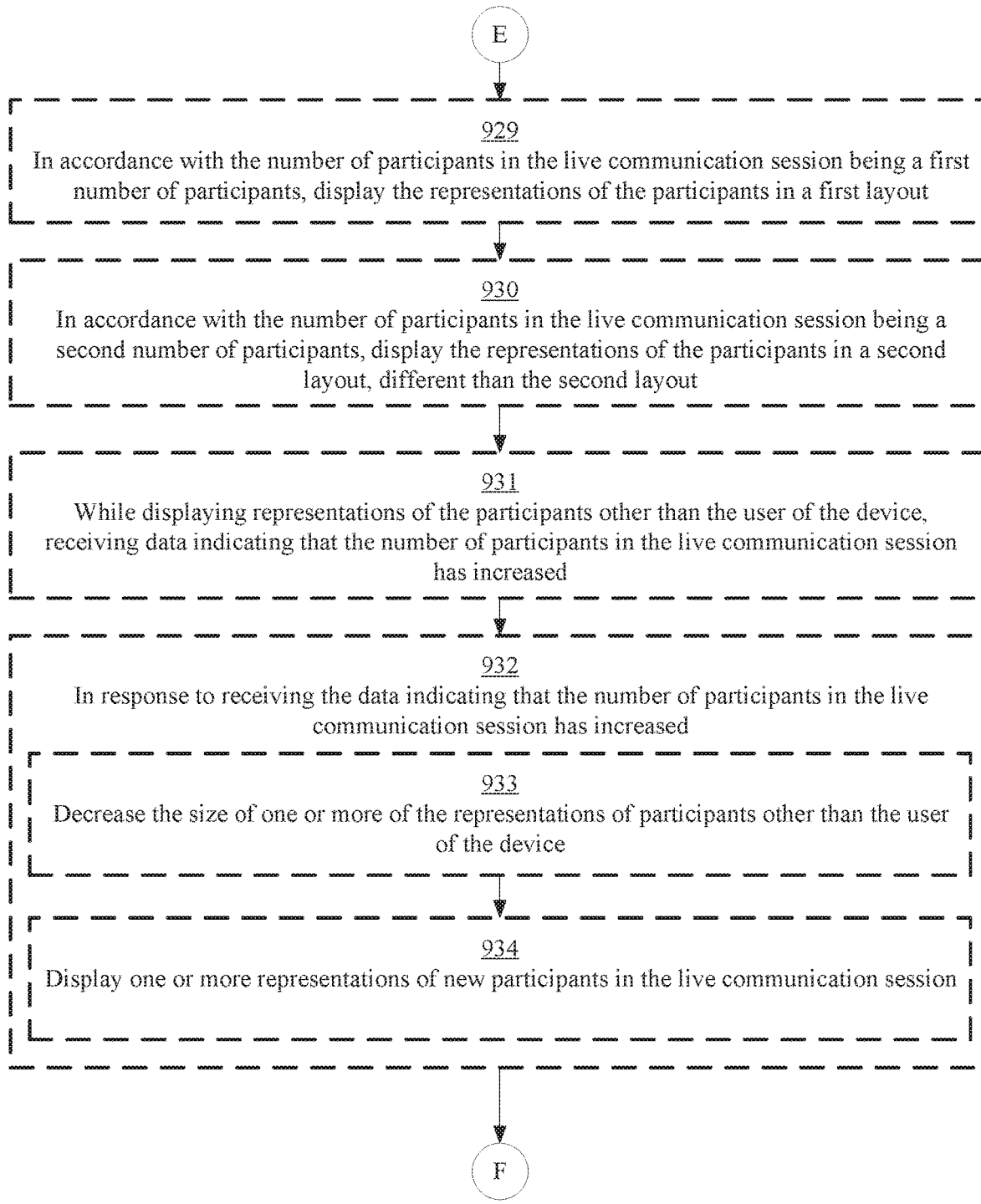
Figure 9G:
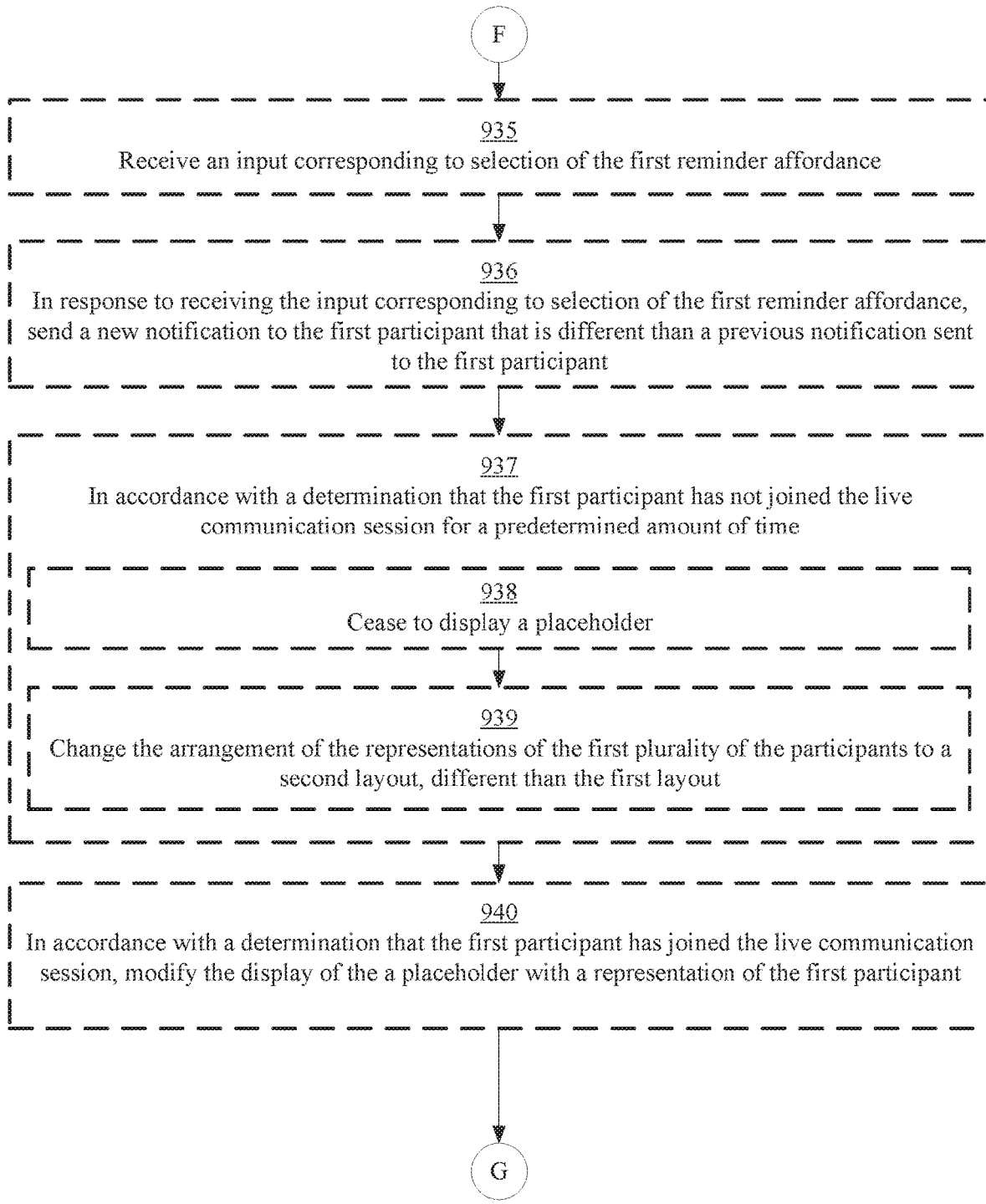
Figure 9H:
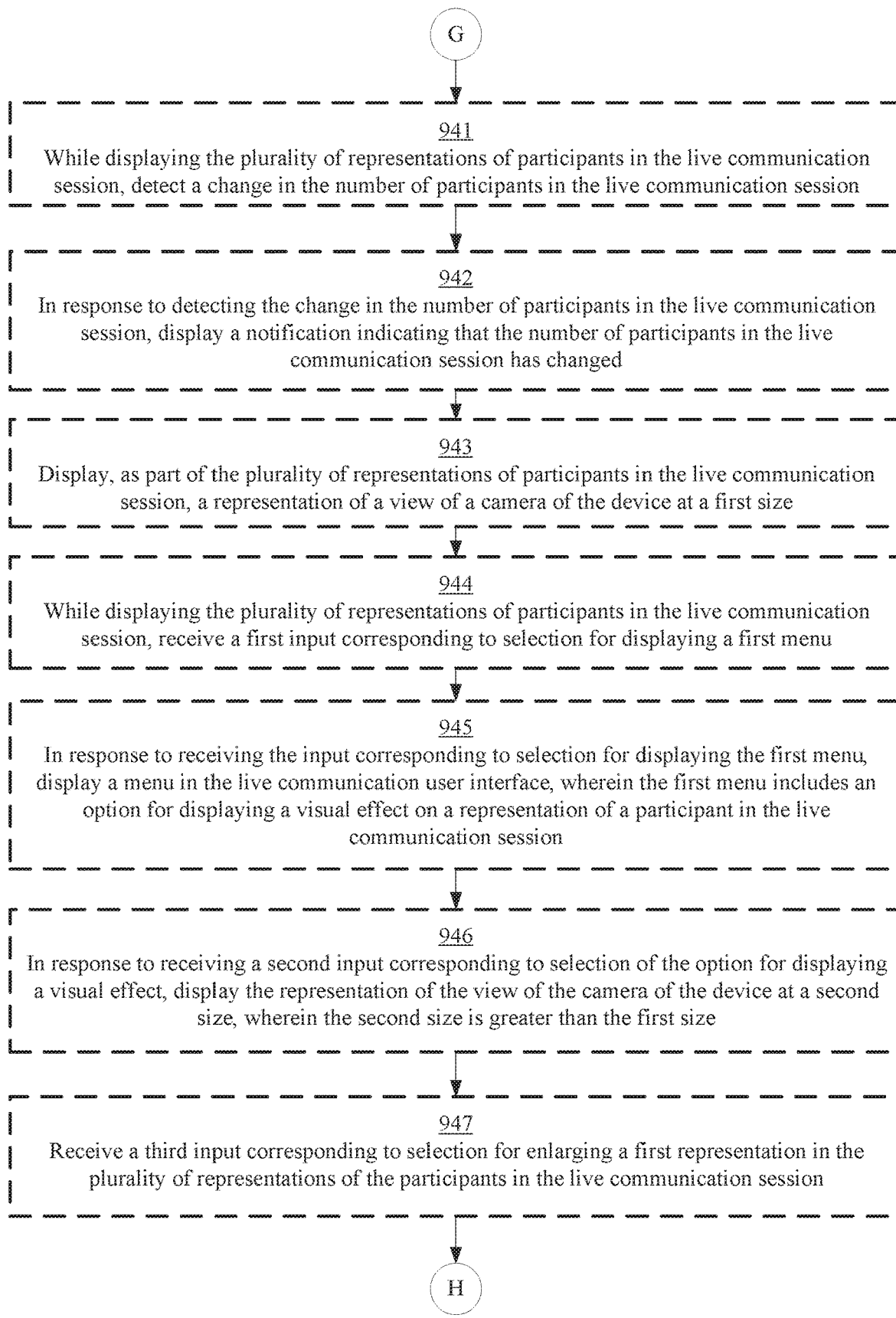
Figure 9I:
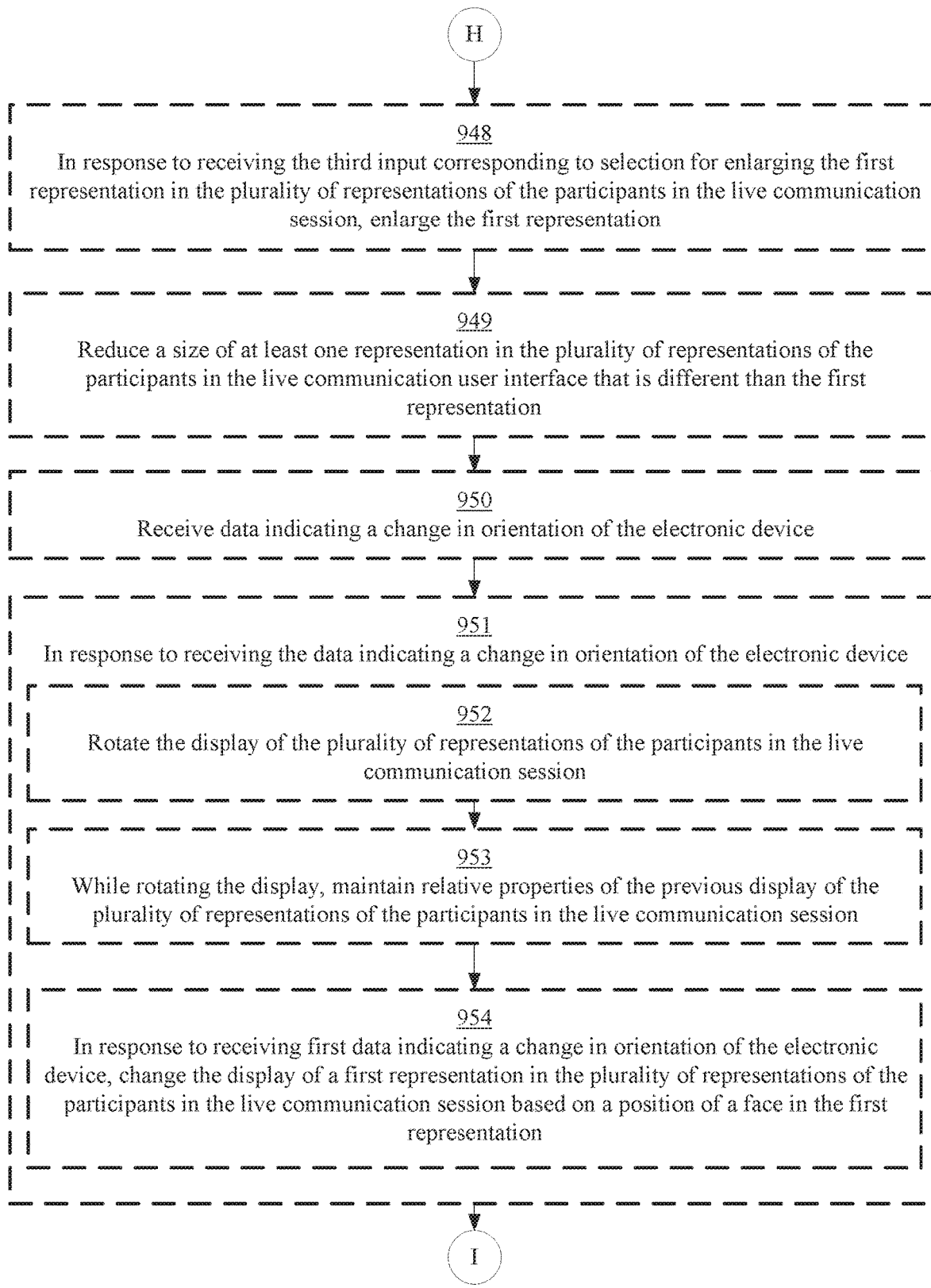
Figure 9J:
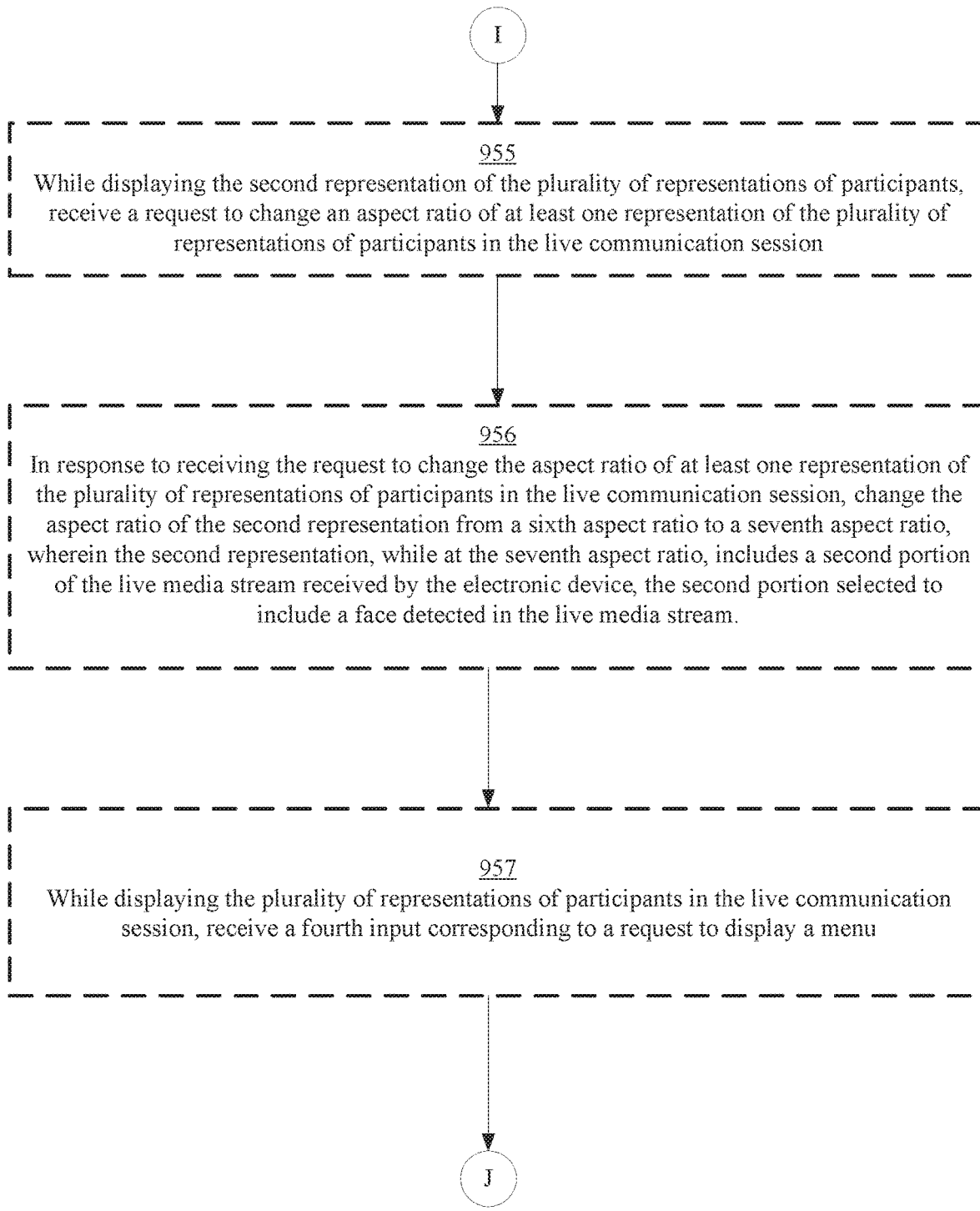
Figure 9K:
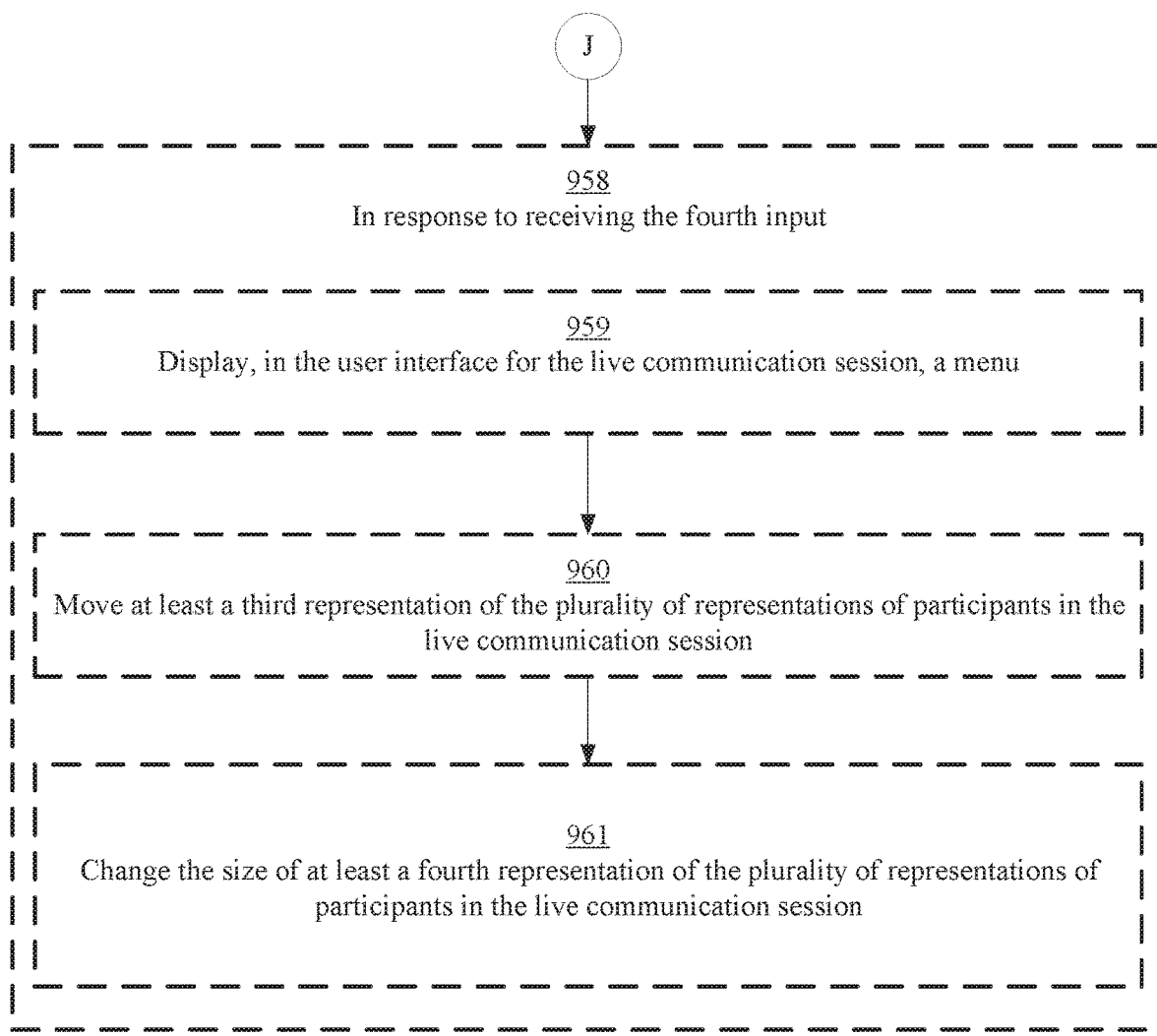

In some embodiments, in response to a participant joining the live communication session, device 600 replaces an existing primary representation with a primary representation of the newly joined participant and moves the replaced participant to overflow region 820. In FIG. 8Z, a participant Pablo joins the live communication session. In response, device 600 replaces the smallest primary representation 810E (Stephen) with primary representation 810I of newly joined participant Pablo and displays overflow representation 822F (Stephen) in overflow region 820. To make room for overflow representation 822F, overflow representations 822A, 822C, 822D, and 822E are scrolled (e.g., upward according to the orientation of device 600 illustrated in FIG. 8Z). As illustrated in FIG. 8Z, overflow representation 822A is no longer visible and overflow representation 822C is partially hidden by user representation 806.

As illustrated in FIG. 8AA, device 600 is rotated from a landscape (horizontal) orientation to a portrait (vertical) orientation. In response, device 600 rotates the images of the participants in the representations while maintaining the area on display occupied by each representation (e.g., device 600 reverses the rotation performed in response to device being rotated from a portrait orientation to a landscape orientation).

In FIG. 8AB, the participant corresponding to primary representation 810G leaves (disconnects from) the live communication session. Optionally, as illustrated in the embodiment shown in FIG. 8BC, in response, device 600 displays notification 828 indicating that the participant has left the live communication session. Since the number of participants remains greater than five, device 600 maintains the 4-on-1 layout with the display of overflow region 820. As illustrated in FIG. 8AC, primary representation 810G is replaced with primary representation 810J of the participant with the next highest activity level, Stephen, and overflow representation 822F corresponding to participant Stephen is removed from overflow region 820. When overflow representation 822F is removed, the remaining overflow representations 822A, 822C, 822D, and 822E are scrolled to the left. In the embodiment illustrated in FIG. 8BD, overflow representation 822D of participant Hoan is updated to display a placeholder indicating that participant Hoan is not connected and a reminder affordance to request participant Hoan to rejoin.

In some embodiments, if the number of participants in the live communication is reduced from six to five when a participant leaves the live communication session, device 600 ceases to display overflow region 820 and, optionally, increases the size and/or vertical spacing of one or more of the primary representations.

In FIG. 8AC, device 600 receives (e.g., detects) user input 850F (e.g., a double tap) corresponding to selection of overflow representation 822E of participant Allison. As illustrated in FIG. 8AD, in response to receiving user input 850F, device 600 displays enlarged representation 830 of participant Allison in front of the 4-on-1 layout of the currently displayed primary representations 810. Display of enlarged representation 830 is similar to the display of enlarged representation 810G in FIG. 8N, except that enlarged representation 830 is not brought forward from a primary representation in the 4-on-1 layout.

As illustrated in FIG. 8AD, device 600 receives (e.g., detects) user input 850G (e.g., a tap) corresponding to selection of close affordance 818. As illustrated in FIGS. 8AE-8AF, in response to receiving user input 850F, device 600 displays primary representation 810K of participant Allison in place of primary representation 810J of participant Stephen (e.g., the participant having the lowest activity status of the participants with a current primary representation). Primary representation 810K (at least initially) includes ribbon (or sash) 842A along the bottom of edge, which includes the participant's name and an affordance for enlarging the representation (e.g., as illustrated in FIG. 8AD). FIGS. 8AE-8AF illustrate an exemplary animation of replacing primary representation 810J with primary representation 810K. Primary representation 810K is initially displayed at the small representation size (like primary representation 810J in FIG. 8AC) and then is enlarged to a medium representation size, while primary representation 810H is reduced from medium to small. Overflow representation 822E corresponding to participant Allison is reduced in size and/or fades out, while overflow representation 822F of the replaced participant translates into overflow region 820. In some embodiments, ceasing to display primary representation 810J and displaying primary representation 810K includes a crossfade from primary representation 810J to primary representation 810K and/or a tint to create a "flash" effect. FIGS. 8BE-8BH illustrate an embodiment in which primary representation 810J is removed with a flash effect.

In some embodiments, overflow region 820 is scrollable. Referring to the embodiment illustrated in FIGS. 8BH-BI, device 600 scrolls the overflow representations 822 in overflow region 820 in response to active participation by a participant for which the corresponding overflow representation is not currently displayed or not completely displayed. As illustrated in FIG. 8BH, overflow representation 822F of the participant (corresponding to primary representation 810I) is partially hidden in overflow region 820. In FIG. 8BH, the participant corresponding to primary representation 810I actively participates in the live communication session. As illustrated in FIG. 8BI, in response to receiving data indicating that the participant corresponding to primary representation 810I is actively participating, device 600 enlarges primary representation 810I, scrolls the overflow representations 822 such that overflow representation 822F is fully displayed (e.g., near the middle of the displayed portion of overflow region 820), and visually indicates overflow representation 822F by highlighting the initial bar at the bottom of overflow representation 822F.

Turning to FIG. 8AG, device 600 detects contact 850H, which is moved horizontally from right to left on overflow region 820 while maintaining contact with display 602. As illustrated in FIG. 8AH, in response to receiving contact 850H, device 600 scrolls overflow representations 822 to the left on display 602 such that overflow representation 822F is moved partially off the left edge of display 602 and overflow representation 822A is no longer overlapped by user representation 806. In some embodiments, contact 850H and overflow representations 822 move by the same horizontal amount.

Primary representations 810 remain unchanged while scrolling overflow region 820. Also, user representation 806 remains in overflow region 820.

In the embodiment illustrated in FIGS. 8BJ-8BK, contact 850H begins at the left side of overflow region 820 and is moved horizontally to the right. In response, device 600 scrolls overflow representations 822 to the right on display 602. In FIGS. 8BJ-8BK, device 600 removes (e.g., no longer displays) representations from display 602 as they reach user representation 806.

Turning to FIG. 8AH, device 600 receives (e.g., detects) user input 850I (e.g., a tap) at a location on display 602 where a primary representation 810 is not displayed. As illustrated in FIG. 8AI, in response to receiving user input 850I, device 600 displays call control menu 832, which includes call affordance 834 (e.g., to leave the live communication session), effects affordance 836, menu affordance 838, and handle affordance 840.

As illustrated in FIG. 8AI, call control menu 832 does not overlap with overflow region 820 and primary representations 810. To make room for call control menu 832, device 600 reduces the size and/or vertically translates one or more of the primary representations 810 (e.g., reduces the size of canvas region 811) and moves overflow region 820 upward on display 602. In some embodiments, device 600 reduces the size of medium sized primary representations and maintains the size of small and large primary representations. In some embodiments, device 600 reduces the vertical separation and/or increases the vertical overlap between the primary representations.

In response to receiving user input 850I, device 600 also displays ribbons 842A-842D on each of the primary representations. Ribbons 842A-842D include the name of the corresponding participant and an affordance to enlarge the representation (e.g., as illustrated in FIG. 8O). In some embodiments, the vertical height of ribbons 842A-842D is the same as the amount of vertical overlap between primary representations.

As illustrated in FIG. 8AJ, device 600 receives (e.g., detects) user input 850J (e.g., a tap) corresponding to selection of menu affordance 838. In some embodiments, user input 850J includes an upward swipe starting at call control menu 832 (e.g., on handle affordance 840). As illustrated in FIG. 8AK, in response to user input 850J, device 600 expands call control menu 832 to display additional information and controls related to the live communication session, analogous to the additional information and controls described with respect to call control menu 630 in FIG. 6H.

As illustrated in FIG. 8AL, device 600 receives (e.g., detects) user input 850K (e.g., a tap) corresponding to selection of effects affordance 836. As illustrated in FIG. 8AM, in response to receiving user input 850K, device 600 displays an enlarged image 843 of the user of device 600 from camera 603 and modifies call control menu 832. In modified call control menu 832, effects affordance 836 is highlighted and effect options affordances 844A-844E are displayed. In FIG. 8AN, device 600 receives (e.g., detects) user input 850L (e.g., a tap) corresponding to selection of effect options affordance 844A. As illustrated in FIG. 8AO, in response to receiving user input 850L, device 600 modifies call control menu 832 to include avatar options affordances 846A-846C. In FIG. 8AO, device 600 receives (e.g., detects) user input 850M (e.g., a tap) corresponding to selection of avatar affordance 846C. As illustrated in FIG. 8AP, in response to receiving user input 850M, device 600 displays effect 843A over the user's face in image 843 and scrolls call control menu 832 to place affordance 846C of the currently selected avatar centered in call control menu 832. In FIG. 8AP, device 600 receives (e.g., detects) user input 850N (e.g., a tap) on cancel affordance 848. As illustrated in FIG. 8AQ, in response to receiving user input 850N, device 600 returns call control menu 832 to the configuration of FIG. 8AN and maintains display of effect 843A on enlarged image 843. In FIG. 8AQ, device 600 receives (e.g., detects) user input 850O (e.g., a tap) on display 602 outside of enlarged image 843 and call control menu 832. As illustrated in FIG. 8AR, in response to receiving user input 850O, device 600 ceases displaying enlarged image 843 and displays effect 843A on the image of the user in user representation 806. When effect 843A is activated, as in FIG. 8AR, the live video stream of the user of device 600 includes effect 843A.

As illustrated in FIG. 8AR, call control menu 832 includes media affordance 844E. Device 600 receives (e.g., detects) user input 850P (e.g., a tap) corresponding to selection of media affordance 844E. As illustrated in FIG. 8AS, in response to receiving user input 850P, device 600 modifies call control menu 832 to include media options affordances 852A-852D. In FIG. 8AS, device 600 receives (e.g., detects) user input 850Q (e.g., a tap) corresponding to selection of media options affordance 852A (SKETCH). In response to receiving user input 850Q, device 600 displays a representation of media content associated with media options affordance 852A in canvas region 811.

As illustrated in FIG. 8AT, in response to receiving user input 850Q, device 600 replaces primary representation 810K (e.g., the smallest primary representation) with representation 810L of the selected media item. In FIG. 8AT, device 600 receives (e.g., detects) user input 850R (e.g., a down swipe on call control menu 832) corresponding to a request to dismiss call control menu 832. As illustrated in FIG. 8AU, in response to receiving user input 850R, device 600 ceases displaying call control menu 832.

In some embodiments, selecting media options affordance 852A causes the associated media content to be shared with other participants of the live communication session (e.g., displayed in the canvas region on the display of a device of another participant). In some embodiments, participants of the live communication session can interact with the shared media content (e.g., via a sequence of one or more inputs in the user interface of the live communication application). FIG. 8AV illustrates an embodiment in which an additional feature 810L-1 has been added to the media content of representation 810L. In some embodiments, in response to participant interaction with the media content associated with representation 801L, device 600 enlarges representation 801L (e.g., similar to the way in which a primary representation is enlarged then selected or the participant corresponding to the representation actively participates). As illustrated in FIG. 8AV, representation 810L is enlarged (compared to FIG. 8AT) in response to participant interaction with associated media content. FIG. 8AV also illustrates representation 810M of other content (e.g., a game between two participants) shared in the live communication session.

FIGS. 9A-9K are a flow diagram illustrating a method in accordance with some embodiments. Method 900 is performed at a device (e.g., 100, 300, 500, or 600) with a display. Some operations in method 900 are, optionally, combined, the orders of some operations are, optionally, changed, and some operations are, optionally, omitted.

As described below, method 900 provides, among other things, an intuitive way for providing an adaptive and intelligent live communication user interface. In addition, among other things, method 900 provides an intuitive way for users to interact with a live communication user interface. The method reduces the cognitive burden on a user by providing an adaptive and intelligent live communication interface based on the number of participants in the live communication, thereby creating a more efficient human-machine interface. For battery-operated computing devices, enabling a user to view a live communication user interface based on a predetermined number of participants in the live communication is faster and more efficiently conserves power and increases the time between battery charges.

At block 901, the device receives a request (e.g., 850A) to display a user interface for a live communication session between two or more participants.

At block 902, in response to receiving the request to display the user interface for the live communication session between two or more participants, the device displays a live communication user interface (e.g., 804) including concurrently displaying a plurality of representations of participants (e.g., 810A-810D) in the live communication session, where displaying the plurality of representations of participants in the live communication session includes blocks 902 and 903. In some embodiments, the live communication session user interface includes a placeholder (e.g., 810A of FIG. 8C) (e.g., a graphical placeholder (e.g., an image or virtual avatar) a textual placeholder (e.g., a name or initials)) associated with a first participant who has been invited to the live communication session but has not yet joined the live communication session (e.g., a participant other than the user of the electronic device; a participant that has yet to join the communication session and that has been sent an invitation to join the communication session). In some embodiments, if a participant is sharing a live media stream that includes a live video stream, the representation includes images of the live video stream (e.g., 810B of FIG. 8D). In some embodiments, if a participant is sharing a live media stream with only audio, the representation includes an avatar of the respective participant (e.g., 810E of FIG. 8I). In some embodiments, the plurality of representations of participants in the live communication session includes a user communication status selected from a group consisting of an audio-only status (e.g., participant is communication using audio only), a video status (e.g., participant is talking using video and audio), a video paused status (e.g., participant's video is paused), a video not decoded status (e.g., participants video stream cannot be processed because of latency issues, issues with the format of the video stream, etc.), a left status (e.g., participant has left the live communication session), and a waiting to join (e.g., participant was invited to the live communication session but have not joined the live communication yet) status.

At block 903, in accordance with a determination that the number of participants in the live communication session includes more than a threshold number of participants, the device concurrently displays representations of a first plurality of the participants (e.g., 810A-810D) other than a user of the electronic device at one or more sizes greater than a respective threshold size while displaying representations of a second plurality of the participants (e.g., 822) in an overflow region (e.g., 820), wherein the second plurality of participants includes one or more participants not included in the first plurality of participants and the representations of the one or more other participants displayed in the overflow region are displayed at a size smaller than the respective threshold size. In some embodiments, a currently active participant (e.g., 810E of FIG. 8J) (e.g., a most active participant, a participant that is speaking or moving in a manner that satisfies an active participant set of criteria) is displayed as part of the first plurality of participants. In some embodiments, the currently active participant is displayed in a main region (e.g., 811) of the user interface (e.g., a region where the first plurality of participants is displayed). In some embodiments, if a participant that is not currently displayed in the main region (e.g., participant corresponding to 822B of FIG. 8U) becomes the currently active participant, the representation of that participant is displayed in the main region (e.g., 810H of FIG. 8V). In some embodiments, the representations of the first plurality of participants (e.g., 810) are displayed at two or more different sizes (e.g., with more active participants or more recently active participants displayed at a larger size than less active participants or less recently active participants) and the representations of the second plurality of participants (e.g., 822) in the overflow region are displayed at the same size.

In some embodiments, the overflow region (e.g., 820) further includes representations of the first plurality of the participants (e.g., 810A-810D) (e.g., representations of participants displayed in a main region of the user interface are also displayed in the overflow region) (e.g., FIG. 8AX). In some embodiments, the overflow region (e.g., 820) further includes placeholder representations (e.g., 822A in FIG. 8AW) (e.g., an avatar, a name, initials) for invitees of the live communication session that are not currently connected to the live communication session. Displaying representations of participants differently based on whether prescribed condition as met (e.g., based on whether the live communication session includes greater than a number of participants) allows the user to view representations of participants in the live communication session easier or more efficiently. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at blocks 904 and 905, the device updates the display of the representations (e.g., the arrangement, positions, size, position, visual indications, visual content, and/or video feed of a representation) of the first plurality of the participants (e.g., 810A-810D) at a first rate (e.g., the representations of the first plurality of participants are live video feeds that are updated at a frame rate that is at or greater than a typical video refresh rate such as 24, 30, or 60 frames per second) and updates the display of the representations (e.g., the arrangement, positions, size, position, visual indications of the representations, visual content, and/or video feed of a representation) of the second plurality of the participants (e.g., 822) in the overflow region at a second rate, where the second rate is lower than the first rate.) (e.g., the thumbnails in the overflow region are updated over time, but at a rate that is less than the video refresh rate of the representations of the plurality of participants in canvas region 811, such as 1, 5, or 10 frames per second). Updating the displays of sets of representations at different rates allows the device to provide the user with feedback about the current state of representations in a live communication while conserving processing power to provide a set of representations at a faster rate than the other set of representations, and thereby, proving the user the ability to view a higher prioritized set of representations at a greater rate. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at block 906, the device, while displaying the representations of the second plurality of participants (e.g., 822) in the overflow region (e.g., 820), displays a representation of a view of a camera of the electronic device (e.g., 806) in the overflow region (e.g., a self-view camera view). Displaying a representation of a view of a camera of the electronic device provides the user with visual feedback about the current state of the view of the user camera (e.g., what a user is showing to other participants in the live communication session). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at blocks 907, 908, 909, and 910, the device detects an input (e.g., 850H) (e.g., a horizontal finger drag) corresponding to the overflow region. In response to detecting the input corresponding to the overflow region, the device scrolls the overflow region (e.g., scrolling the representations of the second plurality of participants in a first direction in accordance with the input), to cease to display (e.g., to hide) a subset of the representations of the second plurality of participants (e.g., 822G and 822H in FIGS. 8BJ-8BK). While scrolling the overflow region, the device maintains the display of the representation of the view of the camera of the electronic device (e.g., 806) in the overflow region (e.g., FIGS. 8BJ-BK). In some embodiments, scrolling the overflow region includes displaying an animation of one or more representations of the second plurality of participants appearing to scroll under the representation of the view of the camera of the device. Maintaining the display of the representation of the view of the camera of the electronic device while scrolling the overflow region provides the user with continued feedback about the current state of the view of the camera of the electronic device (e.g., what a user is showing to other participants in the live communication session) while also allowing the user with the ability to scroll through representation of participants in the overflow region. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at blocks 911, 912, and 913, detects an input (e.g., 850F) (e.g., tap gesture corresponding to a representation in overflow region 820 or a gesture having a characteristic intensity that exceeds an intensity threshold corresponding to a representation in overflow region 820) corresponding to selection of a representation (e.g., 822E of FIG. 8AC) in the representations of the second plurality of participants in the overflow region. In response to detecting the input corresponding to selection of a representation in the representations of the second plurality of participants in the overflow region, the devices replaces the display of a representation (e.g., 810J in FIG. 8AC) in the representations of the first plurality of the participants with a representation of the participant (e.g., 810K of FIG. 8AE) corresponding to the selected representation in the overflow region (e.g., replace the last recently active participant in the main display). In some embodiments, replacing the display of the representation in the representations of the first plurality of the participants with the representation of the participant corresponding to the selected representation in the overflow region includes ceasing to display the selected representation in the representations of the second plurality of participants in the overflow region. In some embodiments, ceasing to display the selected representation in the overflow region includes an animation of the selected representation shrinking. In some embodiments, other representations in the overflow region are translated to fill a gap where the selected representation was displayed. In some embodiments, replacing the display of the representation in the representations of the first plurality of the participants with the representation of the participant corresponding to the selected representation in the overflow region includes displaying the representation of the participant corresponding to the selected representation at a first size and then enlarging the representation of the participant corresponding to the selected representation to a second size larger than the first size. In some embodiments, the representation of the selected participant replaces the smallest representation in the canvas region (corresponding to the participant in the canvas region with the lowest activity level), and then is automatically increased in size to (e.g., to the medium representation size) while another representation (corresponding to the participant in the canvas region with the second lowest activity level) is reduced in size (e.g., to the small representation size).

Replacing the display of a representation corresponding to the selected representation in the overflow region and/or ceasing to display the selected representation in the overflow region provides additional control options without cluttering the UI and provides the user with more control of the device and the display of representations by helping the user to quickly replace a representation with the user's selected presentation. Providing additional control of the device without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at block 914, the device displays a first animated effect (e.g., FIGS. 8AA-8AC) (e.g., the representation gets bigger, then smaller, optionally with a crossfade and tint to create a "flash" effect) affecting the representation in the representations of the first plurality of the participants. Optionally, at block 915, the device displays a second animated effect affecting the selected representation in the representations of the second plurality of participants that shares an animation characteristic with the first animated effect (e.g., FIGS. 8BF-8BH) (e.g., a rate of fading/shrinking from the main display can correspond to a rate of flashing in the overflow display). Displaying the second animation that corresponds to the first animation provides visual feedback to quickly identify which representations are being switched and/or replaced. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at block 916, further, in response to detecting the input (e.g., 850H) corresponding to the overflow region, the device displays a new (e.g., a previously hidden) representation of the second plurality of participants in the overflow region (e.g., 822A in FIGS. 8AG-8AH). Displaying a new representation of a participant in the overflow region in response to input allows the user to view representations easier and more efficiently by increasing the accessibility of displayed representations. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at block 917, in response to receiving data indicating that a new participant has joined or been added to the live communication session, the device displays a representation of the new participant in the overflow region at the end of a sequence of the representations of the second plurality of participants in the overflow region (e.g., 822B in FIG. 8R).

Optionally, at blocks 918, 919, 920, and 921, the device receives second data related to an activity (e.g., speaking, moving) level of a first participant in the second plurality of participants. In response to receiving the second data, the device, in accordance with the activity level of the first participant in the second plurality of participants increasing, emphasizes (e.g., increase or initiate) a visual characteristic (e.g., size, highlight representation (e.g., display border), animation (e.g., pulsing avatar), bring image to front) of a representation that corresponds to the representation of the first participant in the representations of the second plurality of participants in the overflow region (e.g., 822B of FIG. 8U). In response to receiving the second data, the device, in accordance with the activity level of the first participant in the second plurality of participants decreasing, deemphasizes (e.g., increase or initiate) a visual characteristic (e.g., size, highlight representation (e.g., display border), animation (e.g., pulsing avatar), bring image to front) of the representation that corresponds to the first participant in the representations of the second plurality of participants in the overflow region. Emphasizing and/or deemphasizing a visual indication when prescribed conditions are met allow the user to quickly recognize the activity level of participants including participants that are most and/or least active. Performing an optimized operation when a set of conditions has been met without requiring further user input enhances the operability of the device and makes the user-device interface more efficient (e.g., by helping the user to provide proper inputs and reducing user mistakes when operating/ interacting with the device) which, additionally, reduces power usage and improves battery life of the device by enabling the user to use the device more quickly and efficiently. In addition, emphasizing and/or deemphasizing when prescribed conditions are met provides visual feedback to the user indicating the activity level of each participant. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at blocks 922 and 923, while displaying the live communication user interface, the device detects a second participant in the second plurality of participants becoming a currently active participant (e.g., a most active participant, a participant that is speaking or moving in a manner that satisfies an active participant set of criteria). In response to detecting the second participant in the second plurality of participants becoming the currently active participant and in accordance with a determination that a representation of the second participant in the second plurality of participants is not currently displayed in the overflow region, the device scrolls the overflow region to display the representation of the second participant in the second plurality of participants in the overflow region (e.g., 822F of FIGS. 8BH-8BI). Dynamically scrolling the overflow region to display an active participant in the overflow region allows viewing of the representation of the active participant in the overflow region without selecting any additional inputs. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

At block 924, in accordance with a determination that the number of participants in the live communication session includes less than or equal to the threshold number of participants, the device displays representations of the participants other than the user of the electronic device at one or more sizes greater than a respective threshold size without displaying representations of participants other than the user of the electronic device at one or more sizes smaller than or equal to the respective threshold size (e.g., FIG. 8P). In some embodiments, the electronic device receives (e.g., prior to displaying the user interface for the live communication session) a plurality of live media streams associated with respective participants of a plurality of participants of a live video communication session. In some embodiments, the number of received live media streams corresponds to the number of participants currently joined in the live video communication session, which does not include the participant using the device. Displaying representations of participants differently based on whether prescribed condition are met (e.g., based on whether the live communication session includes less than or equal to a number of participants display representations without an overflow region) allows the user to view representations of participants in the live communication session easier or more efficiently. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with a determination that the number of participants in the live communication session includes less than a second threshold number of participants, none of the plurality of representations of remote participants (e.g., participants other than the user) overlap each other (e.g., FIG. 8J). In some embodiments, in accordance with a determination that the number of participants in the live communication session includes more than or equal to the second threshold number of participants, at least some of the plurality of representations of the remote participants (e.g., participants other than the user) overlap each other (e.g., FIG. 8K).

Optionally, at blocks 925 and 926, in accordance with a determination that the number of participants in the live communication session includes less than a second threshold (e.g., two participants, including the user of the electronic device (e.g., one other participant)) number of participants, the device displays at least one of the representations of the participants other than the user of the device at a first aspect ratio (e.g., 810B of FIG. 8H) (e.g., a rectangular aspect ratio). In accordance with a determination that the number of participants in the live communication session includes more than the second threshold (e.g., three or more participants) number of participants, the device displays at least one of the representations of the participants other than the user of the device at a second aspect ratio (e.g., a square aspect ratio), different than the first aspect ratio (e.g., 810B of FIG. 8I). Displaying representations of the participants at different aspect ratios based on the number of participants in the live communication session based on prescribed conditions being met allows the device to provide an intelligent live communication user interface by maximizing the size of the representations and/or the organization of the representation to provide a better user experience based on the number of participants, allowing the user to view representation on the device easier and more efficiently. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at blocks 927 and 928, in accordance with a determination that the number of participants in the live communication session includes less than a second threshold (e.g., two participants) number of participants, the device displays a representation of a view of a camera of the device (e.g., a self-view from a camera of the device) at a third aspect ratio (e.g., a rectangular aspect ratio) (e.g., 806 of FIG. 8H). In accordance with a determination that the number of participants in the live communication session includes more than or equal to the second threshold (e.g., three or more participants) number of participants, the device displays the representation of the view of the camera of the device (e.g., a self-view from a camera of the device) at a fourth aspect ratio (e.g., a square aspect ratio), different than the third aspect ratio (e.g., 806 of FIG. 8J). Displaying a view of the camera of the device at different aspect ratios based on the number of participants in the live communication session based on prescribed conditions being met allows the device to provide an intelligent live communication user interface by maximizing the size of the representation of the view of the camera to the user and allowing the user to view a representation on the device easier and more efficiently. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at blocks 929 and 930, in accordance with the number of participants in the live communication session being a first number of participants, the device displays the representations of the participants in a first layout (e.g., arrangement or pattern) (e.g., FIG. 8J). In some embodiments, the first layout is one of a plurality of predefined layouts in which representations of users are anchored at different locations in the user interface (e.g., layouts selected randomly). In some embodiments, the layout (e.g., arrangement) of the representations of a first plurality of the participants (e.g., other than a user of the device) is determined based on the number of participants in the live communication session. In accordance with the number of participants in the live communication session being a second number of participants, the device displays the representations of the participants in a second layout, different than the second layout (e.g., FIG. 8K) (e.g., layout changes as participants join/leave the live communication sessions). In some embodiments, the first layout and the second layout are in a family of predetermined layouts that have similar relative placement of representations of users. (e.g., a family of predetermined layouts includes layouts that work well together). In some embodiments, a family of predetermined layouts includes layout members for a plurality of possible participant numbers (e.g., a first member for one non-user of the device participants (e.g., a 1-up layout), a second member for two non-user-of-the-device participants (e.g., a 2-up layout), and so forth. In some embodiments, the electronic device includes a plurality of families of predetermined layouts, where the members of each family share a common characteristic). Displaying representations in different layouts that have similar relative placement of representations of users based on the number of users allows the user view the representations easier and more efficiently with increased visibility. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at blocks 931, 932, 923 and 934, while displaying representations of the participants other than the user of the device, the device receives data indicating that the number of participants in the live communication session has increased. In response to receiving the data indicating that the number of participants in the live communication session has increased, the device decreases the size of one or more of the representations of participants other than the user of the device (e.g., FIGS. 8J-8K). In response to receiving the data indicating that the number of participants in the live communication session has increased, the device displays one or more representations of new (e.g., participants who have recently just joined the group before the original display) participants in the live communication session (e.g., FIGS. 8J-8K).

Decreasing the size of one or more representations and displaying a new representation provides the user with feedback about the current state of the live communication session and provides visual feedback to the user indicating that a new participant has joined the live communication. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at blocks 935 and 936, the device receives an input (e.g., 850B) corresponding to selection of the first reminder affordance (e.g., 808). In response to receiving the input corresponding to selection of the first reminder affordance, the devices sends a new notification (e.g., call, ring, etc.) to the first participant that is different than a previous notification sent to the first participant (e.g., the second notification is more intrusive than the first notification). Sending a notification to the first participant in response to receiving an input corresponding to a selection of a reminder affordance that is different from a previous notification sent to the participant reduces the number of inputs needed to perform an operation. Reducing the number of inputs needed to perform an operation (e.g., the number of options needed for the user to remind the participant) enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In addition, performing an operation automatically, such as sending a notification that is different from a first notification, without further user input) enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In embodiments where the placeholder and the representations of the first plurality of the participants are arranged in a first layout, optionally, at blocks 937, 938, and 939, the device, in accordance with a determination that the first participant has not joined the live communication session for a predetermined amount of time (e.g., not joined the live communication after a predetermined period of time), ceases to display the placeholder (e.g., FIGS. 8E and 8F). Further, in accordance with a determination that the first participant has not joined the live communication session for a predetermined amount of time, the device changes the arrangement of the representations of the first plurality of the participants to a second layout, different than the first layout (e.g., includes enlarging and/or moving one or more of the representations of participants (e.g., display a layout with the first participant not included in the layout). In some embodiments, the device receives data from a server or another device to make the determination that the first participant has not joined the live communication session for a predetermined amount of time. In some embodiments, the device can make the determination that the first participant has not joined the live communication session for a predetermined amount of time because it hasn't displayed any representations of the user. Ceasing to display the placeholder and changing the arrangement of the representations when prescribed conditions are met allows users to quickly recognize when other users are joining or not joining the call while maximizing the visibility of displayed participants and/or placeholders. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In addition, ceasing to display the placeholder and changing the arrangement of the display provides the user with feedback about the current state of a live communication session, and provides visual feedback to the user indicating that certain operations associated with the notification and/or the live communication session will be performed. Providing improved visual feedback to the user enhances the operability of the device and makes the user-device interface more efficient (e.g., by helping the user to provide proper inputs and reducing user mistakes when operating/interacting with the device), which additionally, reduces power usage and improves battery life of the device by enabling the user to use the device more quickly and efficiently.

Optionally, at block 940, in accordance with a determination that the first participant has joined the live communication session, the devices modifies the display of the first placeholder with a representation of the first participant (e.g., 810B of FIGS. 8C-8D) (e.g., a placeholder can have participants name). In some embodiments, the device can receive data from a server or another device to make this determination. In some embodiments, the device can make this determination because it hasn't displayed any representations of the user. In some embodiments, an animation occurs. Modifying the display of the first placeholder with a representation of the participant allows the user to quickly recognize which users have joined the call, provides the user with feedback about the current state of a live communication session, and provides visual feedback to the user indicating that certain operations associated with the notification and/or the live communication session will be performed. Providing improved visual feedback to the user enhances the operability of the device and makes the user-device interface more efficient (e.g., by helping the user to provide proper inputs and reducing user mistakes when operating/interacting with the device), which additionally, reduces power usage and improves battery life of the device by enabling the user to use the device more quickly and efficiently.

Optionally, at blocks 941 and 942, while displaying the plurality of representations of participants in the live communication session, the device detects a change in the number of participants in the live communication session. In response to detecting the change in the number of participants in the live communication session, displaying a notification (e.g., 812) indicating that the number of participants in the live communication session has changed. In some embodiments, the notification, when a participant leaves the live communication session, is an animation of the departing participant's representation being replaced with a placeholder graphic (e.g., a graphic that includes the participant's name or initials) that subsequently disappears (e.g., after a predetermined time). In some embodiments, the notification, when a new participant joins the live communication session, is display of a placeholder (e.g., a graphic that includes the participant's name or initials) for the new participant that is subsequently replaced (e.g., after a predetermined time) with a representation (e.g., a representation based on video data transmitted from a device of the new participant) of the new participant. In some embodiments, the notification indicating that the number of participants in the live communication session has changed is displayed in accordance with a determination that the number of participants joined in the live communication session exceeds a threshold number of participants (e.g., when the overflow region includes more than a predefined maximum number of representations (e.g., 3 or 4 representations other than the user of the electronic device). In some embodiments, the device forgoes displaying a notification that the number of participants in the live communication session has changed (e.g., the notification is not displayed when there is another visible indication that a participant has joined or left the live communication session, such as display of a representation of a newly joined participant or removal of the display of a representation of a participant who has left the session). In some embodiments, the device provides an audio output indicating that the number of participants in the live communication session has changed without displaying a notification (e.g., when there is no visible indication that a participant has joined or left the live communication session). In some embodiments, the notification includes an indication (e.g., the name) of a participant that has joined or left the live communication session. In some embodiments, if multiple participants join and/or leave the live communication session within a threshold amount of time, the device generates a single notification that indicates the number of participants that joined and/or left the live communication session within the threshold amount of time. In some embodiments, participants joining the live communication session and participants leaving the live communication session are grouped together into separate notifications. In some embodiments, when a participant leaves or joins the live communication session, the device delays displaying a notification until the threshold amount of time has elapsed in order to determine whether the notification should include information about additional participants joining and/or leaving the live communication session. Displaying a notification indicating that the number of participants in the live communication session has changed provides the user with feedback about the current state of the number of participants in the live communication and provides visual feedback to the user indicating that a change has occurred in the number of participants in the live communication session. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at blocks 943, 944, 945, and 946, the device displays, as part of the plurality of representations of participants in the live communication session, a representation (e.g., self-view) of a view of a camera of the device at a first size (e.g., 806 of FIG. 8AH). While displaying the plurality of representations of participants in the live communication session, the device receives a first input (e.g., 850I) (e.g., triggered based on single tap on background or up swipe) corresponding to selection for displaying a first menu (e.g., 832). In response to receiving the input corresponding to selection for displaying the first menu, the device displays the first menu (e.g., call control menu 832) in the live communication user interface (e.g., 804), where the first menu includes an option (e.g., 836) for displaying a visual effect (e.g., creative camera) on a representation of a participant in the live communication session. In some embodiments, menu includes other options, such as to end the call switch cameras (e.g., front-facing camera to back facing camera). In response to receiving a second input (e.g., 850K) corresponding to selection of the option for displaying a visual effect (e.g., 842), the device displays (e.g., overlaying on representations of participants) the representation of the view of the camera of the device at a second size (e.g., 842), wherein the second size is greater than the first size.

Optionally, at blocks 947, 948, and 949, the device receives a third input (e.g., 850C) (e.g., double tap on representation in the main region or an input having a characteristic intensity that exceeds an intensity threshold) corresponding to selection for enlarging a first representation in the plurality of representations of the participants in the live communication session (e.g., 810F of FIG. 8L). In response to receiving the third input corresponding to selection for enlarging the first representation in the plurality of representations of the participants in the live communication session, the device enlarges the first representation (e.g., 810F of FIG. 8M). The device reduces a size of at least one representation in the plurality of representations of the participants in the live communication user interface that is different than the first representation (e.g., 810E of FIGS. 8L-8M). Dynamically reducing the sizing of one or more representations in a set of displayed representations and enlarging a selected representation provides improved feedback that allows a user to focus and easily view the enlarged representation while minimizing the reduced representations. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at blocks 950, 951, 952, and 953, the device receives data indicating a change in orientation of the electronic device (e.g., in a first direction (e.g., change of 90 degrees clock)). In response to receiving the data indicating a change in orientation of the electronic device, the device rotates the display of the plurality of representations of the participants in the live communication session (e.g., FIGS. 8W-8X) (e.g., in a second direction (e.g., opposite the first direction to maintain that the images are upright)). The device, while rotating the display, maintains relative properties (e.g., size, position of user interface objects (e.g., representations), arrangements, etc. of another display) of the previous display of the plurality of representations of the participants in the live communication session. Automatically rotating the device and maintaining relative properties of previously displayed representations when certain conditions are met (e.g., data indicating that the user is rotating the device) allows the user to view the rotated representation in the same previously displayed positions without changing the arrangement, size, or positions of the representation with minimal visual distractions. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at block 954, in response to receiving first data indicating a change in orientation of the electronic device (e.g., from portrait orientation to landscape orientation), the device changes the display of a first representation in the plurality of representations of the participants in the live communication session based on a position of a face in the first representation (e.g., 822C of FIGS. 8AZ-8BA) (e.g., if the representations are not square, adjust the display so that the participant's face is in the center of the representation when going from a portrait representation (where the participant's face might be biased toward the top of the representation) to a landscape representation).

Optionally, at blocks 955 and 956, while displaying the second representation of the plurality of representations of participants, the device receives a request to change the aspect ratio of at least one representation of the plurality of representations of participants in the live communication session. In response to receiving the request to change the aspect ratio of at least one representation of the plurality of representations of participants in the live communication session, the device changes the aspect ratio of the second representation from the sixth aspect ratio to a seventh aspect ratio (e.g., a square or circular aspect ratio), where the second representation, while at the seventh aspect ratio, includes a second portion (e.g., a portion that is less than the first portion, a cropped portion) of the live media stream received by the electronic device, the second portion selected to include a face detected in the live media stream (e.g., 822C of FIGS. 8AZ-8BA). In some embodiments, the electronic device changes the aspect ratio of a representation based on a live video feed and crops a portion of the live video feed by selecting a portion of the live video feed that includes a detected face so that the detected face is not cropped out of the representation. Maintaining a view of the faces in representation of participants provides the user with feedback allowing the user to view the other participants' faces when changing the aspect ratio. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at blocks 957, 958, 959, 960, and 961, while displaying the plurality of representations of participants in the live communication session, the device receives a fourth input (e.g., 850I) (e.g., triggered based on single tap on background or up swipe) corresponding to a request to display a menu (e.g., 832). In response to receiving the fourth input, device displays in the user interface for the live communication session, a menu (e.g., 832). The device moves at least a third representation of the plurality of representations of participants in the live communication session (e.g., 810H of FIG. 8AI) (e.g., in order to accommodate the menu; in order to avoid overlapping with the menu). The device changes the size of at least a fourth representation (e.g., a representation that is the same as the third representation; a representation that is different than the third representation) of the plurality of representations of participants in the live communication session (e.g., 810F of FIG. 8AI) (e.g., in order to accommodate the menu; in order to avoid overlapping with the menu). In some embodiments, representations are moved up and resized when a menu is displayed at the bottom of the screen. In some embodiments, at least one representation of the plurality of representations is not re-sized when displaying the menu. In some embodiments, the representations are representations having three predefined image sizes (e.g., 1 "small", 2 "medium", and 1 "large"), and only representations of one size (e.g., "medium" image(s)) are re-sized while keeping "small" and "large" representations the same size). Moving one or more representations and changing the size of one or more representations in the live communication session when displaying a menu provides additional control options while maintaining the visibility of the representations in the live communication user interface. Providing additional control options without cluttering the live communication user interface with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the device receives data indicating an increase in an activity level of a first participant in the second plurality of participants represented in the overflow region above an activity level of a participant corresponding to a first representation in the representations of the first plurality of participants (e.g., a participant represented in the overflow region begins talking such that his activity level increases above the activity level of one of the participants represented in the canvas region), and in response: replaces the display of the first representation in the representations of the first plurality of the participants with a representation of the first participant in the second plurality of participants (e.g., replaces the participant in the canvas region having the lowest activity level with the representation of the speaking participant); and ceases to display the representation of the first participant in the overflow region. In some embodiments, ceasing to display the representation of the first participant in the overflow region includes an animation of the representation shrinking. In some embodiments, other representations in the overflow region are translated to fill a gap where the representation was displayed. In some embodiments, replacing the display of the first representation in the representations of the first plurality of the participants includes displaying, in the overflow region, a representation of the participant corresponding to the replaced first representation.

In some embodiments, while displaying the plurality of representations of participants in the live communication session, the device receives an input corresponding to a request to display a menu. In response to receiving the input corresponding to the request to display the menu, the device displays the menu in the live communication user interface, where the menu includes an option for selecting a content item (e.g., game, video, sketch). In some embodiments, the device receives an input corresponding to selection of a content item, and in response to receiving the input corresponding to selection of the content item, the device replaces a representation of a participant displayed at a size greater than the respective threshold size (e.g., a representation of a participant in the canvas region) with a representation of the content item at a size greater than the respective threshold size (e.g., the content item is displayed in one of the positions in the canvas region).

In some embodiments, displaying representations of a second plurality of the participants in an overflow region includes: in accordance with a determination that a first number of participants (e.g., 6 total participants) are participating in the live communication session, displaying a first set of representations in the overflow region (e.g., two representations, including a representation of the least active participant and the representation of the view of the camera of the device); and in accordance with a determination that a second number of participants (e.g., 7 total participants) different than the first number of participants are participating in the live communication session, displaying a second set of representations (e.g., three representations, including representations of the two least active participant and the representation of the view of the camera of the device) different than the first set of representations in the overflow region, where the second set of representations includes a different number of representations than the first set of representations.

Note that details of the processes described above with respect to method 900 (e.g., FIG. 9A-9K) are also applicable in an analogous manner to the methods described below/above. For example, method 900 optionally includes one or more of the characteristics of the various methods described above with reference to methods 700, 1100, 1300, and 1500.

FIGS. 10A-10S illustrate exemplary techniques for, inter alia, dynamically adjusting user interfaces of live communication sessions, in accordance with some embodiments. The user interfaces in these figures are used to illustrate the processes described below, including the processes in FIG. 11A-11F.

FIG. 10A illustrates device 600 displaying user interface 1000 of an active live communication session. User interface 1000 includes representations of five participants in the live communication session displayed in canvas region 1001. Representation 1010A includes a placeholder for a participant that has not connected to the live communication session. Representation 1010B includes a representative image for a participant that is providing only audio data. Representations 1010C and 1010D include live video feeds from two respective participants. Representation 1002 includes a view from camera 603 of device 600.

Each participant has an activity level that is used to determine the layout of user interface 1000. In some embodiments, the activity level of a participant is based on an audio and/or video feed (e.g., motion or sound in the video feed) received from a device of the participant. In some embodiments, the activity level of a participant is based on filtered audio (e.g., audio filtered of background noise or filtered to isolate/amplify speech audio) from an audio feed received from the device of the participant. In some embodiments, the activity level of a participant is based on movement identified in a video feed received from the device of the participant that meets a set of movement criteria (e.g., movement that is of a certain type (e.g., hand movement, head/face movement, movement that is not background movement (e.g., non-participant movement)).

In some embodiments, the activity level of a participant is based on data indicating activity detected at the device of the first participant (e.g., data indicating that the first participant performed a user interface action at the device of the participant (e.g., selection of an attention affordance or a visual effect affordance). In some embodiments, the activity level is determined at an external electronic device (e.g., a server) and then transmitted to device 600.

As illustrated in FIG. 10A, the activity level of the participants of live communication session is in the following order, from highest to lowest, by representation: representation 1010C, representation 1010D, representation 1010B, and representation 1010A. The tables shown on the right side of FIGS. 10A-10O list the participants in descending order of activity level from highest to lowest, with the participant at the top of the list (1) having the highest activity level and the person at the bottom of the list (4) having the lowest activity level of the participants represented in canvas region 1001. In FIGS. 10A-10O, the representation corresponding to the participant with the highest activity level is the largest of the representations in canvas region 1001, and the representation corresponding to the participant with the lowest activity level of the participants represented in canvas region 1001 is the smallest. In FIGS. 10A-10O, the representations corresponding to the participants with the second highest activity level and third highest activity level have a size between the size of the representation of the participant with the highest activity level and the size of the representation of the participant with the lowest activity level of the participants represented in canvas region 1001.

In some embodiments, the activity level of a participant changes relative to the other participants. While displaying user interface 1000, device 600 receives data indicating that an activity level of participant Stephen corresponding to representation 1010B has increased above the activity level of participant Nicholas corresponding to representation 1010D. As illustrated in FIG. 10B, the activity level of representation 1010B increases above the activity level of representation 1010D, but does not changes size since it has the second to highest activity level. In FIG. 10B, participant Stephen continues to speak and becomes the participant with the highest activity level. In response, representation 1010B increases in size, representation 1010C decreases in size, and representation 1010A shifts to the right (e.g., to avoid excessive overlap with representation 1010B due to the increased size of representation 1002B), as illustrated in FIG. 10C. In some embodiments, device 600 changes the size and/or position of three or more representations on user interface 1000.

As illustrated in FIG. 10C, representations 1010A-1010D overlap with each other. In some embodiments, one or more of representations 1010A-1010D are reduced in size and/or moved when a representation is being increased in size in order to avoid obstructing a face of a participant and/or avoid creating an overlap that exceeds a predefined maximum overlap. In some embodiments, the front-to-back (aka "z-order") of representations 1010A-1010D does not change when a representation is increased in size (e.g., when a participant is actively participating). In some embodiments, a representation 1010 changes order (e.g., moves from behind to in front or from in front to behind) one or more representations when changing size (e.g., due to active participation by the corresponding participant or a user input at device 600 selecting a representation (e.g., in response to user input 850C in FIG. 8M described above)). For example, in some embodiments, representation 1010B is moved in front of representation 1010C and/or representation 1010A when increasing in size in FIGS. 10B-10C.

In some embodiments, the representations of the participants remain in the same general region on display 602 when changing size and/or position. As illustrated in FIGS. 10A-10C, after representations 1010A-1010D change size and/or position, each representation occupies at least part of the area it occupied prior to changing size and/or position.

Turning to FIG. 10D, participant Stephen of representation 1010B begins to stop talking, and, as illustrated in FIG. 10E, the participant in the live video feed of representation 1010A begins to physically move. The participant's motion is detected in the live video feed. In some embodiments, a participant is determined to be actively participating in the live communication session based on motion detected in a live video feed of the participant (e.g., motion indicative of physical movement of the participant). In some embodiments, movement of a participant results in an increase in the activity level of the participant. In some embodiments, a participant is determined to be actively participating in accordance with the motion meeting one or more criteria (e.g., duration, magnitude, direction, or predetermined gesture).

As illustrated in FIG. 10F, in response to receiving data indicating that the participant of representation 1010A is actively participating, device 600 increases the size of representation 1010A and decreases the size of representation 1010D. Representation 1010B remains the same size and is moved downward. In this way, representation 1010A transitions from the smallest representation to a medium size representation and representation 1010D transitions to being the smallest representation.

In some embodiments, in response to receiving data indicating that the participant of representation 1010A (e.g., the participant having the lowest activity level) is actively participating, device 600 increases the size of representation 1010A from the smallest representation to the largest representation, and decreases the size of representation 1010B. In some embodiments, representation 1010A is increased from the smallest representation to the largest representation in accordance with the participant corresponding to representation 1010A being the most recent participant to actively participate. For example, in some embodiments, in accordance with the participant corresponding to representation 1010A being the most recent participant to actively participate, device 600 transitions from the layout and relative representation sizes illustrated in FIG. 10E to the layout and relative representation sizes illustrated in FIG. 10G (discussed below).

In some embodiments, a participant actively participates in the live communication session by applying a visual effect to the live video feed provided to the live communication session. In some embodiments, a participant applies a visual effect via a user interface of the participant's device. In some embodiments, a participant is determined to be actively participating in the live communication session based on a visual effect included in the live media feed of the participant. As illustrated in FIG. 10F, a visual effect (robot face) is applied to the live video feed of representation 1010A. As a result, the participant of representation 1010A is determined to be actively participating and the participant's activity level is increased. As illustrated in FIGS. 10F-10H, in accordance with the determination that the participant of representation 1010A is actively participating, device 600 increases the size of representation 1010A to the largest representation size and reduces the size of representation 1010B to a medium representation size. The relative z-order of representations 1010A and 101B also change, as representation 1010A moves in front of representation 1010B due to the increased activity level of the participant associated with representation 1010A.

In FIG. 10H, device 600 receives (e.g., detects) user input 1050A (e.g., a tap) on representation 1010C. As illustrated in FIG. 10I-10J, in response to user input 1050A, device 600 increases the size of representation 1010C to the largest representation size. In addition, the participant corresponding to representation 1010D begins actively participating (e.g., talking), causing representation 1010D to increase to a medium size and representation 1010B to reduce to a small size.

In FIG. 10J, device 600 receives (e.g., detects) user input 1050B (e.g., a tap) on a location of display 602 at which a representation of a participant is not displayed. As illustrated in FIG. 10K, in response to user input 1050B, device 600 displays call control menu 1004, which is analogous to call control menu 630 described above.

As illustrated in FIG. 10K, the size of canvas region 1001 is reduced when call control menu 1004 is displayed such that call control menu 1004 does not overlap with the representations 1010. To make room for call control menu 1004, device 600 modifies the layout of representations 1010 by reducing the size and/or vertically translating upward one or more of the representations. In some embodiments, device 600 reduces the size of the medium sized representations, 1010A and 1010D, and maintains the size of the small and large primary representations, 1010B and 1010C, respectively. In some embodiments, device 600 reduces the vertical separation between representations (e.g., between representations 1010A and 1010C).

In response to receiving user input 1050B, device 600 also displays ribbons 1012A-1012D on each of the representations, except for representation 1002 of the user of device 600. Each ribbon includes the name of the corresponding participant and an affordance to enlarge the representation.

Turning to FIG. 10L, device 600 is illustrated in a landscape (horizontal) orientation. The relative activity levels of the participants are the same as in FIG. 10J. As compared to the portrait (vertical) orientation in FIG. 10J, the representations occupy the same respective areas of display 602 as in the portrait (vertical) orientation and images within the representations are rotated so that the participants appear upright. In some embodiments, in response to rotation of device 600 from the portrait orientation of FIG. 10J to the landscape orientation of FIG. 10L, device 600 displays an animated rotation of the representations or the images within the representations (e.g., 90 degrees opposite the direction of rotation of device 600).

Turning to FIG. 10M, beginning from the layout and activity levels illustrated in FIG. 10J, a sixth participant Pablo joins the live communication session. As illustrated in FIG. 10M, in response to the sixth participant joining the live communication session, and in accordance with a determination that the number of participants connected to the live communication session is greater than a predetermined threshold of five connected participants, device 600 replaces the image in representation 1010B corresponding to the participant with the lowest activity level with an image of the newly connected participant. Device 600 optionally provides a notification that the newly connected participant has joined the live communication session and displays an overflow representations 1022A of the newly connected participant in overflow region 1020. As illustrated in FIGS. 10M-10O, the size of canvas region 1001 is reduced when overflow region 1020 is displayed. At least some of representations 1010A-1010D are reduced in size and/or moved on display 602.

As illustrated in FIG. 10N, overflow representation 1010A corresponds to a participant that is not represented by a primary representation (e.g., the representations above overflow region 1020 in FIG. 10N). In FIG. 10N, device 600 receives (e.g., detects) user input 1050C (e.g., a tap) on overflow representation 1022A. As illustrated in FIG. 10O, in response to user input 1050C, device 600 replaces the image in representation 1010A with an image of the participant corresponding to selected overflow representation 1022A and displays overflow representation 1022B corresponding to the replaced participant (Hoan).

In some embodiments, device 600 replaces the image in representation 1010A of FIG. 10N with an image of the participant corresponding to overflow representation 1022A in response to active participation by the participant corresponding to overflow representation 1022A (e.g., instead of in response to user input 1050C). In some embodiments, device 600 replaces the image in representation 1010A of FIG. 10N with an image of the participant corresponding to overflow representation 1022A in response to a determination that the activity level of the participant corresponding to overflow representation 1022A has increased above the activity level of the participant corresponding to representation 1010A of FIG. 10N.

Turning to FIG. 10P, device 1008 with display 1014 is illustrated. In some embodiments, display 1014 has different characteristics (e.g., size and/or aspect ratio) than display 602 of device 600. Device 1008 displays user interface 1016, which is divided into two portions 1016A (e.g., the canvas region) and 1016B. Portion 1016A has approximately the same aspect ratio as display 602 of device 600. In accordance with the aspect ratio of portion 1016A, portion 1016A includes representations 1030A-1030D, corresponding to the participants of representations 1010A-1010D in FIG. 10O. As illustrated in FIG. 10P, the layout (e.g., relative size, positions, spacing, and overlapping) of representations 1030A-1030D is similar to the layout of representations 1010A-1010D in FIG. 10O.

As illustrated in FIG. 10P, device 1008 receives (e.g., detects) user input 1050D (e.g., a right swipe) to move divider 1018 to the right. In response, device 1008 reduces the size of portion 1016B and increases the size of portion 1016A. As illustrated in FIGS. 10P-10S, representations 1030 are enlarged and the horizontal spacing between representations 1030 is increased. As illustrated in FIG. 10S, device 1008 displays menu 1024, with effects affordance 1026, call affordance 1028, and menu affordance 1034 (which are analogous to effects affordance 632, call affordance 634, and menu affordance 636 described above).

FIG. 11A-11F is a flow diagram illustrating a method in accordance with some embodiments. Method 1100 is performed at a device (e.g., 100, 300, 500, or 600) with a display. Some operations in method 1100 are, optionally, combined, the orders of some operations are, optionally, changed, and some operations are, optionally, omitted.

As described below, method 1100 provides an intuitive way for providing an adaptive and intelligent live communication user interface that emphasizes one or more active participants in the live communication sessions. The method reduces the cognitive burden on a user for viewing active participants in a live communication session, thereby creating a more efficient human-machine interface. For battery-operated computing devices, enabling a user to view active participants faster and more efficiently conserves power and increases the time between battery charges.

At block 1102, the device displays a live video communication user interface (e.g., 1000) that includes concurrently displaying a representation (e.g., 1010C) of a first participant in a live video communication session, a representation (e.g., 1010B) of a second participant in the live video communication session, and a representation (e.g., 1010D) of a third participant in the live video communication session. In some embodiments, if a participant is sharing a live media stream that includes a live video stream, the representation includes images of the live video stream (e.g., 1010C). In some embodiments, if a participant is sharing a live media stream with only audio, the representation includes an avatar of the respective participant (e.g., 1010B). In some embodiments, if a participant is not currently joined in the live video communication session, the representation includes a placeholder image (e.g., an avatar) (e.g., 1010A). In some embodiments, the live communication interface includes a canvas region (e.g., 1001) (e.g., canvas region (e.g., main region) is different from the overflow region. In some embodiments, the canvas region is next to the overflow region. In some embodiments, the representation of the first participant in the live communication session, the representation of the second participant in the live communication session, and the representation of the third participant in the live communication session are displayed in the canvas region (e.g., FIG. 10A).

At block 1104, while displaying the live video communication user interface, the device receives data indicating that an activity level of the second participant (e.g., 1010B) in the live video communication session has increased above the activity level of the first participant (e.g., 1010C) in the live video communication session. In some embodiments, data indicating that the first participant is actively participating is received from an external source (e.g., a server). In some embodiments, the device determines that the first participant is actively participating is based on received data (e.g., live video or live audio from a live media feed associated with the first participant. In some embodiments, prior to receiving the data indicating that the activity level of the second participant in the live video communication session has increased above the activity level of the first participant in the live video communication session, the one or more of the representation of the first participant, the second participant, and the third participant overlaps with at least one other representation of a participant (e.g., 1010B, 1010C, and 1010D of FIG. 10A).

In some embodiments, the activity level of at least the first participant is based on (e.g., a function of) an audio and/or video feed (e.g., motion or sound in the video feed) received from a device of the first participant and/or data indicating activity detected at the device of the first participant (e.g., data indicating that the first participant performed a user interface action at the device of the first participant (e.g., selection of a attention affordance)). In some embodiments, the activity level is determined at an external electronic device (e.g., a server) and then transmitted to the electronic device. In some embodiments, the activity level of at least the first participant is based on filtered audio (e.g., audio filtered of background or filtered to isolate/amplify speech audio) from an audio feed received from the device of the first participant. In some embodiments, the activity level of at least the first participant is based on movement identified (e.g., identified at a server; identified at the electronic device) in a video feed received from the device of the first participant that meets a set of movement criteria (e.g., 1010A of FIG. 10E) (e.g., movement that is of a certain type (e.g., hand movement, head/face movement, movement that is not background movement (e.g., non-user movement)).

At block 1106, in response to receiving the data indicating that the activity level of the second participant (e.g., 1010B of FIG. 10A) in the live video communication session has increased above the activity level of the first participant (e.g., 1010C of FIG. 10A) in the live video communication session, the device changes a size and/or position of the representation of the first participant in the live video communication user interface (at block 1108), changes a size and/or position of the representation of the second participant in the live video communication user interface (at block 1110), and changes a size and/or position of the representation (e.g., 1010D) of the third participant in the live video communication user interface (at block 1112). Changing the size and/or positions of representations when prescribed conditions are met allows the user to quickly recognize the activity level of participants including participants that are most and/or least active. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In addition, changing the size and/or positions of representations only when prescribed conditions are met reduces the number of inputs needed for a user to determine an active participant or focus on an active participant. Reducing the number of inputs further enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to receiving the data indicating that the activity level of the second participant in the live video communication session has increased above the activity level of the first participant in the live video communication session, the size of the representation (e.g., 1010C of FIG. 10A) of the first participant in the live communication user interface is changed, the size of the representation (e.g., 1010B of FIG. 10A) of the second participant in the live communication user interface is changed, and the size of the representation (e.g., 1010D of FIG. 10A) of the third participant in the live communication user interface is changed. In some embodiments, if the least active participant become the most active participant (e.g., based on activity score), the device increases the size of the representation of the most active participant, and decreases the size of all other representations (e.g., FIGS. 10E-10F). In some embodiments, if the most active participant becomes the least active participant (e.g., based on an activity score), the device decreases the size of the representation of the least active participant, and increase the size of all other representations. In some embodiments, in response to receiving the data indicating that the activity level of the second participant in the live video communication session has increased above the activity level of the first participant in the live video communication session: the position of the representation of the first participant in the live communication user interface is changed; the position of the representation of the second participant in the live communication user interface is changed; and the position of the representation of the third participant in the live communication user interface is changed. In some embodiments, if least active participants become the most active participant (e.g., based on activity score), swap all positions (e.g., representation of most active participants moves up or over, and others move down or over). In some embodiments, if the most active participant because the least active participant (e.g., based on an activity score), the representation of least active participants moves down and/or over, and other representations move up and/or over.

In some embodiments, a portion of the representation (e.g., 1010C of FIG. 10A) of a participant having (e.g., currently having) the highest activity level of the first, second, and third participants is overlapped (e.g., a portion of representation for most active is underneath the other representations) by a portion of the representation of another participant of the first second, and third participants in the live communication user interface. In some embodiments, the representation of the participant having the lowest activity level is displayed without being overlapped by the representations of any other participants (e.g., because the representation of the participant having the lowest activity level is the smallest representation of the representations of participants and thus is kept on top of representations of other participants to avoid obscuring too much of the representation of the participant with the lowest activity level). In some embodiments, the representation (e.g., 1010B of FIG. 10I) of the participant having the lowest activity level is displayed overlapping at least a portion of the representation (e.g., 1010A of FIG. 10I) of the participant having the highest activity level. In some embodiments, a portion of the representation (e.g., 1010D of FIG. 10H) of a participant having (e.g., currently having) the lowest activity level of the first, second, and third participants overlaps (e.g., a portion for representation of least active on underneath of the other representations) a portion of the representation (e.g., 1010C of FIG. 10H) of another participant of the first, second, and third participants in the live communication user interface.

Optionally, at block 1114, the device changes the size and/or position of the representation of the first participant based on facial recognition data obtained from (e.g., obtained by analyzing) a video feed of the second participant (and/or a video feed of the third participant), where changing the size and/or position of the representation of the first participant does not result in obscuring the face of the second participant (and/or obscuring the face of the third participant). Changing the size and/or position of a representation of a participant in the live communication session without obscuring a face of another participant provides the user with feedback about the currently activity level of a participant without hiding the faces of other participants in the live communication session, thereby allowing the user to view the other participants' faces when changing in size or position of the participant whose activity level has changed. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at block 1116, the device changes the size and/or position of the representation (e.g., 1010B of FIG. 10A-10C) of the first participant includes gradually increasing (e.g., gradually over a period of time) the size of the representation from a first size to a second size. Changing the sizes and/or positions of representations provides the user feedback about the current activity level of the participants while minimizing user interface changes. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Increasing the size of a representation gradually provides visual feedback to the user indicating that the activity level of the participant is changing when their activity level changes while minimizing distractions that an abrupt change in size causes to the user. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at block 1118, the device detects a canvas size change event (e.g., 1050B; FIGS. 10J-10K) (e.g., rotation of the device; the introduction of additional elements (e.g., one or more call affordances for contacting participants; the addition of representations of participants displayed outside the canvas region) into the live video communication user interface; a user input corresponding to a request to change the size of the canvas region). Optionally, at block 1120, the device, in response to detecting the canvas size change event, changes a size of the canvas region (e.g., 1001) (optionally, at block 1124). In response to detecting the canvas size change event, the device modifies a layout of the representations of the first, second, and third participants (e.g., 1010B, 1010C, and 1010D of FIG. 10K). In some embodiments, the layout of the representations is modified by shifting the positions of the representations and/or changing the sizes of the representations (e.g., so as to reduce the spacing between the representations, when the size of the canvas region is reduced). Intelligently modifying a layout based the size of the canvas region changes allows users to view the representation of the users with minimal changes the displayed representations when the canvas size changes, and thereby, reducing distractions to the user while allowing users to view the displayed presentations. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at block 1126, the device further, in response to detecting the canvas size change event, changes the size of one or more of the representations of the first, second, and third participants (e.g., 1010B, 1010C, and 1010D of FIG. 10K). In some embodiments, prior to receiving the data indicating that the activity level of the second participant in the live video communication session has increased above the activity level of the first participant in the live video communication session, the representations of the first, second, and third participants in the live communication user interface are displayed according to a z-order (e.g., 1010B, 1010C, and 1010D of FIG. 10K) (e.g., a "z-order" refers to the order of the representations of the participants with respect to a virtual axis normal to the face of the display) (e.g., an axis coming out of the screen) (e.g., when the positions of two representations overlap, the z-order of the representations determines which object is displayed in front of the other). At block 1128, the device maintains the z-order of the representations of the first, second, and third participants (e.g., 1010B, 1010C, and 1010D of FIG. 10K).

In some embodiments, after changing the size and/or position of the representation (e.g., 1010B of FIG. 10B) of the first participant in the live communication user interface, the changed representation of the first participant occupies at least a portion of a region (e.g., general area, location, pixel on the display, etc.) that was occupied by the representation of the first participant in the live communication user interface before changing at least one of the size or the position of the representation of the first participant In some embodiments, after changing the size, the participant is displayed in the same region of the display as the participant was previously in (e.g., at least a portion (e.g., a part, a pixel, a position, etc.) of the representation continues to contact a location on the display that it previously contacted before changing). In some embodiments, the representations maintain arrangement/general location of representations while emphasizing active participant (e.g., representations shift as they increase/decrease in size but maintain position relative to other images). In some embodiments, after changing the size and/or position of the representation (e.g., 1010C of FIG. 10B) of the second participant in the live communication user interface, the changed representation of the second participant occupies at least a portion of a region (e.g., general area, location, pixel on the display, etc.) that was occupied by the representation of the second participant in the live communication user interface before changing at least one of the size or the position of the representation of the second participant In some embodiments, after changing the size, the participant is displayed in the same region of the display as the participant was previously in (e.g., at least a portion (e.g., a part, a pixel, a position, etc.) of the representation continues to contact a location on the display that it previously contacted before changing). In some embodiments, representation maintains arrangement/general location of representations while emphasizing active participant (e.g., representations shift as they increase/decrease in size but maintain position relative to other images). In some embodiments, after changing the size and/or position of the representation (1010D of FIG. 10B) of the third participant in the live communication user interface, the changed representation of the third participant occupies at least a portion of a region (e.g., general area, location, pixel on the display, etc.) that was occupied (e.g., before the change) by the representation of the third participant in the live communication user interface before changing at least one of the size or the position of the representation of the third participant In some embodiments, after changing the size, the participant is displayed in the same region of the display as the participant was previously in (e.g., at least a portion (e.g., a part, a pixel, a position, etc.) of the representation continues to contact a location on the display that it previously contacted before changing) In some embodiments, the representations maintain their arrangement and/or general locations while emphasizing active participant (e.g., representations shift as they increase/decrease in size but maintain position relative to other images).

Displaying representations that occupy at least a portion of the region that they previously occupied after changing the size and/or positions of the representations allows the user to recognize the activity level of participants with minimal changes to the user interface, thereby increasing the users' ability to focus on representations of participants in the live communication session. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at block 1130, the device displays a representation (e.g., 1010D of FIG. 10E) of a fourth participant in the live communication user interface. Optionally, in response to receiving the data indicating that the activity level of the second participant in the live video communication session has increased above the activity level of the first participant in the live video communication session, the device changes a size and/or position of the representation of the fourth participant in the live communication user interface (at block 1132). In some embodiments, a fourth representation changes the size and/or position when all others change size or position. In some embodiments, a fourth representation changes (e.g., in response to receiving the first data indicating that the activity level of the second participant in the live communication session has increased above the activity level of the first participant in the live communication session). In some embodiments, some representations, such as the fourth representations, may maintain their size and position even when other representations are changing).

Optionally, at blocks 1134, 1136, 1138, 1140, and 1142, after changing the size and/or position of the representation of the first participant in the live video communication user interface, the device receives second data indicating that an activity level of the first participant in the live video communication session has increased above the activity level of the second participant in the live video communication session. In response to receiving the second data indicating that an activity level of the first participant in the live video communication session has increased above the activity level of the second participant in the live video communication session, the device changes the size and/or position of the representation of the first participant in the live video communication user interface. The device changes the size and/or position of the representation of the second participant in the live video communication user interface. The device maintains the size and position of the representation of the third participant in the live communication session. In some embodiments, in response to changes in activity level of a participant, the representation of some of the representations displayed in the canvas (e.g., a main region) are maintained, even though other representations change size or position (e.g., two representations may swap places based on a determination and other representations their size of position). In some embodiments, the representation that is maintained corresponds to a participant having an activity level lower than the activity level of the participants that correspond to the representations that are changed. Maintaining the size and/or positions of some representations while changing the size and/or representations of other representations when prescribed conditions are met allows the user to quickly recognize the activity level of participants with minimal changes to the user interface, thereby, increasing the users' ability to focus on representation of participants in the live communication session. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at blocks 1144 and 1146, the device, in response to receiving the first data indicating that the activity level of the second participant in the live communication session has increased above the activity level of the first participant in the live communication session, emphasizes (e.g., increase or initiate) a visual indication (e.g., highlight representation (e.g., display border), animation (e.g., pulsing avatar), bring image to front, increase size) of the representation of the second participant (e.g., when the second participant is currently more active) in the live communication user interface. In response to receiving the first data indicating that the activity level of the second participant in the live communication session has increased above the activity level of the first participant in the live communication session, the device deemphasizes (e.g., decrease or cease) a visual indication (e.g., highlight representation (e.g., display border), animation (e.g., pulsing avatar), bring image to back, decrease size) of the representation of the first participant (e.g., when the first participant is currently less active) in the live communication user interface. Emphasizing and/or deemphasizing a visual indication when prescribed conditions are met allows the user to quickly recognize the activity level of participants including participants that are most and/or least active. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In addition, emphasizing and/or deemphasizing when prescribed conditions are met provides visual feedback to the user indicating the activity level of each participant. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, prior to (e.g., before) the device receiving the data indicating that the activity level of the second participant in the live video communication session has increased above the activity level of the first participant in the live video communication session: the representation of the first participant is displayed at a first size (e.g., a middle size in a set of 3 or more predefined sizes; the largest size in the set) the representation of the second participant is displayed at a second size (e.g., the smallest size in a set of 3 or more predefined sizes; a middle size in the set) smaller than the first size (e.g., small representation). Optionally, at block 1148, the device increases the size of the representation of the second participant from the second size to the first size. Increasing the size and/or position of a representation from a smaller size to a larger size provides visual feedback to the user indicating that the activity level of the participant is changing when their activity level changes. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at blocks 1150 and 1152, after receiving the data indicating that the activity level of the second participant in the live video communication session has increased above the activity level of the first participant in the live video communication session, the device detects an input (e.g., 850C) (e.g., tap on a representation) corresponding to the representation of the first participant. In response to detecting the input corresponding to the representation of the first participant (e.g., a user can change the size of any representation displayed (e.g., in an overflow region, canvas region, etc.) on the live communication user interface), the device increases the activity level (e.g., increasing the value of an activity level) of the first participant (e.g., 810F of FIGS. 8L-8M).

At blocks 1154 and 1156, the device receives data indicating that a fourth participant in the live communication session is more active than a participant having the lowest activity level of the first, second, and third participants. In response to receiving the data indicating that the fourth participant in the live communication session is more active than a participant having the lowest activity level of the first, second, and third participants, replace the display of the representation (e.g., 1010A of FIG. 10N) of the participant having the lowest activity level of the first, second, and third participants with display of a representation (e.g., 1010A of FIG. 10O) of the fourth participant. In some embodiments, at block 1158, the device displays the representation of the fourth participant at a size larger than the size of the representation of the participant having the lowest activity level of the first, second, and third participants. Replacing the display of the representation of a participant with the lowest activity level with a participant that is not displayed in the first set of representations when prescribed conditions are met allows the user to focus on representations of the most active participants in the live communication session while decreasing the user's focus on the least active participants in the live communication session when users not displayed are more active than users who are displayed in the first set of representations. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Increasing the size of a newly displayed participant provides the user feedback about the current activity level of the other displayed participants (e.g., in the first subset of representations) in relation to the new participant while minimizing user interface changes. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at block 1160, the device displays a representation (e.g., 1002) of a view of a camera of the electronic device (e.g., (e.g., self-view) in the live communication session user interface. Optionally, at block 1162, the device, further in response to receiving the first data indicating that the activity level of the second participant in the live communication session has increased above the activity level of the first participant in the live communication session: optionally, at block 1164, maintains a size of the representation (e.g., 1002) of a view of a camera of the electronic device in the live communication session user interface. In some embodiments, self-view does not change based on changes in activity level of other participants). Maintaining the size of a representation of a view of the camera of the device while other representations may change when a set of conditions has been met allows users to view their representations while minimizing changes to the layout continuously. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 1100 (e.g., FIG. 11A-11F) are also applicable in an analogous manner to the methods described below/above. For example, method 1100 optionally includes one or more of the characteristics of the various methods described above with reference to method 700, 900, 1300, or 1500.

FIGS. 12A-12N illustrate exemplary user interfaces for, inter alia, initiating a live communication session from a messaging application, in accordance with some embodiments. The user interfaces in these figures are used to illustrate the processes described below, including the processes in FIG. 13A-13D.

FIG. 12A illustrates device 600 (as described above) displaying messaging user interface 1200 of a messaging application. Messaging user interface 1200 includes messages in message region 1202 between participants in a group of 15 participants ("The Dream Team") engaged in a message conversation. Messaging user interface 1200 includes call-all affordance 1206 for initiating a live communication session with all of the participants in the message conversation (e.g., all of the participants in The Dream Team group) and group contact information affordance 1208 for accessing additional information related to The Dream Team group.

As illustrated in FIG. 12A, device 600 receives (e.g., detects) user input 1250A (e.g., a tap) corresponding to selection of call-all affordance 1206. In response to receiving user input 1250A, device 600 starts a live communication session with all of the participants in the message conversation included as participants in the live communication session. In some embodiments, in response to receiving user input 1250A, device 600 sends instructions causing devices associated with the members of the group to display a notification that the live communication session is active. In this way, call-all affordance 1206 immediately starts a live communication session with all of the participants in the message conversation group.

FIG. 12B illustrates messaging user interface 1200 of the messaging application while the live communication session has is being initiated. Messaging user interface 1200 includes message 1212 in message region 1202 and visual indicator 1214 at the top of display 602 indicating that the live communication session is active.

In some embodiments, in response to receiving user input 1250A, device 600 launches the live communication application. As illustrated in FIG. 12C, after the live communication session begins, device 600 displays live communication user interface 1216 of the live communication application. Live communication user interface 1216 corresponds to the live communication session started with the group The Dream Team.

As illustrated in FIG. 12C, live communication user interface 1216 includes primary representations 1210A-1210D (collectively 1210) of four corresponding participants (e.g., the first four participants in a list of participants of the group The Dream Team) and user representation 1218 of the user of device 600. Live communication user interface 1216 also includes overflow region 1220 with overflow representations 1222 corresponding to participants of the live communication session (e.g., each of the members of The Dream Team group). Primary representation 1210B includes a live video from participant Allison, indicating that Allison has joined the live communication session with video data.

Primary representations 1201A, 1210C, and 1210D include placeholders indicating that the corresponding participants have not joined (e.g., are not connected to) the live communication session. The placeholders include a textual representation of the participant's name (e.g., first name or first and last initial). Optionally, the placeholders include a status indicator, indicating that the participant is waiting to connect to the live communication session, and a reminder affordance (e.g., "RING" 808A) for sending a reminder to the corresponding participant that the live communication session is available. In some embodiments, reminder affordances are not initially included on the placeholders and are displayed in accordance with a determination that the corresponding participant has not joined the live communication session after a predetermined period of time.

In some embodiments, device 600 detects an input corresponding to selection of a reminder affordance (e.g., a tap on a reminder affordance), and in response, sends instructions to cause a new notification (e.g., call, ring, etc.) indicating that the live communication session is available at a device associated with the corresponding participant, where the new notification is different than a previous notification sent to the participant. In some embodiments, the new notification is more intrusive than the previous notification (e.g., an audio ring, haptic output, or full screen notification, as compared to a banner notification without audio or haptic output). In some embodiments, reminder affordances are displayed in overflow representations 1222 (e.g., in accordance with the same criteria used for displaying reminder affordances in the primary representations). In some embodiments, selection of a reminder affordance on an overflow representation results in the same response (e.g., a new, more intrusive notification to the corresponding participant) as described above with respect to the reminder affordances displayed on the primary representations.

In some embodiments, in accordance with a determination that one of the participants represented by a placeholder has joined the live communication session, device 600 modifies the representation associated with the user (e.g., replaces the placeholder with live video; see, e.g., FIGS. 8C-8D). In some embodiments, modifying the representation includes an animation. In some embodiments, device 600 receives data from a server or other device to determine whether a participant has joined the session. In some embodiments, device 600 determines that a participant has joined the session based on receiving live media data associated with the participant.

In some embodiments, in accordance with a determination that one of the participants represented by a placeholder has not joined the live communication session for a predetermined amount of time, device 600 changes the layout of the representations displayed in live communication session user interface 1216 (e.g., device 600 ceases to display the representation corresponding to the participant that has not joined the live communication session for a predetermined amount of time and displays a layout with fewer primary representations or replaces the representation of the participant with a representation of another participant; see, e.g., FIGS. 8E-8F). In some embodiments, device 600 receives data from a server or other device to determine whether a participant has not joined the live communication session for a predetermined amount of time. In some embodiments, device 600 determines whether a participant has not joined the live communication session for a predetermined amount of time based on not receiving live media data associated with the participant.

FIG. 12D illustrates live communication user interface 1216 at a later time during the live communication session with the group The Dream Team. As illustrated in FIG. 12D, live communication user interface 1216 includes call control menu 1224, which is analogous to call control menu 630 described above. As described above, in some embodiments, call control menu 1224 is displayed in response to a user input (e.g., a tap or swipe up on display 602). As illustrated in FIG. 12D, device 600 receives (e.g., detects) user input 1250B (e.g., a swipe up) corresponding to a request to expand call control menu 1224. As illustrated in FIG. 12E, in response to user input 1250B, device 600 expands call control menu 1224. Expanded call control menu 1224 is analogous to expanded call control menu 630 described with respect to FIG. 6I-6K. As illustrated in FIG. 12E, call control menu 1224 includes reminder affordance 1226 associated with the participant Hoan. In some embodiments, device 600 detects an input corresponding to selection of reminder affordance 1226 (e.g., a tap on reminder affordance 1226), and in response, sends instructions to cause a new notification (e.g., call, ring, etc.) indicating that the live communication session is available at a device associated with the participant Hoan, where the new notification is different than a previous notification sent to the participant Hoan. In some embodiments, the new notification is more intrusive than the previous notification (e.g., an audio ring, haptic output, or full screen notification, as compared to a banner notification without audio or haptic output).

FIG. 12F again illustrates live communication user interface 1216 prior to starting the live communication session with the message group The Dream Team. As illustrated in FIG. 12F, device 600 receives (e.g., detects) user input 1250C (e.g., a tap) corresponding to selection of group contact affordance 1208. As illustrated in FIG. 12G, in response to receiving user input 1250C, device 600 displays group contact user interface 1228, which shows additional information related to The Dream Team group including live communication session affordance 1230 and list 1232 of the participants in the group. Group contact user interface 1228 also includes add contact affordance 1234. In some embodiments, in response to detecting an input (e.g., a tap) corresponding to the selection of add contact affordance 1234, device 600 initiating a process for adding a new contact to the live communication session (e.g., by displaying a user interface with a text entry field for entering the names of participants using a keyboard and/or an add participant affordance for selecting participants from a menu such as a contacts list (e.g., as described below with reference to FIG. 14F)).

As illustrated in FIG. 12H, device 600 receives (e.g., detects) user input 1250D (e.g., a tap) corresponding to selection of live communication session affordance 1230. In response to receiving user input 1250D, device 600 launches the live communication application and starts the live communication session with the participants in the group The Dream Team (e.g., as illustrated in FIG. 12C).

A user can also select a representation of a participant in the group on group contact user interface 1228 to access additional information and options related to the corresponding participant. As illustrated in FIG. 12I, device 600 receives (e.g., detects) user input 1250E (e.g., a tap) corresponding to selection of list item 1232B for participant Allison. In response to user input 1250E, device 600 displays individual contact user interface 1236 with additional information associated with the selected participant and options 1238A-1238E for communicating with the participant individually via various communication modes. As illustrated in FIG. 12J, individual contact user interface 1236 includes, inter alia, affordances 1238A, 1238B, and 1238C for initiating, respectively, an individual message conversation, an individual telephone call, and an individual live communication session (e.g., a video communication) with participant Allison.

In some embodiments, device 600 determines whether a characteristic intensity of user input 1250E exceeds a threshold intensity. As illustrated in FIG. 12K, in accordance with a determination that the characteristic intensity of user input 1250E exceeds the threshold intensity, device 600 displays menu 1240 on top of group contact user interface 1228 with options 1242A-1242E corresponding to various communication modes for individual communication with the participant Allison.

FIGS. 12L-12N illustrate exemplary 4-on-1, 3-on-1, and 2-on-1 layouts, respectively. In some embodiments, in accordance with a live communication session including five participants (including the user of device 600), device 600 displays one of the initial layouts illustrated in FIG. 12L. In some embodiments, in accordance with a live communication session including four participants (including the user of device 600), device 600 displays one of the initial layouts illustrated in FIG. 12M. In some embodiments, in accordance with a live communication session including three participants (including the user of device 600), device 600 displays one of the initial layouts illustrated in FIG. 12N. In some embodiments, device 600 displays representations of participants in one of the layouts illustrated in FIGS. 12L-12N as an initial layout when initiating a live communication session (e.g., instead of the layout illustrated in FIG. 12C) based on the number of invited and/or connected participants. For example, in some embodiments, in accordance with a live communication session including a total of four participants, device 600 displays representations of the participants according to one of the layouts illustrated in FIG. 12M.

FIG. 13A-13D is a flow diagram illustrating a method in accordance with some embodiments. Method 1300 is performed at a device (e.g., 100, 300, 500, or 600) with a display. Some operations in method 1300 are, optionally, combined, the orders of some operations are, optionally, changed, and some operations are, optionally, omitted.

As described below, method 1300 provides an intuitive way for initiating and interacting with a live communication session between multiple participants. The method reduces the cognitive burden on a user by providing the intelligent initiation of and interaction with a live communication session between multiple participants, thereby creating a more efficient human-machine interface. For battery-operated computing devices, enabling a user to interact with and initiate a live communication session faster and more efficiently conserves power and increases the time between battery charges.

At block 1302, the device displays a messaging user interface (e.g., 1200) of a messaging application. The messaging user interface includes a message region (e.g., 1202) including a plurality of messages between participants in a message conversation that includes three or more participants. The messaging user interface includes an affordance (e.g., 1206) separate from the message region (e.g., 1202) for starting a live video communication session in a live video communication application (e.g., a message details affordance or an affordance with a graphical indication of the live video communication application). In some embodiments, the affordance is a call-all affordance (e.g., 1206) that will immediately start a live communication session with all of the participants in the messaging application. In some embodiments, the affordance is a group contact affordance (e.g., 1208) for displaying a group contact user interface to invite participants to a live communication session.

At block 1340, the device detects an input (e.g., 1250A) corresponding to selection of the affordance (e.g., 1206). At block 1306, the device, in response to detecting the input corresponding to selection of the affordance, initiates a process for starting the live video communication session in the live video communication application, the live video communication session including the participants of the message conversation. In some embodiments, the live video communication application is launched (e.g., 1216), and the new live video communication session is started directly in response to selection of the affordance. In some embodiments, a menu of the messaging application (e.g., 1228) is displayed in response to selection of the affordance and a menu option (e.g., 1230) is selected to launch the live video communication application and start the new live video communication session. Automatically initiating a process for starting the live video communication session in the live video communication application when prescribed conditions are met (e.g., by detecting an input) allows a user to start a live communication session. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In addition, providing an additional control (e.g., an affordance) to initiate the process for starting the live communication provides additional control options (e.g., an affordance) without cluttering the UI with additional displayed controls (e.g., a group chat UI) enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at block 1308, the device transitions (e.g., immediately transitioning in response to detecting the user input) from the messaging user interface (e.g., 1200) to a user interface (e.g., 1216) of the live communication application. Optionally, at block 1310, the device starts the live communication session. Optionally, at block 1312, the device displays a group contact user interface (e.g., 1228), the group contact user interface (e.g., an interface displayed while continuing to display at least a portion of the messaging user interface or a discrete user interface that replaces the messaging user interface) includes a group contact affordance (e.g., 1230) for starting the live communication session. Automatically transitioning from the messaging user interface and starting the live video communication session in the live video communication application when prescribed conditions are met (e.g., by detecting an input) allows a user to start a live communication session immediately. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In addition, transitioning from the messaging user interface and starting the live video communication session in the live video communication application when prescribed conditions are met reduces the number of inputs needed to perform an operation. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the group contact user interface further includes: a plurality of participant affordances (e.g., 1232) including a first participant affordance (e.g., 1232B) that is associated with a first participant in the participants of the message conversation (e.g., list of individual participants). In some embodiments, the group contact user interface further includes a new contact affordance (e.g., 1234). Optionally, at block 1314, the device starts the live communication session in the live communication application. Displaying a group contact user interface provides additional control options (e.g., an affordance) without cluttering the UI with additional displayed controls when the additional controls are needed enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at block 1316, the device displays a live communication session user interface (e.g., 1216) (e.g., an interface for live communication placeholders) that includes (e.g., initially includes) a placeholder (e.g., 1210A of FIG. 12C) (e.g., a graphical placeholder (e.g., an image or virtual avatar) a textual placeholder (e.g., a name or initials) associated with a first participant (e.g., a participant other than the user of the electronic device. A participant that has yet to join the communication session and that has been sent an invitation to join the communication session) of the live communication session participants. In some embodiments, the live communication session user interface further includes a second placeholder associated with a second participant. In some embodiments, the first placeholder includes a first reminder affordance (e.g., a ring button) for the first participant of the live communication session participants (e.g., FIG. 12C). In some embodiments, the live communication session user interface further includes a second placeholder associated with a second participant (e.g., 1210C). In some embodiments, the first placeholder and the second placeholder are arranged according to a first layout. Displaying a live communication session user interface when the live communication is started provides the user with feedback about the current state of the live communication session and provides visual feedback to the user indicating that operations associated with the live communication interface may be performed. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at block 1318, in accordance with a determination that the first participant has joined the live communication session, the device replaces display of the first placeholder (e.g., 1210A of FIG. 12C) with a representation (e.g., 1210A of FIG. 12D) of the first participant (e.g., a placeholder can have participants name). In some embodiments, an animation occurs (e.g., FIGS. 8T-8W). In some embodiments, the device receives data from server or another device to make this determination. In some embodiments, the device makes this determined because it hasn't displayed any representations of the user. Modifying the display of the first placeholder with a representation of the participant allows the user to quickly recognize which users have joined the call, provides the user with feedback about the current state of a live communication session, and provides visual feedback to the user indicating that certain operations associated with the notification and/or the live communication session will be performed. Providing improved visual feedback to the user enhances the operability of the device and makes the user-device interface more efficient (e.g., by helping the user to provide proper inputs and reducing user mistakes when operating/interacting with the device), which additionally, reduces power usage and improves battery life of the device by enabling the user to use the device more quickly and efficiently.

Optionally, at block 1320, the device, in accordance with a determination that the first participant has not joined the live communication session for a predetermined amount of time (e.g., not joined the live communication after a predetermined period of time), the device ceases (optionally at block 1322) display the first placeholder and, optionally at block 1324, the device changes the arrangement of the second placeholder to a second layout, different than the first layout (e.g., display a layout with the first participant not included in the layout). In some embodiments, the device can receive data from server or another device to make this determination. In some embodiments, the device can make this determined because it hasn't displayed any representations of the user. Ceasing to display the placeholder and changing the arrangement of the display when prescribed conditions are met allows users to quickly recognize when other users are joining or not joining the call while maximizing the visibility of displayed participants and/or placeholders. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In addition, ceasing to display the placeholder and changing the arrangement of the display provides the user with feedback about the current state of a live communication session, and provides visual feedback to the user indicating that certain operations associated with the notification and/or the live communication session will be performed. Providing improved visual feedback to the user enhances the operability of the device and makes the user-device interface more efficient (e.g., by helping the user to provide proper inputs and reducing user mistakes when operating/interacting with the device), which additionally, reduces power usage and improves battery life of the device by enabling the user to use the device more quickly and efficiently.

Optionally, at blocks 1326 and 1328, the device receives an input (e.g., 850B) corresponding to selection of the first reminder affordance (e.g., 808). In response to receiving the input corresponding to selection of the first reminder affordance, the device sends a new notification (e.g., call, ring, etc.) to the first participant that is different than a previous notification sent to the first participant (e.g., the second notification is more intrusive than the first notification). Sending a notification to the first participant in response to receiving an input corresponding to a selection of a reminder affordance that is different from a previous notification sent to the participant reduces the number of inputs needed to perform an operation. Reducing the number of inputs needed to perform an operation (e.g., the number of options needed for the user to call the participant) enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In addition, performing an operation automatically, such as sending a notification that is different from a first notification, without further user input) enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at blocks 1330 and 1332, the device detects an input (e.g., 1250C) corresponding to selection of the group contact affordance (e.g., 1208) for starting the live communication session. In response to detecting the input corresponding to selection of the group contact affordance for starting the live communication session, the device starts the live communication session in the live communication application. (e.g., transitioning to the user interface of the live communication application). In some embodiments, the group contact user interface includes a listing (e.g., 1232) of the participants for the live communication session. In some embodiments, the listing of the participants is provided without providing options and/or affordances for individually joining or starting a video or audio conference with the given participant. In some embodiments, the messaging user interface includes, two affordances for starting a live video communication session in a live video communication application: a first affordance that, when selected, results in display of the group contact user interface, and a second affordance that, when selected, results in transition to a user interface of the live communication application and in starting (e.g., immediately starting) the live communication session). Starting the live communication session in the live communication application in response to the selection of a group contract affordance provides additional control options (e.g., an affordance) without cluttering the UI with additional displayed controls when the additional controls are needed enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In addition, starting the live communication session in the live communication application in response to the selection of a group contract affordance reduces the number of inputs needed to perform an operation. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at blocks 1334, 1336, 1338, and 1340, the device, after starting the communication: in response to a determination that the first participant has not joined the live communication session for a predetermined period of time, displays a reminder option that is associated with the first participant In some embodiments, the reminder option is displayed on or near the first participant affordance) in the group contact user interface. Displaying a reminder option that is associated with a participant when prescribed conditions are met allows the user to quickly recognize users that have not joined the call and call those particular users. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. While displaying the reminder option that is associated with the first participant, the device receives an input corresponding to selection of the reminder option. At, in response to receiving the input corresponding to selection of the reminder option, the device sends a notification (e.g., a notification that causes a device of the first participant to output (e.g., an audible, visual, haptic) a notification) indicating that the live communication session is available to the first participant. Sending a notification to the first participant in response to receiving an input corresponding to a selection of a reminder option that is associated with the participant reduces the number of inputs needed to perform an operation. Reducing the number of inputs needed to perform an operation (e.g., the number of options needed for the user to call the participant) enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at blocks 1342 and 1344, the device detects an input (e.g., 1250E) corresponding to selection of the first participant affordance (e.g., 1232B) that is associated with the first participant of the message conversation. In some embodiments, these participants are participants of the live communication session (e.g., participants of the live communication sessions can include one or more different users than those from the message conversation and can also include none of the participants from the message conversation). In response to detecting the input corresponding to selection of the first participant affordance that is associated with the first participant of the message conversation, the device displays an individual participant user interface (e.g., 1236) that includes a characteristic of the first participant (e.g., the individual participant user interface has details concerning the individual user (e.g., user identifiers, such as names, initials, etc.; user contact information; modes of communication to contact the user)). Displaying a individual participant user interface in response to detecting an input (e.g., a participant affordance for each individual participant on the group contact UI) without cluttering the UI (e.g., group contact UI) with additional displayed controls when the additional controls are needed enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at blocks 1346 and 1348, the device detects an input (e.g., an input having a characteristic intensity that exceeds an intensity threshold) corresponding to selection of the option for selecting the mode of communication (e.g., 1238A-1238C). In response to detecting the input corresponding to selection of the mode of communication option, the device initiates a process to select the mode of commutation for the first participant. In some embodiments, initiating the process includes displaying a plurality of communication option affordances (e.g., a mail affordance, a call affordance, a messaging affordance)).

Optionally, at blocks 1350 and 1352, the device detects an input corresponding to selection of the new contact affordance (e.g., 1234). In response to detecting the input corresponding to selection of the new contact affordance, the device initiates a process for adding a new contact to the live communication session (e.g., displaying a user interface for selecting a new contact to add). Initiating a process for adding a new contact to the live communication session allows the user to quickly recognize which users are added to the call, provides the user with feedback about the current state of a live communication session, and provides visual feedback to the user indicating that certain operations associated with the notification and/or the live communication session will be performed. Providing improved visual feedback to the user enhances the operability of the device and makes the user-device interface more efficient (e.g., by helping the user to provide proper inputs and reducing user mistakes when operating/interacting with the device), which additionally, reduces power usage and improves battery life of the device by enabling the user to use the device more quickly and efficiently.

Note that details of the processes described above with respect to method 1300 (e.g., FIGS. 13A-13D) are also applicable in an analogous manner to the methods described below/above. For example, method 1300 optionally includes one or more of the characteristics of the various methods described with reference to method 700, 900, 1100, or 1500.

FIGS. 14A-14I illustrate exemplary user interfaces for, inter alia, initiating a live communication session from a live communication application, in accordance with some embodiments. The user interfaces in these figures are used to illustrate the processes described below, including the processes in FIGS. 15A-15C.

Figure 14A:
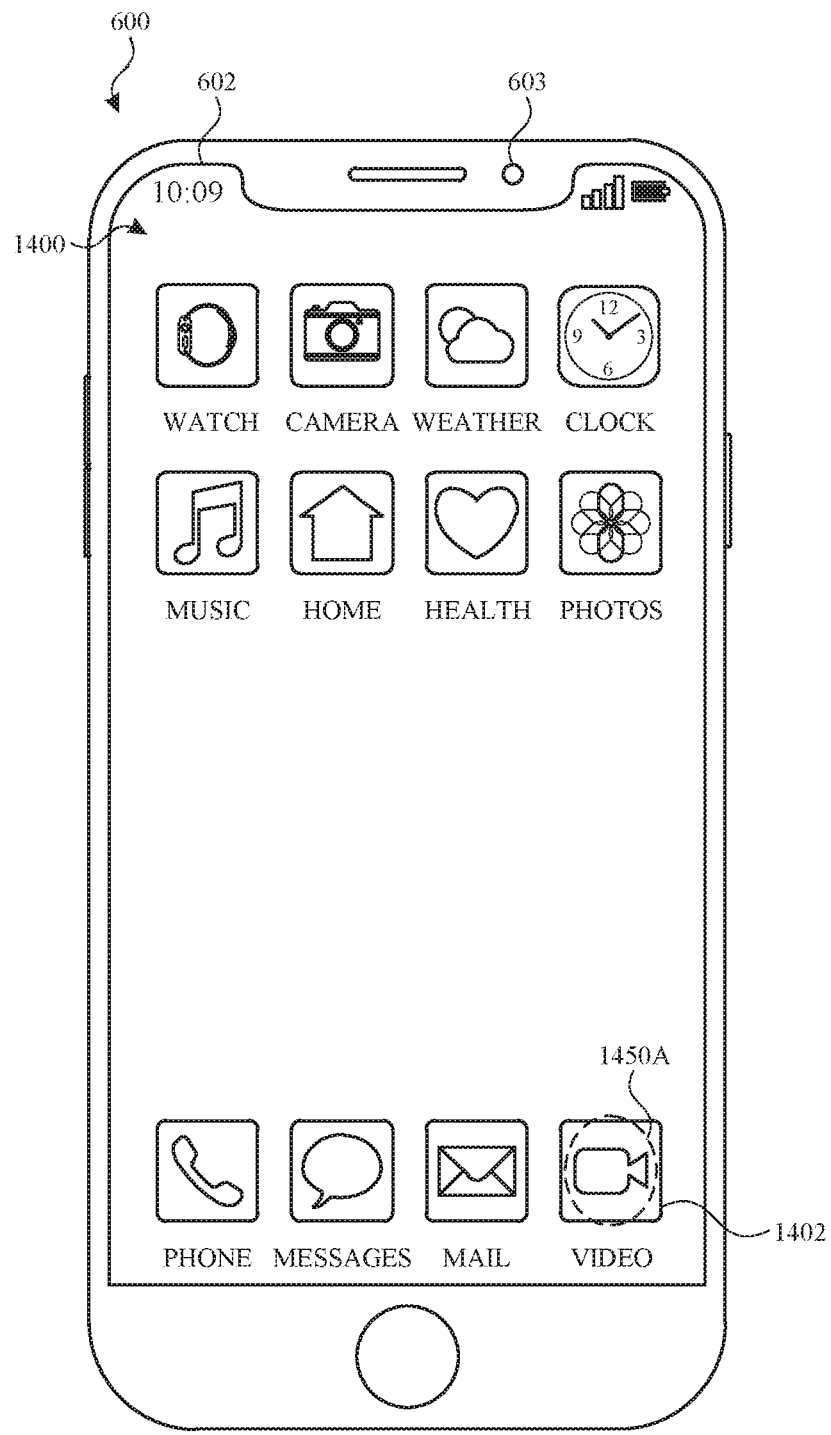
FIGS. 14A-14I illustrate exemplary user interfaces in accordance with some embodiments.
Figure 15A:
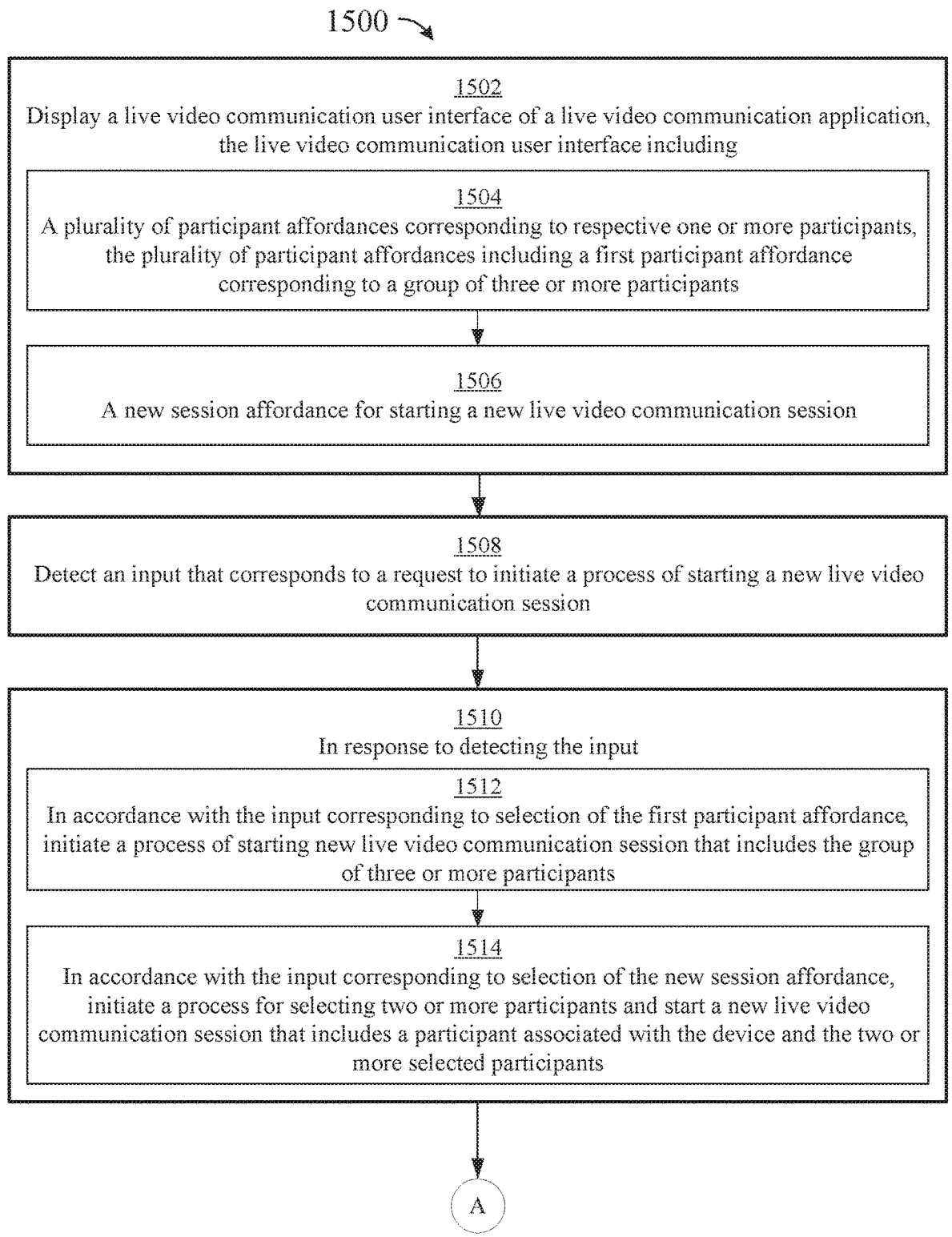
FIGS. 15A-15C illustrate an exemplary method in accordance with some embodiments.
Figure 15B:
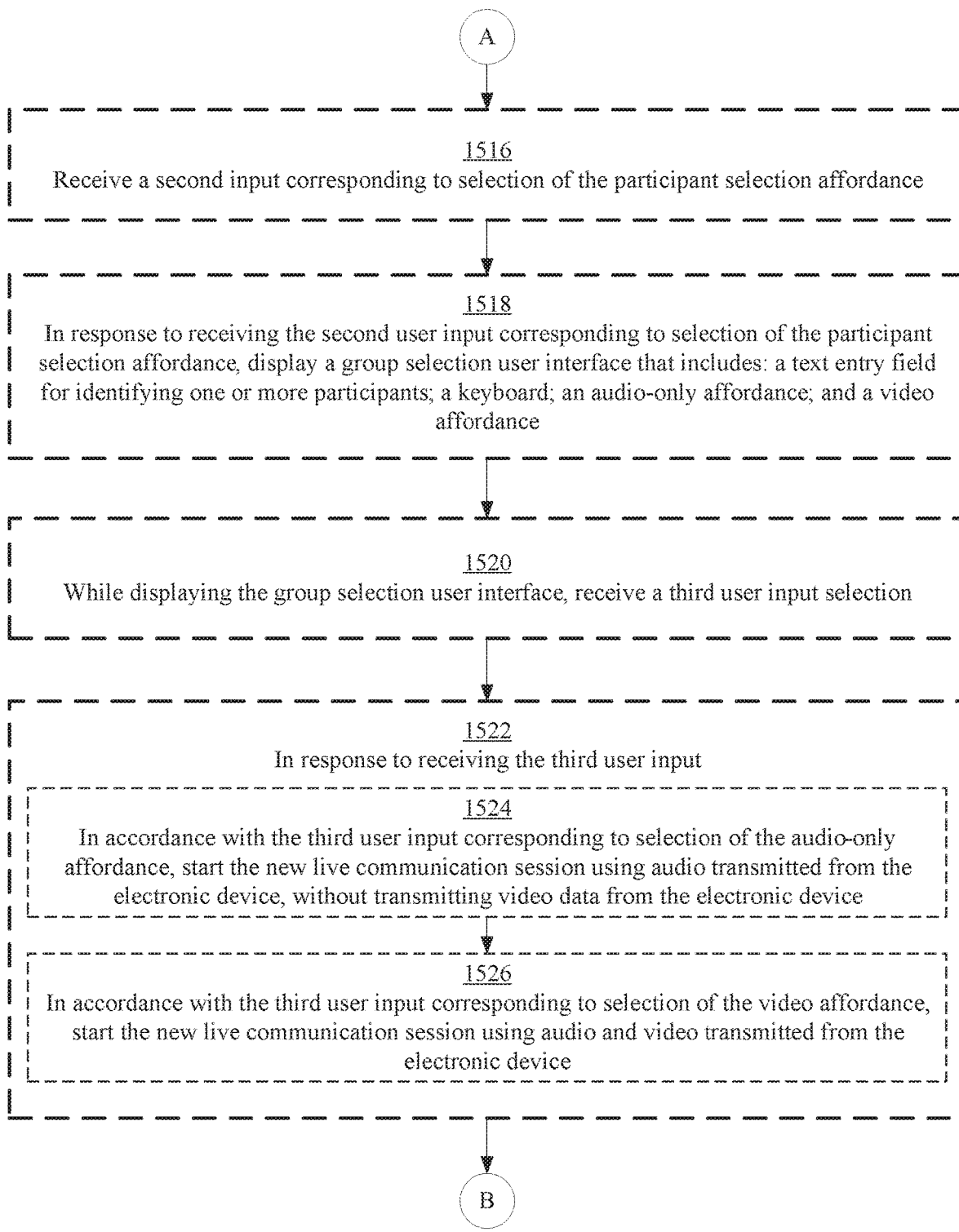
Figure 15C:
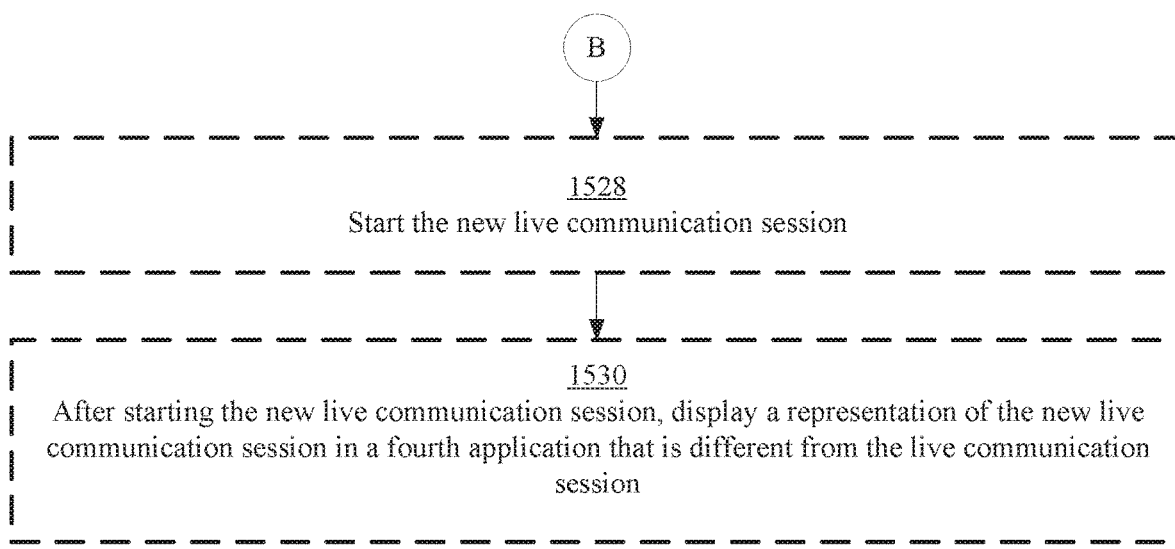

FIG. 14A illustrates device 600 (as described above) displaying user interface 1400 (e.g., a home screen or springboard) with affordances for launching applications. As illustrated in FIG. 14A, device 600 receives (e.g., detects) user input 1450A (e.g., a tap) corresponding to selection of live communication application affordance 1402.

Figure 14B:
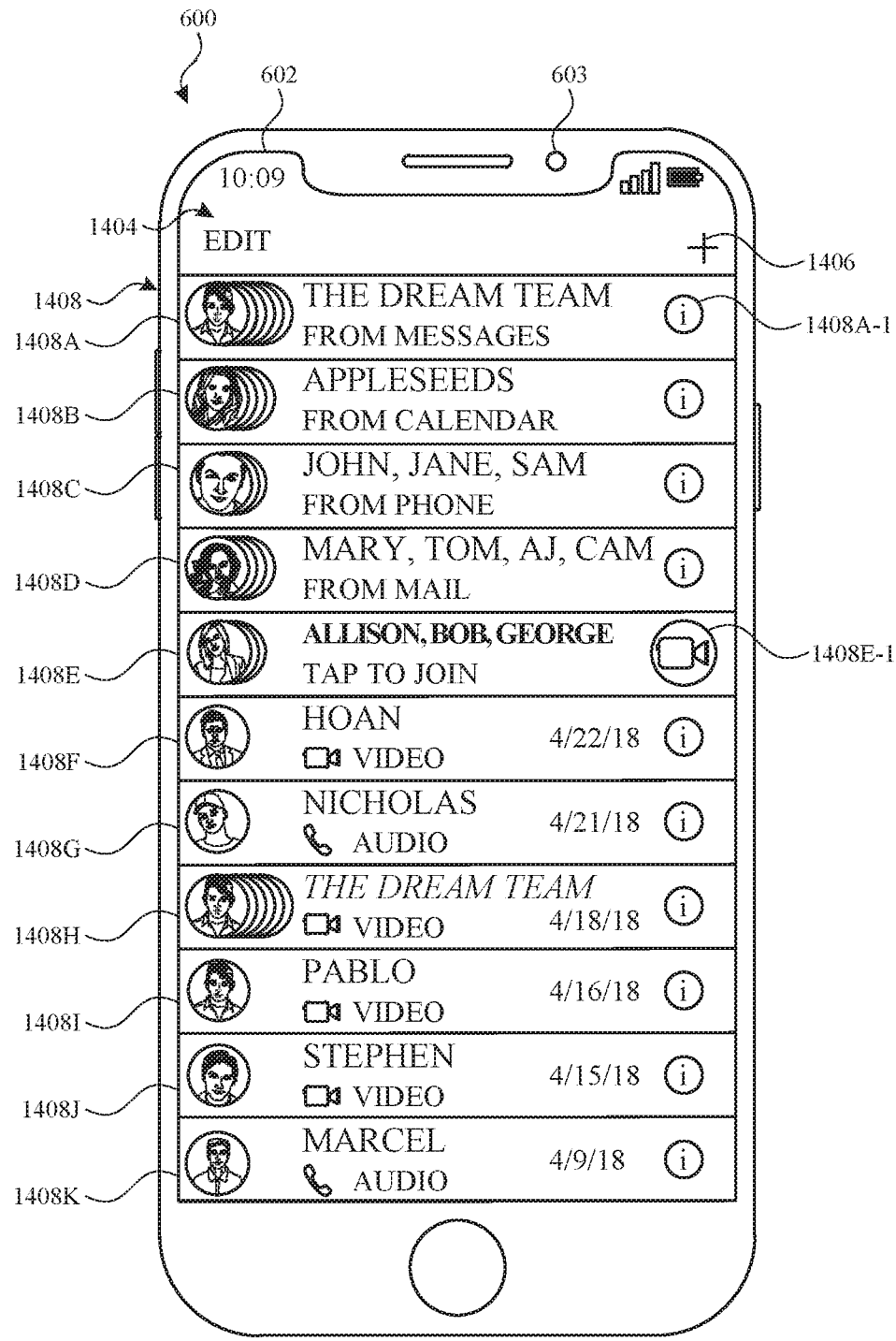

As illustrated in FIG. 14B, in response to receiving user input 1450A, device 600 launches the live video communication application and displays live video communication user interface 1404 of the live video communication application. The live video communication user interface includes list 1408 of participant affordances 1408A-1408K corresponding to respective participants or participant groups. In some embodiments, a participant affordance is included in list 1408 based on a previous (e.g., recent) live communication session with the respective participant or participant group (e.g., two or more participants other than the user of device 600) in the live communication application. In some embodiments, previous live communication sessions include successfully connected and attempted communications, either by the user of device 600 or another participant. Live video communication user interface 1404 includes new session affordance 1406 for selecting participants for a new live communication session.

In some embodiments, a participant affordance is included in list 1408 based on a participant group associated with another application (e.g., a messages application (affordance 1408A; e.g., a group chat participant list), phone application (affordance 1408C; e.g., participants of a conference call), calendar application (affordance 1408B; e.g., attendees of a calendar event), or email application (affordance 1408D; e.g., a recipient list of an email)). For example, participant affordance 1408A corresponds to a group of participants in a previous or existing group message conversation (e.g., text or instant message) and is displayed in list 1408 as a suggestion (e.g., a user did not have to manually create the participant group). In some embodiments, a participant affordance corresponds to a group of participants in a telephonic conference call associated with a phone application. Participant affordances 1408A-1408K include an indication of the participant or participant group, a status indicator, a details affordance, and, optionally, an associated date. As illustrated in FIG. 14B, the status indicator identifies a source of a participant or group (e.g., "From Messages", "From Phone", "From Calendar", "From Mail") or a communication status of an associated communication (e.g., video, audio, unavailable, etc.). In some embodiments, the source of a participant or group is indicated by a graphical or textual indication, a color associated with a certain application, or a logo related to the application (e.g., a phone icon, video camera icon, or message bubble icon).

In some embodiments, device 600 visually distinguishes a participant affordance associated with a group for which there is an active live communication session. In FIG. 14B, participant affordance 1408E is associated with a group for which a live communication session is currently active. The active live communication session is indicated by the bold text for the participant names, video camera icon 1408E-1, and "TAP TO JOIN" message in participant affordance 1408E, as compared to the non-bold text and contact details icon (e.g., 1408A-1) displayed in other participant affordances.

In some embodiments, the appearance of a participant affordance associated with a previous live communication session is based on whether or not the user of the device joined the corresponding live communication session. In FIG. 14B, participant affordance 1408H is associated with a previous live communication session that the user of device 600 did not join. As a result, participant affordance 1408H includes italicized text, as compared to the non-italicized text of other participant affordances associated with previous live communication session that the user of device 600 joined (e.g., 1408F).

Figure 14C:
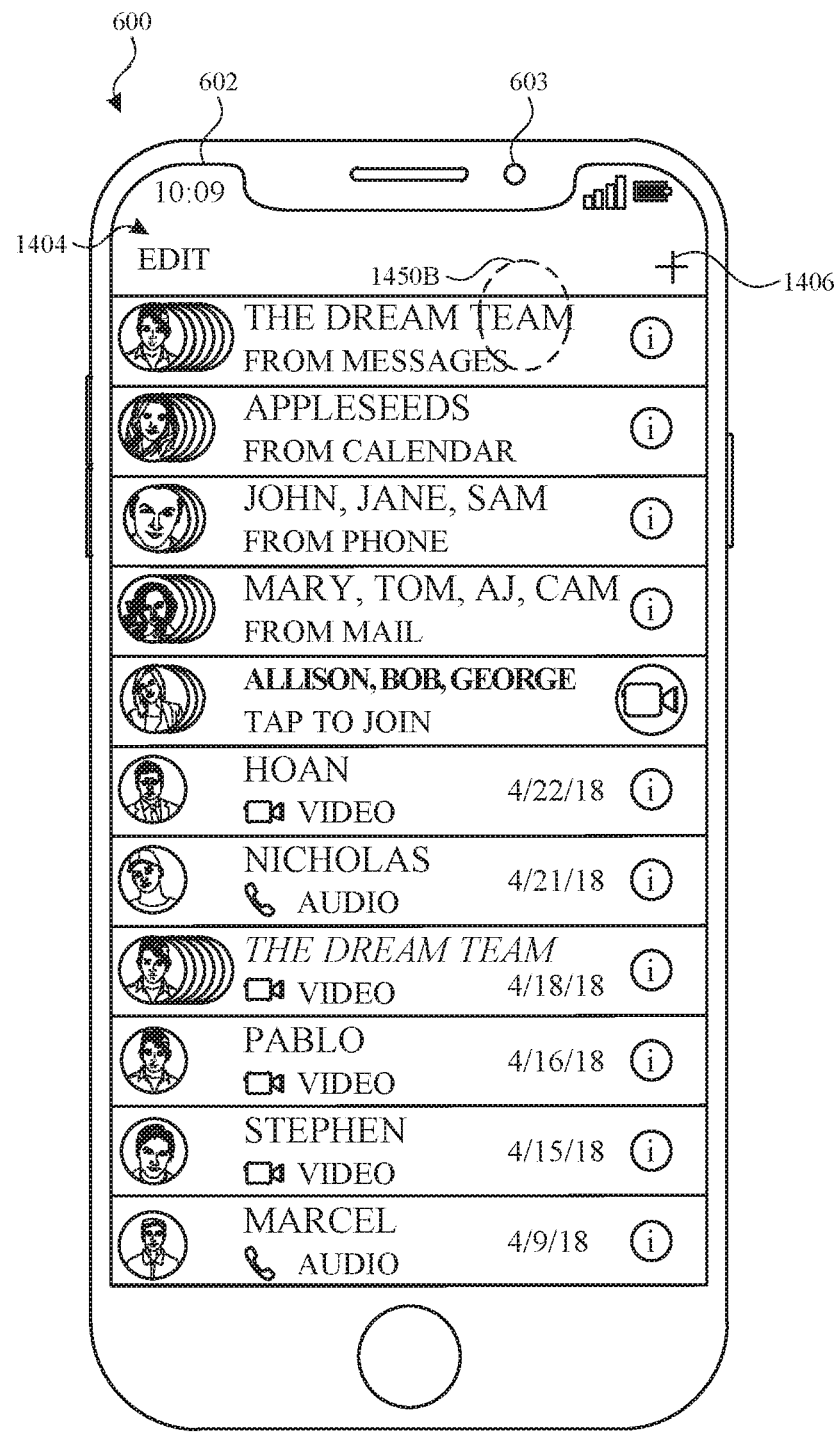

As illustrated in FIG. 14C, device 600 receives (e.g., detects) user input 1450B (e.g., a tap) corresponding to selection of participant affordance 1408A for participant group The Dream Team described above, which includes 15 participants.

Figure 14D:

In response to receiving user input 1450B, device 600 initiates a process of starting a new live video communication session with the participants corresponding to selected participant affordance 1408A (The Dream Team). In some embodiments, the new live video communication session is started directly in response to selection of participant affordance 1408A. For example, as illustrated in FIG. 14D, in response to receiving user input 1450B, device 600 displays live communication user interface 1410 and initiates the live communication session with the group The Dream Team without further user input. Live communication user interface 1410 includes a representation of the user of device 600 (e.g., a video from a camera on the front of device 600) and call control menu 1412, analogous to call control menu 630 discussed.

In some embodiments, a menu of the live video communication application is displayed in response to selection of participant affordance 1408A and a menu option is selected to start the new live video communication session. For example, in some embodiments, device 600 displays live communication user interface 1410 (as shown in FIG. 14D) without initiating the live communication session. Instead, while displaying live communication user interface 1410, device 600 receives (e.g., detects) a user input (e.g., a tap) corresponding to selection of call affordance 1414 on call control menu 1412, and initiates a live communication session with the group The Dream Team in response to selection of live communication initiation affordance 1414.

Figure 14E:
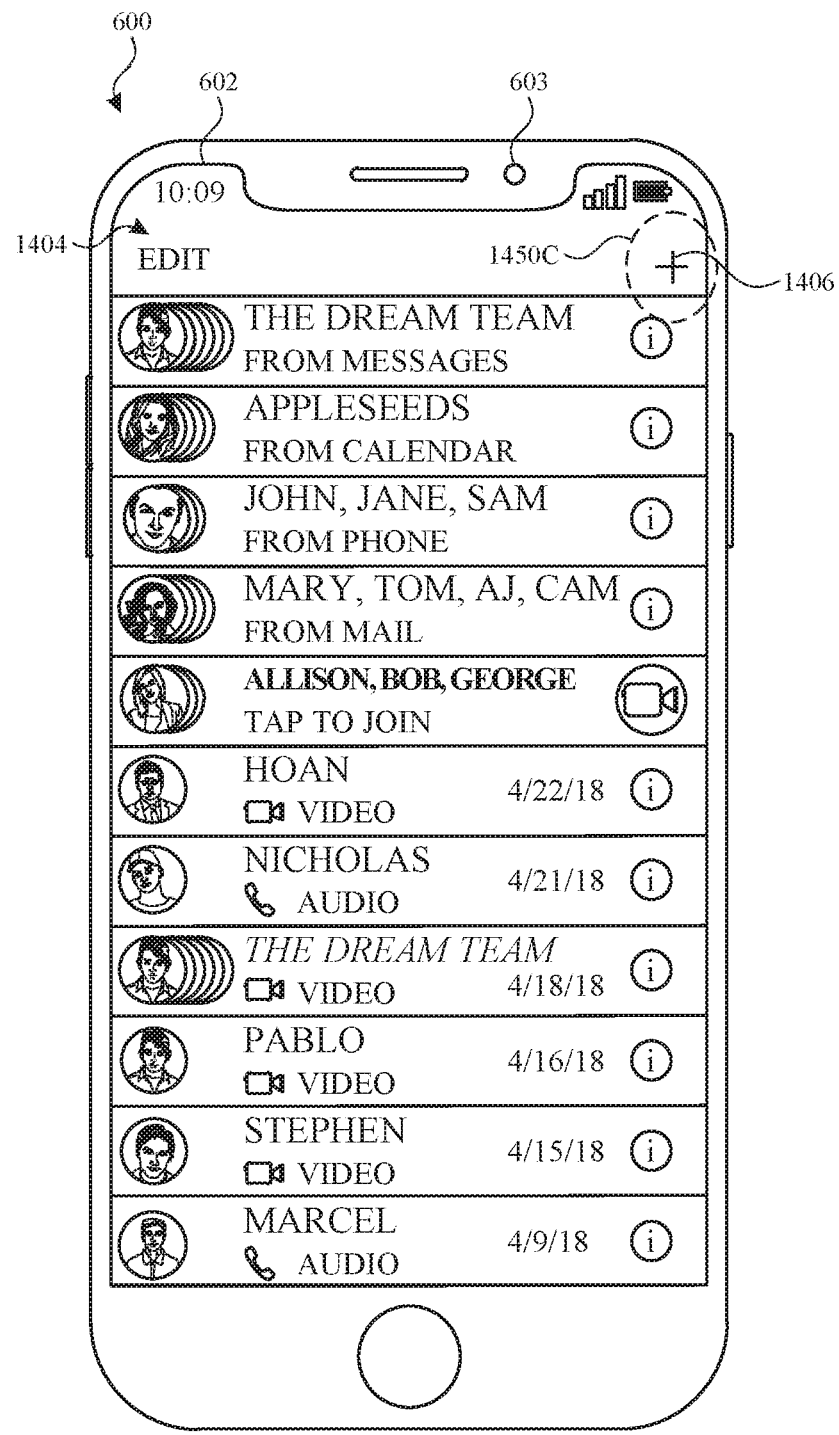
Figure 14F:
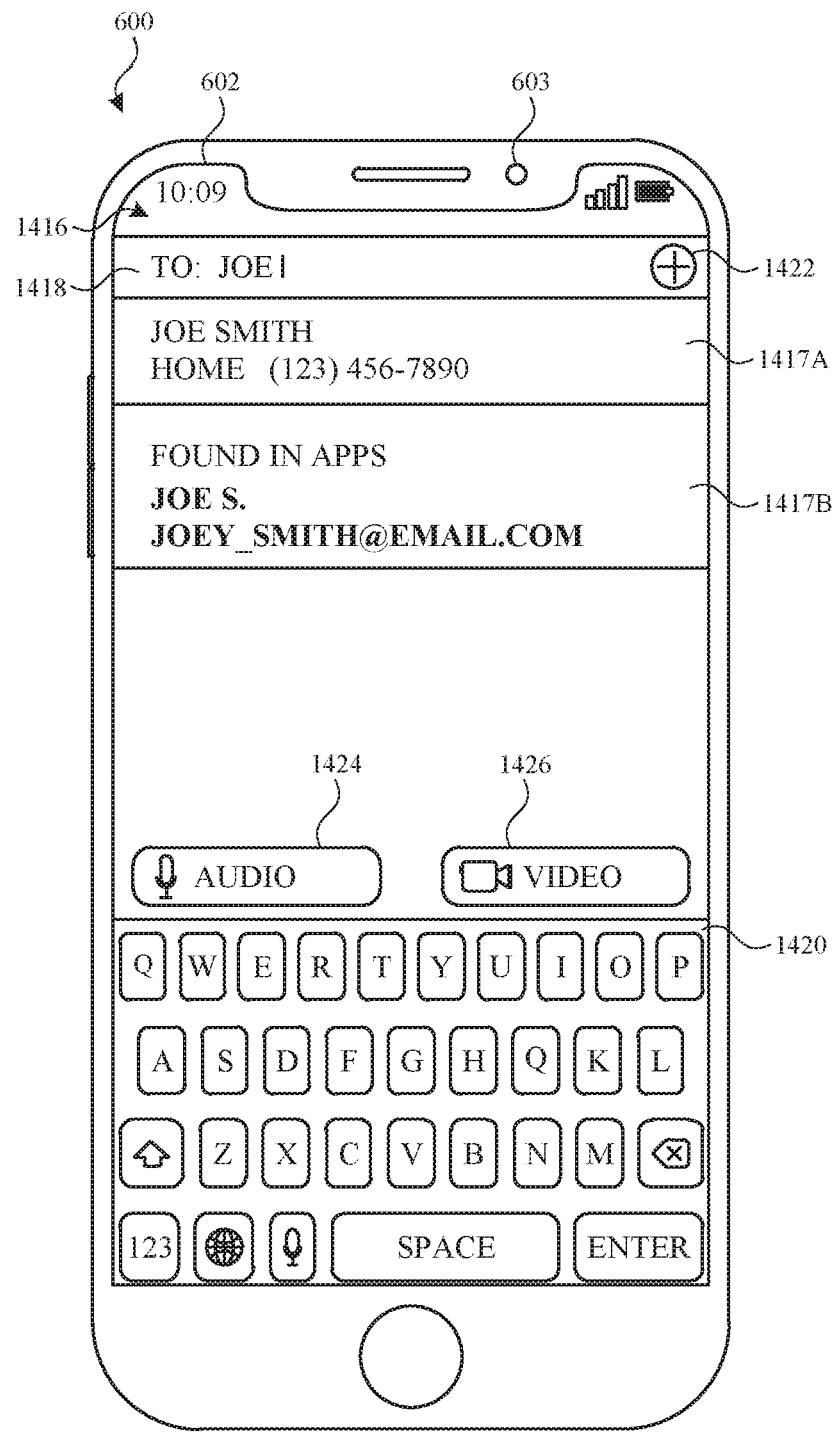

FIG. 14E also illustrates live communication user interface 1404. Instead of receiving selection of a participant affordance in list 1408 (as illustrated in FIG. 14C), device 600 receives (e.g., detects) user input 1450C (e.g., a tap) corresponding to selection of new session affordance 1406. In response to user input 1450C, and in accordance with user input 1450C corresponding to selection of new session affordance 1406, device 600 initiates a process for selecting participants and starting a new live video communication session between the selected participants and the user of device 600. As illustrated in FIG. 14F, live communication user interface 1404 is replaced with user interface 1416, which includes text entry field 1418 for entering the names of participants using keyboard 1420, add participant affordance 1422 for selecting participants from a menu (e.g., a contacts list), audio-only affordance 1424, and video affordance 1426.

In FIG. 14F, in response to entry of text "JOE" into text entry field 1418, device 600 displays two communication options 1417A and 1417B for contact "JOE SMITH." In some embodiments, device 600 visually distinguishes communication options that are associated with a device capable of joining a live communication session. In FIG. 14F, the communication mode (e.g., email) represented by communication option 1417B is associated with a device capable of joining a live communication session, as indicated by bold text. In contrast, the communication mode (e.g., home phone) represented by communication option 1417A is displayed in normal (non-bold) text to indicate that the communication mode is not associated with a device capable of joining a live communication session.

Figure 14G:
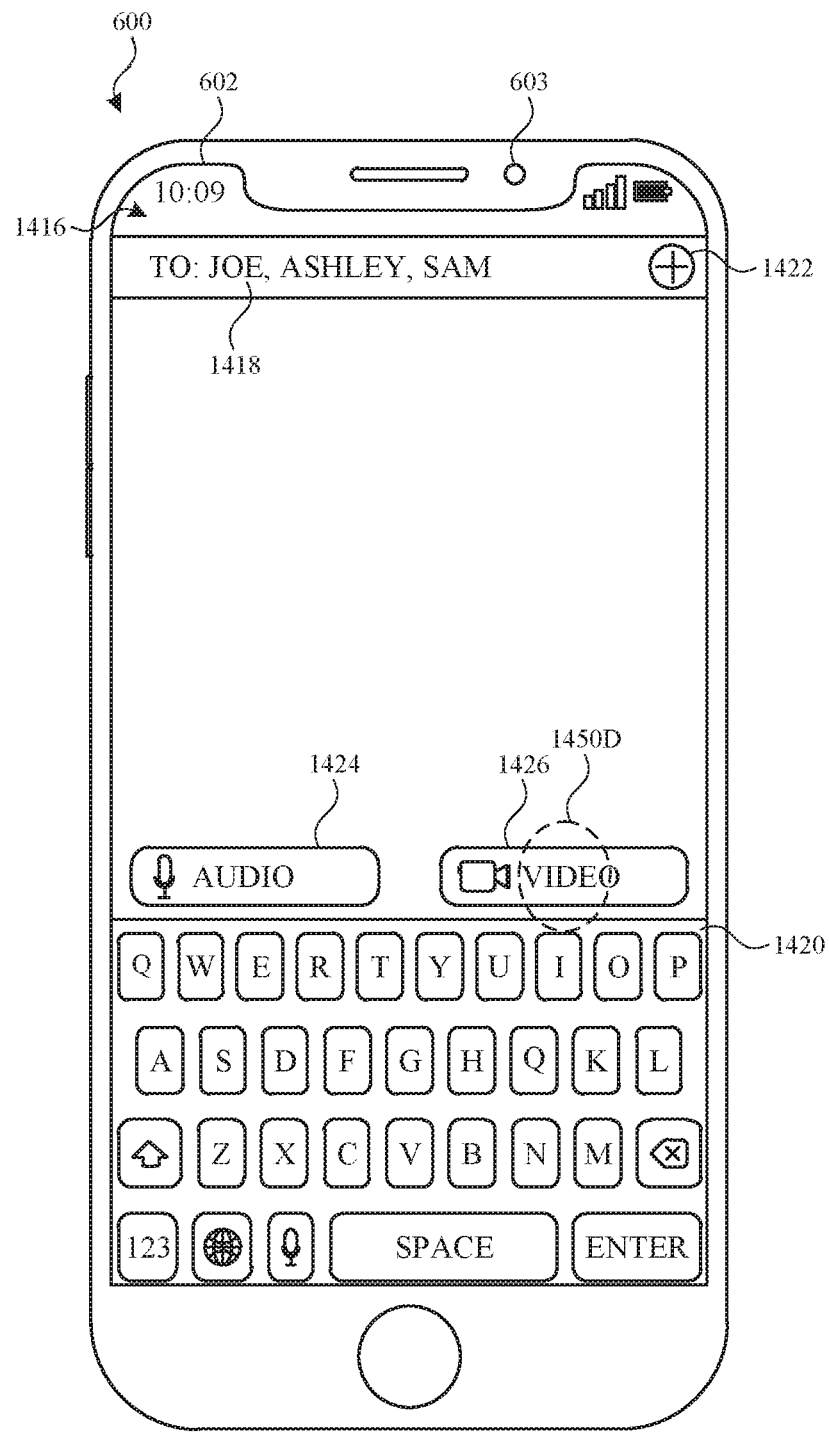

As illustrated in FIG. 14G, participants named Joe, Ashley, and Sam have been selected. Device 600 receives (e.g., detects) user input 1450D (e.g., a tap) corresponding to selection of video affordance 1426.

Figure 14H:

In response to receiving user input 1450D, device 600 starts a new live communication session with the selected participants and provides a live media stream including video and audio data (as illustrated in FIG. 14H). In some embodiments, in response to receiving user input corresponding to selection of audio only affordance 1424, device 600 starts a new live communication session with the selected participants and provides a live media stream including audio data, without video data.

Figure 14I:
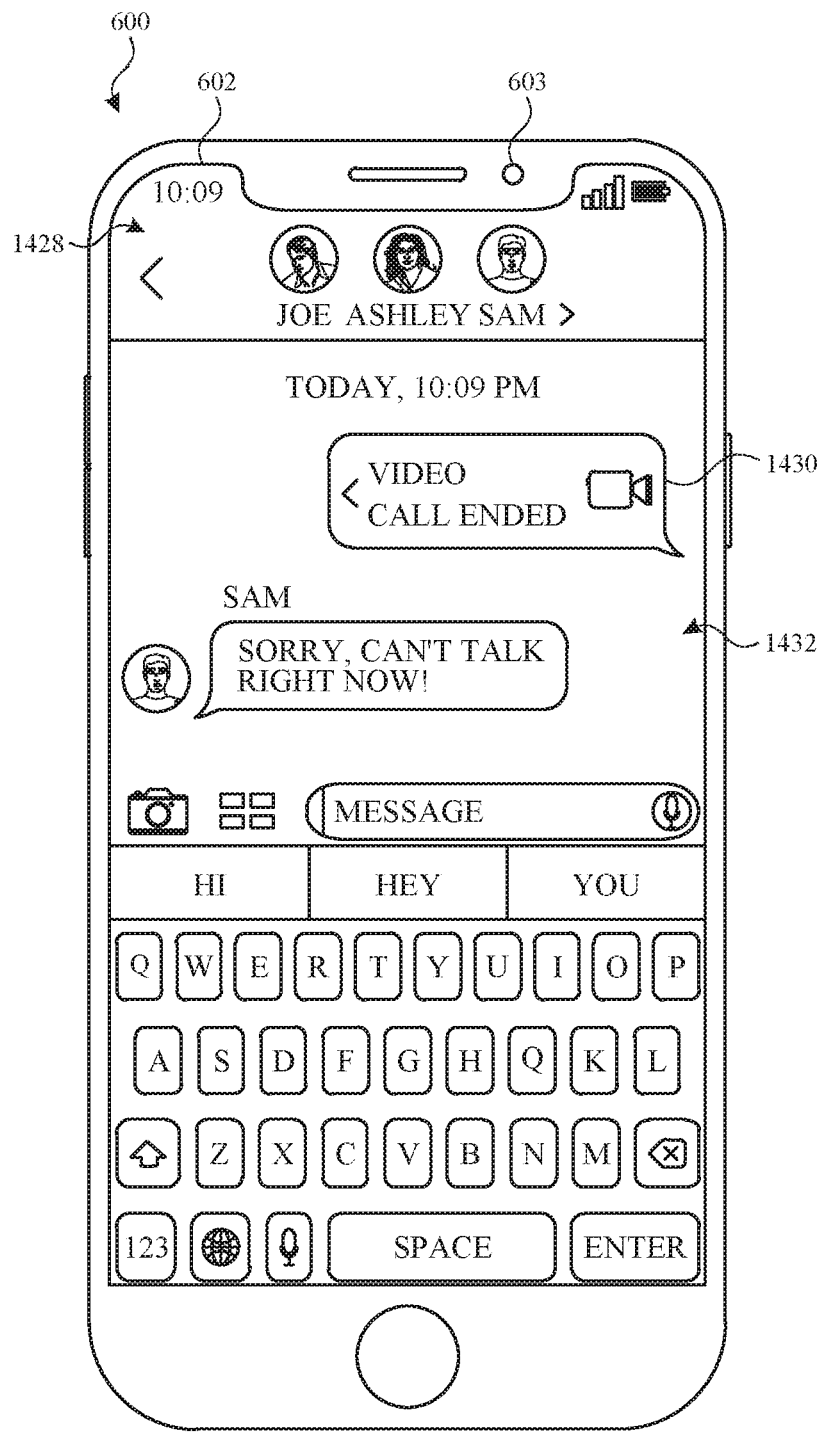

In some embodiments, after the new live communication session is started, device 600 displays a representation of the new live communication session in an application other than the live communication application. After starting the live communication session with participants Joe, Ashley, and Sam, the user of device 600 navigates to a messaging application. As illustrated in FIG. 14I, after starting the live communication session, device 600 displays messaging user interface 1428 of the messaging application. Messaging user interface 1428 displays a group message conversation including the participants of the live communication session, and message 1430 indicating that the live communication session has been started is displayed in message region 1432. In some embodiments, after starting the live communication session, device 600 displays a group including the participants of the live communication session in a list of message conversations in the messaging application. In some embodiments, device 600 displays messaging user interface 1428 (described above) in response to selection of the group in the list of message conversations.

FIGS. 15A-15C are a flow diagram illustrating a method in accordance with some embodiments. Method 1500 is performed at a device (e.g., 100, 300, 500, or 600) with a display. Some operations in method 1500 are, optionally, combined, the orders of some operations are, optionally, changed, and some operations are, optionally, omitted.

As described below, method 1500 provides an intuitive way for initiating and interacting with a live communication session between multiple participants. The method reduces the cognitive burden on a user for providing the intelligent initiation of and interaction with a live communication session between multiple participants, thereby creating a more efficient human-machine interface. For battery-operated computing devices, enabling a user to interact with and initiate a live communication session faster and more efficiently conserves power and increases the time between battery charges.

At block 1502, the device displays a live video communication user interface (e.g., 1404) of a live video communication application. At block 1504, the live video communication user interface includes a plurality of participant affordances (e.g., 1408A-1408K) corresponding to respective one or more participants, the plurality of participant affordances including a first participant affordance (e.g., 1408A) corresponding to a group of three or more participants. At block 1506, the live video communication user interface includes a new session affordance (e.g., 1406) for starting a new live video communication session. In some embodiments, a participant affordance corresponds to a previous (e.g., recent) video communication (e.g., successfully connected or attempted (either by the participant using the device or by a participant associated with an external device)) and includes an indication of the participant(s) of the video communication (e.g., 1408F). In some embodiments, a participant affordance represents a group associated with another communication application (e.g., a messaging application or a phone application (e.g., a recent conference call)). In some embodiments, the live communication user interface includes a list of recent live communication sessions (e.g., list of recent video chats can be individual and/or group chats). Displaying a live communication user interface that includes a list of recent live communication sessions allows user to quickly access and realize the recent live communication sessions that the user or device involved in (e.g., invited to, joined, communication in, etc.), provides the user with feedback about the current state of a live communication session, and provides visual feedback to the user indicating that certain operations associated with the notification and/or the live communication session will be performed. Providing improved visual feedback to the user enhances the operability of the device and makes the user-device interface more efficient (e.g., by helping the user to provide proper inputs and reducing user mistakes when operating/interacting with the device), which additionally, reduces power usage and improves battery life of the device by enabling the user to use the device more quickly and efficiently.

In some embodiments, the plurality of participant affordances includes a second participant affordance corresponding to a suggested group of participants (e.g., 1408B) (e.g., a suggested group of participants that was not manually selected/created by a user) determined based on data (e.g., usage data) from a second application (e.g., a phone application, a messaging application) different than the live video communication application.

In some embodiments, the suggested group of participants corresponds to participants in a group conversation (e.g., a group messaging session, group conference call) conducted in the second application (e.g., 1408A) or a conference call conducted in the second application (e.g., 1408C). Displaying a live communication user interface that includes an affordance corresponding to a suggested group of participants allows users to quickly access and start a live communication with a suggested group and reduces the number of inputs needed to perform an operation associated with setting up a live communication session that includes each member of the selected group. Reducing the number of inputs needed to perform an operation enhances the operability of the device and makes the user-device interface more efficient (e.g., by helping the user to provide proper inputs and reducing user mistakes when operating/interacting with the device), which additionally, reduces power usage and improves battery life of the device by enabling the user to use the device more quickly and efficiently. In addition, displaying an affordance corresponding to a suggested group provides additional control operation without cluttering the UI with addition displayed controls. Providing additional control operation without cluttering the UI with addition displayed controls enhances the operability of the device and makes the user-device interface more efficient (e.g., by helping the user to provide proper inputs and reducing user mistakes when operating/interacting with the device), which additionally, reduces power usage and improves battery life of the device by enabling the user to use the device more quickly and efficiently.

In some embodiments, the second participant affordance includes an indication (e.g., a graphical or textual indication (e.g., "suggested from Messages") a color related to a certain application, or a logo related to the application) of the second application (e.g., the source application for the suggestion). Displaying a live communication user interface that further includes an affordance corresponding to a suggest group of participants that corresponds to participants in a group conversation in a different application than the live communication application allows users to quickly access and start a live communication with a suggested group and reduces the number of inputs needed to perform an operation associated with setting up a live communication session that includes each member of the selected group (e.g., such as navigating the different application). Reducing the number of inputs needed to perform an operation enhances the operability of the device and makes the user-device interface more efficient (e.g., by helping the user to provide proper inputs and reducing user mistakes when operating/interacting with the device), which additionally, reduces power usage and improves battery life of the device by enabling the user to use the device more quickly and efficiently. In some embodiments, the plurality of participant affordances includes a third participant affordance corresponding to a second suggested group of participants (e.g., a suggested group of participants that was not manually selected/created by a user) determined based on data (e.g., usage data) from a third application (e.g., a phone application, a messaging application, an email application, a calendar application) different than the live video communication application and different from the second application (e.g., a group from a recent calendar event or a group from a recent mail event). Displaying a second participant affordance that includes an indication of an application that the suggested group is from provides the user with feedback about the current state of a live communication session and provides visual feedback to the user indicating that certain operations associated with the second application. Providing improved visual feedback to the user enhances the operability of the device and makes the user-device interface more efficient (e.g., by helping the user to provide proper inputs and reducing user mistakes when operating/interacting with the device), which additionally, reduces power usage and improves battery life of the device by enabling the user to use the device more quickly and efficiently. In some embodiments, the live communication user interface further includes a participant selection affordance (e.g., "+").

At blocks 1508, the device detects an input (e.g., 1450B) that corresponds to a request to initiate a process of starting a new live video communication session. At blocks 1510, 1512, and 1514, the device, in response to detecting the input: in accordance with the input corresponding to selection of the first participant affordance (e.g., 1408A), initiates a process of starting new live video communication session that includes the group of three or more participants. In some embodiments, the new live video communication session is started directly in response to selection of the first participant affordance (e.g., FIG. 14D). In some embodiments, a menu (e.g., 1416) of the live video communication application is displayed in response to selection of the first participant affordance, and a menu option is selected to start the new live video communication session. In response to detecting the input, the device, in accordance with the input corresponding to selection of the new session affordance, initiates a process for selecting two or more participants and starts a new live video communication session that includes a participant associated with the device and the two or more selected participants (e.g., FIG. 14F). In some embodiments, the user interface is replaced with another user interface that includes a first affordance (e.g., 1422) for selecting participants and a second affordance (e.g., 1424 and 1426) for starting the live video communication session (e.g., starting the live video communication session directly in response to selection of the second affordance). In some embodiments, participants are selected by entering contact information into a text field (e.g., 1418) or selecting a contact from a list of contacts. In some embodiments, the new live video communication session is started directly in response to selection of the affordance (e.g., 1408A). Initiating a process for starting a new live communication when prescribed conditions are met allows the device to provide the user with different live video communication session based on the number of selected participants. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In addition, initiating different processes for starting a new live communication when prescribed conditions are met reduces the number of inputs needed to perform an operation. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at blocks 1516, 1518, 1520, 1522, 1524, and 1526, the device receives a second input corresponding to selection of the participant selection affordance. In response to receiving the second user input corresponding to selection of the participant selection affordance, the device displays a group selection user interface (e.g., 1416) that includes: a text entry field (e.g., 1418) for identifying one or more participants (e.g., to: field); a keyboard (e.g., 1420); an audio-only affordance (e.g., 1424); and a video affordance (e.g., 1426). While displaying the group selection user interface, the device receives a third user input selection. In response to receiving the third user input, the device, in accordance with the third user input corresponding to selection of the audio-only affordance, starts the new live communication session using audio transmitted from the electronic device (e.g., audio recorded by one or more microphones of the device), without transmitting video data from the electronic device. Starting the new live communication session using audio transmitted from the electronic device when prescribed conditions are met (e.g., in response to an audio-only affordance being selected) allows a user to join live communication sessions using audio without the user having to select or modify additional input and outputs of the device (e.g., turning off camera and/or turning on microphone). Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the system displays an indicator that describes that the user has joined the live communication using audio only. In some embodiments, the device prompts user display a phrase such as "do you want to connect with video" in order to determine whether the user wants to use audio only or video and audio. This can give the user comfort in that video is not being shared). In response to receiving the third user input, in accordance with the third user input corresponding to selection of the video affordance, the device starts the new live communication session using audio and video transmitted from the electronic device. Starting the live communication session using audio and video transmitted from the electronic device when prescribed conditions are met (e.g., in response to a video affordance option being selected) allows a user to join live communication sessions using audio and video without the user having to select or modify additional input and outputs of the device (e.g., turning on camera and/or turning on microphone). Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Optionally, at blocks 1528 and 1530, the device starts the new live communication session. After starting the new live communication session, the device displays a representation of the new live communication session in a fourth application (e.g., messages or phone applications) that is different from the live communication session. In some embodiments, live communication participants are displayed as group participants in a group message in a list of message conversation in the messaging application. In some embodiments, the group message in the list of message conversations includes an indication of whether there is an active live communication session including the group participants (e.g., 1408E). In some embodiments, live communication participants are displayed as group participants in a group call in a list of recent calls in the phone application or call application. In some embodiments, live communication participants are displayed as invitees to a calendar event in a calendar application. Displaying a representation of the live communication session in an application that is different than the live communication session provides the user with feedback about the current state of a live communication session in multiple applications, provides visual feedback to the user indicating that certain operations associated with the notification and/or the live communication session will be performed, if the user merely, in some embodiments, activates the representation at one time (e.g., starting the another new live communication session in the live communication application from another application with the same participants that were in the previous live communication session at a later time). Providing improved visual feedback to the user enhances the operability of the device and makes the user-device interface more efficient (e.g., by helping the user to provide proper inputs and reducing user mistakes when operating/interacting with the device), which additionally, reduces power usage and improves battery life of the device by enabling the user to use the device more quickly and efficiently.

In some embodiments, the plurality of participant affordances (e.g., 1408) includes a fourth participant affordance (e.g., 1408A, 1408E) corresponding to a group of three or more participants. In some embodiments, in accordance with a determination that the fourth participant affordance corresponds to an active live communication session (e.g., 1408E), the fourth participant affordance is displayed with a first visual appearance (e.g., the first visual appearance is font color or font style of the participant affordance or an icon or glyph displayed at or near the participant affordance); and in accordance with a determination that the fourth participant affordance corresponds to a non-active live communication session (e.g., 1408A), the fourth participant affordance is displayed with a second visual appearance different than the first visual appearance (e.g., the second visual appearance is a font color or font style that is different than a font color or font style of the first visual appearance, or the second visual appearance does not include an icon or glyph displayed near the representation of the potential participant or includes a different icon or glyph than the first visual appearance). In some embodiments, the appearance of a participant affordance associated with a previous live communication session is based on whether or not the user of the device joined the corresponding live communication session (e.g., the participant affordance for a missed live communication session (e.g., 1408H) includes a font color, font style, icon, glyph, etc. that is different than or not included in a participant affordance (e.g., 1408F) for a live communication session that the user of device 600 joined; a participant affordance includes text of one color if the user of the device joined the session and includes text of a different color if the user of the device did not join the session before it ended). In some embodiments, the appearance of a participant affordance associated with an active live communication session changes when the session is no longer active (e.g., from bold text and a video camera icon to non-bold text without a video camera icon).

In some embodiments, initiating the process for selecting two or more participants includes displaying a representation (e.g., 1417A, 1417B) of a potential participant (e.g., a contact in a contact list). In some embodiments, in accordance with a determination that the potential participant is associated with a device capable of joining a live communication session, the representation of the potential participant is displayed with a first visual appearance (e.g., the first visual appearance is font color or font style of the representation of the potential participant or an icon or glyph displayed near the representation of the potential participant); and in accordance with a determination that the participant is not associated with a device capable of joining a live communication session, the representation of the potential participant is displayed with a second visual appearance different than the first visual appearance (e.g., the second visual appearance is a font color or font style that is different than a font color or font style of the first visual appearance, or the second visual appearance does not include an icon or glyph displayed near the representation of the potential participant or includes a different icon or glyph than the first visual appearance).

Note that details of the processes described above with respect to method 1500 (e.g., FIG. 15A-15C) are also applicable in an analogous manner to the methods described above. For example, method 1500 optionally includes one or more of the characteristics of the various methods described above with reference to method 700, 900, 1100, or 1300.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the multimedia communication. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to facilitate multimedia communications between users. Accordingly, use of such personal information data enables users to improve such communications. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of multimedia communications, the present technology can be configured to allow users to select to "opt in" or "opt out" of participation in the collection of personal information data during registration for services or anytime thereafter. In another example, users can select not to provide location data and/or availability. In yet another example, users can select to limit the length of time records of communication sessions are maintained or entirely prohibit the retention of such data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, communication sessions can be established based on non-personal information data or a bare minimum amount of personal information, such as the content being requested by the device associated with a user, other non-personal information available to the communication service providers, or publicly available information.

What is claimed is:

1. An electronic device, comprising:
a display;
one or more processors; and
memory storing one or more programs configured to be executed by the one or more processors, the one or more programs including instructions for:
displaying a messaging user interface of a messaging application, the messaging user interface including:
a message region including a plurality of messages between participants in a message conversation that includes three or more participants; and
an affordance separate from the message region for starting a live video communication session in a live video communication application;
detecting an input corresponding to selection of the affordance; and
in response to detecting the input corresponding to selection of the affordance, initiating a process for starting the live video communication session in the live video communication application, the live video communication session including the participants of the message conversation, wherein initiating the process for starting the live video communication session in the live video communication application includes starting the live video communication session in the live communication application; and after starting the live video communication session:
in response to a determination that a first participant has not joined the live video communication session for a predetermined period of time, displaying a reminder option that is associated with the first participant in the live video communication application;
while displaying the reminder option that is associated with the first participant, receiving an input corresponding to selection of the reminder option; and
in response to receiving the input corresponding to selection of the reminder option, sending a notification indicating that the live video communication session is available to the first participant.

2. The electronic device of claim 1, wherein initiating the process for starting the live video communication session in the live communication application includes:
transitioning from the messaging user interface to a user interface of the live video communication application.

3. The electronic device of claim 1, wherein initiating the process for starting the live video communication session in the live video communication application includes displaying a group contact user interface, the group contact user interface including a group contact affordance for starting the live video communication session, and wherein the one or more programs further include instructions for:
before starting the live video communication session:
detecting an input corresponding to selection of the group contact affordance for starting the live video communication session; and
in response to detecting the input corresponding to selection of the group contact affordance for starting the live video communication session, starting the live video communication session in the live video communication application.

4. The electronic device of claim 3, wherein the group contact user interface further includes: a plurality of participant affordances including a first participant affordance that is associated with a first participant in the participants of the message conversation, the one or more programs further including instructions for:
detecting an input corresponding to selection of the first participant affordance that is associated with the first participant of the message conversation; and
in response to detecting the input corresponding to selection of the first participant affordance that is associated with the first participant of the message conversation, displaying an individual participant user interface that includes a characteristic of the first participant.

5. The electronic device of claim 4, wherein the first participant affordance includes an option for selecting a mode of communication for contacting the first participant of the message conversation, the one or more programs further including instructions for:
detecting an input corresponding to selection of the option for selecting the mode of communication; and
in response to detecting the input corresponding to selection of the option for selecting the mode of communication, initiating a process to select the mode of commutation for contacting the first participant.

6. The electronic device of claim 3, wherein the group contact user interface further includes a new contact affordance, the one or more programs further including instructions for:
detecting an input corresponding to selection of the new contact affordance; and
in response to detecting the input corresponding to selection of the new contact affordance, initiating a process for adding a new contact to the live video communication session.

7. The electronic device of claim 1, wherein initiating the process for starting the live video communication session includes:
after starting the live video communication session in the live video communication application, displaying a live video communication session user interface that includes:
a first placeholder associated with a first participant of the live video communication session participants.

8. The electronic device of claim 7, wherein the first placeholder includes a first reminder affordance for the first participant of the live video communication session participants, the one or more programs further including instructions for:
receiving an input corresponding to selection of the first reminder affordance; and
in response to receiving the input corresponding to selection of the first reminder affordance, sending a new notification to the first participant that is different than a previous notification sent to the first participant.

9. The electronic device of claim 7, wherein the live video communication session user interface further includes a second placeholder associated with a second participant, wherein the first placeholder and the second placeholder are arranged according to a first layout, and wherein the one or more programs further include instructions for:
in accordance with a determination that the first participant has not joined the live video communication session for a predetermined amount of time:
ceasing to display the first placeholder; and
changing the arrangement of the second placeholder to a second layout, different than the first layout.

10. The electronic device of claim 7, the one or more programs further including instructions for:
in accordance with a determination that the first participant has joined the live video communication session, modifying the display of the first placeholder with a representation of the first participant.

11. A non-transitory computer-readable storage medium storing one or more programs configured to be executed by one or more processors of an electronic device with a display and a touch-sensitive surface, the one or more programs including instructions for:
displaying a messaging user interface of a messaging application, the messaging user interface including:
a message region including a plurality of messages between participants in a message conversation that includes three or more participants; and
an affordance separate from the message region for starting a live video communication session in a live video communication application;
detecting an input corresponding to selection of the affordance; and
in response to detecting the input corresponding to selection of the affordance, initiating a process for starting the live video communication session in the live video communication application, the live video communication session including the participants of the message conversation, wherein initiating the process for starting the live video communication session in the live video communication application includes starting the live video communication session in the live video communication application; and after starting the live video communication session:
in response to a determination that a first participant has not joined the live video communication session for a predetermined period of time, displaying a reminder option that is associated with the first participant in the live video communication application;
while displaying the reminder option that is associated with the first participant, receiving an input corresponding to selection of the reminder option; and
in response to receiving the input corresponding to selection of the reminder option, sending a notification indicating that the live video communication session is available to the first participant.

12. The non-transitory computer-readable storage medium of claim 11, wherein initiating the process for starting the live video communication session in the live video communication application includes:
transitioning from the messaging user interface to a user interface of the live video communication application.

13. The non-transitory computer-readable storage medium of claim 11, wherein initiating the process for starting the live video communication session in the live video communication application includes displaying a group contact user interface, the group contact user interface including a group contact affordance for starting the live video communication session, and wherein the one or more programs further include instructions for:
before starting the live video communication session:
detecting an input corresponding to selection of the group contact affordance for starting the live video communication session; and
in response to detecting the input corresponding to selection of the group contact affordance for starting the live video communication session, starting the live video communication session in the live video communication application.

14. The non-transitory computer-readable storage medium of claim 13, wherein the group contact user interface further includes: a plurality of participant affordances including a first participant affordance that is associated with a first participant in the participants of the message conversation, the one or more programs further including instructions for:
detecting an input corresponding to selection of the first participant affordance that is associated with the first participant of the message conversation; and
in response to detecting the input corresponding to selection of the first participant affordance that is associated with the first participant of the message conversation, displaying an individual participant user interface that includes a characteristic of the first participant.

15. The non-transitory computer-readable storage medium of claim 14, wherein the first participant affordance includes an option for selecting a mode of communication for contacting the first participant of the message conversation, the one or more programs further including instructions for:
detecting an input corresponding to selection of the option for selecting the mode of communication; and
in response to detecting the input corresponding to selection of the option for selecting the mode of communication, initiating a process to select the mode of commutation for contacting the first participant.

16. The non-transitory computer-readable storage medium of claim 13, wherein the group contact user interface further includes a new contact affordance, the one or more programs further including instructions for:
detecting an input corresponding to selection of the new contact affordance; and
in response to detecting the input corresponding to selection of the new contact affordance, initiating a process for adding a new contact to the live video communication session.

17. The non-transitory computer-readable storage medium of claim 11, wherein initiating the process for starting the live video communication session includes:
after starting the live video communication session in the live video communication application, displaying a live video communication session user interface that includes:
a first placeholder associated with a first participant of the live video communication session participants.

18. The non-transitory computer-readable storage medium of claim 17, wherein the first placeholder includes a first reminder affordance for the first participant of the live video communication session participants, the one or more programs further including instructions for:
receiving an input corresponding to selection of the first reminder affordance; and
in response to receiving the input corresponding to selection of the first reminder affordance, sending a new notification to the first participant that is different than a previous notification sent to the first participant.

19. The non-transitory computer-readable storage medium of claim 17, wherein the live video communication session user interface further includes a second placeholder associated with a second participant, wherein the first placeholder and the second placeholder are arranged according to a first layout, and wherein the one or more programs further include instructions for:
in accordance with a determination that the first participant has not joined the live video communication session for a predetermined amount of time:
ceasing to display the first placeholder; and
changing the arrangement of the second placeholder to a second layout, different than the first layout.

20. The non-transitory computer-readable storage medium of claim 17, the one or more programs further including instructions for:
in accordance with a determination that the first participant has joined the live video communication session, modifying the display of the first placeholder with a representation of the first participant.

21. A method comprising:
at an electronic device with a display:
displaying a messaging user interface of a messaging application, the messaging user interface including:
a message region including a plurality of messages between participants in a message conversation that includes three or more participants; and
an affordance separate from the message region for starting a live video communication session in a live video communication application;
detecting an input corresponding to selection of the affordance; and in response to detecting the input corresponding to selection of the affordance, initiating a process for starting the live video communication session in the live video communication application, the live video communication session including the participants of the message conversation, wherein initiating the process for starting the live video communication session in the live video communication application includes starting the live video communication session in the live video communication application; and after starting the live video communication session:
in response to a determination that a first participant has not joined the live video communication session for a predetermined period of time, displaying a reminder option that is associated with the first participant in the live video communication application;
while displaying the reminder option that is associated with the first participant, receiving an input corresponding to selection of the reminder option; and
in response to receiving the input corresponding to selection of the reminder option, sending a notification indicating that the live video communication session is available to the first participant.

22. The method of claim 21, wherein initiating the process for starting the live video communication session in the live video communication application includes:
transitioning from the messaging user interface to a user interface of the live video communication application.

23. The method of claim 21, wherein initiating the process for starting the live video communication session in the live video communication application includes displaying a group contact user interface, the group contact user interface including a group contact affordance for starting the live video communication session, and the method further comprises:
before starting the live video communication session:
detecting an input corresponding to selection of the group contact affordance for starting the live video communication session; and
in response to detecting the input corresponding to selection of the group contact affordance for starting the live video communication session, starting the live video communication session in the live video communication application.

24. The method of claim 23, wherein the group contact user interface further includes: a plurality of participant affordances including a first participant affordance that is associated with a first participant in the participants of the message conversation, the method further comprising:
detecting an input corresponding to selection of the first participant affordance that is associated with the first participant of the message conversation; and
in response to detecting the input corresponding to selection of the first participant affordance that is associated with the first participant of the message conversation, displaying an individual participant user interface that includes a characteristic of the first participant.

25. The method of claim 24, wherein the first participant affordance includes an option for selecting a mode of communication for contacting the first participant of the message conversation, the method further comprising:
detecting an input corresponding to selection of the option for selecting the mode of communication; and
in response to detecting the input corresponding to selection of the option for selecting the mode of communication, initiating a process to select the mode of commutation for contacting the first participant.

26. The method of claim 23, wherein the group contact user interface further includes a new contact affordance, the method further comprising:
detecting an input corresponding to selection of the new contact affordance; and
in response to detecting the input corresponding to selection of the new contact affordance, initiating a process for adding a new contact to the live video communication session.

27. The method of claim 21, wherein initiating the process for starting the live video communication session includes:
after starting the live video communication session in the live video communication application, displaying a live video communication session user interface that includes:
a first placeholder associated with a first participant of the live video communication session participants.

28. The method of claim 27, wherein the first placeholder includes a first reminder affordance for the first participant of the live video communication session participants, the method further comprising:
receiving an input corresponding to selection of the first reminder affordance; and
in response to receiving the input corresponding to selection of the first reminder affordance, sending a new notification to the first participant that is different than a previous notification sent to the first participant.

29. The method of claim 27, wherein the live video communication session user interface further includes a second placeholder associated with a second participant, wherein the first placeholder and the second placeholder are arranged according to a first layout, and wherein the method further comprises:
in accordance with a determination that the first participant has not joined the live video communication session for a predetermined amount of time:
ceasing to display the first placeholder; and
changing the arrangement of the second placeholder to a second layout, different than the first layout.

30. The method of claim 27, further comprising:
in accordance with a determination that the first participant has joined the live video communication session, modifying the display of the first placeholder with a representation of the first participant.

* * * * *

UNITED STATES PATENT AND TRADEMARK OFFICE
CERTIFICATE OF CORRECTION

PATENT NO. : 10,630,939 B2
APPLICATION NO. : 16/383403
DATED : April 21, 2020
INVENTOR(S) : Marcel Van Os et al.

It is certified that error appears in the above-identified patent and that said Letters Patent is hereby corrected as shown below:

In the Claims

Claim 1, Column 117, Line 4, after "live" insert -- video --.

Signed and Sealed this
Twenty-second Day of December, 2020

Andrei Iancu
*Director of the United States Patent and Trademark Office*